(12) United States Patent
Alwahedi et al.

(10) Patent No.: US 12,337,303 B2
(45) Date of Patent: Jun. 24, 2025

(54) HYDROGENATION OF SULPHUR CONTAINING GASES WITH PHOSPHIDE NANOPARTICLES

(71) Applicant: Khalifa University of Science and Technology, Abu Dhabi (AE)

(72) Inventors: Yasser Alwahedi, Abu Dhabi (AE); Kyriaki Polychronopoulou, Abu Dhabi (AE); Xinnan Lu, Abu Dhabi (AE); Safa Gaber, Abu Dhabi (AE); Dina Gaber, Abu Dhabi (AE); Georgia Basina, Abu Dhabi (AE); Malathe Samir, Abu Dhabi (AE)

(73) Assignee: Khalifa University of Science and Technology, Abu Dhabi (AE)

( * ) Notice: Subject to any disclaimer, the term of this patent is extended or adjusted under 35 U.S.C. 154(b) by 147 days.

(21) Appl. No.: 17/928,958

(22) PCT Filed: Jun. 30, 2021

(86) PCT No.: PCT/IB2021/055862
§ 371 (c)(1),
(2) Date: Dec. 1, 2022

(87) PCT Pub. No.: WO2022/003591
PCT Pub. Date: Jan. 6, 2022

(65) Prior Publication Data
US 2023/0226528 A1    Jul. 20, 2023

Related U.S. Application Data

(60) Provisional application No. 63/046,453, filed on Jun. 30, 2020.

(51) Int. Cl.
| | | |
|---|---|---|
| *B01J 27/185* | (2006.01) | |
| *B01J 35/23* | (2024.01) | |
| *B01J 35/30* | (2024.01) | |
| *B01J 35/64* | (2024.01) | |
| *B01J 37/02* | (2006.01) | |
| *B01J 37/03* | (2006.01) | |
| *B01J 37/08* | (2006.01) | |
| *B01J 37/28* | (2006.01) | |

(52) U.S. Cl.
CPC .......... *B01J 27/1853* (2013.01); *B01J 35/23* (2024.01); *B01J 35/393* (2024.01); *B01J 35/647* (2024.01); *B01J 37/0209* (2013.01); *B01J 37/035* (2013.01); *B01J 37/08* (2013.01); *B01J 37/28* (2013.01)

(58) Field of Classification Search
CPC .... B01J 27/1853; B01J 35/647; B01J 35/393; B01J 35/23; B01J 35/45; B01J 37/0209; B01J 37/035; B01J 37/08; B01J 37/28
USPC ............................................. 502/213, 259
See application file for complete search history.

(56) References Cited

U.S. PATENT DOCUMENTS

| | | | |
|---|---|---|---|
| 6,800,261 B1 | 10/2004 | Borsboom et al. | |
| 7,655,205 B2 | 2/2010 | Van et al. | |
| 9,120,719 B2* | 9/2015 | Ding | C07C 1/044 |
| 9,802,821 B2* | 10/2017 | Zhang | C01B 25/08 |
| 10,406,509 B2* | 9/2019 | Bussell | B01J 35/45 |
| 2014/0155670 A1* | 6/2014 | Slowing | B01J 23/745 |
| | | | 502/167 |
| 2016/0355936 A1* | 12/2016 | Dismukes | C25B 11/075 |

FOREIGN PATENT DOCUMENTS

| | | |
|---|---|---|
| CN | 104383948 A | 3/2015 |
| CN | 107694584 A | 2/2018 |
| EP | 2089154 A1 | 8/2009 |

OTHER PUBLICATIONS

Tamás I. Korányi et al., "SBA-15-supported nickel phosphide hydrotreating catalysts." Journal of Catalysis 253, pp. 119-131. (Year: 2008).*
Dolly Carolina Costa et al., "Phosphorus as a promoter of a nickel catalyst to obtain 1-phenylethanol from chemoselective hydrogenation of acetophenone." Heliyon 5, pp. 1-9. (Year: 2019).*
Dolly C. Costa et al., "Preparation and characterization of a supported system of Ni2P/Ni12P5 nanoparticles and their use as the active phase in chemoselective hydrogenation of acetophenone." Nanotechnology 29, pp. 1-11. (Year: 2018).*
M. Consuelo Alvarez-Galvan et al., "Metal phosphide catalysts for the hydrotreatment of non-edible vegetable oils." Catalysis Today 302, pp. 242-249. (Year: 2018).*
Yongxing Yang et al., "Novel method to synthesize Ni2P/SBA-15 adsorbents for the adsorptive desulfurization of model diesel fuel." Journal of Alloys and Compounds 745, pp. 467-476. (Year: 2018).*
"International Search Report and Written Opinion Received mailed Sep. 9, 2021", Sep. 9, 2021, 10 pages.
Yang, Shaofeng , et al., "Preparation and hydrotreating activity of unsupported nickel phosphide with high surface area", Jun. 6, 2006.
Pan, Yuan , et al., "An efficient method for the synthesis of nickel phosphide nanocrystals via thermal decomposition of single-source precursors", RSC Advances, DOI: 10.1039/C5RA00117J, Jan. 2015.
Pan, Yuan , et al., "Monodispersed nickel phosphide nanocrystals with different phases: synthesis, characterization and electrocatalytic properties for hydrogen evolution", Journal of Materials Chemistry A, DOI: 10.1039/C4TA04867A, Nov. 2024, 36 pages.

(Continued)

*Primary Examiner* — Patricia L. Hailey
(74) *Attorney, Agent, or Firm* — Billion & Armitage

(57) ABSTRACT

Embodiments include hydrogenating catalysts and methods of making the same. The catalyst includes nanoparticles of a metal phosphide, such as nickel phosphide with a $Ni_5P_4$ phase. Also included are methods of hydrogenating a gas that contains sulfur. The methods include directing the gas containing sulfur to a catalyst that includes nanoparticles of a metal phosphide, and contacting the catalyst with the gas containing sulfur to produce a hydrogenated gas.

18 Claims, 62 Drawing Sheets

(56) References Cited

OTHER PUBLICATIONS

Papawassiliou, Wassilios, et al., "Crystal and electronic facet analysis of ultrafine Ni2P particles by solid-state NMR nanocrystallography", 22 pages.
Polychronopoulou, K., et al., "Novel Fe—Mn—Zn—Ti—O mixed-metal oxides for the low-temperature removal of H2S from gas streams in the presence of H2, CO2, and H2O", Journal of Catalysis 236 (2005) 205-220.
Polychronopoulou, K., "Novel Zn—Ti-based mixed metal oxides for low-temperature adsorption of H2S from industrial gas streams", Applied Catalysis B: Environmental 57 (2005) 125-137.
Ravikovitch, P. I., et al., "Capillary Hysteresis in Nanopores: Theoretical and Experimental Studies of Nitrogen Adsorption on MCM-41", Langmuir 1995, 11, 4765-4772.
Savithra, Galbokka H. Layan, et al., "Rational Design of Nickel Phosphide Hydrodesulfurization Catalysts: Controlling Particle Size and Preventing Sintering", Chem. Mater. 2013, 25, 825-833.
Sawhill, Stephanie J., et al., "Thiophene hydrodesulfurization over supported nickel phosphide catalysts", Journal of Catalysis 215 (2003) 208-219.
Senevirathne, Keerthi, et al., "Synthesis and Characterization of Discrete Nickel Phosphide Nanoparticles: Effect of Surface Ligation Chemistry on Catalytic Hydrodesulfurization of Thiophene", Adv. Funct. Mater. 2007, 17, 3933-3939.
Thommes, Matthias, et al., "Physisorption of gases, with special reference to the evaluation of surface area and pore size distribution (IUPAC Technical Report)", Pure Appl. Chem. 2015; aop, 19 pages.
Tzitzios, Vasileios, et al., "Ultra-fine Ni2P nanoparticles decorated r-GO: Novel Phosphidation approach and Dibenzothiophene Hydrodesulfurization", 24 pages.
Vasudevan, P. T., et al., "A Review of Deep Hydrodesulfurization Catalysis", Catalysis Reviews: Science and Engineering, 38:2, 161-188, 1996.
Vrinat, M.L., "The Kinetics of the Hydrodesulfurization Process—A Review", Applied Catalysis, 6 (1983) 137-158.
Wei, Qiang, et al., "A promising catalyst for hydrodesulfurization: Ni2P—A Dft study", Catalysis Today, https://doi.org/10.1016/j.cattod.2019.10.032, 2019, 8 pages.
Wexler, Robert B., et al., "Stable Phosphorus-Enriched (0001) Surfaces of Nickel Phosphides", Chem. Mater., DOI: 10.1021/acs.chemmater.6b01437, Jul. 18, 2016, 23 pages.
Zelinska, Mariya, et al., "Redetermination of Ni5P4", Acta Cryst. (2007). E63, i158-i159.
Zhou, Guangyao, et al., "Electronic modulation by N incorporation boosts the electrocatalytic performance of urchin-like Ni5P4 hollow microspheres for hydrogen evolution", Chemical Engineering Journal (2020), doi: https://doi.org/10.1016/j.cej.2020.126302.
Generalized Synthesis of Metal Phosphide Nanorods via Thermal Decomposition of Continuously Delivered Metal-Phosphine Complexes Using a Syringe Pump.
"Competitive adsorption between sulfur- and nitrogen-containing compounds over NiMOS nanocluster: The correlations of electronegativity, morphology and molecular orbital with adsorption strength", Chemical Engineering Science, https://doi.org/10.1016/j.ces.2020.116313, 2020, 11 pages.
"Hydrodesulfurization Catalysts Market Size, Share & Trends Analysis Report By Type (LoadType, Non-load Type), By Application (Diesel, Naphtha), By Region, And Segment Forecasts,2020-2027", Market Analysis, Jun. 2020, 10 pages.
"Process for removing sulfurcompounds from a gas withhydrogenation and direct oxidationsteps", Apr. 16, 2015, 20 pages.
Albani, Davide, et al., "Ensemble Design in Nickel Phosphide Catalysts for Alkyne Semi-Hydrogenation", ChemCatChem 2018, 10, 1-9.
Aso, Keigo, et al., "Phase-Selective Synthesis of Nickel Phosphide in High-Boiling Solvent for All-Solid-State Lithium Secondary Batteries", Inorg. Chem., 50, 10820-10824, Oct. 3, 2011.
Bahamon, Daniel, et al., "A DFT study of the adsorption energy and electronic interactions of the SO2 molecule on a CoP hydrotreating catalyst", RSC Adv., 2021, 11, 2947.
Basina, Georgia, et al., "On the selective oxidation of H2S by heavy loaded Nanoparticles Embedded in Mesoporous Matrix (NEMMs)", Applied Catalysis B: Environmental 278 (2020) 119338.
Bekaert, "Direct Correlation between the 31P MAS NMR Response and the Electronic Structure of Some Transition Metal Phosphides", J. Phys. Chem. C, 112, 20481-20490, Dec. 3, 2008.
Bernasconi, Roberto, et al., "Nickel Phosphides Fabricated Through a Codeposition-Annealing Technique as Low-Cost Electrocatalytic Layers for Efficient Hydrogen Evolution Reaction", ACS Applied Energy Materials, Jun. 15, 2020, 1-40.
Blaha, Peter, "An Augmented PlaneWave Plus Local Orbitals Program for Calculating Crystal Properties", User's Guide, WIEN2k 22.1 (Release Oct. 6, 2022), 302 pages.
Brunet, Sylvette, et al., "On the hydrodesulfurization of FCC gasoline: a review", Applied Catalysis A: General 278 (2005) 143-172.
Callejas, Juan F., et al., "Synthesis, Characterization, and Properties of Metal Phosphide Catalysts for the Hydrogen-Evolution Reaction", Chem. Mater., DOI: 10.1021/acs.chemmater.6b02148, Aug. 7, 2016, 58 pages.
Chen, Anyin, et al., "Facile synthesis of Ni5P4 nanosheets/nanoparticles for highly active and durable hydrogen evolution", International Journal of Hydrogen Energy 46 (2021) 11701-11710.
Chen, Yudi, et al., "Metal phosphides derived from hydrotalcite precursors toward the selective hydrogenation of phenylacetylene", ACS Catal., DOI: 10.1021/acscatal.5b01429, Aug. 25, 2015.
Chen, Cong-Yan, et al., "Studies on mesoporous materials I. Synthesis and characterization of MCM-41", Microporous Materials, 2 (1993) 17-26.
Chen, Chun-Liang, et al., "Supported transition-metal oxide catalysts for reduction of sulfur dioxide with hydrogen to elemental sulfur", Chemosphere 56 (2004) 425-431.
Cheong, Woo-Jae, et al., "XPS characterization of the corrosion film formed on the electroless nickel deposit prepared using different stabilizers in NaCl solution", Surface and Interface Analysis, Surf. Interface Anal.; 39: 405-414, Mar. 7, 2007.
Chiang, Ray-Kuang, et al., "Formation of Hollow Ni2P Nanoparticles Based on the Nanoscale Kirkendall Effect", Inorg. Chem. 2007, 46, 369-371.
Chorkendotff, /., et al., "Concepts of Modern Catalysis and Kinetics", Concepts of Modern Catalysis and Kinetics Second Edition, 2007, 8 pages.
Deng, Gengfeng, et al., "Reduction of SO2 to elemental sulfur over rare earth-iron catalysts", Journal of Rare Earths, vol. 27, No. 5, Oct. 2009, p. 744.
Eow, John S., "Recovery of Sulfur from Sour Acid Gas: A Review of the Technology", Environmental Progress (V01.21, No. 3), Oct. 2002, 143-162.
Feng, Xuyong, et al., "In Situ Synthesis and in Operando NMR Studies of High-Performance Ni5P4-Nanosheet Anode", Journal of Materials Chemistry A, 2018, DOI: 10.1039/C8TA05433A., 11 pages.
Hall, David S., et al., "Nickel hydroxides and related materials: a review of their structures, synthesis and properties", Proc. R. Soc. A 471: 20140792. http://dx.doi.org/10.1098/rspa.2014.0792, 2014.
Hammer, B., et al., "Theoretical Surface Science and Catalysis—Calculations and Concepts", Advances in Catalysis, vol. 45, 2000, 71-129.
Han, Gi Bo, et al., "Direct Reduction of Sulfur Dioxide to Elemental Sulfur with Hydrogen over Sn—Zr-Based Catalysts", Ind. Eng. Chem. Res. 2008, 47, 4658-4664.
Henkes, Amanda E., et al., "Converting Metals into Phosphides: A General Strategy for the Synthesis of Metal Phosphide Nanocrystals", J. Am. Chem. Soc. 2007, 129, 1896-1897.
Henkes, Amanda E., et al., "Trioctylphosphine: A General Phosphorus Source for the Low-Temperature Conversion of Metals into Metal Phosphides", Chem. Mater. 2007, 19, 4234-4242.
Hohenberg, P., et al., "Inhomogeneous Electron Gas", Physical Review, vol. 136, No. 38, Nov. 9, 1964, B 864-871.
Holstein, T., et al., "Persistence of Band Fluorescence in Mercury Vapor", Aug. 29, 1949, 1259-1261.

(56) References Cited

OTHER PUBLICATIONS

Ishiguro, Atsushi, et al., "Efficient Reduction of Sulfur Dioxide with Hydrogen over TiO2-Supported Catalysts Derived from Ruthenium Salts and Ruthenium Cluster Complexes", Journal of Catalysis 206, 159-164 (2002).

Jain, Anubhav, et al., "Commentary: The Materials Project: A materials genome approach to accelerating materials innovation", Apl Materials 1, 011002, Jul. 18, 2013, 12 pages.

Laskowski, Robert, et al., "NMR Shielding in Metals Using the Augmented Plane Wave Method", J. Phys. Chem. C 2015, 119, 19390-19396.

Laursen, A. B., et al., "Nanocrystalline Ni5P4: a hydrogen evolution electrocatalyst of exceptional efficiency in both alkaline and acidic media", The Royal Society of Chemistry, Energy & Environmental Science, DOI: 10.1039/c4ee02940b, Mar. 2015, 8 pages.

Li, Da, et al., "Effect of Synthetic Levers on Nickel Phosphide Nanoparticle Formation: Ni5P4 and NiP2", Inorg. Chem. 2015, 54, 7968-7975.

Li, Yunhua, et al., "Highly selective hydrodeoxygenation of anisole, phenol and guaiacol to benzene over nickel phosphide", RSC Adv., 2017, 7, 15272-15277.

Li, Kuo-Tseng, et al., "Hydrogenation of sulfur dioxide to hydrogen sulfide on chromium promoted Fe/SiO2 catalysts", Applied Catalysis B: Environmental 46 (2003) 541-549.

Li, Kuo-Tseng, "Hydrogenation of sulfur dioxide to hydrogen sulfide over Fe/y—Al2O3 catalysts", Applied Catalysis B: Environmental 40 (2003) 13-20.

Li, Huiming, et al., "Phase controlled synthesis of nickel phosphide nanocrystals and their electro-catalytic performance for hydrogen evolution reaction", Chem. Eur. J. 10.1002/chem.201801964.

Liu, Xiaodong, et al., "DFT insights into the stacking effects on HDS of 4,6-DMDBT on Ni—Mo—S corner sites", Fuel 280 (2020) 118669.

Liu, Xin, et al., "Porous Ni5P4 as a Promising Cocatalyst for Boosting the Photocatalytic Hydrogen Evolution Reaction Performance", Applied Catalysis B: Environmental (2020), doi: https://doi.org/10.1016/j.apcatb.2020.119144.

Lu, Xinnan, et al., "Ni2P Nanoparticles Embedded in Mesoporous SiO2 for Catalytic Hydrogenation of SO2 to Elemental S", Acs Appl. Nano Mater. 2021, 4, 5665-5676.

Meng, Suci, et al., "Synthesis of iron-doped 3D ordered mesoporous cobalt phosphide material towards efficient electrocatalytic overall water splitting", J. Name., 2012, 00, 1-3, 8 pages.

Mourdikoudis, Stefanos, et al., "Oleylamine in Nanoparticle Synthesis", Chem. Mater. 2013, 25, 1465-1476.

Muthuswamy, Elayaraja, et al., "Synthetic Levers Enabling Independent Control of Phase, Size, and Morphology in Nickel Phosphide Nanoparticles", vol. 5, No. 3, 2402-2411, 2011.

Oyama, S. Ted, "Novel catalysts for advanced hydroprocessing: transition metal phosphides", Journal of Catalysis 216 (2003) 343-352.

Oyama, S. Ted, et al., "Transition metal phosphide hydroprocessing catalysts: A review", Catalysis Today 143 (2009) 94-107.

Paik, Sang Cheol, et al., "The catalytic reduction of SO2 to elemental sulfur with H2 or CO", Catalysis Today 38 (1997) 193-198.

Paik,, Sang Cheol, et al., "Selective catalytic reduction of sulfur dioxide with hydrogen to elemental sulfur over Co—Mo/Al2O3".

Paik,, Sang Cheol, et al., "Selective hydrogenation of SO, to elemental sulfur over transition metal sulfides supported on Al2O3", Applied Catalysis B: Environmental 8 (1996) 267-279.

\* cited by examiner

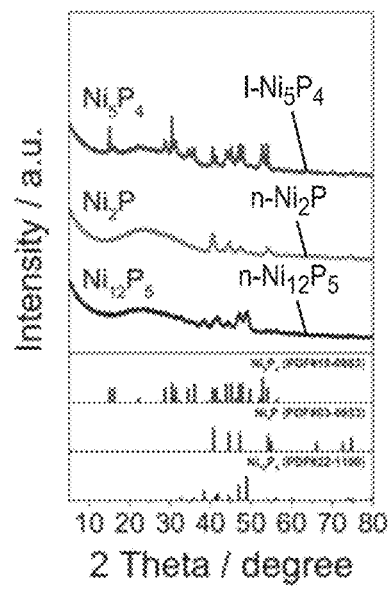 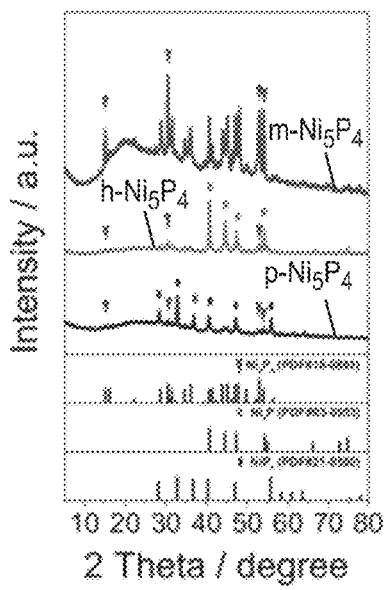 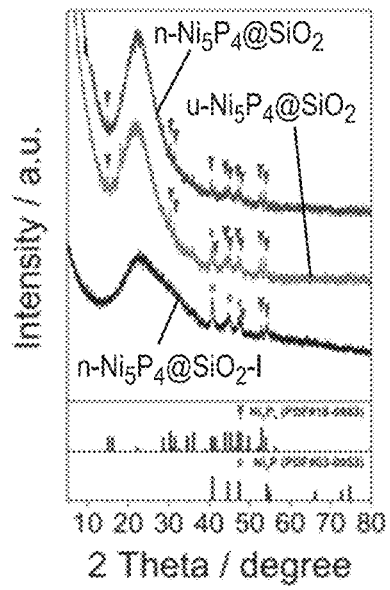
FIG. 1A        FIG. 1B        FIG. 1C
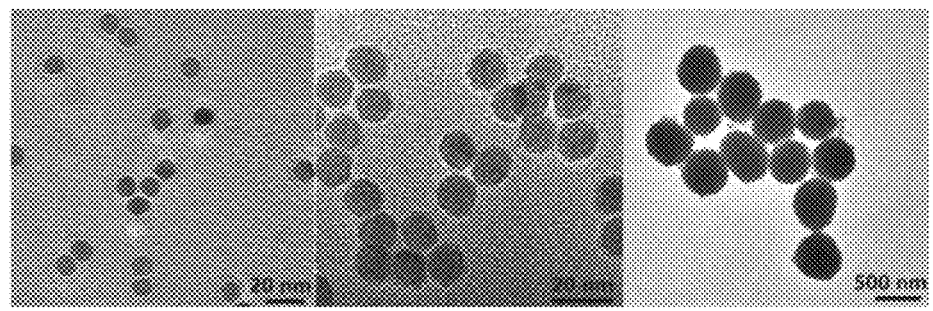
FIG. 2A        FIG. 2B        FIG. 2C
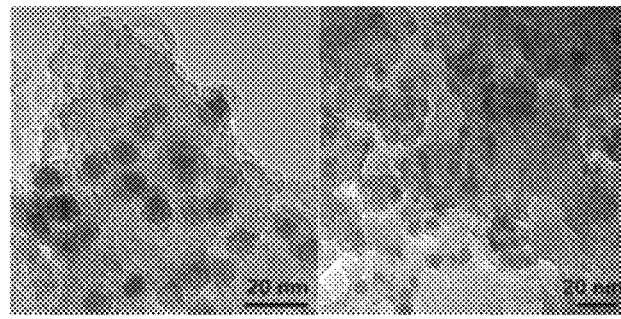 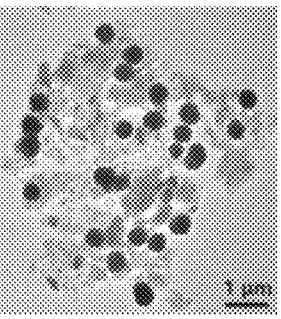
FIG. 2D        FIG. 2E        FIG. 2F

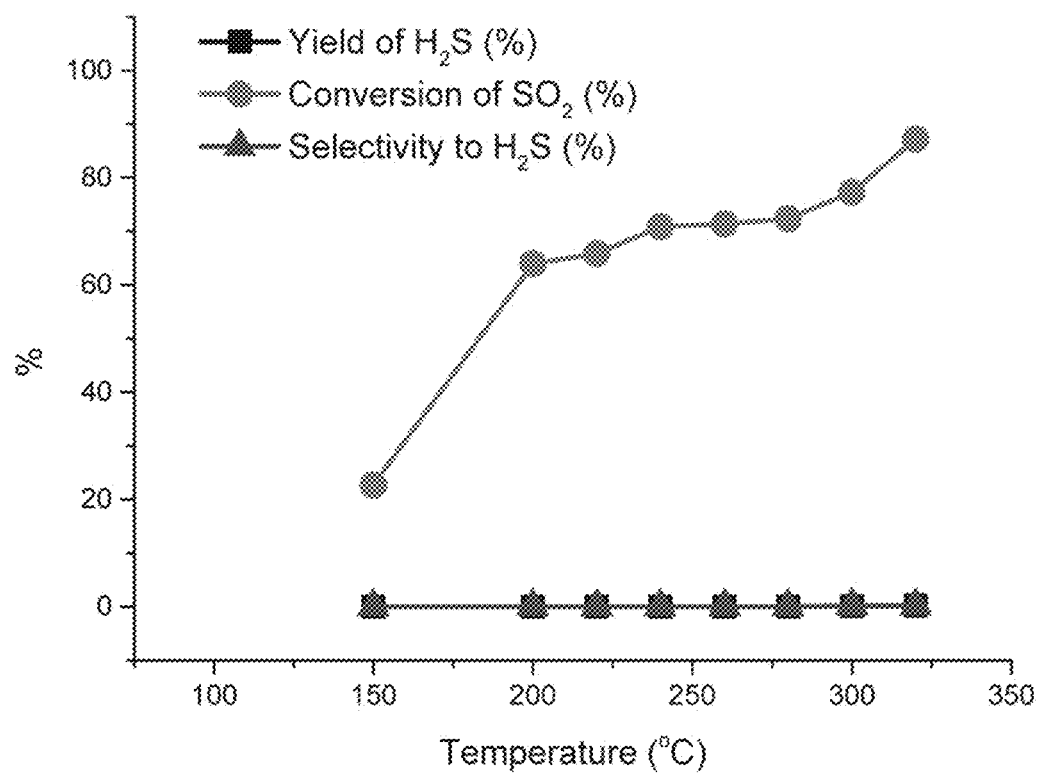
FIG. 30C
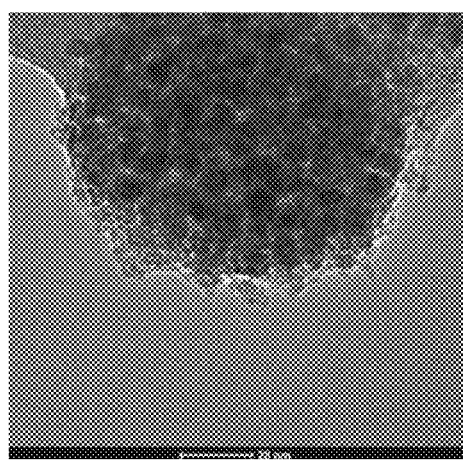 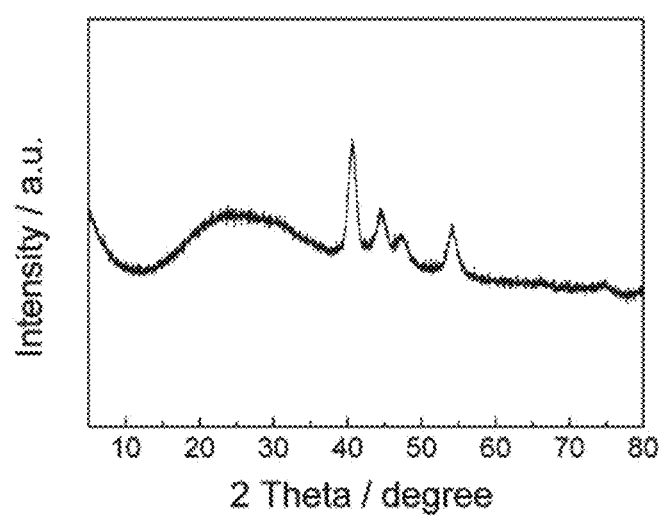
FIG. 31A  FIG. 31B

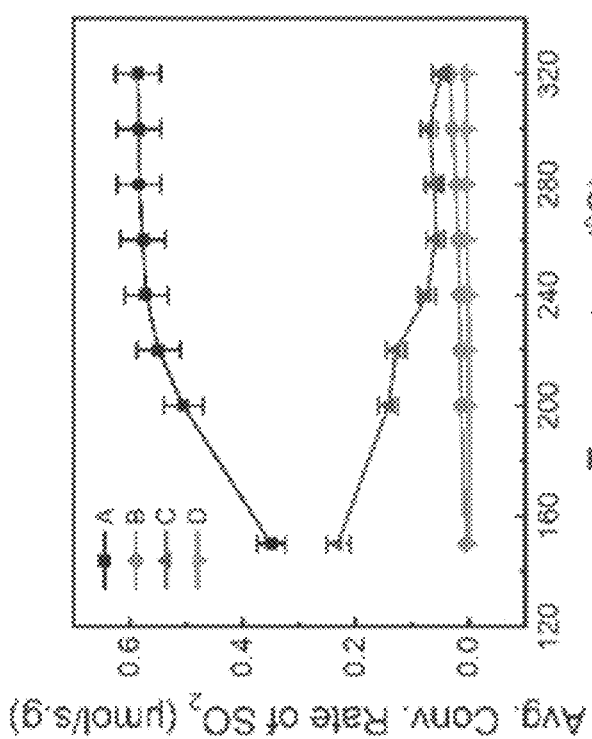
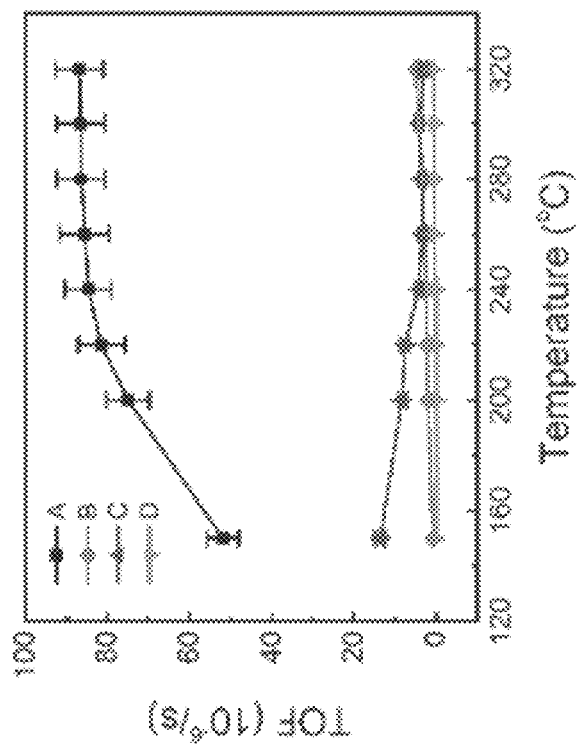
FIG. 56C
FIG. 56D

HYDROGENATION OF SULPHUR CONTAINING GASES WITH PHOSPHIDE NANOPARTICLES

BACKGROUND

Heterogeneous catalysis is an important part of the chemical industry with an estimated annual market size of $16 billion. Hydrodesulfurization (HDS) is estimated to make up about $2.4 billion of that market and is a catalytic process used in a number of important applications. For example, HDS is widely used to remove sulfur from natural gas or refined petroleum products to reduce the sulfur dioxide emissions that results when the gas or products are used. HDS is also used to remove sulfur from chemical process feed streams to prevent poisoning downstream noble metal catalysts (e.g., platinum or rhenium). HDS also provides hydrogen sulfide (H2S) gas, which is a useful feedstock consumed in many chemical process applications. A need exists for improved HDS catalytic materials and methods.

SUMMARY

The present invention is directed towards articles and methods for hydrogenating sulfur-containing compounds.

In some embodiments, the present invention includes methods of making hydrogenation catalysts. For example, the methods of making catalysts may include constraining or sequestering a metal phosphide or transitional metal (e.g., elemental nickel or a nickel phosphide) within a coating layer (e.g., meso-porous silicon dioxide) and then phosphorizing the metal phosphide or transition metal to produce a catalyst. The coating layer constrains the growth of the metal phosphide or transitional metal during the phosphorizing process, thereby producing catalytic nanoparticles that are both relatively small in size and have increased phosphorus as compared to the original metal phosphide or transitional metal particles.

In further examples, the methods of making catalysts may include dissolving nickel or a nickel precursor, at a relatively low temperature (e.g., between 15° C. and 100° C.), in a solvent with a relatively high boiling point (e.g., >400° C.), heating the dissolved nickel up to a temperature of between 325° C. and 375° C., and then contacting the dissolved nickel with phosphorus or a phosphorus source while maintaining the temperature between 325° C. and 375° C. to produce a $Ni_5P_4$ catalyst nanoparticle. By dissolving the nickel at a low temperature and then phosphorizing at a high temperature, the nickel has relatively little time to undergo a nucleation process while simultaneously becoming enriched in phosphorus.

The present invention also includes the catalysts made by the described methods and methods of using the inventive catalysts.

BRIEF DESCRIPTION OF THE DRAWINGS

FIGS. 1A-1C illustrates XRD patters of nanoparticles, according to one or more embodiments of the invention.

FIGS. 2A-2F illustrate TEM images collected of a selection of nanoparticles before and after mesoporous $SiO_2$ coating, according to one or more embodiments of the invention.

FIGS. 30A-30C illustrate (a) a TEM image of the nanoparticle material designated as Sample 27, (b) an XRD pattern of that nanoparticle material, and (c) a graph of $H_2S$ yield, conversion, and selectivity curves as a function of temperature for that nanoparticle material, according to one or more embodiments of the invention.

FIGS. 31A-31C illustrate (a) a TEM image of the nanoparticle material designated as Sample 28, (b) an XRD pattern of that nanoparticle material, and (c) a graph of $H_2S$ yield, conversion, and selectivity curves as a function of temperature for that nanoparticle material, according to one or more embodiments of the invention.

FIGS. 56A-56D illustrate graphs showing $SO_2$ conversion, sulfur selectivity, reaction rate of $SO_2$, and TOF data for some catalysts of the present invention.

DETAILED DESCRIPTION

Definitions

Figure 3:
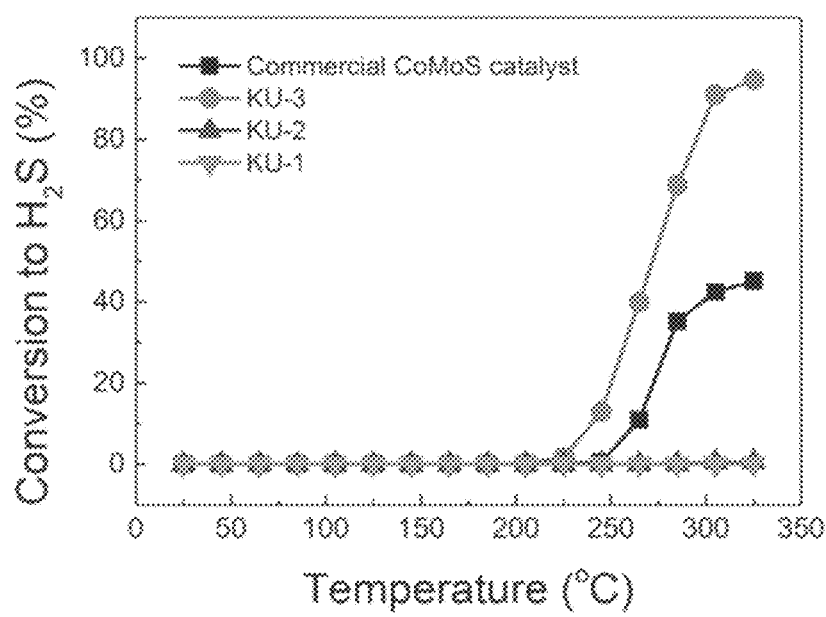
FIG. 3 illustrates a graph showing $H_2S$ conversion curves as a function of temperature for a selection of nanoparticles, according to one or more embodiments of the invention.

As used herein, the term "Co(acac)$_2$" refers to cobalt (II) acetylacetonate.

As used herein, the term "CTAB" refers to hexadecyl trimethyl ammonium bromide. Examples of suitable CTAB include 98% CTAB, available from Millipore Sigma of Burlington, Massachusetts.

As used herein, the term "Fe(acac)$_3$" refers to iron (III) acetylacetonate.

As used herein, the term "GHSV" refers to gas hourly space velocity.

As used herein, the term "Mo(CO)$_6$" refers to molybdenumhexacarbonyl.

As used herein, the term "(NH$_4$)$_6$Mo$_7$O$_{24}$ 4H$_2$O" refers to ammonium molybdate tetrahydrate.

As used herein, the term "Ni(acac)$_2$" refers to nickel (II) acetylacetonate (Ni(acac)$_2$).

As used herein, the term "Ni(NO$_3$)$_2$" refers to nickel (II) nitrate hexahydrate (Ni(NO$_3$)$_2$ 6H$_2$O. Examples of suitable Ni(NO$_3$)$_2$ include 95% Ni(NO$_3$)$_2$, available from Millipore Sigma of Burlington, Massachusetts.

As used herein, the terms "phosphorizing", "phosphorate", or the like mean to combine or impregnate with phosphorus.

As used herein, the term "OA" refers to oleylamine. Examples of suitable OA include ≥98% OA with a b.p. 348° C., available from Millipore Sigma of Burlington, Massachusetts.

As used herein, the term "TEM" refers to high-resolution transmission electron microscopy.

As used herein, the term "TEOS" refers to tetraethyl orthosilicate. Examples of suitable TEOS include ≥99% GC TEOS, available from Millipore Sigma of Burlington, Massachusetts.

As used herein, the term "TOP" refers to trioctylphosphine. Examples of suitable TOP include 97% TOP, available from Millipore Sigma of Burlington, Massachusetts.

As used herein, the term "TOPO" refers to trioctylphosphine oxide. Examples of suitable TOPO include 99% TOPO, available from Millipore Sigma of Burlington, Massachusetts.

As used herein, the term "WCl$_4$" refers to tungsten (IV) chloride.

As used herein, the term "XRD" refers to x-ray diffraction.

DISCUSSION

The present disclosure provides novel catalytic materials and methods useful for hydrogenating sulfur-containing gases. It has been surprisingly found that metallic phosphide nanoparticles are useful catalytic materials for the hydrogenation of sulfur compounds and offer improved performance over prior art catalytic materials. In some embodiments, the present invention includes catalytic materials that outperform prior art catalysts in terms of hydrogen sulfide conversion rates and operating temperature. Further, in some embodiments, the present inventive catalytic materials meet or exceed the performance of prior art catalysts while using significantly less catalytic mass (e.g., 1/20 as much catalytic mass). Hence, the present invention provides substantial cost savings.

In some embodiments, the present invention includes a hydrodesulphurization catalyst or catalytic material that includes nanoparticles of a metal phosphide. For example, the metal phosphide can be a nickel phosphide, a cobalt phosphide, a molybdenum phosphide, or mixtures thereof. In some embodiments the metal phosphide is a nickel phosphide with a Ni$_5$P$_4$ phase structure, a nickel phosphide with a NiP$_2$ phase structure, a nickel phosphide with a Ni$_2$P phase structure, a nickel phosphide with a Ni$_{12}$P$_5$ phase structure, or mixtures thereof. In some embodiments, the metal phosphide is a cobalt phosphide (e.g., a cobalt phosphide in a CoP phase or a Co$_2$P phase), an iron phosphide (e.g., an iron phosphide in a FeP$_4$ phase), a molybdenum phosphide, a tungsten phosphide, or combinations thereof. In some embodiments, the catalyst or catalytic material of the present invention includes two or more of the above-described metal phosphides (e.g., 3, 4, 5, or more than 5). In some embodiments, the catalyst or catalytic material of the present invention includes two or more of the above-described metal phosphides and one or more of the phosphides acts as a co-catalytic material.

In some embodiments, the metal phosphide(s) of the nanoparticles are each in a single phase (e.g., Ni$_2$P and/or Ni$_5$P$_4$ phases). In other embodiments, the nanoparticles are in two or more phases (e.g., Ni$_2$P and/or Ni$_5$P$_4$ phases). In some embodiments, the nanoparticles are devoid of metal phosphides that are in an amorphous phase.

In some embodiments, the nanoparticles have a mean or average particle size of between about 0.1 nm to about 1,000 nm or higher, such as about 5 nm, about 10 nm, about 20 nm, about 30 nm, about 40 nm, about 50 nm, about 60, about 70, about 75 nm, about 80, about 90, about 100 nm, about 150 nm, about 200 nm, about 250 nm, about 300 nm, about 350 nm, about 400 nm, about 450 nm, about 500 nm, about 550 nm, about 600 nm, about 650 nm, about 700 nm, about 750 nm, about 800 nm, about 850 nm, about 900 nm, about 950 nm, about 1000 nm or higher, or any incremental value or subrange between the provided particle sizes. In some embodiments, the nanoparticles have a mean or average particle size of between about 0.1 nm and about 20 nm or less than 20 nm, such as between about 0.1 nm and about 15 nm or lower, such as about 12 nm, about 10 nm, about 9 nm, about 8 nm, about 7 nm, about 6 nm, about 5 nm, about 4 nm, about 3 nm, about 2 nm, about 1 nm, about 0.5 nm, or any incremental value or subrange between the provided particle sizes.

In some embodiments, the nanoparticles include one or more coating or "support" layers. For example, in some embodiments, the nanoparticles include a coating of CTAB, silicon dioxide (e.g., mesoporous silicon dioxide or a silicon dioxide coating that has pores with diameters between 2 and 50 nm), a cerium oxide (e.g., cerium (III) oxide, cerium (III, IV) oxide, or cerium (IV) oxide), an aluminum oxide (e.g., aluminum (III) oxide, aluminum (II) oxide, or aluminum (I) oxide), or combinations thereof (e.g., an inner coating of CTAB and an outer coating of silicon dioxide). The coating layers on the nanoparticles may cover only a portion of a nanoparticle, such that at least a portion of the metal phosphide surface of the nanoparticles is not in direct contact with the coating material. In some embodiments, the one or more coating layers may completely engulf some or all of the nanoparticles such that the some or all of the nanoparticles are completely embedded within the coating material. In some embodiments, the one or more coating layers protect the metal phosphide nanoparticles from sintering during use.

In some embodiments, the present invention includes one or more of the inventive catalytic materials arranged on or secured to a solid support. For example, some embodiments of the present invention include nanoparticles of metal phosphide that are arranged on or secured to an alumina support (e.g., a gamma alumina support).

Figure 34:
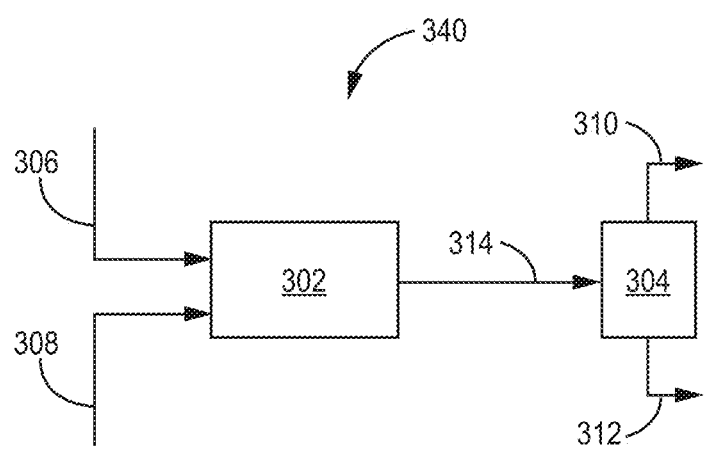
FIG. 34 illustrates a hydrogenation process utilizing methods of hydrogenating sulfur-containing gases with a catalyst that includes nanoparticles of metal phosphides, according to one or more embodiments of the invention.

In some embodiments, the present invention includes methods of using the inventive catalysts or catalytic materials to hydrogenate a gas that includes sulfur. FIG. 34 illustrates some embodiments of such inventive methods in the form of process 340. Process 340 is a process flow diagram showing a portion of a simple sulfur hydrogenation application. Process 340 could be illustrative of any number of commercially used sulfur hydrogenation applications, such as, for example, a portion of a hydrodesulphurization application used in a Claus tail gas clean-up process or a sulfur recovery unit of a larger chemical process.

As shown in FIG. 34, process 340 includes use of catalytic bed 302, separation unit 304, sulfur-containing gas feed line 306, optional hydrogen-containing gas feed line 308, separation unit feed line 314, separation unit waste line 310, and separation unit product line 312.

Catalytic bed 302 includes at least one of the inventive catalysts or catalytic materials of the present invention described herein. For example, catalytic bed 302 could be a catalysis unit that include nanoparticles of nickel phosphide with a $Ni_5P_4$ phase structure mounted on a gamma alumina solid support.

Separation unit 304 could be one or more separation units suitable for separating chemical species of interest from separation unit feed line 314. For example, separation unit 304 could include one or more distillation columns, absorption columns, or gas separator tanks.

Sulfur-containing gas feed line 306 directs a sulfur-containing gas to catalytic bed 302 and into contact with the inventive catalyst or catalytic material therein. The sulfur-containing gas might be, for example, a Claus tail gas that contains sulfur compounds such $SO_2$, COS, and/or $CS_2$.

If given application requires additional hydrogen for the hydrogenation reaction, optional hydrogen-containing gas feed line 308 directs a flow of a hydrogen-containing gas into catalytic bed 302 and into contact with the inventive catalyst or catalytic material therein.

While not illustrated in FIG. 34, one or both of lines 306 and 308 may optionally direct their respective gases through various unit operations to precondition the sulfur-containing gas and/or hydrogen-containing gas before those gas streams are directed into catalytic bed 302. For example, one or both of lines 306 and 308 may pass through one or more heat exchangers, furnaces, chillers, humidifiers, dryers, pumps, compressors, or pressure reduction valves.

Once in catalytic bed 302, the sulfur-containing gas and, if used, the hydrogen-containing gas come into contact with the inventive catalysts or catalytic material inside bed 302. The inventive catalysts or catalytic material catalyze the hydrogenation reaction and portions of the sulfur compounds in the sulfur-containing gas are hydrogenated to the desired catalytic products (e.g., $H_2S$), thereby producing a hydrogenated gas.

The sulfur-containing gas and/or the hydrogen-containing gas may contact the inventive catalyst or catalytic material at any desired temperature. In some embodiments of the invention, the sulfur-containing gas and/or the hydrogen-containing gas contact the inventive catalyst or catalytic material at a temperature of between about 200° C. and about 500° C. or higher, such as about 210° C., about 220° C., about 230° C., about 240° C., about 250° C., about 260° C., about 270° C., about 280° C., about 290° C., about 300° C., about 310° C., about 320° C., about 330° C., about 340° C., about 350° C., about 360° C., about 370° C., about 380° C., about 390° C., about 400° C., about 410° C., about 420° C., about 430° C., about 440° C., about 450° C., about 460° C., about 470° C., about 480° C., about 490° C., about 500° C. or higher, or any incremental value or subrange between the provided temperatures.

The sulfur-containing gas and/or the hydrogen-containing gas may contact the inventive catalyst or catalytic material at any desired pressure. In some embodiments of the invention, the sulfur-containing gas and/or the hydrogen-containing gas contact the inventive catalyst or catalytic material at a pressure that is between about 1 atmosphere and about 150 atmospheres or higher, such as about 2 atmospheres, about 3 atmospheres, about 4 atmospheres, about 5 atmospheres, about 6 atmospheres, about 7 atmospheres, about 8 atmospheres, about 9 atmospheres, about 10 atmospheres, about 15 atmospheres, about 20 atmospheres, about 25 atmospheres, about 30 atmospheres, about 35 atmospheres, about 40 atmospheres, about 45 atmospheres, about 50 atmospheres, about 55 atmospheres, about 60 atmospheres, about 65 atmospheres, about 70 atmospheres, about 75 atmospheres, about 80 atmospheres, about 85 atmospheres, about 90 atmospheres, about 95 atmospheres, about 100 atmospheres, about 105 atmospheres, about 110 atmospheres, about 115 atmospheres, about 120 atmospheres, about 125 atmospheres, about 130 atmospheres, about 135 atmospheres, about 140 atmospheres, about 145 atmospheres, about 150 atmospheres or higher, or any incremental value or subrange between the provided pressures.

After contacting the inventive catalysts or catalytic material in catalytic bed 302, the hydrogenated gas, including catalytic reaction products such as $H_2S$, are directed from catalytic bed 302 to separation unit 304 via separation unit feed line 314. Optionally, separation unit feed line 314 may direct the hydrogenated gas through one or more unit operations to condition the catalytic reaction products prior to directing the hydrogenated gas to separation unit 304. For example, line 314 may pass hydrogenated gas through one or more heat exchangers, furnaces, chillers, humidifiers, dryers, pumps, compressors, or pressure reduction valves.

Once in separation unit 304, the catalytic reaction products in the hydrogenated gas are separated into one or more product and/or waste streams. The products of interest (e.g., $H_2S$) are directed from separation unit 304 via separation unit product line 312, while unreacted or undesired chemical species are directed from separation unit 304 via separation unit waste line 310.

The present invention includes methods of making a hydrogenation catalyst.

In some embodiments, the methods of making a hydrogenation catalyst include dispersing Ni in a mesoporous $SiO_2$ to form a Ni@meso-$SiO_2$ composite and then contacting the Ni@meso-$SiO_2$ composite with a P source to provide a $Ni_xP_y$@meso-$SiO_2$ composite.

Dispersing Ni in a mesoporous $SiO_2$ can include dissolving a Ni precursor in a solvent to form a mixture of dissolved Ni and/or dispersing Ni-containing nanoparticle compounds within the mixture (e.g., dispersing nanoparticles of Ni(acac)$_2$ and/or $Ni_xP_y$ nanoparticles such as $Ni_2P$ or $Ni_{12}P_5$ nanoparticles). The solvent could be, for example, water, OA, TOP, TOPO, or mixtures of one or more of those materials. The Ni precursor can be, for example, Ni(acac)$_2$. Additional components can also be utilized during the dispersion; for example, the mixture could include a surfactant and/or a source of $SiO_2$. For example, the surfactant could be CTAB, OA, TOP, or TOPO and/or the source of $SiO_2$ could be $Na_2SiO_3$. NaOH or other bases or acids could be included in the mixture to facilitate the dispersion of the Ni in the mesoporous $SiO_2$.

The dispersion of Ni in the solvent can be conducted at a temperature that is between ~15° C. and ~250° C., such as ~20° C., ~25° C., ~30° C., ~35° C., ~40° C., ~45° C., ~50° C., ~55° C., ~60° C., ~65° C., ~70° C., ~75° C., ~80° C., ~85° C., ~90° C., ~95° C., ~100° C., ~125° C., ~150° C., ~175° C., ~200° C., ~225° C., ~250° C., of any incremental value or subrange between these provided temperatures.

Dispersing Ni in a mesoporous $SiO_2$ can include removing excess Ni from the solution. For example, any undissolved Ni solids can be removed by filtration and/or centrifugation. In some embodiments, the final Ni content in the dispersed mixture can be such that the Ni to Si atomic ratio is 5% or less.

The Ni@meso-$SiO_2$ composite produced can take the form of nanoparticles of nickel compounds (e.g., Ni(acac)$_2$ and/or $Ni_xP_y$ nanoparticles such as $Ni_2P$ or $Ni_{12}P_5$ nanoparticles) embedded, constrained, or encased within mesoporous $SiO_2$. In some embodiments, dispersing Ni in a mesoporous $SiO_2$ includes removing these composite nanoparticles from the solvent mixture in which they are dispersed (e.g., by centrifugation, filtration, and/or drying and/or washing).

In some embodiments, the P source is one or more of TOP or TOPO. Contacting the Ni@meso-$SiO_2$ composite with the P source can include dissolving or mixing TOP or TOPO into OA.

In some embodiments the P source and Ni@meso-$SiO_2$ composite are contacted for a period of time and at a temperature necessary to phosphorilize the Ni@meso-$SiO_2$ composite to a desired extent and produce the desired $Ni_xP_y$ phase in the resulting $Ni_xP_y$@meso-$SiO_2$ composite. For example, the P source and Ni@meso-$SiO_2$ composite may be contacted for up to about 5 minutes, 10 minutes, 20 minutes, 30 minutes, 40 minutes, 50 minutes, 60 minutes, 75 minutes, 90 minutes, 105 minutes, 120 minutes, 150 minutes, 180 minutes, 210 minutes, 240 minutes, 270 minutes, 300 minutes, 330 minutes 360 minutes, 390 minutes, 420 minutes, 450 minutes, 480 minutes, 510 minutes, 540 minutes, 570 minutes, 10 hours, 12 hours, 18 hours, 24 hours, 2 days, 3 days, 4 days, 7 days, or any incremental value or subrange between these provided times. The temperature at which the P source and Ni@meso-$SiO_2$ composite are contacted may be between about 180° C. and about 500° C., such as about 180° C., about 190° C., about 200° C., about 210° C., about 220° C., about 225° C., about 230° C., about 240° C., about 250° C., about 260° C., about 270° C., about 275° C., about 280° C., about 290° C., about 300° C., about 310° C., about 320° C., about 325° C., about 330° C., about 340° C., about 350° C., about 360° C., about 370° C., about 375° C., about 380° C., about 390° C., about 400° C., about 410° C., about 420° C., about 425° C., about 430° C., about 440° C., about 450° C., about 460° C., about 470° C., about 475° C., about 480° C., about 490° C., about 500° C., or any incremental value or subrange between these provided temperatures. In some embodiments, the contact between the Ni@meso-$SiO_2$ composite and the P source occurs as a temperature between 225° C. and 275° C. and the resulting $Ni_xP_y$@meso-$SiO_2$ composite is a $Ni_{12}P_5$@meso-$SiO_2$ composite that includes $Ni_{12}P_5$ nanoparticles less than 5 nm in size embedded within the mesoporous $SiO_2$. In some embodiments, the contact between the Ni@meso-$SiO_2$ composite and the P source occurs as a temperature between 275° C. and 325° C. and the resulting $Ni_xP_y$@meso-$SiO_2$ composite is a $Ni_2P$@meso-$SiO_2$ composite and includes $Ni_2P$ nanoparticles less than 5 nm in size embedded within the mesoporous $SiO_2$. In some embodiments, the contact between the Ni@meso-$SiO_2$ composite and the P source occurs as a temperature between 325° C. and 375° C. and the resulting $Ni_xP_y$@meso-$SiO_2$ composite is a $Ni_5P_4$@meso-$SiO_2$ composite and includes $Ni_5P_4$ nanoparticles less than 5 nm in size embedded within the mesoporous $SiO_2$.

In some embodiments, the present invention includes methods of making a hydrogenation catalyst, where the method includes forming a first mixture by dissolving Ni (e.g., a Ni precursor such as Ni(acac)$_2$) in a solvent that has a boiling point that is higher than the temperatures needed to phosphoralize the Ni. For example, the solvent may have a boiling point that is above 400° C., such as TOPO which has a boiling point of about 411.2° C. The temperature at which the Ni is dissolved in the solvent is below the nucleation temperature of the Ni in that solvent. For example, the temperature at which the Ni is dissolved in the solvent could be between ~15° C. and ~250° C., such as ~20° C., ~25° C., ~30° C., ~35° C., ~40° C., ~45° C., ~50° C., ~55° C., ~60° C., ~65° C., ~70° C., ~75° C., ~80° C., ~85° C., ~90° C., ~95° C., 100° C., 125° C., −150° C., −175° C., −200° C., −225° C., −250° C., of any incremental value or subrange between these provided temperatures.

After forming the first mixture, the first mixture is heated to a temperature at which the Ni will be phosphoralized and the P source is added while maintaining that temperature. For example, the first mixture could be heated to a temperature of between 325° C. and 375° C. to provide a heated mixture, and then a P source (e.g., TOP or TOPO) is added to the heated mixture while maintaining the temperature between 325° C. and 375° C. to allow the P source to phosphorize the Ni to produce $Ni_5P_4$ nanoparticles. In other examples, the temperature to which the first mixture is heated and the phosphorylation process conducted is between about 225° C. and about 375° C., such as about 225° C., about 230° C., about 240° C., about 250° C., about 260° C., about 270° C., about 275° C., about 280° C., about 290° C., about 300° C., about 310° C., about 320° C., about 325° C., about 330° C., about 340° C., about 350° C., about 360° C., about 370° C., about 375° C., or any incremental value or subrange between these provided temperatures.

Example 1

$Ni_xP_y$ Catalyst Synthesis

A systematic methodology of synthesizing catalysts was followed to produce various types of $Ni_xP_y$ catalysts. Flow charts illustrating some aspects of the methodologies are provided in FIG. 35, with additional details on those methodologies provided below. Briefly, the methodologies shown in group "A" of FIG. 35 were used to produce $Ni_xP_y$ having different phases, the methodologies shown in group "B" were used to produce $Ni_5P_4$ catalysts with different morphologies, and the methodologies shown in group "C" were used to produce $Ni_5P_4$ catalysts with different morphologies using confinement of $SiO_2$.

1. $Ni_xP_y$ Phase Control $Ni_xP_y$ nanoparticles having various types of phases and a mesoporous coating were produced using the methodologies of group "A" in FIG. 35.

Synthesis of $Ni_xP_y$ Nanoparticles $Ni_xP_y$ nanoparticles were synthesized in a $N_2$ atmosphere via thermal decomposition of nickel precursor in organic mixtures using OA and TOP or TOPO. In a typical preparation of $Ni_xP_y$ nanoparticles, 2 mmol of nickel precursor $Ni(acac)_2$ was first dissolved in the reaction mixture of 10 mL OA and 5 mL TOP under magnetic stirring for 5 min at 80° C. After the stirring, the mixture was heated to 230° C. for 1 hour, and then another 5 mL TOP was injected into the mixture and stirred at the following reaction temperatures T for another 2 hours to produce the following types of nanoparticle samples:

Sample of 1-$Ni_5P_4$: T=350° C.
Sample of n-$Ni_2P$: T=300° C.
Sample of n-$Ni_2P_5$: T=250° C.

The above operations were carried out in a fume hood.

After cooling to room temperature, the $Ni_xP_y$ particles were precipitated by addition of ethanol (≥99.8% for HPLC; available from Millipore Sigma) and subsequently centrifuged for 10 min at 4500 rpm. The supernatant was then discarded and the nanoparticles retained. To remove excess surfactants, the nanoparticles were washed three times by dispersion in n-hexane (95% anhydrous; available from Millipore Sigma), then precipitated with ethanol and isolated by centrifugation. The resulting nanoparticles were dried at room temperature.

The resulting 1-$Ni_5P_4$ sample comprised $Ni_5P_4$ phase particles with a relatively large particle size of >500 nm. The resulting n-$Ni_2P$ sample comprised $Ni_2P$ phase particles with a particle size of about 11 nm. The n-$Ni_{12}P_5$ sample comprised $Ni_{12}P_5$ phase particles with a particle size of about 12 nm.

Coating $Ni_xP_y$ Nanoparticles with Mesoporous Silica

The $Ni_xP_y$ nanoparticles described above were coated with mesoporous silica to produce $Ni_xP_y$@meso-$SiO_2$ coated catalytic nanoparticles. Prior to the dispersion in water, the previously obtained nanoparticles were dispersed in hexane. Specifically, 100 mg of the previously obtained $Ni_xP_y$ nanoparticles were dispersed in 5 mL n-hexane and then mixed with 50 ml of an aqueous solution (1% w/v) of CTAB. The mixture of nanoparticles, hexane, and CTAB was sonicated for 30 min and then stirred overnight at room temperature. The nanoparticles were isolated from the solution using centrifugation. The resulting CTAB-coated $Ni_xP_y$ particles were washed and recovered again by centrifugation, followed by dispersion in 50 ml of deionized water to form a stable hydrosol.

The coated catalyst, $Ni_xP_y$@meso-$SiO_2$, was synthesized by hydrolysis of the silica source TEOS in the presence of base, then the resultant silanol groups were condensed prior to extraction of surfactant. Specifically, 0.5 mL of TEOS was added dropwise into 50 ml of the previously obtained CTAB-coated $Ni_xP_y$ hydrosol with vigorous stirring for 15 minutes. To this mixture, 70 μL of aqueous ammonia solution (26 wt % $NH_4OH$) was then added and the reaction proceeded at room temperature for 24 hours. Afterwards, the $Ni_xP_y$/coated-CTAB/$SiO_2$ particles were recovered by centrifugation, washed in $H_2O$, and then washed in ethanol. The CTAB was removed by stirring the sample in a diluted HCl/ethanol solution (0.4 ml 1M HCl in 40 mL ethanol) at room temperature for 1 hour. After three extractions, the final product was washed with ethanol, recovered by centrifugation, and dried at room temperature to obtain the $Ni_xP_y$@meso-$SiO_2$ nanoparticles. The $SiO_2$ coated samples derived the 1-$Ni_5P_4$ sample, the n-$Ni_2P$ sample, and the n-$Ni_{12}P_5$ sample were denoted as the 1-$Ni_5P_4$@$SiO_2$ sample, the n-$Ni_2P$@$SiO_2$ sample, and the n-$Ni_{12}P_5$@$SiO_2$ sample, respectively.

2. $Ni_5P_4$ Morphology Control by Use of TOP or TOPO

Figure 35:
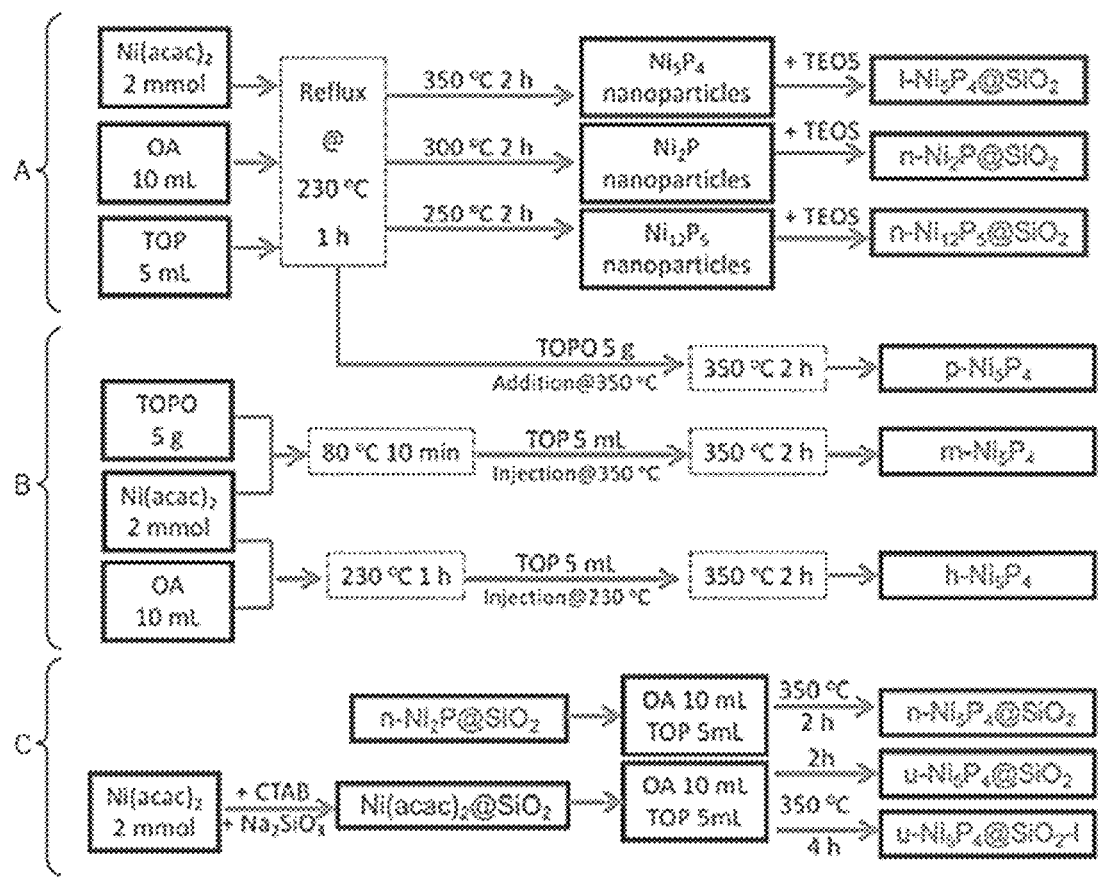
FIG. 35 illustrates flow charts showing some aspects of methodologies of the present invention.

Samples of $Ni_5P_4$ with various morphologies were synthesized using TOP or TOPO using the methodologies of group "B" in FIG. 35. The $Ni_5P_4$ samples were synthesized in an $N_2$ atmosphere via thermal decomposition of nickel precursor in organic mixtures using OA and TOP or TOPO. The nanoparticles were precipitated and washed using the processes mentioned above. Some of the parameters were modified as described further below.

Synthesis of m-$Ni_5P_4$ Nanoparticles

Medium sized nanoparticles, having particle sizes of about 20 to about 50 nm, were prepared and designated "m-$Ni_5P_4$". The procedure used to create the m-Ni5P4 particles included first dissolving 2 mmol of $Ni(acac)_2$ precursor in 5 g TOPP under a $N_2$ atmosphere. The reaction mixture was magnetically stirred for 10 min at 80° C. The temperature was raised to 350° C., 5 mL TOP was added, and the mixture stirred at 350° C. for another 2 hours.

Synthesis of h-$Ni_5P_4$ Nanoparticles

Hollow $Ni_5P_4$ nanoparticles having a particle size of about 50 nm were prepared and designated "h-$Ni_5P_4$". The procedure used to create the h-$Ni_5P_4$ particles included first dissolving 2 mmol of $Ni(acac)_2$ precursor in 10 mL OA under a $N_2$ atmosphere and magnetically stirring for 10 min at 80° C. The temperature was then raised to 230° C. for 1 hour while the stirring continued. Then 5 mL TOP was added and the mixture stirred for another 2 hours at 230° C.

Synthesis of p-$Ni_5P_4$ nanoparticles

Porous networks of $Ni_5P_4$ nanoparticles having a particle size of about 50 to about 100 nm were prepared and designated "p-$Ni_5P_4$". The procedure used to create the p-$Ni_5P_4$ particles included first dissolving 2 mmol of Ni(acac)$_2$ precursor in 10 mL OA and 5 mL TOP under a $N_2$ atmosphere and magnetically stirring for 10 min at 80° C. The temperature was then raised to 230° C. for 1 hour while the stirring continued. Then 5 mL TOPO was added and the mixture stirred for another 2 hours at 350° C. 3. $Ni_5P_4$ morphology control by the confinement of $SiO_2$:

Samples of $Ni_5P_4$ nanoparticles were synthesized using the $SiO_2$ confinement methodologies of group "C" in FIG. 35.

Synthesis of n-$Ni_5P_4$@$SiO_2$

About 0.1 g of the previously prepared n-$Ni_2P$@$SiO_2$ nanoparticles were first dispersed in 10 mL OA and 5 mL TOP. The reaction mixture was magnetically stirred for 30 minutes at 100° C. and then stirred for another 2 hours at a temperature of 350° C. The result were nanoparticles of $Ni_5P_4$ that had a size of about 11 nm and a coating of $SiO_2$ and were denoted as n-$Ni_5P_4$@$SiO_2$.

Synthesis of u-$Ni_5P_4$@$SiO_2$

Clusters of nanoparticles of $Ni_5P_4$ having an ultra-fine particle size of less than 2 nm and fined within mesoporous $SiO_2$ were created and denoted as u-$Ni_5P_4$@$SiO_2$.

First, a solution of $Na_2SiO_3$ was prepared by dissolving 32.0 g Na(OH) in 800 mL deionized water. About 187 mL Ludox (40 wt. %) was added into the NaOH solution and the mixture stirred at 40° C. overnight to provide a transparent solution. This $Na_2SiO_3$ solution can be stored in a sealed Teflon bottle at room temperature for several weeks and used so long as it remains clear.

1.0 g CTAB and 1 mmol of Ni(acac)$_2$ precursor were dissolved in 35 mL deionized water followed by slowly stirred (to avoid creating bubbles) at a temperature 60° C. for 1 hour until dissolution of the surfactant is complete and a clear viscous solution is formed (the precipitate was removed by centrifugation). In a synchronous mode, 25 g of the above $Na_2SiO_3$ solution were stirred at 60° C. for 1 hour and the CTAB solution was subsequently added dropwise into the $Na_2SiO_3$ solution. The resulting mixture was vigorously stirred for 1 hour at a temperature of 60° C., followed by overnight stirring at room temperature. The mixture was then centrifuged for 10 min at 4500 rpm to collect the precipitated powder. The excess of the surfactants was removed by washing the obtained powder three times in $H_2O$, then two times in ethanol. The powder was then collected by centrifugation. The solid was dried in an oven at 80° C. overnight to obtain a bout 1.5 g of a light green powder.

In an $N_2$ atmosphere, 0.5 g obtain the light green powder was first dissolved in 10 mL OA and 5 mL TOP. The reaction mixture was magnetically stirred for 10 minutes at 80° C. and then stirred for another 2 hours at a temperature of 350° C. After cooling at room temperature, precipitation of a powder was achieved by addition of ethanol followed by centrifugation for 10 min at 4500 rpm. The supernatant was discarded and the retained nanoparticle powder was washed three times in hexane to remove excess surfactants, precipitated with ethanol, and isolated by centrifugation. The resulting black nanoparticle powder was dried in an oven at 80° C. overnight.

Synthesis of u-$Ni_5P_4$@$SiO_2$-1

A sample denoted as u-$Ni_5P_4$@$SiO_2$-1 was prepared using the same synthesis method as described above for the synthesis of u-$Ni_5P_4$@$SiO_2$, with the exception that the 350° C. heating step lasted for 4 hours instead of 2 hours. The resulting catalysts comprised clusters of ultra-fine nanoparticles of $Ni_5P_4$ having an average particle size of <2 nm and confined within mesoporous $SiO_2$.

Example 2

Characterization and Testing of $Ni_xP_y$ Nanoparticles
Characterization Equipment and Methodology The XRD patterns of the calcined catalysts were collected with a Panalytical X'Pert PRO powder diffractometer (available from Malvern Panalytical Ltd of Malvern, United Kingdom) using Cu-K$\alpha$ radiation ($\lambda$=1.5406 Å) operated at 40 mA and 40 kV. The mean particle size and morphology were determined using high resolution transmission electron microscopy (HR-TEM; 200 kV FEI Tecnai, available from FEI Company of Hillsboro, Oregon). Elemental analysis was conducted in a FEI Quanta 250 FEG scanning microscope (available from FEI Company). The electron source of this instrument is a Schottky field emission gun, possessing a spatial resolution of approximately 1 nm at 30 KV (SE) and 3.0 nm at 1 KV (SE). Elemental analysis was conducted using an equipped Apollo silicon drift detector (SDD) integrated with the EDAX Genesis software (available from EDAX of Ametek, Inc. of Berwyn, Pennsylvania).

Selected catalysts were studied using HR-TEM technique in a Titan 80-300 ST electron microscope, operated at 300 kV. A spherical aberration (Cs) corrector for the image (CEOS CETCOR), and an energy filter (model GIF Quantum 963, Gatan, Inc.) complement the microscope. Additionally, nanoscale elemental mapping was performed using the STEM mode. The TEM data acquisition and processing was performed using Gatan Microscopy Suite (GMS, version 3.2).

The atomic percentages of the components were calculated from multiple measurements done at various locations and magnifications (average values are herein provided from 5 measurements, error range about 2%).

Porosimetry studies were conducted using nitrogen adsorption-desorption isotherms at 77 K in a 3Flex Micromeritics (Atlanta, USA) instrument. Samples (~90 mg) were degassed at 130° C. in vacuum overnight prior to any measurement.

An ESCALAB Thermo Scientific Theta Probe Angle-Resolved X-ray Photoelectron Spectrometer (East Grinstead, UK) was used for the photoelectron spectroscopic studies. A monochromatic Al K$\alpha$ X-ray source (hv=1486.6 eV) was used. Pass energy of 300 eV and 50 eV were used to collect the survey spectra, and the high-resolution core level spectra, respectively. The C 1 s peak at 285.0 eV was used as internal reference for all the spectra. The redox properties of the Nickel phosphide catalysts were investigated using $H_2$ temperature-programmed reduction ($H_2$-TPR). Autochem 2920, (Micromeritics Instruments Corporation, Norcross, GA, USA) instrument equipped with a thermal conductivity detector (TCD) was used. A catalyst sample of 120 mg was loaded on the U-shaped quartz tube and pretreated at 100° C. for 1 h under He flow (30 ml/min). After cooling the sample at 35° C., 10% $H_2$/Ar gas mixture was passed at 30 ml/min flow rate. After signal stabilization, the temperature was raised up to 800° C. at a heating rate of 5° C./min while the TCD signal was recorded every 1 second. A cold trap was used to remove any condensable from the gas stream. The $^{31}$P Magic Angle Spinning (MAS) solid-state nuclear magnetic resonance (ssNMR) spectrum were collected on a Bruker Avance III 400 spectrometer operating at magnetic fields of 9.4T with a $^{31}$P Larmor frequency of 162.066 MHz, at spinning speeds of 14.00 kHz. For acquisition, a rotor synchronized Hahn echo pulse sequence was employed for acquisition, with a π/2 excitation pulse of 2 μs, which corresponds to a rf field strength of 125 kHz. All NMR shifts were referenced to H$_3$PO$_4$ 85% wt at 0 ppm. NMR Knight shift calculations were performed on bulk Ni$_5$P$_4$, by using the full-potential linearized augmented plane-wave method, as implemented in the Wien2k DFT software package within the LDA formalism. The k-mesh convergence was checked up to 50,000. Other computational parameters, such as atomic sphere radii as well as potentials and wave functions inside the atomic spheres, were as set by Wien2k defaults.

Catalytic Assessment: Reaction Metrics

Experiments to measure the selective hydrogenation of SO$_2$ were conducted at atmospheric pressure in a fixed bed U-shaped quartz reactor. Forty milligrams of a given catalyst was diluted with 180 mg of quartz particles (125 to 250 μm) and then placed in the quartz reaction tube which had a 4 mm internal diameter. The catalyst bed was initially pretreated for 1 hours at 100° C. by introducing a stream of argon at 40 ml/min. Then, a feed gas consists of 103 ppm SO$_2$ at 20 mL/min and a feed gas of 2% H$_2$ in N$_2$ at 20 mL/min were fed into the reactor (total feed gas at 40 mL/min; a GHSV of ~50000 h$^{-1}$), and the reaction was run at a temperature range of 100-320° C. The effluent stream (reactants and reaction products) was analyzed using a PerkinElmer Clarus 580 Gas Chromatograph (GC)-Model Arnel 4025 PPC and Model Arnel 4016 PPC Sulphur Chemiluminescence Detector (SCD) (both available from PerkinElmer, Inc. of Waltham, Massachusetts).

The conversion of SO$_2$ can be described based on the following reaction scheme:

$$SO_2 + 2H_2 \rightarrow S + 2H_2O \quad \text{(Equation 1)}$$

$$SO_2 + 3H_2 \rightarrow H_2S + 2H_2O \quad \text{(Equation 2)}$$

The yield of H$_2$S was calculated based on the peak area of H$_2$S and SO$_2$ using the following equation:

$$\text{Yield of } H_2S \ (\%) = \frac{(H_2S)_{out}}{(SO_2)_{in}} \times 100 \quad \text{(Equation 3)}$$

where $(SO_2)_{in}$ is the SO$_2$ molar flow rate in the feed gas (mol/s) and $(H_2S)_{out}$ is the H$_2$S molar flow rate in the bed effluent (mol/s).

The conversion of SO$_2$ was calculated based on the peak area of SO$_2$ using the following equation:

$$\text{Conversion of } SO_2 \ (\%) = \left(1 - \frac{(SO_2)_{out}}{(SO_2)_{in}}\right) \times 100 \quad \text{(Equation 4)}$$

where $(SO_2)_{in}$ is the SO$_2$ molar flow rate in the feed gas (mol/s) and $(SO_2)_{out}$ is the SO$_2$ molar flow rate in the bed effluent (mol/s).

The selectivity to H$_2$S was calculated based on the peak area of H$_2$S and SO$_2$ using the following equations:

$$\text{Selectivity of } H_2S \ (\%) = \frac{\text{Yield of } H_2S}{\text{Conversion of } SO_2} \times 100 \quad \text{(Equation 5)}$$

Kinetic Studies

The average SO$_2$ conversion rate r (mol/s·g$_{active}$) was calculated using the following equation:

$$r = \frac{n(SO_2)_c}{m_{active}} = \frac{(SO_2)_{in} \times (SO_2)_{conv}}{m_{active}} \quad \text{(Equation 6)}$$

where $m_{active}$ (g) is the mass of the catalyst active phase (Ni$_5$P$_4$/Ni$_2$P/Ni$_{12}$P$_5$/Ni$_2$P).

The turn over frequency (TOF, s$^{-1}$) was calculated based on the average SO$_2$ conversion rate using the following equation:

$$\text{TOF} = r \times M_{active} \quad \text{(Equation 7)}$$

where r is the average reaction rate, $M_{active}$ is the molar mass of Ni$_5$P$_4$ (417.36 g/mol), Ni$_2$P (148.36 g/mol), Ni$_{12}$P$_5$ (859.19 g/mol) or CoMoS (186.94 g/mol).

The average rate constant k (m$^3$/s·g) was calculated based on the average rate of reaction, using the following expression applied for a PFR (plug flow reactor) assuming r=k*concentration of SO$_2$ (the reaction rate is assumed to be first order in SO$_2$) as per the equation (8):

$$k = \frac{-1 \times (SO_2)_{in} \times \ln(1 - (SO_2)_{conv})}{c(SO_2)_{in} \times m_{active}} \quad \text{(Equation 8)}$$

where c $(SO_2)_{in}$ is the concentration of SO$_2$ in the feed gas.

The activation energy of reaction was calculated based on the average rate constant using the following equation derived from the Arrhenius expression (equation (9)):

$$\ln k = \ln A - \frac{E_a}{RT} \quad \text{(Equation 9)}$$

where: k (m$^3$/s·g) is the average rate constant, A is the pre-exponential factors, $E_a$ is the activation energy, R is the ideal gas constant which value is 8.314 J/(K·mol), T (K) is the reaction temperature. $E_a$ is derived from the slope of line plotted from ln k vs. 1/T.

Catalyst Characterization Results—Structural Characterization

Three types of pure phase Ni$_x$P$_y$ particles (1-Ni$_5$P$_4$, n-Ni$_2$P, n-Ni$_{12}$P$_5$) were synthesized using the methodologies of group "A" in FIG. 35 by modifying the phosphorization temperature. After coating with mesoporous SiO$_2$, the Ni$_x$P$_y$@SiO$_2$ samples were tested for the selective hydrogenation of SO$_2$ reaction. A commercial catalyst (CoMoS@Al$_2$O$_3$) was also tested under the same conditions for comparison purposes.

FIG. 1A shows the XRD patterns of the produced Ni$_x$P$_y$ nanoparticles with three different phases (Ni$_5$P$_4$, Ni$_2$P, and Ni$_{12}$P$_5$). 1-Ni$_5$P$_4$ is composed of the typical Ni$_5$P$_4$ phase, with peaks at 2θ of 15.1° (100), 30.4° (200), 47.0° (301), 47.8° (213), 53.0° (214), and 54.0° (220) corresponding to the typical Ni$_5$P$_4$ characteristic peaks (PDF #18-0883). n-Ni$_2$P is composed of the Ni$_2$P phase, with peaks at 2θ of 40.6° (111), 44.5° (201), 47.1° (210), 54.2° (002/300) and 54.8° (211) corresponding to the typical Ni$_2$P characteristic peaks (PDF #03-0953). n-Ni$_{12}$P$_5$ is composed of the Ni$_{12}$P$_5$ phase, with peaks at 2θ of 38.4° (112), 41.7° (400), 44.4° (330), 47.0° (420), and 49.0° (312) corresponding to the typical Ni$_{12}$P$_5$ characteristic peaks (PDF #22-1190). After phosphorization at 250° C., the product phase is $Ni_{12}P_5$, while at 300° C. it is $Ni_2P$ phase and at 350° C. the $Ni_5P_4$ phase was obtained. Increasing the phosphorization temperature facilitates the insertion of P atoms into the Ni lattice, thus promoting the formation of P-rich nickel phosphide phase.

The XRD patterns of samples m-$Ni_5P_4$, h-$Ni_5P_4$, and p-$Ni_5P_4$ are presented in FIG. 1B. Though all three samples undergo phosphorization at 350° C. for 2 hours, they display different crystal phases. m-$Ni_5P_4$ contains $Ni_5P_4$ phase (peaks at 2θ of 15.1° (100), 30.4° (200), 47.0° (301), 47.8° (213), 53.0° (214), and 54.0° (220), PDF #18-0883) and $NiP_2$ phase (peaks at 2θ of 28.2° (111), 32.7° (200), 36.7° (210), 40.4° (211) 47.0° (220), and 55.7° (311) correspond to the typical $NiP_2$ characteristic peaks (PDF #21-0590)). h-$Ni_5P_4$ contains the $Ni_5P_4$ phase (peaks at 2θ of 15.1° (100), 30.4° (200), 47.0° (301), 47.8° (213), 53.0° (214), and 54.0° (220), PDF #18-0883) and $Ni_2P$ phase (peaks at 2θ of 40.6° (111), 44.5° (201), 47.10 (210), 54.2° (002/300) and 54.8° (211), PDF #03-0953). Only p-$Ni_5P_4$ is the pure $Ni_5P_4$ phase without the peaks corresponding to $Ni_2P$ or $NiP_2$ phases.

For m-$Ni_5P_4$, without OA, the TOPO served a dual role of solvent and surfactant. The high ramping rate up to 350° C., leads to a fast pass through the nucleation whereas the injection of TOP, at 350° C., leads to the rapid insertion of P into the Ni lattice. Hence the P insertion occurs simultaneously along with the Ni nucleation process, which facilitates the formation of a P-rich phase $NiP_2$ due to the excessive phosphorization. In the case of h-$Ni_5P_4$, the nucleation process was allowed to progress at 230° C. before the TOP injection. Then, the TOP was injected after the nucleation of Ni particles. This leads to a more difficult insertion step of P into the Ni lattice, thus leading to the Ni-rich phase $Ni_2P$. In the synthesis of p-$Ni_5P_4$, the same steps were followed as in the case of l-$Ni_5P_4$, with the TOPO being added after the nucleation, though no alteration in the resulting crystal phase of the product was found. The pure phase of $Ni_5P_4$ was achieved for p-$Ni_5P_4$ as l-$Ni_5P_4$. $Ni_2P$, $Ni_5P_4$, and $NiP_2$ phases are formed in a narrow temperature range between 300° C. to 350° C. and this demonstrates the sensitivity of the phosphorization reaction towards the temperature. Hence, to modify the morphology while preserving the crystal phase purity requires fine tuning of synthesis parameters.

The XRD patterns of sample n-$Ni_5P_4$@$SiO_2$, u-$Ni_5P_4$@$SiO_2$, and u-$Ni_5P_4$@$SiO_2$-1 are shown in FIG. 1C. n-$Ni_5P_4$@$SiO_2$ presents peaks that correspond to $Ni_2P$ phase (peaks at 2θ of 40.6° (111), 44.5° (201), and 47.1° (210), PDF #03-0953) as well as $Ni_5P_4$ phase (peaks at 2θ of 15.1° (100), 30.4° (200), 47.0° (301), 47.8° (213), 53.0° (214), and 54.0° (220), PDF #18-0883). u-$Ni_5P_4$@$SiO_2$ and u-$Ni_5P_4$@$SiO_2$-1 show more clear characteristic peaks corresponding to $Ni_5P_4$ phase (peaks at 2θ of 15.1° (100), 30.4° (200), 47.0° (301), 47.8° (213), 53.0° (214), and 54.0° (220), PDF #18-0883), while the low amount of $Ni_2P$ (peak at 2θ of 40.6° (111), PDF #03-0953) phase was coexisting. The broad peak in the 20-40 degrees range originates from the $SiO_2$ matrix.

For n-$Ni_5P_4$@$SiO_2$, $Ni_2P$ nanoparticles were first coated with mesoporous $SiO_2$ and then the phosphorization step was conducted at 350° C. The mesoporous $SiO_2$ provided the channels for P diffusion towards the nanoparticles. Due to the inadequate contact of P to some unevenly dispersed $Ni_2P$ particles which were enclosed within $SiO_2$, the $Ni_2P$ phase and the $Ni_5P_4$ phase are coexistent in FIG. 1C of sample n-$Ni_5P_4$@$SiO_2$. For u-$Ni_5P_4$@$SiO_2$ and u-$Ni_5P_4$@$SiO_2$-1, $Ni(acac)_2$ was incorporated into the mesoporous silica with the assistance of the CTAB surfactant. Then the composite $Ni(acac)_2$@$SiO_2$ underwent the phosphorization step at 350° C. The CTAB surfactant in the silica skeleton slowly decomposes when the heating temperature exceeds 250° C. This exposes the Ni precursor housed within the porous channels to P. The phase transformation from Ni to $Ni_5P_4$ was accomplished in the mesoporous framework of $SiO_2$.

The loading of $Ni_xP_y$ crystals compared to the $SiO_2$ support is shown in Table 1 expressed as Ni/(Ni+Si) ratio. The atomic ratio of Ni loading to Ni+Si in l-$Ni_5P_4$@$SiO_2$, n-$Ni_2P$@$SiO_2$, and n-$Ni_{12}P_5$@$SiO_2$ is about 41 at. %, 22 at. %, and 15 at. % respectively. For n-$Ni_5P$@$SiO_2$ it is about 28 at. % which is similar to n-$Ni_2P$@$SiO_2$. u-$Ni_5P_4$@$SiO_2$ and u-$Ni_5P_4$@$SiO_2$-1 contain about 5 at. % loading of $Ni_5P_4$ clusters confined by the mesoporous $SiO_2$, which are much lower than the samples with $SiO_2$ coating after treatment.

TABLE 1

Phase identification as derived from XRD study and compositional analysis of the catalysts conducted using SEM/EDX before and after catalytic performance testing.

| Catalyst | Phase (XRD) | Atomic Ratio*[a] | | | Weight Ratio*[b] |
| --- | --- | --- | --- | --- | --- |
| | | Ni/(Ni + Si) | Ni/P*[c] (fresh) | Ni/P*[c] (spent) | $Ni_xP_y$ (%) |
| l-$Ni_5P_4$@$SiO_2$ | $Ni_5P_4$ | 41% | 1.1 | 1.3 | 50 |
| n-$Ni_2P$@$SiO_2$ | $Ni_2P$ | 22% | 1.8 | 1.6 | 26 |
| n-$Ni_{12}P_5$@$SiO_2$ | $Ni_{12}P_5$ | 15% | 1.7 | 1.5 | 18 |
| m-$Ni_5P_4$ | $Ni_5P_4$ + $NiP_2$ | 100% | 0.9 | 0.7 | 100 |
| h-$Ni_5P_4$ | $Ni_2P$ + $Ni_5P_4$ | 100% | 1.8 | 1.5 | 100 |
| p-$Ni_5P_4$ | $Ni_5P_4$ | 100% | 1.4 | 0.9 | 100 |
| n-$Ni_5P_4$@$SiO_2$ | $Ni_2P$ + $Ni_5P_4$ | 28% | 1.3 | 1.1 | 35 |
| u-$Ni_5P_4$@$SiO_2$ | $Ni_2P$ + $Ni_5P_4$ | 5% | 0.6 | 0.8 | 9 |
| u-$Ni_5P_4$@$SiO_2$-1 | $Ni_5P_4$ | 5% | 0.5 | 0.7 | 10 |

*[a]Average data from 5 measurements, error = ~2%.
*[b]$Ni_xP_y$/($Ni_xP_y$ + $SiO_2$), calculated based on the atomic ratio data of fresh catalysts.
*[c]The stoichiometry Ni/P atomic ratio of $Ni_xP_y$ (x/y) phases were: $Ni_{12}P_5$ (2.4), $Ni_2P$ (2.0), $Ni_5P_4$ (1.25), $NiP_2$ (0.5).

The EDX data reveal the Ni:P atomic ratio of each sample which is also listed in Table 1. The stoichiometry Ni:P atomic ratio of $Ni_xP_y$ (x/y) phases are as follows: $Ni_{12}P_5$ (2.4), $Ni_2P$ (2.0), $Ni_5P_4$ (1.25), $NiP_2$ (0.5); the experimental Ni:P atomic ratio data of l-$Ni_5P_4$@$SiO_2$ (Ni:P=1.1, $Ni_5P_4$ phase), n-$Ni_2P$@$SiO_2$ (Ni:P=1.8, $Ni_2P$ phase), and p-$Ni_5P_4$ (Ni:P=1.4, $Ni_5P_4$ phase) are in agreement to the nominal Ni:P atomic ratio, which corroborates their XRD results. For the sample n-$Ni_{12}P_5$@$SiO_2$ (Ni:P=1.7, $Ni_{12}P_5$ phase) which was synthesized at a lower temperature (250° C.) than the synthesis of 1-Ni$_5$P$_4$@SiO$_2$ (350° C.) and n-Ni$_2$P@SiO$_2$ (300° C.), the Ni:P atomic ratio was found to be lower than the nominal ratio which is likely due to the adhesive P with excess undecomposed TOP on the nanoparticles.

For the sample m-Ni$_5$P$_4$ (Ni:P=0.9) with mixed phases of Ni$_5$P$_4$ and NiP$_2$ (average stoichiometry Ni:P atomic ratio is 0.9), and h-Ni$_5$P$_4$(Ni:P=1.8) with mixed phases of Ni$_2$P+ Ni$_5$P$_4$ (average stoichiometry Ni:P atomic ratio is 1.6), the experimental data agree with the nominal Ni:P atomic ratio, which corroborates the XRD patterns over this catalyst as well.

The sample n-Ni$_5$P$_4$@SiO$_2$ (Ni:P=1.3), u-Ni$_5$P$_4$@SiO$_2$ (Ni:P=0.6), and u-Ni$_5$P$_4$@SiO$_2$-1 (Ni:P=0.5) show much lower experimental Ni:P atomic ratio than their nominal ratio corresponding to their XRD phase analysis (Ni:P=1.25-1.8). This is likely due to the excess P incorporation with the SiO$_2$ during the decomposition of TOP during the phosphorization step, as the Ni loading is much lower compared to the SiO$_2$ matrix. A small amount of excess P can lead to the high ratio of P compare to Ni.

The Ni:P atomic ratio of the spent sample in Table 1 is described in more detail in the subsequent paragraphs of spent catalyst, and the weight ratio of Ni$_x$P$_y$ are listed as well and are calculated as the active composition of each sample for the catalytic efficiency analysis in the subsequent section. Most of these results are consistent with the Ni/P atomic ratio results from SEM-EDX. One exception comes from the m-Ni$_5$P$_4$ which had non uniform particle size and phase distribution, and the other two exceptions come from the n-Ni$_5$P$_4$@SiO$_2$ and u-Ni$_5$P$_4$@SiO$_2$-1 which had high ratios of SiO$_2$ that lead to the inaccurate quantification of small Ni and P peaks.

Figure 36:
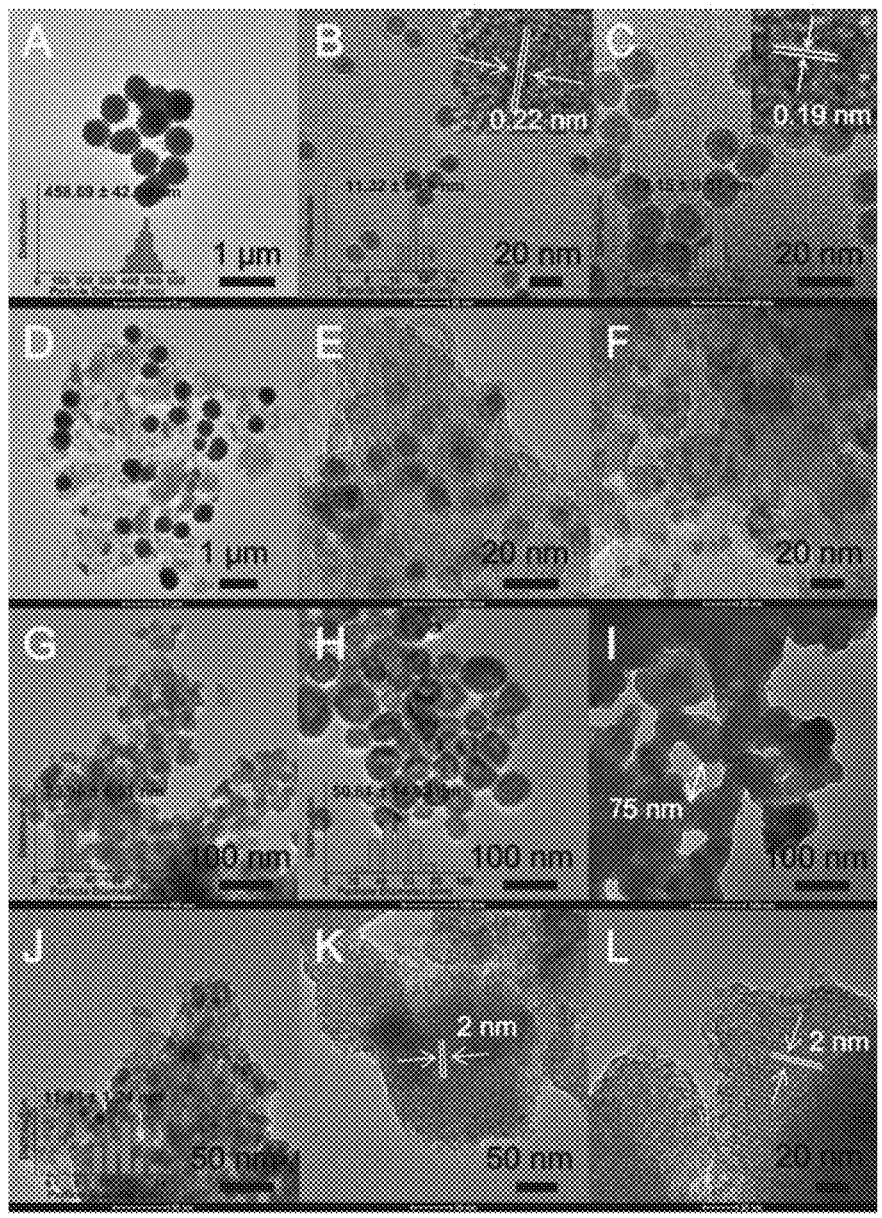
FIG. 36 illustrate TEM images of some catalyst samples of the present invention.

FIG. 36 illustrates the TEM images obtained over the produced three types of pure phase Ni$_x$P$_y$ samples (Ni$_5$P$_4$, Ni$_2$P, and Ni$_{12}$P$_5$) before and after mesoporous SiO$_2$ coating, and the Ni$_5$P$_4$ samples with different morphologies either with or without SiO$_2$. In FIG. 36, panel A shows the image for 1-Ni$_5$P$_4$ (>500 nm large Ni$_5$P$_4$ particles), panel B shows the image for n-Ni$_2$P (~11 nm Ni$_2$P particles), and panel C shows the image for n-Ni$_{12}$P$_5$ (~12 nm Ni$_{12}$P$_5$ particles), all without mesoporous SiO$_2$ coating. Panel D shows the image for 1-Ni$_5$P$_4$@SiO$_2$, panel E shows the image for n-Ni$_2$P@SiO$_2$, and panel F shows the image for n-Ni$_{12}$P$_5$@SiO$_2$, all with mesoporous SiO$_2$ coating. Panel G shows the image for m-Ni$_5$P$_4$ (~20 to ~50 nm medium size particles), panel H shows the image for h-Ni$_5$P$_4$ (~50 nm hollow particles), panel I shows the image for p-Ni$_5$P$_4$ (~50 to ~100 nm porous network), panel J shows the image for n-Ni$_5$P$_4$@SiO$_2$ (~11 nm Ni$_5$P$_4$ particles coated with SiO$_2$), panel K shows the image for u-Ni$_5$P$_4$@SiO$_2$ (<2 nm ultrafine Ni$_5$P$_4$ clusters confined with mesoporous SiO$_2$), panel L shows the image for u-Ni$_5$P$_4$@SiO$_2$-1 (<2 nm ultra-fine Ni$_5$P$_4$ clusters confined with mesoporous SiO$_2$, long heating time).

1-Ni$_5$P$_4$@SiO$_2$ shows large clusters of nearly spherical particles possessing a diameter of ~500 nm (Panel A, FIG. 36). After coating of mesoporous SiO$_2$, a thinly layered matrix of mesoporous SiO$_2$ incompletely encapsulates the particles, forming a snatchy matrix (Panel D, FIG. 36). Images of n-Ni$_2$P@SiO$_2$ and n-Ni$_{12}$P$_5$@SiO$_2$ display particles with a diameter of about 11 to 12 nm (respectively, Panels B and C, FIG. 36), with a lattice spacing of ~0.22 nm (consistent with the (111) plane of Ni$_2$P) and ~0.19 nm (consistent with the (420) plane of Ni$_{12}$P$_5$), respectively. The particles were embedded completely within the thin layered mesoporous SiO$_2$ matrix after coating (Panels E and F, FIG. 36). None of the samples exhibited changes in morphology after the coating of silica.

The synthesis of small size phase-pure Ni$_5$P$_4$ using solution-phase approaches is challenging due to the aggregation of Ni$_5$P$_4$ crystal at 350° C. (compare to n-Ni$_2$P and n-Ni$_{12}$P$_5$, 1-Ni$_5$P$_4$ aggregated to ~500 nm clusters). The role of OA in preventing the aggregation of Ni$_x$P$_y$ weakens at such high temperatures (350° C., exceeds the OA boiling point of 348° C.). Thus, a better suited stabilizing agent to avoid the crystal size growth and sintering at high temperature up to 350° C. is in demand.

Two approaches were applied to restrict the Ni$_5$P$_4$ aggregation: (i) introduction of a high boiling point solvent instead of OA and (ii) introduction of a solid frame to limit the crystal size. TOPO with a higher boiling point of 411.2° C. was introduced into the mixture as an assistant solvent to provide a more stable environment to prevent the aggregation of Ni$_5$P$_4$ crystals (m-Ni$_5$P$_4$ and p-Ni$_5$P$_4$). The addition of TOP or TOPO at high temperatures was also used as an effective morphology adjustment approach (m-Ni$_5$P$_4$, h-Ni$_5$P$_4$, p-Ni$_5$P$_4$). SiO$_2$ is an inert and stable support, so the mesoporous SiO$_2$ can serve as a frame for the confinement of the Ni$_x$P$_y$ crystal growth and aggregation, thus providing an effective size control pathway (n-Ni$_5$P$_4$@SiO$_2$, u-Ni$_5$P$_4$@SiO$_2$, u-Ni$_5$P$_4$@SiO$_2$-1).

The TEM image of m-Ni$_5$P$_4$ in panel G of FIG. 36 displays solid particles with a diameter of about 20 to about 50 nm, while the TEM image of h-Ni$_5$P$_4$ in panel H displays the hollowed particles with a diameter of about 50 nm. The formation of hollow nanoparticles of h-Ni$_5$P$_4$ is due to the Kirkendall effect. The injection of TOP at high temperatures after the nucleation of Ni particles, cause a varying ion diffusion rates of Ni and P (the Ni migration outward is faster than the P migration inward) which leads to the creation of voids. These hollow particles were not aggregated. The simultaneous nucleation and P insertion performed in m-Ni$_5$P$_4$ did not allow for the Kirkendall effect to take place, thus the particles are solid. The use of TOPO with a higher boiling point instead of OA as solvent and surfactant minimizes the aggregation of the final product. For the synthesis of p-Ni$_5$P$_4$, the TOPO was added after the nucleation and P insertion step at 230° C. Compared to the synthesis of 1-Ni$_5$P$_4$ (only OA as surfactant and solvent), the co-existence of TOPO avoided the strong aggregation of Ni$_5$P$_4$ crystals, but still, partial aggregation occurs, which leads to the cross-linked net structure, and the Ni$_5$P$_4$ network structure possessing macropores of about 50 to about 100 nm in size based on the TEM observation (Panel I, FIG. 36).

For n-Ni$_5$P$_4$@SiO$_2$, the embedded nanoparticles maintain their size and morphology before and after the phase transformation process, owing to the protection of mesoporous SiO$_2$ coating (Panel J, FIG. 36). The mesoporous SiO$_2$ display the same protection roles in u-Ni$_5$P$_4$@SiO$_2$ and u-Ni$_5$P$_4$@SiO$_2$-1. In panels K and L of FIG. 36, only the ordered fingerprint (as the marker lines show) of the hexagonal honeycomb pores of SiO$_2$ can be clearly observed. The pore diameter is about 2 to about 3 nm is size and the wall thickness of SiO$_2$ is about 1 nm, which correspond to the mesoporous structure of MCM-41. No distinct nickel phosphide particles can be observed from their TEM images, while the XRD patterns (FIG. 1C) and the EDX analysis (Table 1) show the evidence of Ni$_5$P$_4$. This means that the clusters of the Ni$_5$P$_4$ phase were confined in the mesoporous SiO$_2$ matrix. The crystallites are less than ~2 nm (the channel diameter of the mesopores of the SiO$_2$ matrix is around 2 nm as it is indicated in panels K and L of FIG. 36), which is beyond the visible range of the TEM instrument.

Figure 37:
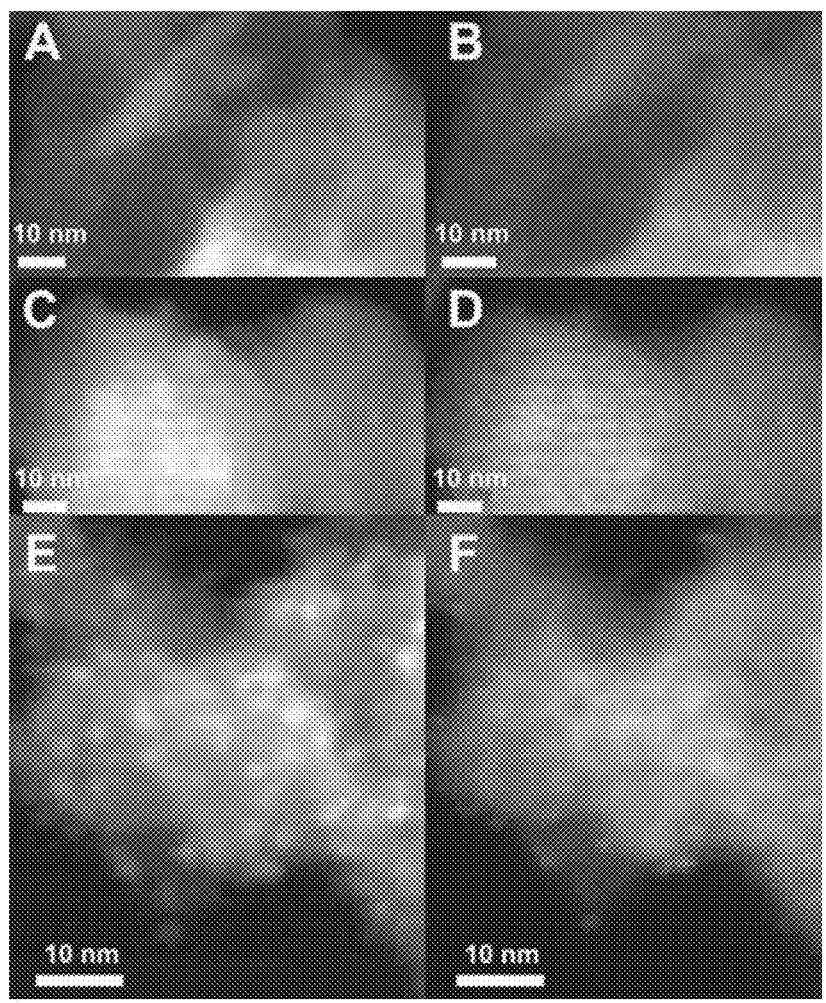
FIG. 37 illustrate HRTEM and STEM-HAADF/EDS mapping images for some catalysts of the present invention.

To show the dispersion of ultrafine $Ni_5P_4$ clusters confined in mesoporous $SiO_2$, a further characterization by HRTEM and STEM-HAADF/EDS of Ni and Si elemental mapping for the u-$Ni_5P_4$@$SiO_2$ (FIG. 37, panels A and B) and u-$Ni_5P_4$@$SiO_2$-1 (FIG. 37, panels C, D, E, and F) was studied. While FIG. 37 is limited to a black-and-white illustration of the resulting mapping images, the original color image maps indicated the position of Ni as red spots with a size of about 1 to about 2 nm dispersed throughout a green field of Si. Compared to the u-$Ni_5P_4$@$SiO_2$ sample (with ~2 hours phosphorization), the u-$Ni_5P_4$@$SiO_2$-1 (4 hours phosphorization) showed a clearly larger size of the red spots (though still less than 2 nm). The channels with a diameter of about 2 nm of the mesoporous $SiO_2$ matrix (panels C and D of FIG. 37) can be observed as well. A reliable P map could not be acquired because its P-L edge (132 eV) was completely masked by the Si-L edge (99 eV). However, the Ni-L23 edge (855 eV) was not overlapping with any other and it was shown as having white-lines.

Catalyst Characterization Results—Textural Characterization

The textural properties of the samples were studied by $N_2$ adsorption/desorption experiments at 77K. The collected isotherms along with the pore size distributions are presented in FIGS. 38A-38G and the BET surface area ($m^2$/g), pore volume ($cm^3$/g), and pore size values (nm) are listed in the following Table 2:

the sharp distribution centered at around 2 nm and the broader distribution between 40-50 nm suggest that the porous structure of the sample is comprised of large widely distributed cavities interconnected with mesoporous channels (see FIGS. 38A, 38B, 38C, and 38E).

Figure 38B:
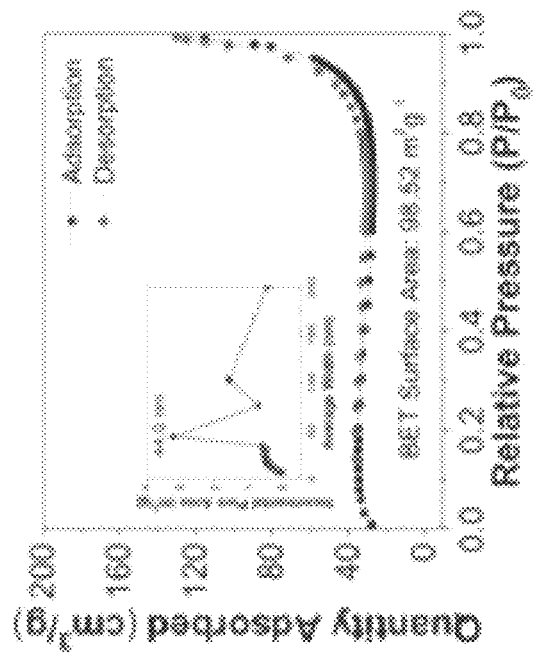
FIGS. 38A-38G illustrate $N_2$ adsorption-desorption isotherms for some samples of the catalysts of the present invention.
Figure 38A:
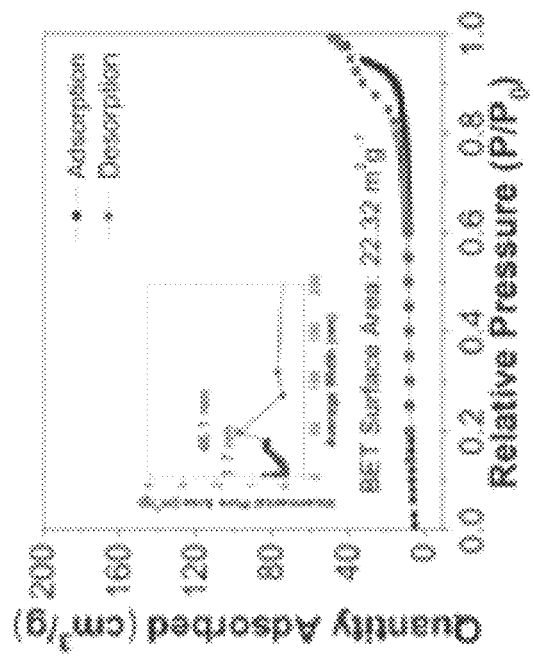
Figure 38C:
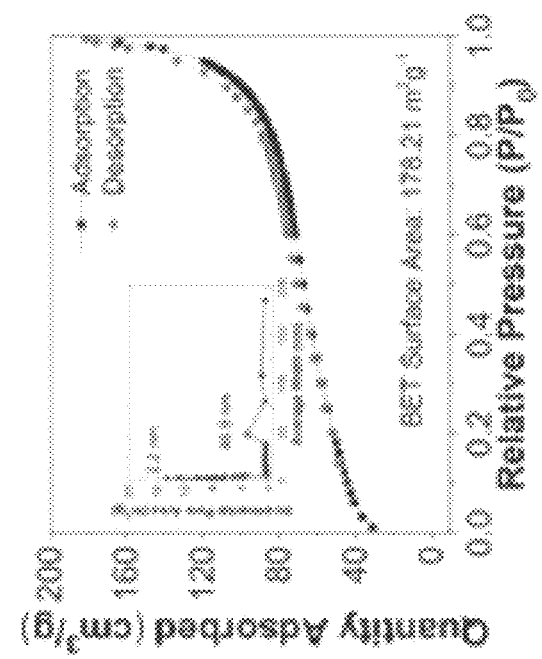
Figure 38D:
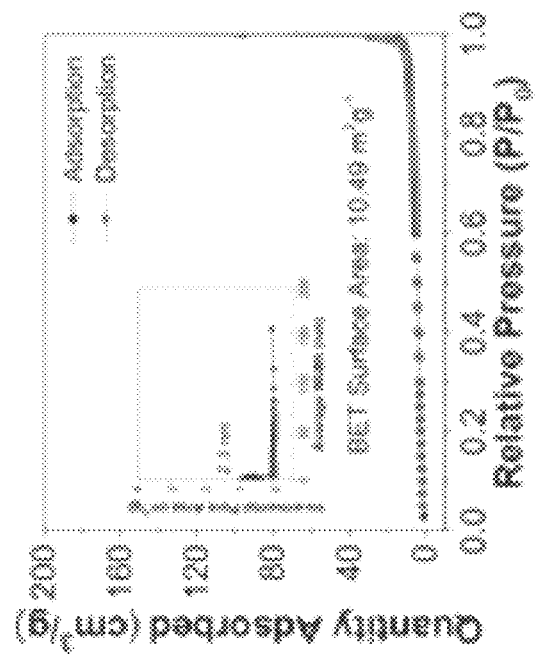
Figures 38E, 38F:
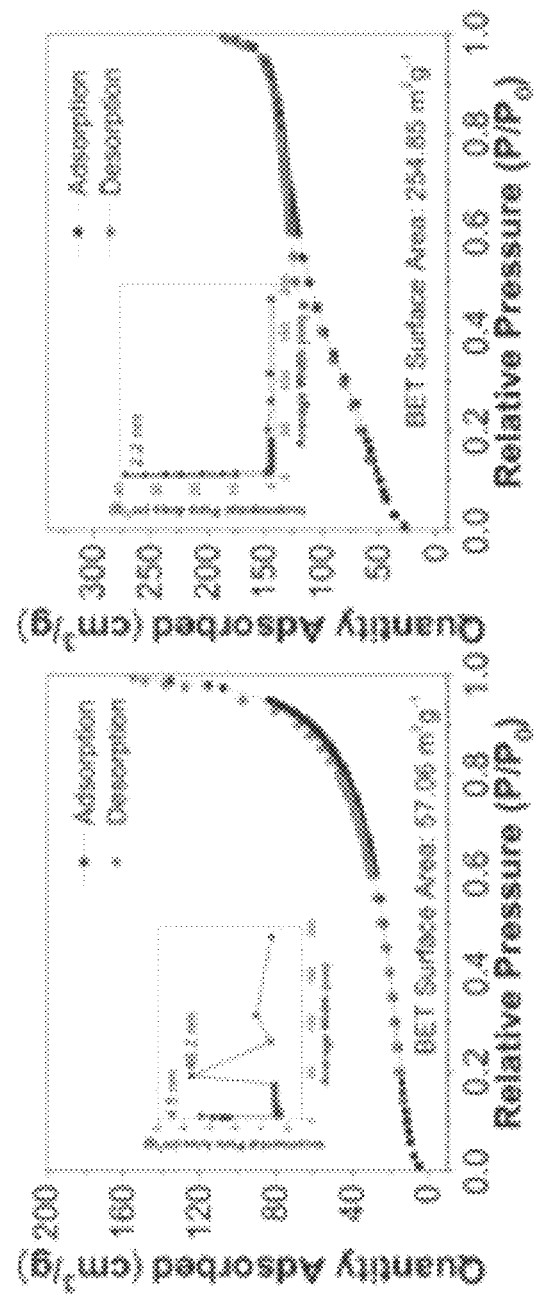
Figure 38G:
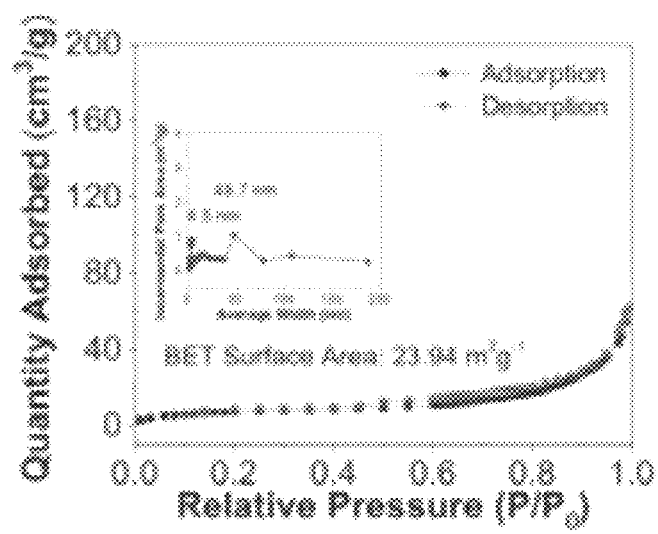

The BET surface area for u-$Ni_5P_4$@$SiO_2$ is 255 $m^2 \cdot g^{-1}$, the pore volume is 0.28 $cm^3 \cdot g^{-1}$ and the BJH pore size distribution of u-$Ni_5P_4$@$SiO_2$ shows a sharp distribution centered at 2.2 nm which is attributed to the hexagonal honeycomb channels of typical MCM-41 (FIG. 38F). While for u-$Ni_5P_4$@$SiO_2$-1, the BET surface area is 24 $m^2 \cdot g^{-1}$, the pore volume is 0.09 $cm^3 \cdot g^{-1}$, and the BJH pore size sharp peaks are centered at 4.5 nm and 48.7 nm. As shown in the BJH pore size distribution of u-$Ni_5P_4$@$SiO_2$-1 (FIG. 38G), the sharp peak at 4.5 nm is attributed to mesoporous channels, while the broad peak centered at 48.7 nm is potentially attributed to the large cavities existing within the silica matrix. Compared to u-$Ni_5P_4$@$SiO_2$, the longer phosphorization process of u-$Ni_5P_4$@$SiO_2$-1 leads to a pore diameter expansion and a BET surface area decrease of the mesoporous silica matrix.

For all the above samples with $SiO_2$, their porosity comes from the $SiO_2$, while p-$Ni_5P_4$ (FIG. 38D) shows a very special porous structure even without the coating of $SiO_2$; it is believed that the porous structure of p-$Ni_5P_4$ was formed by the fusion and cross-linking of $Ni_5P_4$ crystals (the porosity results match well with the TEM in panel I of FIG. 36). It exhibits the typical Type II isotherms according to the IUPAC classification, which corresponds to macroporous

TABLE 2

Summary of the treatment processes during synthesis, as well as the size and morphology characteristics derived from TEM studies and the porosity data derived from $N_2$ adsorption-desorption at 77 K.

| Catalyst | $Ni_xP_y$ Size/Morphology | $V_p$ ($cm^3 \cdot g^{-1}$) | $S_{BET}$ ($m^2 \cdot g^{-1}$) | $d_{BJH}$ (nm) |
|---|---|---|---|---|
| l-$Ni_5P_4$@$SiO_2$ | >500 nm/spherical | 0.07 | 22 | 1.7 |
| n-$Ni_2P$@$SiO_2$ | ~110 nm/particles | 0.20 | 99 | N/A |
| n-$Ni_{12}P_5$@$SiO_2$ | ~12 nm/particles | 0.28 | 178 | 2.2 |
| m-$Ni_5P_4$ | 20~50 nm/particles | N/A | N/A | N/A |
| h-$Ni_5P_4$ | ~50 nm/hollow particles | N/A | N/A | N/A |
| p-$Ni_5P_4$ | 50~100 nm/porous network | 0.04 | 10 | 2.3 |
| n-$Ni_5P_4$@$SiO_2$ | ~11 nm/particles | 0.24 | 57 | 4.3 |
| u-$Ni_5P_4$@$SiO_2$ | <2 nm/ultra-fine clusters | 0.28 | 255 | 2.2 |
| u-$Ni_5P_4$@$SiO_2$-1 | <2 nm/ultra-fine clusters | 0.09 | 24 | 4.5 | l-$Ni_5P_4$@$SiO_2$ (FIG. 38A), n-$Ni_2P$@$SiO_2$ (FIG. 38B), n-$Ni_{12}P_5$@$SiO_2$ (FIG. 38C), n-$Ni_5P_4$@$SiO_2$ (FIG. 38E), u-$Ni_5P_4$@$SiO_2$ (FIG. 38F), and u-$Ni_5P_4$@$SiO_2$-1 (FIG. 38G) exhibit the Type IV isotherms according to the IUPAC classification. There are three distinct sharp uptakes in the isotherms: the uptake at low, medium and high relative pressure, which correspond to the filling of microporous, mesoporous, and inter-grain volumes respectively.

The BET surface area and the pore volume for l-$Ni_5P_4$@$SiO_2$ (50 wt. % $Ni_xP_y$) are 22 $m^2 \cdot g^1$ and 0.07 $cm^3 \cdot g^{-1}$ respectively; for n-$Ni_2P$@$SiO_2$ (26 wt. % $Ni_xP_y$) are 99 $m^{2 \cdot -1}$ and 0.20 $cm^3 \cdot g^{-1}$ respectively; for l-$Ni_{12}P_5$@$SiO_2$ (18 wt. % $Ni_xP_y$) are 178 $m^2 \cdot g^{-1}$ and 0.28 $cm^3 \cdot g^{-1}$ respectively; and for n-$Ni_5P_4$@$SiO_2$ (35 wt. % $Ni_xP_y$) is 57 $m^2 \cdot g^{-1}$ and 0.24 $cm^3 \cdot g^{-1}$ respectively. These differences come from the different ratio of $SiO_2$ in the above four samples, as the porosity is influenced by the $SiO_2$ coating rather than the $Ni_xP_y$ nanoparticles, the higher the ratio of $SiO_2$ coating, the higher the surface area and volume of the sample. As shown in the BJH pore size distribution of the above four samples, structures. Its BET surface area is 10 $m^2 \cdot g^{-1}$, the pore volume is 0.04 $cm^3 \cdot g^{-1}$, and displays BJH pore size sharp peak centered at 2.3 nm and several broad distributions extending between 10 to 100 nm.

Catalytic Performance—Catalyst Screening

Figures 39A, 39B:
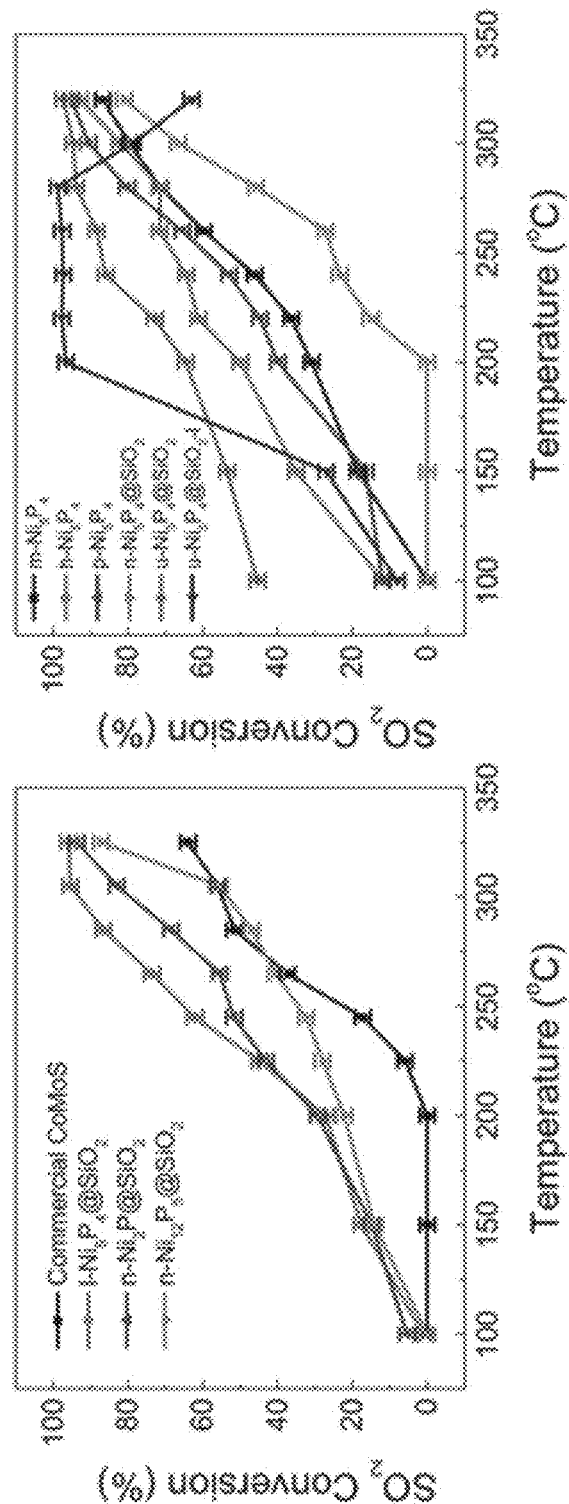
FIGS. 39A-39F illustrate $SO_2$ conversion to $H_2S$ data for some samples of the catalysts of the present invention.
Figure 39C:
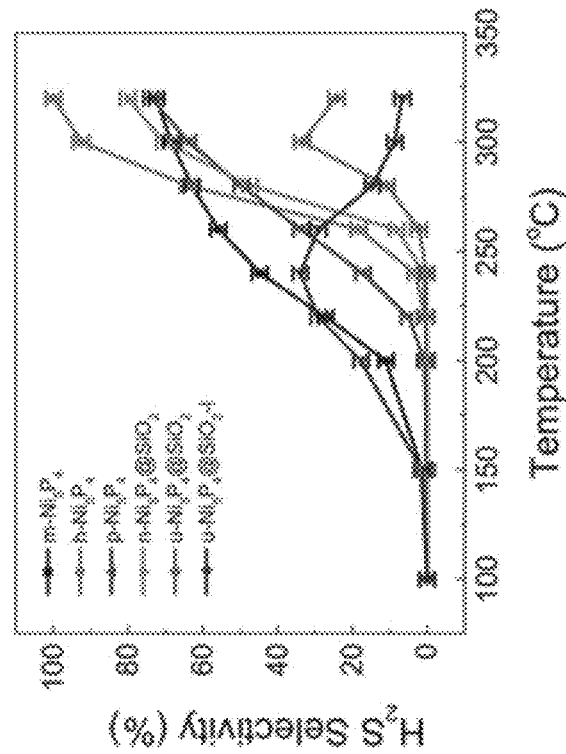
Figure 39D:
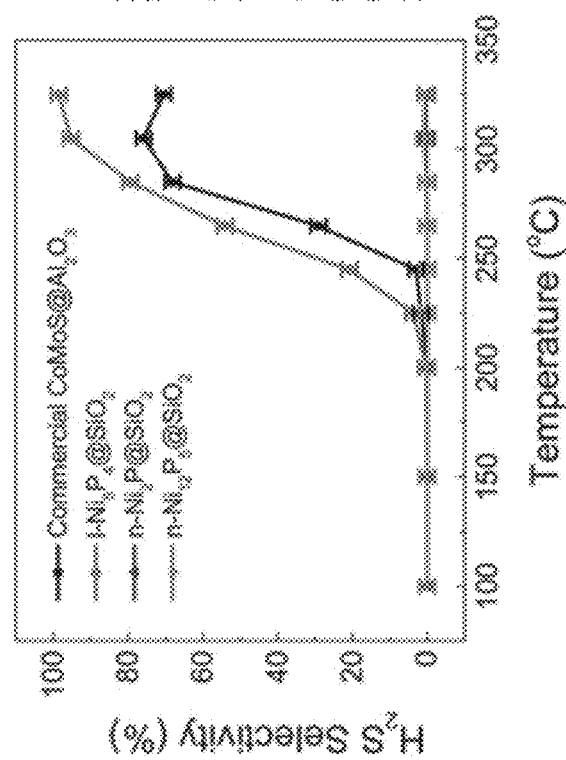
Figures 39E, 39F:
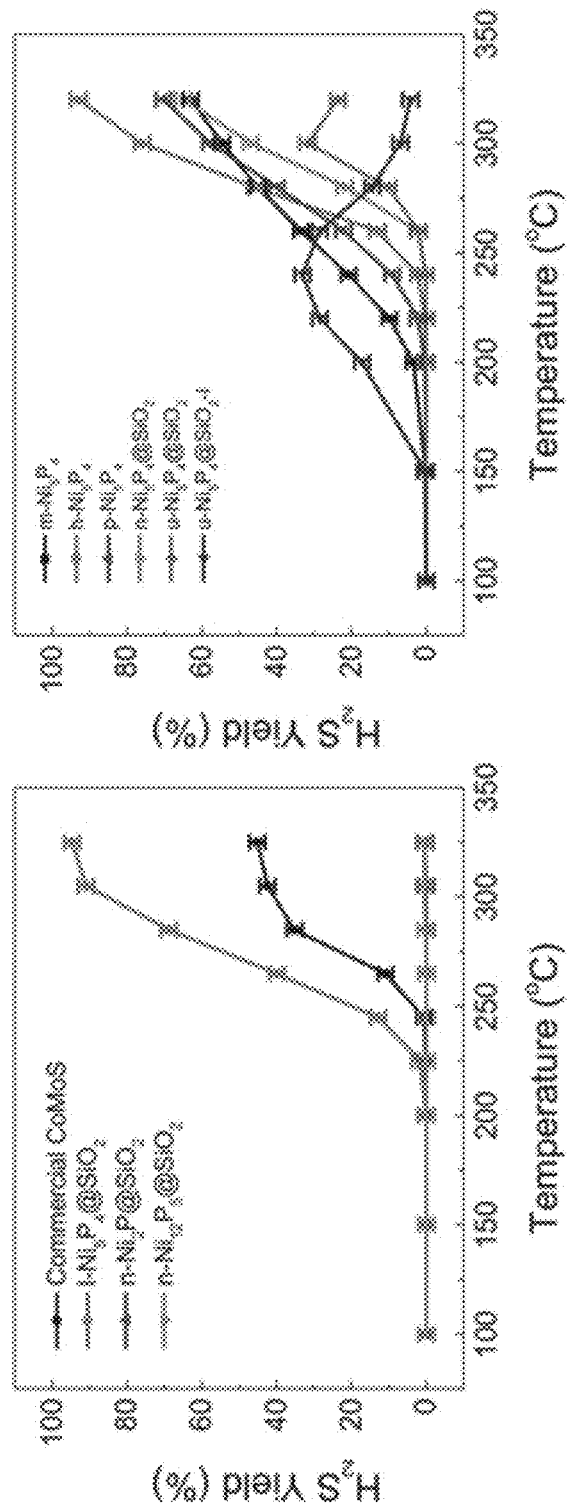

The catalytic activity of the samples containing different phases ($Ni_5P_4$, $Ni_2P$, $Ni_{12}P_5$, and CoMoS), expressed as $SO_2$ conversion to $H_2S$, is plotted in FIGS. 39A, 39C, and 39E. Across the studied temperature range, $SO_2$ conversion of all the samples increases with the temperature. n-$Ni_2P$@$SiO_2$ and n-$Ni_{12}P_5$@$SiO_2$ achieve $SO_2$ conversion of 94% and 87%, respectively, at 325° C., which are much higher than the commercial CoMoS@$Al_2O_3$ (64% $SO_2$ conversion at 325° C.). However, n-$Ni_2P$@$SiO_2$ and n-$Ni_{12}P_5$@$SiO_2$ displayed low selectivity towards $H_2S$ (almost zero). Thus, the $Ni_2P$ and $Ni_{12}P_5$ phases, which were the respective predominant phases in the n-$Ni_2P$@$SiO_2$ and n-$Ni_{12}P_5$@$SiO_2$ samples, were not active phases for the formation of $H_2S$.

For the l-$Ni_5P_4$@$SiO_2$ and commercial CoMoS@$Al_2O_3$ catalyst samples, the $H_2S$ selectivity increases with the temperature. The 1-Ni$_5$P$_4$@SiO$_2$ sample in particular, with its predominant Ni$_5$P$_4$ phase, presented almost twice as high of a yield of H$_2$S than the commercial CoMoS@Al$_2$O$_3$ catalyst, in the range of 91% and 94% at 305° C. and 325° C. for the 1-Ni$_5$P$_4$@SiO$_2$ sample vs. 42% and 45% yield at 305° C. and 325° C. for the commercial catalyst. The H$_2$S yield provided by the 1-Ni$_5$P$_4$@SiO$_2$ sample between 265° C. and 285° C., was similar to that provided by the commercial catalyst at 50° C. higher temperature (~45% H$_2$S yield at 325° C.).

These results suggest that the activity and selectivity are strongly dependent upon the crystal phase of samples, as the different phases of Ni$_x$P$_y$ can play a key role for the modulation of their catalytic properties. Compared to Ni$_{12}$P$_5$ (0.29 at. % of P) and Ni$_2$P (0.33 at. % of P) phases, the Ni$_5$P$_4$ phase has a higher P atomic ratio (0.44 at. % of P) in the crystal structure. If we compare the (001) surface of Ni$_5$P$_4$ and Ni$_2$P crystals, the Ni—P bond length in Ni$_5$P$_4$ (~2.306 Å) is longer than in Ni$_2$P (~2.201 Å), while the Ni-Ni bond length of the trigonal Ni$_3$ site in Ni$_5$P$_4$ (~2.563 Å) is shorter than in Ni$_2$P (~2.640 Å). The overlap of the filled Ni valence orbitals and the hydrogen is orbital can increase in Ni$_5$P$_4$, and the covalent interaction can increase as well, thus the first electron transfer can be more favorable. This can decrease the energy barrier and accelerate the reaction to generate H$_2$S (which demand more activated H$_2$ compare to the generation of S).

Catalytic Performance—Morphology Impact

The SO$_2$ conversion to H$_2$S over Ni$_5$P$_4$ samples with different morphologies (20~50 nm medium size particles, ~50 nm hollow particles, 50~100 nm porous network, 11 nm Ni$_5$P$_4$ particles, and <2 nm ultra-fine Ni$_5$P$_4$ clusters) was determined and the results are plotted in FIGS. 39B, 39D, and 39F.

For the catalysts m-Ni$_5$P$_4$, h-Ni$_5$P$_4$, p-Ni$_5$P$_4$, and n-Ni$_5$P$_4$@SiO$_2$, the yield of H$_2$S increased with temperature. At 320° C., h-Ni$_5$P$_4$ hollow particles (mixed Ni$_2$P and Ni$_5$P$_4$ phase from the XRD analysis, Table 1) displayed the best performance, achieving 93% H$_2$S yield, while p-Ni$_5$P$_4$ (pure Ni$_5$P$_4$ phase, Table 1) achieved a 70% H$_2$S yield, n-Ni$_5$P$_4$@SiO$_2$ (mixed Ni$_2$P and Ni$_5$P$_4$ phase, Table 1) achieved a 65% H$_2$S yield, and m-Ni$_5$P$_4$ (mixed Ni$_5$P$_4$ and NiP$_2$ phase, Table 1) achieved a 63% H$_2$S yield.

The catalyst performance tests of 1-Ni$_5$P$_4$@SiO$_2$, n-Ni$_2$P@SiO$_2$, and n-Ni$_{12}$P$_5$@SiO$_2$ suggest that the Ni$_5$P$_4$ is the active phase for SO$_2$ conversion to H$_2$S. Across the temperature range of 200-260° C., both m-Ni$_5$P$_4$ (non-uniform sized particles) which is comprised of a mixed phase of Ni$_5$P$_4$ and NiP$_2$ and p-Ni$_5$P$_4$ (porous network) which is comprised of a Ni$_5$P$_4$ network achieve better performance than h-Ni$_5$P$_4$ (hollow particles), but their high-temperature performance was not as good as h-Ni$_5$P$_4$. h-Ni$_5$P$_4$ displayed good performance, despite its mixture of Ni$_2$P and Ni$_5$P$_4$ phases which is likely due to the uneven distribution of P in the hollow particles. The hollow particle surface allows for the formation of P-rich phase easily, due to the Kirkendall effect (the Ni migration outwards is faster than the P migration inward) which leads to the creation of voids. The Ni$_2$P phase on the surface of h-Ni$_5$P$_4$ inhibits the formation of H$_2$S below 260° C., while between 260-320° C., the Ni$_5$P$_4$ phase plays a dominant role favoring the selectivity towards H$_2$S (>90%). Compared to the solid Ni$_5$P$_4$ particles, the hollowed particles have a relatively lower density for the same weight of catalyst, thus the h-Ni$_5$P$_4$ can provide more accessibility to the active sites to facilitate contact with the substrate.

n-Ni$_5$P$_4$@SiO$_2$ is comprised of mixed Ni$_2$P and Ni$_5$P$_4$ phases possessing small particle size (~11 nm particles), however, the majority of the particles are still Ni$_2$P phase so its relatively low selectivity towards H$_2$S may be due to the low Ni$_5$P$_4$ content.

Comparing the u-Ni$_5$P$_4$@SiO$_2$ and u-Ni$_5$P$_4$@SiO$_2$-1, both of those samples contained very small Ni$_5$P$_4$ clusters confined in the mesoporous skeleton. u-Ni$_5$P$_4$@SiO$_2$-1 underwent a 4 hours phosphorization process, so it is expected that its phase transfer ratio is higher than the sample of u-Ni$_5$P$_4$@SiO$_2$ which only had 2 hours of phosphorization. Compared to u-Ni$_5$P$_4$@SiO$_2$-1, there is still some Ni$_2$P phase in the u-Ni$_5$P$_4$@SiO$_2$ which leads to the lower selectivity towards H$_2$S. Both of samples have high SO$_2$ conversion, with u-Ni$_5$P$_4$@SiO$_2$ providing an SO$_2$ conversion of 65% at 200° C. and 97% at 320° C. and u-Ni$_5$P$_4$@SiO$_2$-1 providing an SO$_2$ conversion exceeding 95% in the temperature range of about 200 to about 280° C. This is likely due to the size effect because the Ni$_5$P$_4$ or Ni$_2$P clusters with a size of <2 nm provide a very highly dispersed active site for the SO$_2$ conversion. The highest H$_2$S yield for u-Ni$_5$P$_4$@SiO$_2$ was achieved at 300° C. (32% H$_2$S yield), while the highest H$_2$S yield for u-Ni$_5$P$_4$@SiO$_2$-1 was at 240° C. (33% H$_2$S yield).

Based on the above results, we can conclude that the Ni$_x$P$_y$ catalyst performance for the conversion of SO$_2$ to H$_2$S can be influenced by two factors: a) the purity of Ni$_5$P$_4$ phase, and b) the Ni$_5$P$_4$ phase-reactants contact area/interface. The Ni$_5$P$_4$ phase provides high affinity to activate the H$_2$, thus lowering the energy barrier and accelerating the production of H$_2$S, while the high contact area of Ni$_5$P$_4$ with reactants can improve the catalyst's efficiency. Either by decreasing the size of the Ni$_5$P$_4$ crystal (m-Ni$_5$P$_4$, n-Ni$_5$P$_4$@SiO$_2$, u-Ni$_5$P$_4$@SiO$_2$, u-Ni$_5$P$_4$@SiO$_2$-1) and/or by creating voids and porosity in the Ni$_5$P$_4$ clusters (h-Ni$_5$P$_4$, p-Ni$_5$P$_4$), the catalytic density is decreased and surface area per unit weight of catalyst is increased, thereby increasing the contact between the active sites (Ni$_5$P$_4$) of the catalyst and reactants.

Assessment of Reaction Kinetics

Figure 40A:
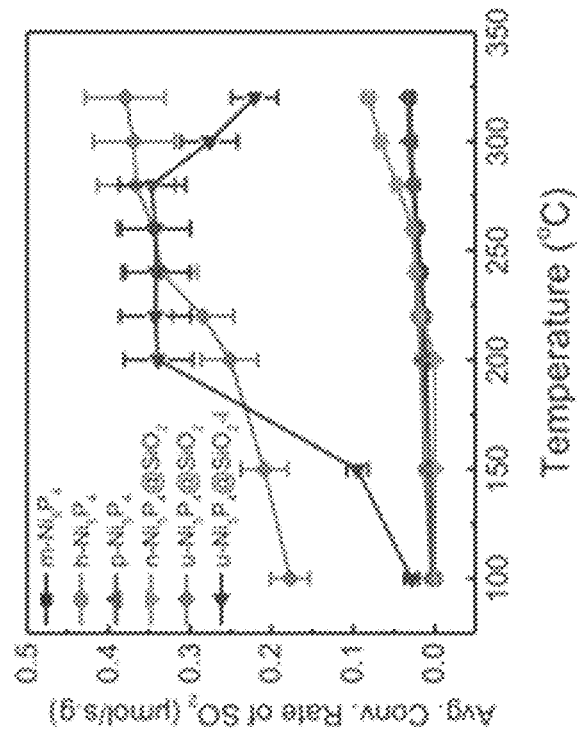
FIGS. 40A-40B illustrate $SO_2$ conversion rates and FIGS. 40C-40D illustrate TOF data, all for some samples of the catalysts of the present invention.
Figure 40B:
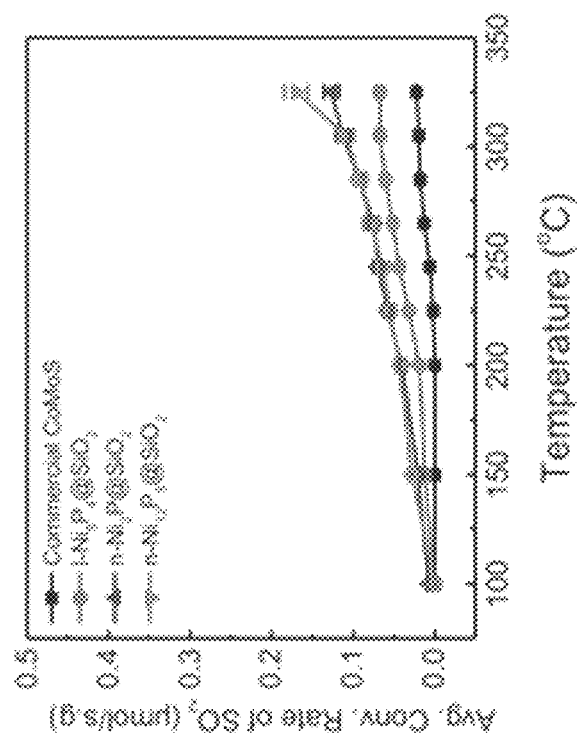
Figure 40D:
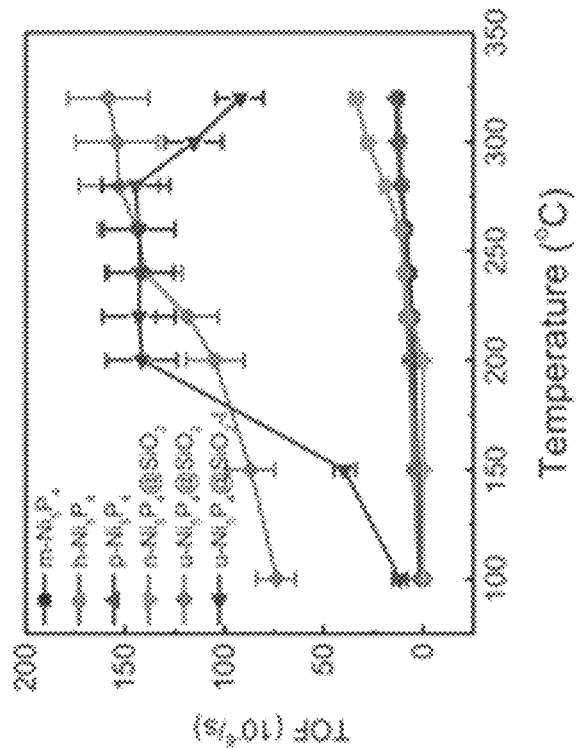
Figure 40C:
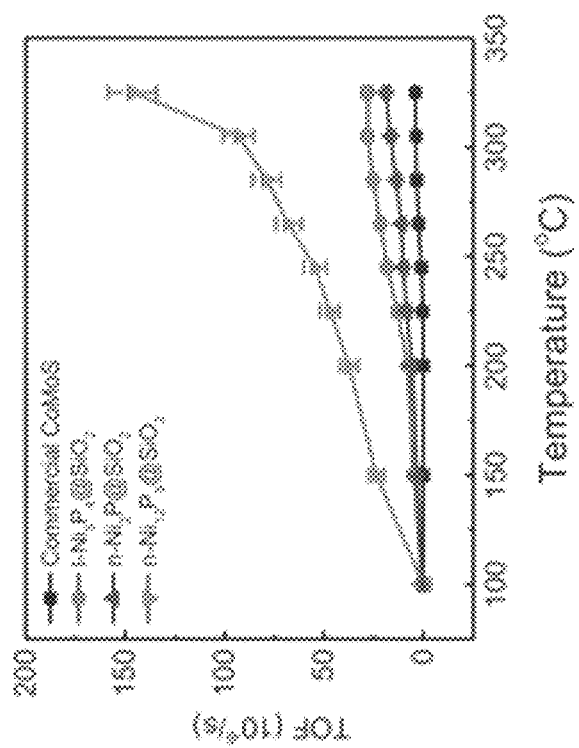

The average SO$_2$ conversion rate (in μmols of SO$_2$ per second per gram of active catalysts (Ni$_x$P$_y$)) was computed based on the Ni$_x$P$_y$ or Ni$_x$P$_y$ loading in SiO$_2$. Hence the results reflect the activity per site. FIGS. 40A and 40B illustrate graphs showing the average SO$_2$ conversion rate per gram of active site, and FIGS. 40C and 40D illustrate graphs showing the TOF of the catalysts. u-Ni$_5$P$_4$@m-SiO$_2$ was the most active catalyst, achieving a SO$_2$ conversion rate of about 0.4 μmol/s·g$_{active}$ and a TOF of 154 (10$^{-6}$/s) over the temperature of 300° C. u-Ni$_5$P$_4$@m-SiO$_2$-1 had a SO$_2$ conversion rate of about 0.35 μmol/s·g$_{active}$ and a TOF around 140 (10$^{-6}$/s) in the temperature range of 200° C. to 280° C. The other catalysts showed SO$_2$ conversion rates that were below 0.2 μmol/s·g$_{active}$ and TOF below 30 (10$^{-6}$/s) over the studied temperature range. Compared to 1-Ni$_5$P$_4$@m-SiO$_2$ and n-Ni$_2$P@m-SiO$_2$, the higher TOF of n-Ni$_{12}$P$_5$@m-SiO$_2$ was due to the high molar weight of Ni$_{12}$P$_5$, meaning each mole of Ni$_{12}$P$_5$ contained more active Ni—P sites. The vast difference in SO$_2$ conversion rate values of Ni$_5$P$_4$ samples is attributed to the high dispersion of Ni$_x$P$_x$ crystals in the mesoporous SiO$_2$, which promoted the reaction rate of SO$_2$ on the activity sites.

Figure 41:
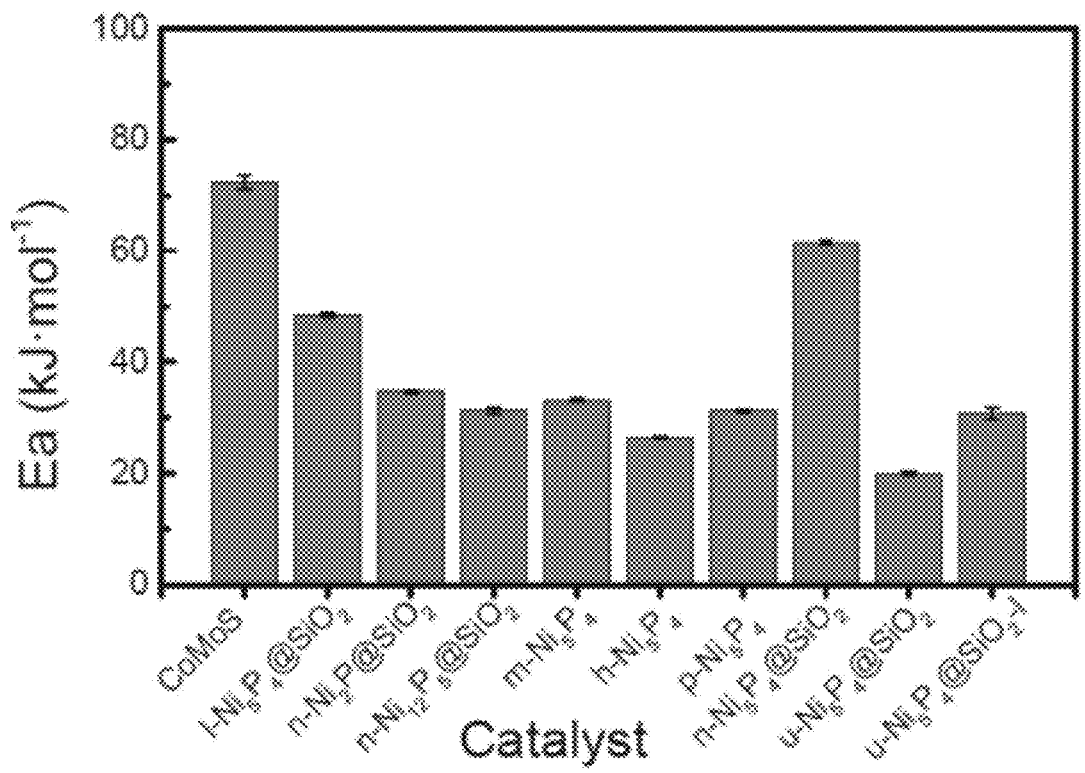
FIG. 41 illustrates a graph showing the activation energy of some catalysts of the present invention.

FIG. 41 illustrates a graph showing the activation energy of the various catalysts, which were computed from ln k vs. 1/T plots. The activation energy is the lowest over the catalyst u-Ni$_5$P$_4$@m-SiO$_2$ (~20 kJ/mol). This not only suggests the high activity of the catalytic sites on this system but also that the energy barrier can be surpassed at a lower temperature. The catalysts m-Ni$_5$P$_4$, h-Ni$_5$P$_4$, and p-Ni$_5$P$_4$ show a rather higher E$_a$ of around 30 kJ/mol compared to the u-Ni$_5$P$_4$@m-SiO$_2$. The apparent activation energy corresponding to SO$_2$ conversion decreases with nanoparticle size while the reaction rate increases.

DFT computations on the mechanism of hydrogen reacting with sulfur dioxide show that the reaction can follow the H radical path for the reduction of SO$_2$ and that the activation energy for the formation of H radical is 586.80 kJ/mol, which is much higher than the subsequent reactions steps. The Ni$_x$P$_y$ phase offers optimal hydrogen binding and shows much higher activity than the sulfurized metal phase and the formation of H radicals on the Ni$_x$P$_y$ phase is efficient enough to facilitate the formation of S. The Ni$_5$P$_4$ phase has even higher efficiency than the Ni$_2$P and N$_{12}$P$_5$ phase, so the S can react with the excess H radical on the Ni$_5$P$_4$ phase to produce H$_2$S.

Catalytic Active Sites

Figure 42:
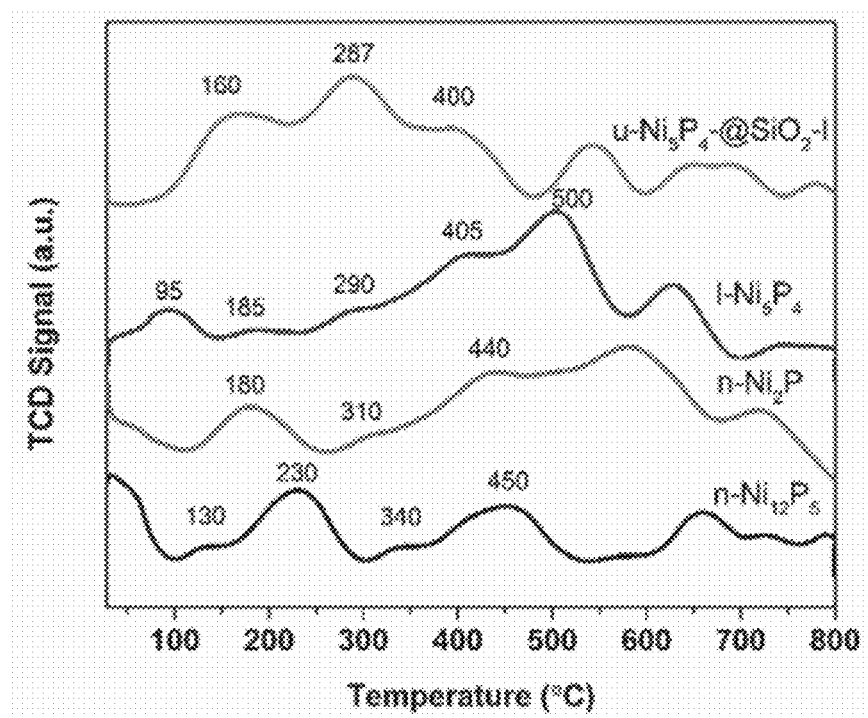
FIG. 42 illustrates $H_2$-TPR profiles for some catalysts of the present invention.

H$_2$-TPR profiles of n-Ni$_{12}$P$_5$, n-Ni$_2$P, 1—Ni$_5$P$_4$, and u-Ni$_5$P$_4$@SiO$_2$-1 are shown in FIG. 42. In the temperature range of 100-500° C., it can be observed that the reduction peaks of the N$_{12}$P$_5$ nanoparticles are centered at 130° C., 230° C., 340° C., and 450° C. For Ni$_2$P nanoparticles the reduction peaks are centered at 180° C., 310° C., and 440° C. For Ni$_5$P$_4$ particles, the reduction peaks centered at 95° C., 185° C., 290° C. and 405° C. The sample with Ni$_5$P$_4$ phase had a reduction profile with peaks at a relative lower temperature as compared to the corresponding reduction peaks of the Ni$_2$P and Ni$_{12}$P$_5$ particles. This result coincides with the ultrafine nature of the Ni$_5$P$_4$ catalyst and the fact that fine-sized catalysts are reduced at lower temperature compared to the coarse-sized catalysts. The ultrafine surface Ni(OH)$_2$ species (according to the XPS studies) are reduced at the lower temperatures (≤200° C.). Ni(OH)$_2$ species residing at inwards layers (away from the surface) or of greater size are reduced at medium temperatures (200-400° C.). The Ni-phosphate species, as shown using XPS, are reduced at the high temperature regime (T>550° C.) due to the P—O—H strong bonds. For the sample u-Ni$_5$P$_4$@SiO$_2$-1, the three strong reduction peaks are centered at 160° C., 287° C., and 400° C., and compared to the sample 1-Ni$_5$P$_4$ the ultrafine Ni$_5$P$_4$ cluster had an even lower hydrogen binding energy meaning it can have a better activity at the low temperature range. After the H$_2$-TPR test, red phosphorus powders were found in the test tube, thus the leaching of phosphorus at high temperature can be a possible cause of Ni$_x$P$_y$ catalysts deactivation.

Figure 43A:
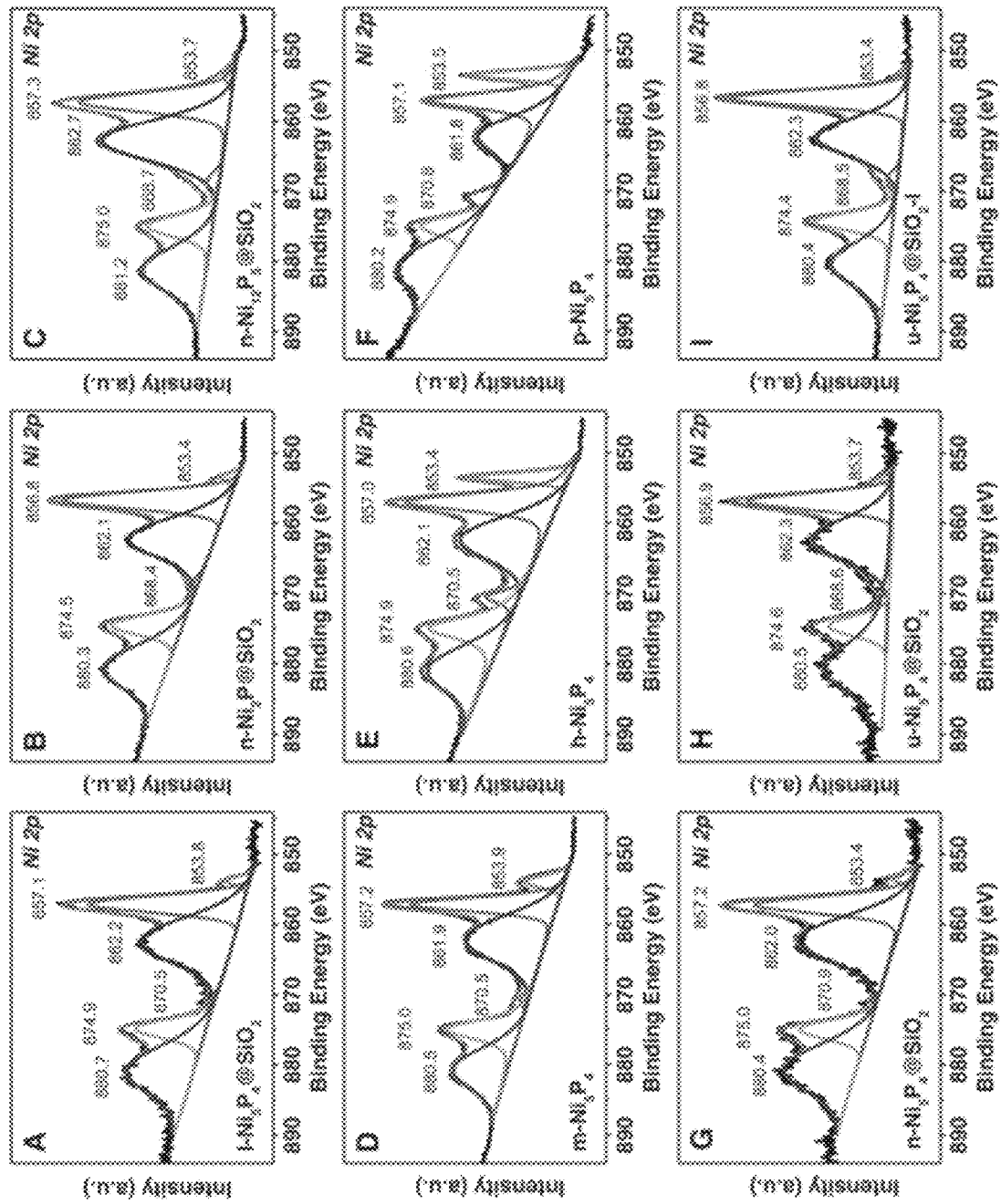
FIGS. 43A and 43B illustrate XPS spectra data for some catalysts of the present invention.
Figure 43B:
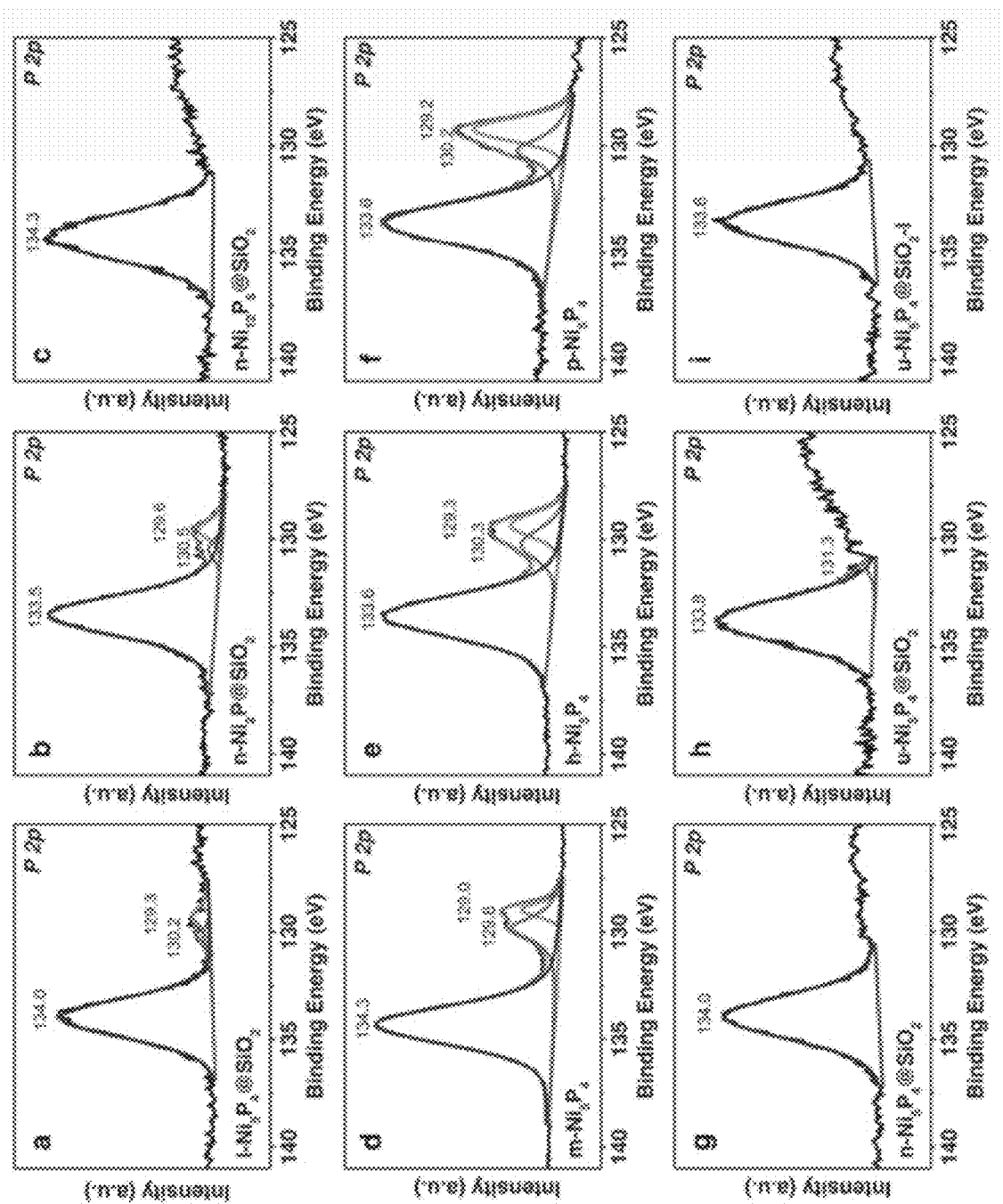

The X-ray photoelectron spectra (XPS) of the catalysts were recorded to identify chemical state information for Ni and P and changes in surface composition and are shown in FIGS. 43A and 43B. FIG. 43A illustrates the high resolution XPS spectra of Ni 2p in panels A, B, C, D, E, F, G, H and I, while the spectra of P 2p are shown in panels a, b, c, d, e, f, g, h, and i of FIG. 43B. For the Ni 2p$_{3/2}$ peak, the peak with the lowest binding energy corresponds to the bulk phosphide catalysts in each case. The binding energy of this peak was found to be generally consistent in the range 853.4-853.8 eV. The low binding energy P 2p peak, also corresponding to the bulk phosphide, occurred within a binding energy range of 129.0-129.6 eV for all catalysts. There does not appear to any substantial or systematic change in the binding energies of these phosphides as a function of composition. The higher binding energy P 2p peak occurs at a binding energy of 133.6-134.3 eV, which corresponds to the oxidized surface of the nickel phosphide catalysts and can be attributed to Ni$_3$(PO)$_4$. The strongest Ni 2p$_{3/2}$ peak for all Ni catalyst samples occurs in a binding energy range of 856.8-857.3 eV. The small binding energy difference between Ni(OH)$_2$ and Ni$_3$(PO)$_4$ makes it difficult to distinguish between these two chemical states. However, considering that the presence of Ni$_3$(PO)$_4$ was established from the P 2p peaks and the Ni 2p$_{3/2}$ binding energies also correspond to Ni(OH)$_2$, which is present on air exposed Ni surfaces, it is reasonable to expect that Ni(OH)$_2$ and Ni$_3$(PO)$_4$ are present on the Ni$_2$P oxidized surface.

With regard to the intensities of the Ni 2p$_{3/2}$ and P 2p peaks for the different nickel phosphide catalysts, the photoelectron intensity from the bulk phosphide is strongest for the m-Ni$_5$P$_4$, h-Ni$_5$P$_4$ and p-Ni$_5$P$_4$ catalysts, the other SiO$_2$ coated catalysts showed very weak peaks. For these latter catalysts, the thin SiO$_2$ layer is attenuating the signal from the underlying nickel phosphide catalyst particulates.

Figure 44:
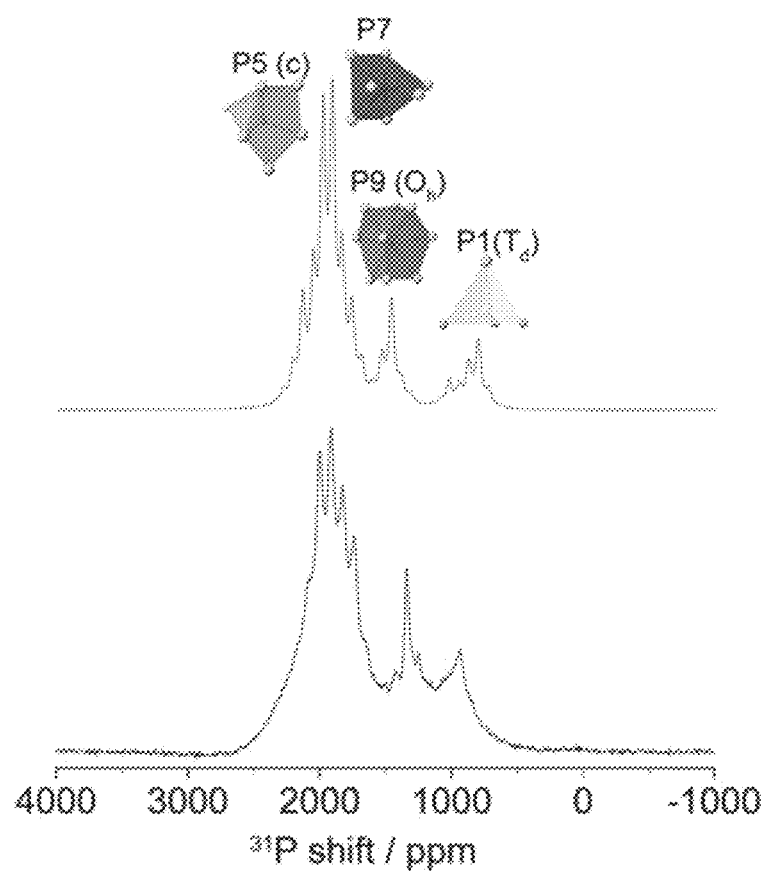
FIG. 44 illustrates $^{31}P$ MAS ssNMR spectrum data for some catalysts of the present invention.

The experimental and calculated $^{31}$P MAS ssNMR spectrum of the 1-Ni$_5$P$_4$ sample is shown in FIG. 44 and in Table 3 below. FIG. 44 illustrates two line graphs, with the bottom graph illustrating the experimental $^{31}$P MAS ssNMR spectrum of the 1-Ni$_5$P$_4$ sample and the top graph illustrating the calculated spectra. The distinct P coordinations in the Ni$_5$P$_4$ crystal structure are also shown in the calculated spectrum.

TABLE 3

DFT calculated and Experimental 31P ssNMR data of the isotropic shift δ$_{iso}$, chemical shift anisotropy CSA and asymmetry parameter η of each site.

| Site | δ$_{iso}$ (calc)/ppm | Δ(calc)/ppm | η | δ$_{iso}$ (exp)/ppm | Δ(calc)/ppm | η |
|---|---|---|---|---|---|---|
| P9 | 1469 | −217.3 | 0.0 | 1168.4 | −488.8 | 0.0 |
| P7 | 1913 | −403.1 | 0.471 | 1842.3 | −450.4 | 0.107 |
| P5 | 1992 | 440.5 | 0.208 | 1984.4 | 550.1 | 0.265 |
| P1 | 881 | 367.2 | 0.0 | 947.8 | 153.6 | 0.0 |

Four NMR shifts could be identified and were analyzed in the SOLA lineshape simulation package, as presented in Table 3. From the crystallography point of view, there are 4 unique P sites which are all distinctively coordinated. Based on the number of Ni atoms coordinated to each site, an all Ni-atom 9-coordinated octahedral site named P$_9$ was identified, as were an all Ni-atom 7-coordinated site P$_7$, a 5 coordinated cuboid site bonded to 4 Ni atoms and one P atom, which is the last unique site named P$_1$ as it is a tetrahedron coordinated to 3 P atoms from the P$_5$ site and 1 Ni atom. To assign the experimental $^{31}$P NMR shifts to the different phosphorus sites, DFT calculations of the NMR Knight shifts were performed with the WIEN2K package, according to formula K=K$_{FC}$+K$_{dip}$+K$_{orb}$. Calculated Knight shifts, anisotropies (A) and asymmetry parameters are presented in Table 3. The simulated theoretical spectrum shows that the shift at 1984.4 ppm corresponds to the P$_5$ site, the shift at 1842.3 ppm to the P$_7$ site, the shift at 1168.4 ppm to the P$_9$ coordination, and the shift at 947.8 to the P$_1$ site. This assignment is important to understand the catalytic activity of Ni$_5$P$_4$, as shifts towards more positive frequencies in nickel phosphides are directly correlated to higher density of states at the Fermi level, indicating enhanced catalytic activity. This was indeed the case with Ni$_5$P$_4$, which showed that P$_7$ and P$_5$ sites (i.e. Ni$_4$P$_3$ and Ni$_3$P$_3$ layers) showing the highest NMR frequency shift, are exposed on the surface of Ni$_5$P$_4$ microcrystals.

Spent Catalyst Characterization

Figure 45:
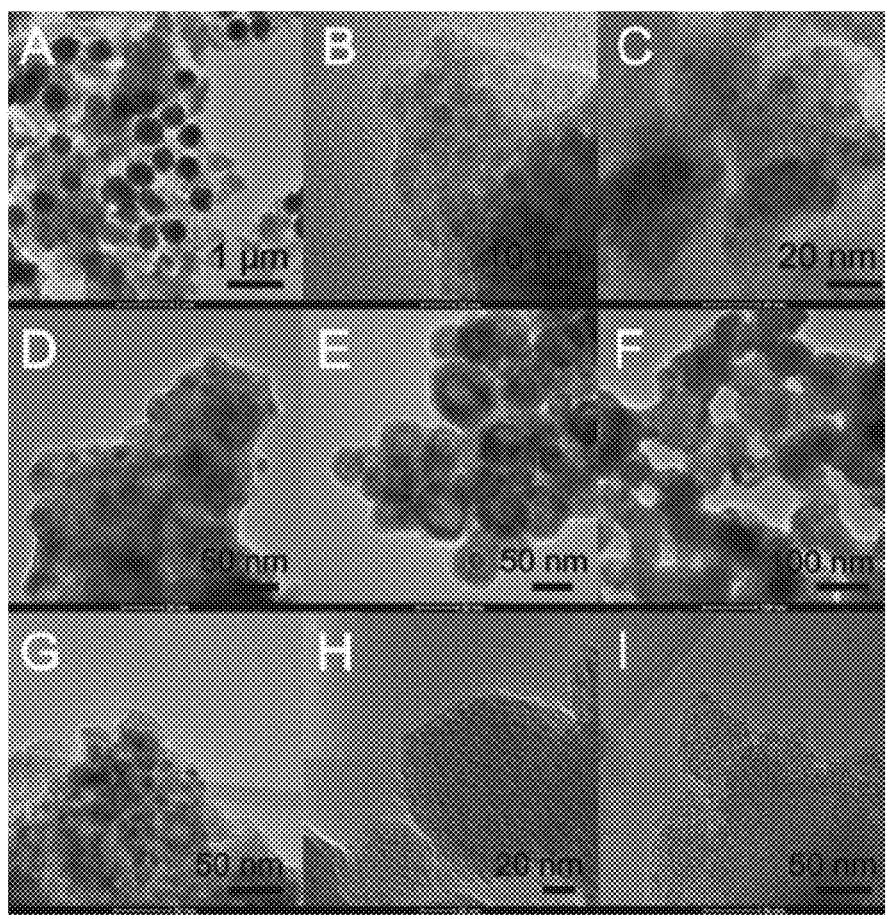
FIG. 45 illustrates TEM images for some catalysts of the present invention.

To assess catalyst structural and morphological changes due to the reaction conditions, spent catalysts of the above samples were characterized using TEM imaging, XRD, EDX and XPS analysis. FIG. 45 shows the post-catalysis performance testing TEM images, with panel A showing the image for 1-$Ni_5P_4$@$SiO_2$ (>500 nm large $Ni_5P_4$ particles with mesoporous $SiO_2$ coating), panel B showing the image for n-$Ni_2P$@$SiO_2$ (~11 nm $Ni_2P$ particles with mesoporous $SiO_2$ coating), panel C showing the image for n-$Ni12P_5$@$SiO_2$ (~12 nm $Ni12P_5$ particles with mesoporous $SiO_2$ coating), panel D showing the image for m-$Ni_5P_4$ (~20 to ~50 nm medium size particles), panel E showing the image for h-$Ni_5P_4$ (~50 nm hollow particles), panel F showing the image for p-$Ni_5P_4$ (~50 to ~100 nm porous network), panel G showing the image for n-$Ni_5P_4$@$SiO_2$ (~11 nm $Ni_5P_4$ coated with $SiO_2$), panel H showing the image for u-$Ni_5P_4$@$SiO_2$ (about <2 nm ultra-fine $Ni_5P_4$ clusters confined with mesoporous $SiO_2$), and panel I showing the image for u-$Ni_5P_4$@$SiO_2$-1 (about <2 nm ultra-fine $Ni_5P_4$ clusters confined with mesoporous $SiO_2$, long heating time).

The images for the particles coating with $SiO_2$ (panels A, B, C and G) show that the particle size and shape did not change. In the m-$Ni_5P_4$ sample (panel D), the nanoparticles retained their size and morphology as well (the particles were stuck on the quartz during the sample preparation before the test). Furthermore, the size and morphology changes were absent for the h-$Ni_5P_4$ (panel E) and p-$Ni_5P_4$ (panel F), their hollowed morphology and the porous network structure were observed as clear as the fresh catalysts. In panels H and I, the mesoporous $SiO_2$ structures of u-$Ni_5P_4$@m-$SiO_2$ and u-$Ni_5P_4$@m-$SiO_2$-1 remained intact. Moreover, the active phase ultra-fine $Ni_5P_4$ crystals retained their size and shape, with no aggregation of $Ni_5P_4$ crystals observed. The EDX results (shown in Table 1) of the samples after the reaction show that the Ni/P ratio remained intact.

Figure 46:
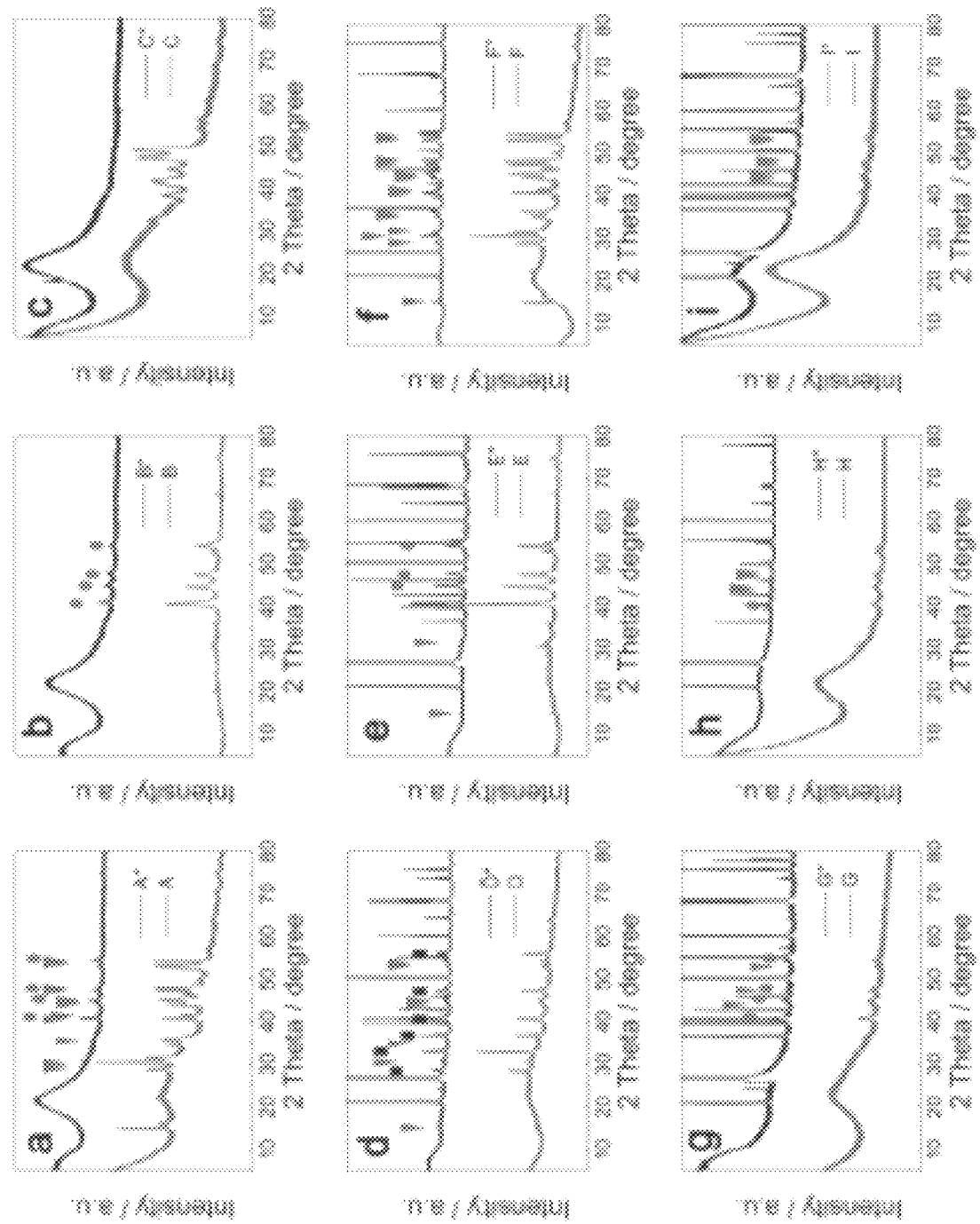
FIG. 46 illustrates XRD patterns for some catalysts of the present invention.

FIG. 46 provides the XRD patterns of the "used" or post-performance testing samples as well as their respective "fresh" or unused sample patterns. FIG. 46 includes 9 panels, each designated by a lower-case letter a through i. Each panel includes two trend lines, with the upper trend line in each panel designated with an upper-case letter A through I with an asterisk (i.e., A*/B*/C*/D*/E*/F*/G*/H*/I*) corresponding to the XRD pattern for the post-performance test catalyst mixed with quartz. The lower trend line in each panel is designated with an upper-case letter A through I without an asterisk (i.e., A/B/C/D/E/F/G/H/I) and corresponds to the "fresh" untested catalyst without mixing of quartz. Starting with the panel in the left column and first row, panel a illustrates the XRD patterns for 1-$Ni_5P_4$ and 1-$Ni_5P_4$@$SiO_2$ (>500 nm large $Ni_5P_4$ particles before (A) and after (A*) mesoporous $SiO_2$ coating). Panel b (center column, first row) illustrates the XRD patterns of n-$Ni_2P$ and n-$Ni_2P$@$SiO_2$ (A11 nm $Ni_2P$ particles before (B) and after (B*) mesoporous $SiO_2$ coating). Panel c (right column, first row) illustrates the XRD patterns of n-$Ni_{12}P_5$ and n-$Ni_{12}P_5$@$SiO_2$ (~12 nm $Ni_{12}P_5$ particles before (C) and after (C*) mesoporous $SiO_2$ coating). Panel d (left column, second row) illustrates the XRD patterns of m-$Ni_5P_4$ (~20 to ~50 nm medium size particles). Panel e (center column, second row) illustrates the XRD patterns of h-$Ni_5P_4$ (~50 nm hollow particles). Panel f (right column, second row) illustrates the XRD patterns of p-$Ni_5P_4$ (~50 to ~100 nm porous network). Panel g (left column, third row) illustrates the XRD patterns of n-$Ni_5P_4$@$SiO_2$ (~11 nm $Ni_5P_4$ coated with $SiO_2$). Panel h (center column, third row) illustrates the XRD patterns of u-$Ni_5P_4$@$SiO_2$ (<~2 nm ultra-fine $Ni_5P_4$ clusters confined with mesoporous $SiO_2$). Panel i (right column, third row) illustrates the XRD patterns of u-$Ni_5P_4$@$SiO_2$-1 (<~-2 nm ultra-fine $Ni_5P_4$ clusters confined with mesoporous $SiO_2$, long heating time).

Comparing the XRD patterns of the post-performance testing samples to their respective "fresh" sample patterns, the XRD patterns of the used samples maintained the crystallinity except for a strong peak of quartz which was mixed with the catalysts during the performance test, suggesting the absence of any structural changes experienced by the catalysts. For the XPS of used 1-$Ni_5P_4$@$SiO_2$ and the used u-$Ni_5P_4$@$SiO_2$-1, no meaningful differences were observed from the spectra of the used samples compared to the spectra of the corresponding fresh samples. The $Ni_xP_y$ catalysts have their active temperature zones below 320° C. There are several possible factors that may contribute to the catalyst activity deterioration at high temperature (>350° C.): (a) the sintering of active sites at high temperature; (b) possible reaction between P and $SiO_2$; (c) the coverage of surface active sites with synthesis organic remnants (e.g. OA, TOP, or CTAB); (d) the leaching of P atoms and the subsequent stoichiometry change; (e) structural changes induced by the temperature leading to exposing a less favorable facet for reaction. For the ultrafine $Ni_5P_4$ samples, the active $Ni_5P_4$ crystal sites are even smaller and incorporated into $SiO_2$ with high weight ratio (Table 1), so it is even more sensitive to the above-described parasitic conditions leading to deactivation at temperatures above 260° C. As previously mentioned, red phosphorus powders formed after the $H_2$-TPR test may be indicative of phosphorus leaching at high temperatures and may be the main reason for $Ni_xP_y$ catalysts deactivation at T>350° C.

Conclusions

Highly active $Ni_5P_4$@$SiO_2$ catalysts were synthesized for the selective hydrogenation of $SO_2$ to $H_2S$. The liquid synthesis of $Ni_5P_4$ in $N_2$ with OA and TOP or TOPO was modified to control $Ni_5P_4$ phase and morphology. Compared to the $Ni_{12}P_5$ and $Ni_2P$ phases, the active sites to convert $SO_2$ to $H_2S$ effectively originate from the $Ni_5P_4$ phase at T>150° C. in the presence of $H_2$. Pure phase $Ni_5P_4$ clusters with a diameter of ~500 nm and a $SiO_2$ coating shows the highest activity (95% $H_2S$ yield at 325° C.) among all tested catalysts. Mesoporous $SiO_2$ confined $Ni_5P_4$ cluster (<2 nm) shows an improved low-temperature performance (33% $H_2S$ yield at 240° C.), which require lower active site loading and less energy cost. STEM-HAADF studies over the u-$Ni_5P_4$@$SiO_2$ system proved the presence of Ni-entities of less than 2 nm size even under conditions of prolonged phosphorization (2-4 hrs at 350° C.).

With regards to morphology control, $Ni_5P_4$ of 20-50 nm nanoparticles, ~50 nm hollowed nanoparticles, 50~100 nm macroporous network structures, and 11 nm $Ni_5P_4$ were successfully prepared and showed promising activity for the selective hydrogenation of $SO_2$ to $H_2S$ (>60% $H_2S$ yield at 320° C.).

XPS studies designated the presence of some Ni oxidation species such as $Ni(OH)_2$ and $Ni_3(PO)_4$. Solid state NMR studies showed that $Ni_5P_4$ microcrystals contain P-sites ($P_7$ and $P_5$ sites in $Ni_4P_3$ and $Ni_3P_3$ layers), with the highest NMR frequency shift, the latter coinciding with high Fermi level electron density leading to high intrinsic activity. Studies over the spent catalysts confirmed the preservation of the crystallinity, the morphology, and the Ni/P ratio for all of the investigated catalysts after the $SO_2$ hydrogenation reactions were run under the specific conditions. This suggests the stability of these systems under the aforementioned reaction conditions.

Table 4 below provides a summary of the experimental parameters applied in the catalytic performance evaluation of various known catalysts for the reduction of $SO_2$ with $H_2$, including two of the inventive catalysts (1-$Ni_5P_4$@$SiO_2$ and u-$Ni_5P_4$@ $SiO_2$-1) and various known catalysts. Table 5 below provides a summary of the catalytic performance of those same catalysts for the reduction of $SO_2$ with $H_2$ expressed as $SO_2$ conversion, sulfur selectivity, $H_2S$ Selectivity, and TOF.

TABLE 4 summary of experimental parameters of inventive catalysts and known catalysts

| Catalyst | Synthesis Method | Space Velocity | $SO_2/H_2$ (mol/mol) | $SO_2$ (ppm) | $SO_2$ Flow Rate (mL/min) | Mass of Catalyst (g) | Active Component (wt %) |
|---|---|---|---|---|---|---|---|
| Co—Mo/$Al_2O_3$ | Commercially & presulfided | WHSV = 3000 mL/g/h | 1/3 | $10^6$ | 2.5 | 2 | 11 |
| Fe/γ-$Al_2O_3$ | Impregnation & presulfided | GHSV = 3600/h | 1/2 | $10^6$ | 3 | 2 | 10 |
| Co/γ-$Al_2O_3$ | Impregnation & presulfided | GHSV = 3600/h | 1/2 | $10^6$ | 3 | 2 | 10 |
| Ni/r-$Al_2O_3$ | Impregnation & presulfided | GHSV = 3600/h | 1/2 | $10^6$ | 3 | 2 | 10 |
| Ru@$TiO_2$ | Impregnation & presulfided | WHSV = 9000 mL/g/h | 1/2 | $10^6$ | 20 | 0.4 | 1.5 |
| NiO/r-$Al_2O_3$ | Impregnation & presulfided | WHSV = 5040 mL/g/h | 1/2 | 12000 | 14 | 0.5 | 16 |
| $SnO_2$—$ZrO_2$ | Precipitate | GHSV = 10000/h | 1/2 | 20000 | 55 | 0.5 | 100 |
| Fe/γ-$Al_2O_3$ | Slurry method & presulfided | WHSV = 36000 mL/g/h | 4/96 | $10^6$ | 4.8 | 0.2 | 2 |
| Fe—Si—Cr | Co-precipitation & presulfided | WHSV = 36000 mL/g/h | 4/96 | $10^6$ | 4.8 | 0.2 | Fe/Si/Cr = 1/0.6/0.01 |
| l-$Ni_5P_4$@$SiO_2$ | Phosphorization & Coating | GHSV = ~50000/h WHSV = 60000 mL/g/h | 1/200 | 103 | 20 | 0.04 | 50 |
| u-$Ni_5P_4$@$SiO_2$-1 | One-pot & Phosphorization | GHSV = ~50000/h WHSV = 60000 mL/g/h | 1/200 | 103 | 20 | 0.04 | 10 |

TABLE 5 summary of catalytic performance of inventive catalysts and known catalysts

| Catalyst | T (° C.) | $SO_2$ Conv. (%) | Sulfur Select. (%) | $H_2S$ Select (%) | Sulfur Yield (%) | H2S Yield (%) | TOF ($10^{-6}$/s) |
|---|---|---|---|---|---|---|---|
| Co—Mo/$Al_2O_3$ | 300 | 84.2 | 95.4 | 4.6 | 80.3 | 3.9 | 573 |
| Fe/γ-$Al_2O_3$ | 300 | 44.9 | 95.2 | 4.8 | 42.7 | 2.2 | 256 |
| Co/γ-$Al_2O_3$ | 300 | 66.7 | 93.7 | 6.3 | 62.5 | 4.2 | 402 |
| Ni/r-$Al_2O_3$ | 300 | 63.9 | 91.9 | 8.1 | 58.7 | 5.2 | 353 |
| Ru@$TiO_2$ | 300 | 90.2 | 100 | 0 | 90.2 | 0 | 206988 |
| NiO/r-$Al_2O_3$ | 320 | 98 | 69 | 31 | 67.6 | 30.4 | 82 |
| $SnO_2$—$ZrO_2$ | 550 | 98 | 55 | 45 | 53.9 | 44.1 | 208 |
| Fe/γ-$Al_2O_3$ | 240 | 100 | 0 | 100 | 0 | 100 | 45682 |
| Fe—Si—Cr | 190 | 100 | 0 | 100 | 0 | 100 | 91364 |
| l-$Ni_5P_4$@$SiO_2$ | 325 | 96 | 1 | 99 | 1 | 95 | 28 |
| u-$Ni_5P_4$@$SiO_2$-1 | 240 | 97 | 66 | 34 | 64 | 33 | 143 |

The methodology described herein as well as the findings are foreseen to impact a wide range of catalytic and electrocatalytic applications, such as the hydrodesulfinization (HDS), hydrodenitrification (HDN), hydrogen evolution reactions (HER) where the $N_{15}P_4$ phase has a pivotal role as a non-noble active catalyst.

Example 3

Additional Characterization and Testing of $Ni_xP_y$ Nanoparticles

Several different Ni—P nanoparticles were produced, characterized, and tested. The methodology for producing, characterizing, and testing each sample is described below in respective subsections. Unless otherwise indicated, the sample production methodology described below utilizes the same ammonia, Ni(acac)$_2$, OA, TEOS, TOP, and TOPO reagents as described above in Examples 1 and 2. Following the respective subsections are Tables 6-8, which summarize the finding from the characterization and testing of the samples.

Sample 1

Under a $N_2$ atmosphere, 2 mmol of nickel precursor Ni(acac)$_2$ was dissolved in 10 mL of OA and 5 mL of TOP. The reaction mixture was subjected to magnetic stirring for 10 min at 80° C., followed by heating to 230° C. for 1 hour. Another 5 mL of TOP was injected into the mixture and stirred at 350° C. for another 2 hours. After cooling to room temperature, the black particles were precipitated by the addition of ethanol and subsequently centrifuged for 10 min at 4,500 rpm. The supernatant was discarded, thereby separating the nanoparticles from the solution. To remove any excess surfactants, the nanoparticles were then washed three times by dispersion in hexane followed by precipitation with ethanol and isolation by centrifugation. Finally, the resulting nanoparticles were dried at room temperature.

Figure 4A:
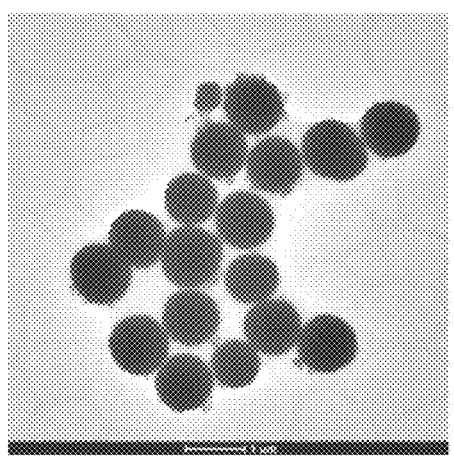
FIGS. 4A-4C illustrate (a) a TEM image of the nanoparticle material designated as Sample 1, (b) an XRD pattern of that nanoparticle material, and (c) a graph of $H_2S$ yield, conversion, and selectivity curves as a function of temperature for that nanoparticle material, according to one or more embodiments of the invention.
Figure 4B:
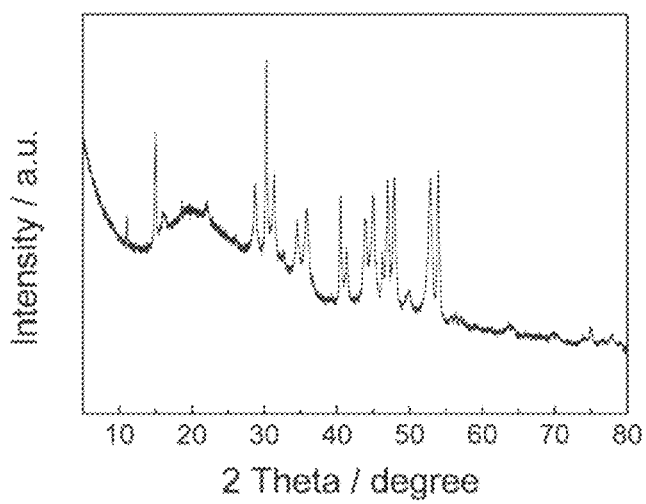
Figure 4C:
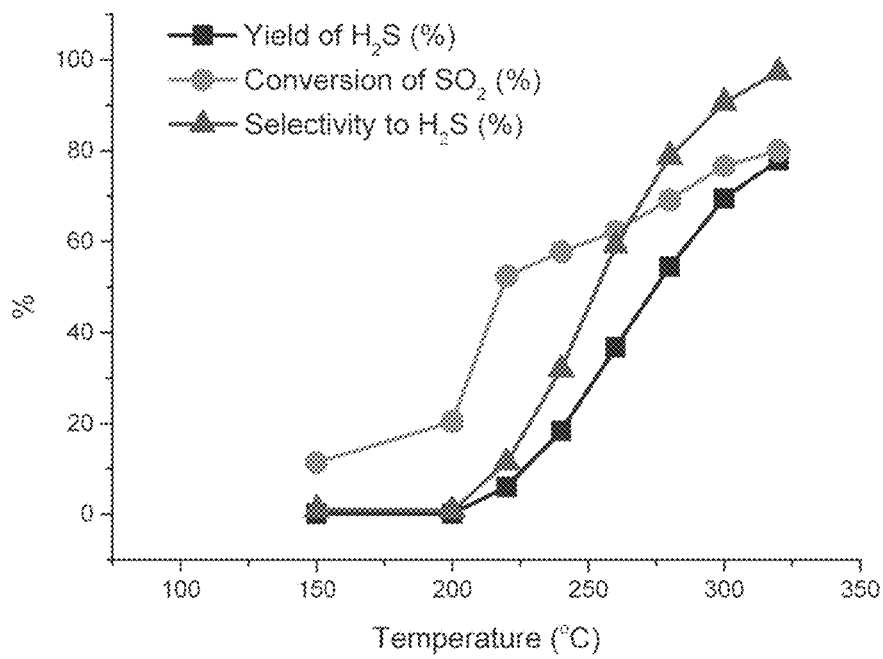

The particles were examined under TEM and subjected to XRD. The $SO_2$ conversion, $H_2S$ yield, and $H_2S$ selectivity of the nanoparticles was also tested at various temperatures. A TEM image of the particles is shown in FIG. 4A, the XRD pattern is shown in FIG. 4B, and the conversion, yield, and selectivity testing results are shown in graph form in FIG. 4C.

Sample 2

Under a $N_2$ atmosphere, 2 mmol of nickel precursor $Ni(acac)_2$ was dissolved in 10 mL of OA. The reaction mixture was subjected to magnetic stirring for 10 min at 80° C., followed by heating to 230° C. for 1 hour. Another 5 mL of TOP was then injected into the mixture and the mixture was stirred at 350° C. for another 2 hours. After cooling to room temperature, the black particles were precipitated by the addition of ethanol and subsequently centrifuged for 10 min at 4,500 rpm. The supernatant was discarded, thereby separating the nanoparticles from the solution. To remove any excess surfactants, the nanoparticles were then washed three times by dispersion in hexane followed by precipitation with ethanol and isolation by centrifugation. Finally, the resulting nanoparticles were dried at room temperature.

Figure 5A:
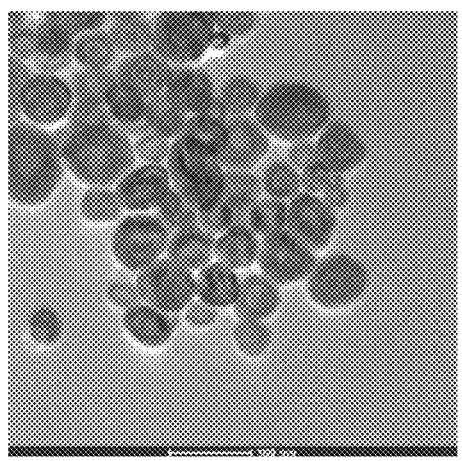
FIGS. 5A-5C illustrate (a) a TEM image of the nanoparticle material designated as Sample 2, (b) an XRD pattern of that nanoparticle material, and (c) a graph of $H_2S$ yield, conversion, and selectivity curves as a function of temperature for that nanoparticle material, according to one or more embodiments of the invention.
Figure 5B:
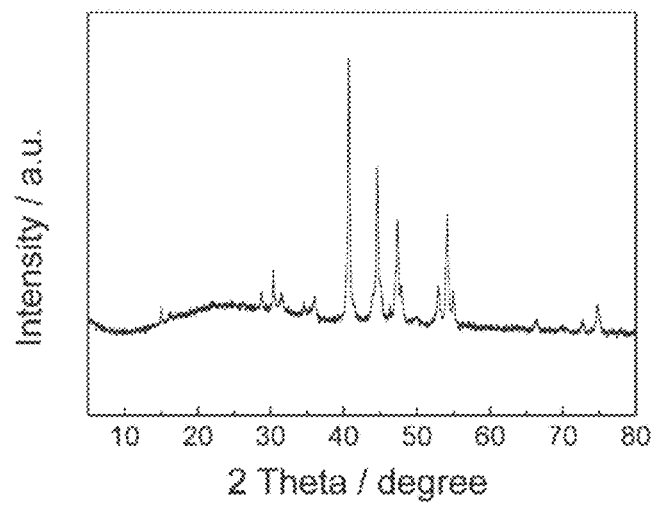
Figure 5C:
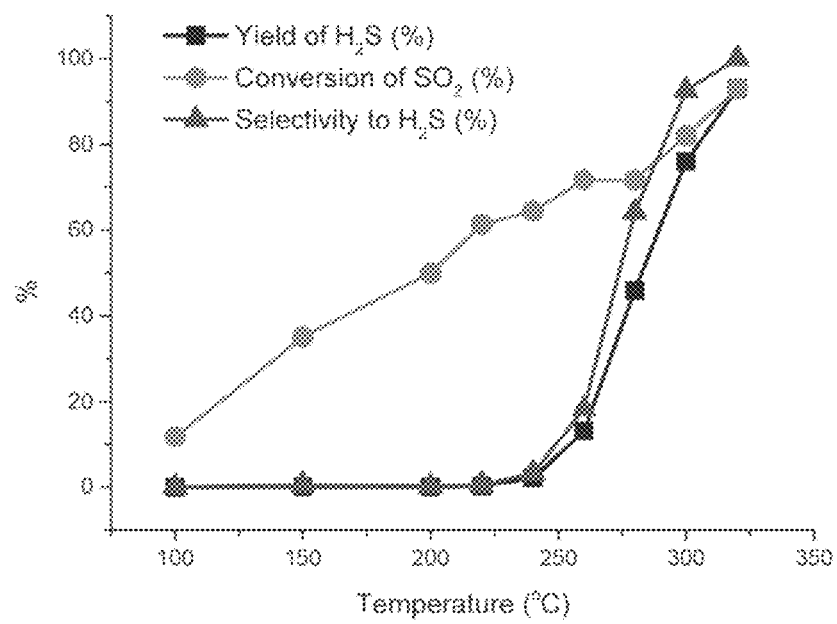

The particles were examined under TEM and subjected to XRD. The $SO_2$ conversion, $H_2S$ yield, and $H_2S$ selectivity of the nanoparticles was also tested at various temperatures. A TEM image of the particles is shown in FIG. 5A, the XRD pattern is shown in FIG. 5B, and the conversion, yield, and selectivity testing results are shown in graph form in FIG. 5C.

Sample 3

Under a $N_2$ atmosphere, 2 mmol of nickel precursor $Ni(acac)_2$ was dissolved in 10 mL of OA and 5 mL of TOP. The reaction mixture was subjected to magnetic stirring for 10 min at 80° C., and then stirred for another 2 hours at a temperature of 350° C. After cooling to room temperature, the black particles were precipitated by the addition of ethanol and subsequently centrifuged for 10 min at 4,500 rpm. The supernatant was discarded, thereby separating the nanoparticles from the solution. To remove any excess surfactants, the nanoparticles were then washed three times by dispersion in hexane followed by precipitation with ethanol and isolation by centrifugation. Finally, the resulting nanoparticles were dried at room temperature.

Figure 6A:
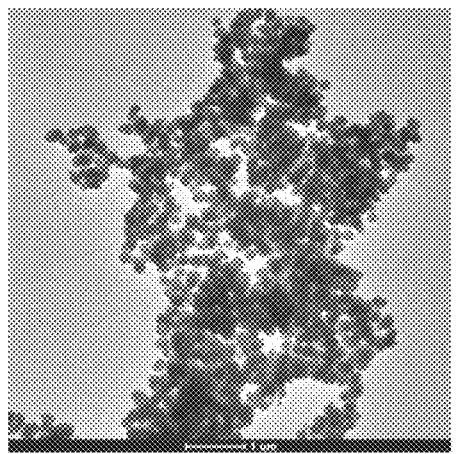
FIGS. 6A-6C illustrate (a) a TEM image of the nanoparticle material designated as Sample 3, (b) an XRD pattern of that nanoparticle material, and (c) a graph of $H_2S$ yield, conversion, and selectivity curves as a function of temperature for that nanoparticle material, according to one or more embodiments of the invention.
Figure 6B:
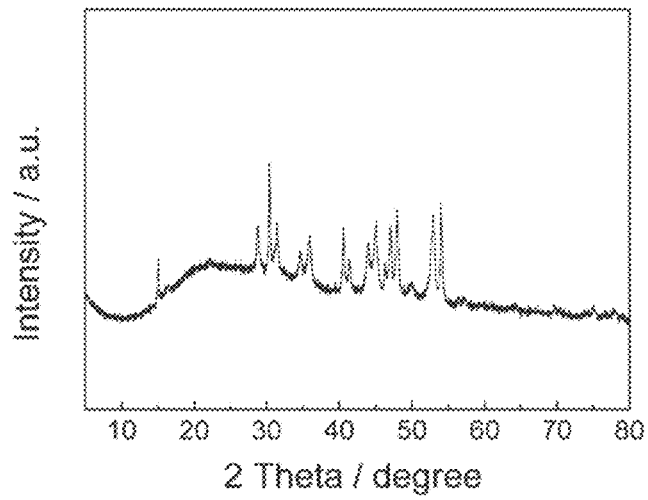
Figure 6C:
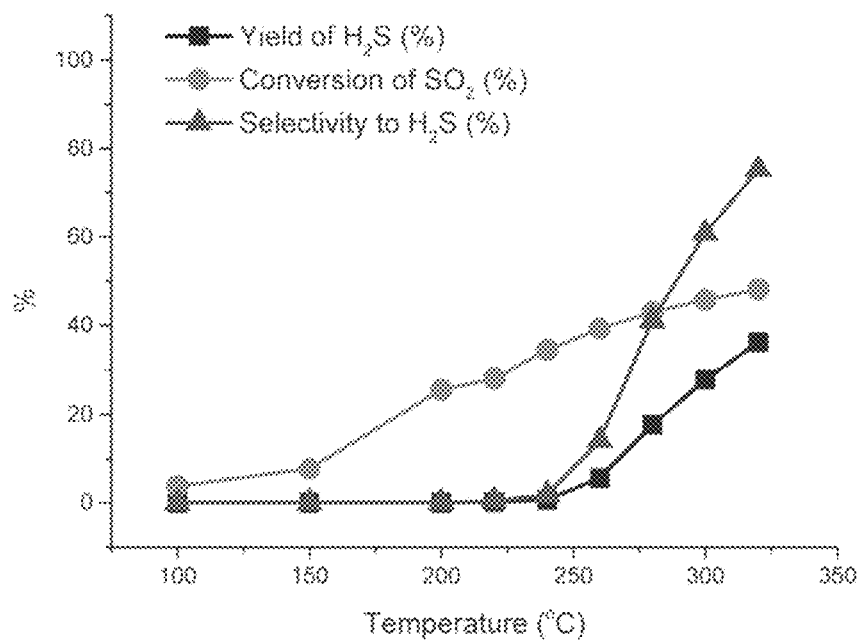

The particles were examined under TEM and subjected to XRD. The $SO_2$ conversion, $H_2S$ yield, and $H_2S$ selectivity of the nanoparticles was also tested at various temperatures. A TEM image of the particles is shown in FIG. 6A, the XRD pattern is shown in FIG. 6B, and the conversion, yield, and selectivity testing results are shown in graph form in FIG. 6C.

Sample 4

Under a $N_2$ atmosphere, 2 mmol of nickel precursor $Ni(acac)_2$ was dissolved in 10 mL of OA and 5 mL of TOP. The reaction mixture was subjected to magnetic stirring for 10 min at 80° C., and then heated to a temperature of 230° C. for 1 hour. Five grams of TOPO was added to the mixture and stirred for another 2 hours at a temperature of 350° C. After cooling to room temperature, the black particles were precipitated by the addition of ethanol and subsequently centrifuged for 10 min at 4,500 rpm. The supernatant was discarded, thereby separating the nanoparticles from the solution. To remove any excess surfactants, the nanoparticles were then washed three times by dispersion in hexane followed by precipitation with ethanol and isolation by centrifugation. Finally, the resulting nanoparticles were dried at room temperature.

Figure 7A:
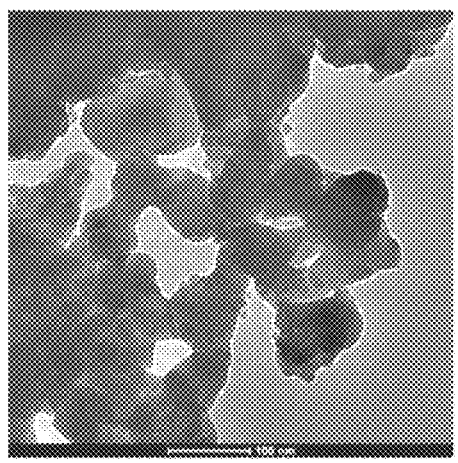
FIGS. 7A-7C illustrate (a) a TEM image of the nanoparticle material designated as Sample 4, (b) an XRD pattern of that nanoparticle material, and (c) a graph of $H_2S$ yield, conversion, and selectivity curves as a function of temperature for that nanoparticle material, according to one or more embodiments of the invention.
Figure 7B:
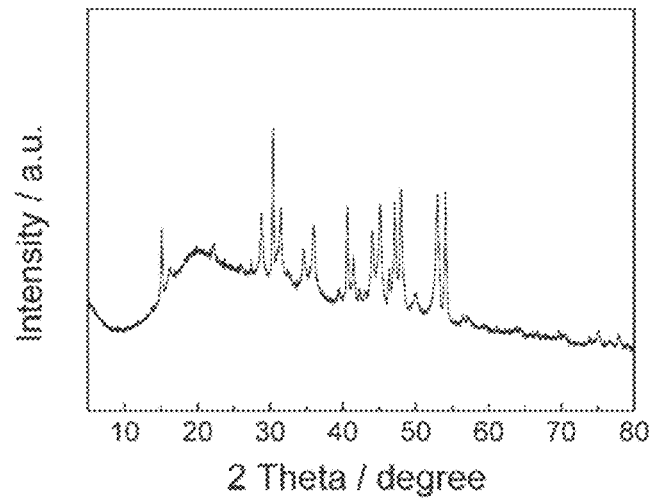
Figure 7C:
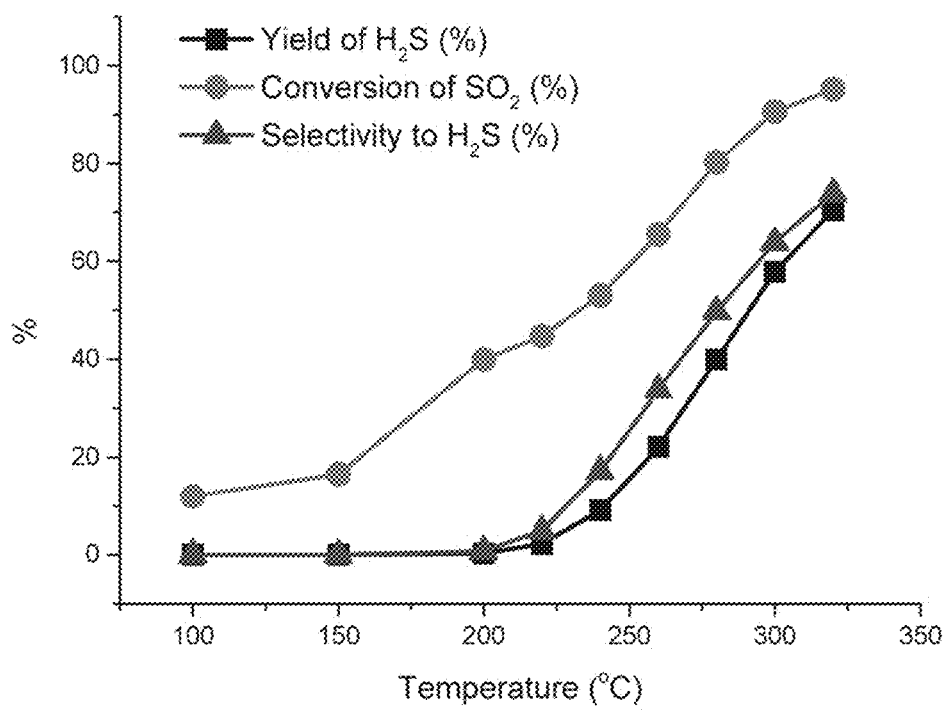

The particles were examined under TEM and subjected to XRD. The $SO_2$ conversion, $H_2S$ yield, and $H_2S$ selectivity of the nanoparticles was also tested at various temperatures. A TEM image of the particles is shown in FIG. 7A, the XRD pattern is shown in FIG. 7B, and the conversion, yield, and selectivity testing results are shown in graph form in FIG. 7C.

Sample 5

Under a $N_2$ atmosphere, 2 mmol of nickel precursor $Ni(acac)_2$ was dissolved in 10 mL of OA and 5 mL of TOP. The reaction mixture was subjected to magnetic stirring for 10 min at 80° C., and then heated to a temperature of 230° C. for 1 hour. Five grams of TOPO was added to the mixture and stirred for another 2 hours at a temperature of 380° C. After cooling to room temperature, the black particles were precipitated by the addition of ethanol and subsequently centrifuged for 10 min at 4,500 rpm. The supernatant was discarded, thereby separating the nanoparticles from the solution. To remove any excess surfactants, the nanoparticles were then washed three times by dispersion in hexane followed by precipitation with ethanol and isolation by centrifugation. Finally, the resulting nanoparticles were dried at room temperature.

Figure 8A:
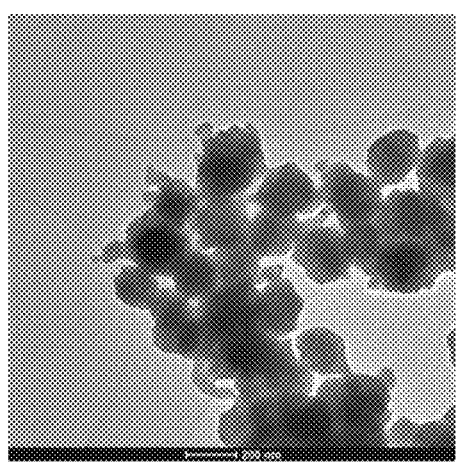
FIGS. 8A-8C illustrate (a) a TEM image of the nanoparticle material designated as Sample 5, (b) an XRD pattern of that nanoparticle material, and (c) a graph of $H_2S$ yield, conversion, and selectivity curves as a function of temperature for that nanoparticle material, according to one or more embodiments of the invention.
Figure 8B:
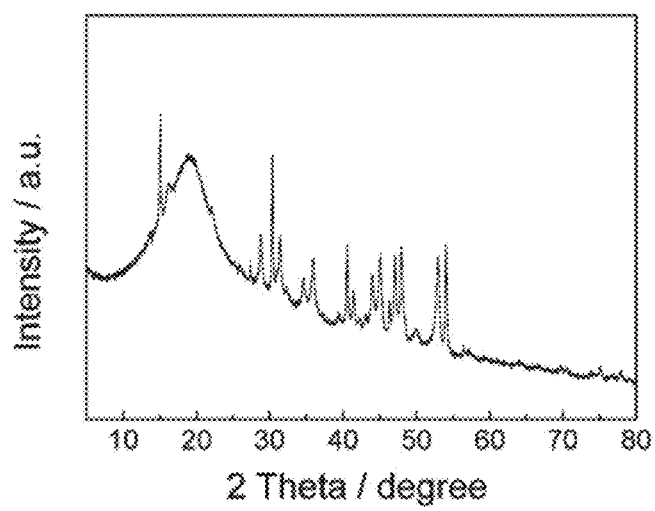
Figure 8C:
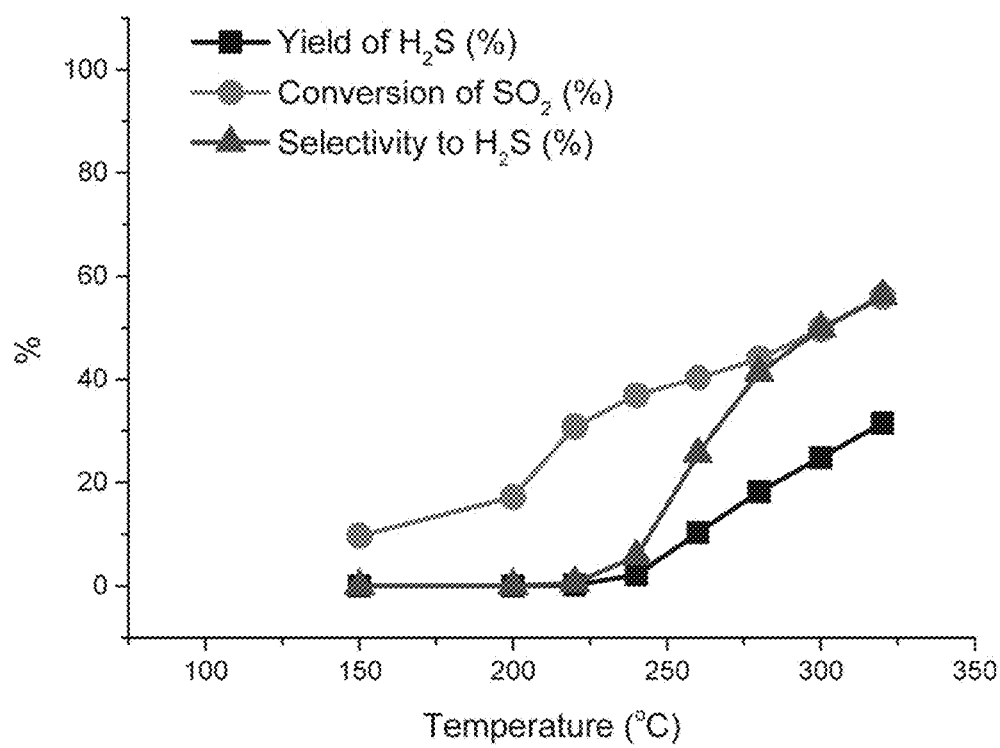

The particles were examined under TEM and subjected to XRD. The $SO_2$ conversion, $H_2S$ yield, and $H_2S$ selectivity of the nanoparticles was also tested at various temperatures. A TEM image of the particles is shown in FIG. 8A, the XRD pattern is shown in FIG. 8B, and the conversion, yield, and selectivity testing results are shown in graph form in FIG. 8C.

Sample 6

Under a $N_2$ atmosphere, 1 mmol of nickel precursor $Ni(acac)_2$ was dissolved in 5 mL of TOP. The reaction mixture was subjected to magnetic stirring for 10 min at 80° C., and then heated to a temperature of 230° C. for 1 hour. Five grams of TOPO was added to the mixture and stirred for another 2 hours at a temperature of 350° C. After cooling to room temperature, the black particles were precipitated by the addition of ethanol and subsequently centrifuged for 10 min at 4,500 rpm. The supernatant was discarded, thereby separating the nanoparticles from the solution. To remove any excess surfactants, the nanoparticles were then washed three times by dispersion in hexane followed by precipitation with ethanol and isolation by centrifugation. Finally, the resulting nanoparticles were dried at room temperature.

Figure 9A:
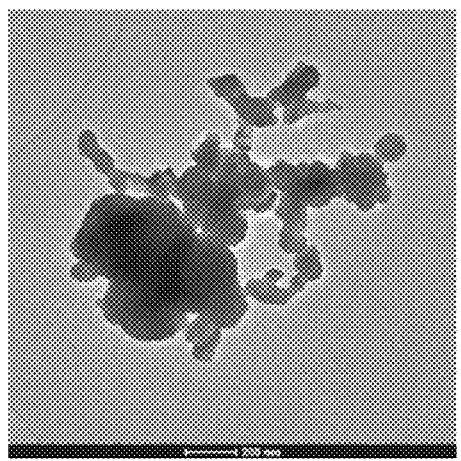
FIGS. 9A-9C illustrate (a) a TEM image of the nanoparticle material designated as Sample 6, (b) an XRD pattern of that nanoparticle material, and (c) a graph of $H_2S$ yield, conversion, and selectivity curves as a function of temperature for that nanoparticle material, according to one or more embodiments of the invention.
Figure 9B:
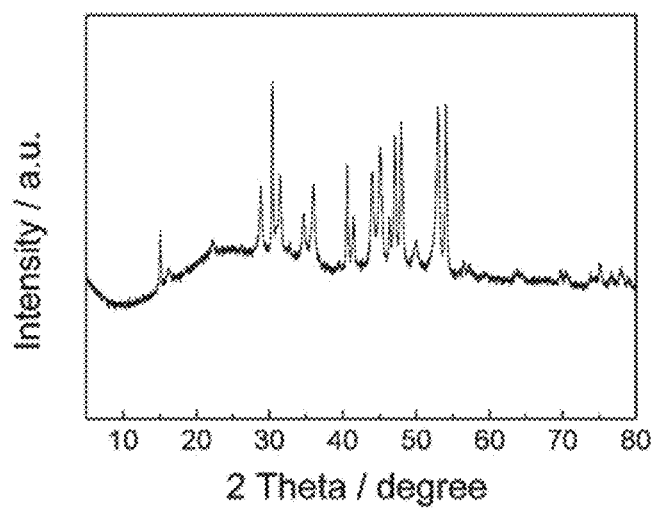
Figure 9C:
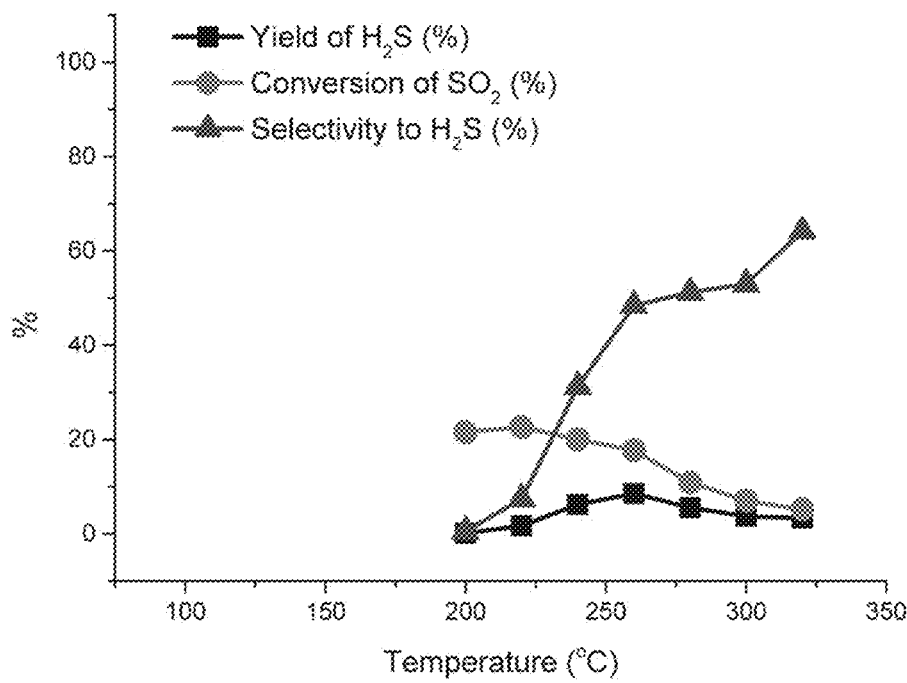

The particles were examined under TEM and subjected to XRD. The $SO_2$ conversion, $H_2S$ yield, and $H_2S$ selectivity of the nanoparticles was also tested at various temperatures. A TEM image of the particles is shown in FIG. 9A, the XRD pattern is shown in FIG. 9B, and the conversion, yield, and selectivity testing results are shown in graph form in FIG. 9C.

Sample 7

Under a $N_2$ atmosphere, 2 mmol of nickel precursor $Ni(acac)_2$ was dissolved in 10 mL OA. The reaction mixture was subjected to magnetic stirring for 10 min at 80° C., and then heated to a temperature of 230° C. for 1 hour. Five mL of TOP was added to the mixture and stirred for another hour at a temperature of 300° C. Five grams of TOPO was then added to the mixture and the mixture stirred at 380° C. for another 2 hours. After cooling to room temperature, the black particles were precipitated by the addition of ethanol and subsequently centrifuged for 10 min at 4,500 rpm. The supernatant was discarded, thereby separating the nanoparticles from the solution. To remove any excess surfactants, the nanoparticles were then washed three times by dispersion in hexane followed by precipitation with ethanol and isolation by centrifugation. Finally, the resulting nanoparticles were dried at room temperature.

Figure 10A:
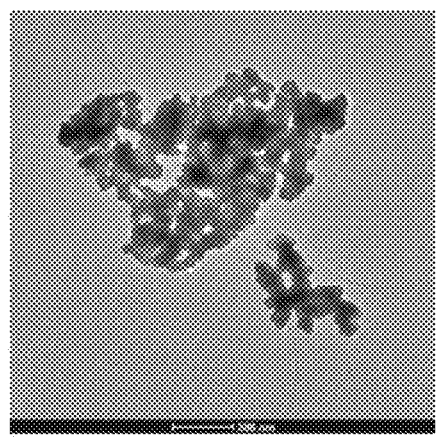
FIGS. 10A-10C illustrate (a) a TEM image of the nanoparticle material designated as Sample 7, (b) an XRD pattern of that nanoparticle material, and (c) a graph of $H_2S$ yield, conversion, and selectivity curves as a function of temperature for that nanoparticle material, according to one or more embodiments of the invention.
Figure 10B:
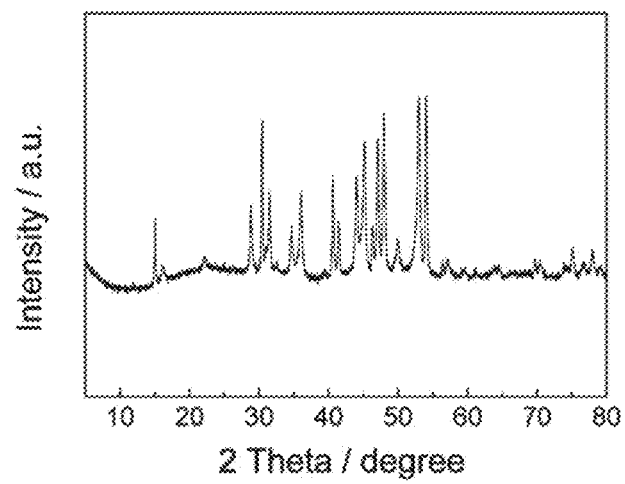
Figure 10C:
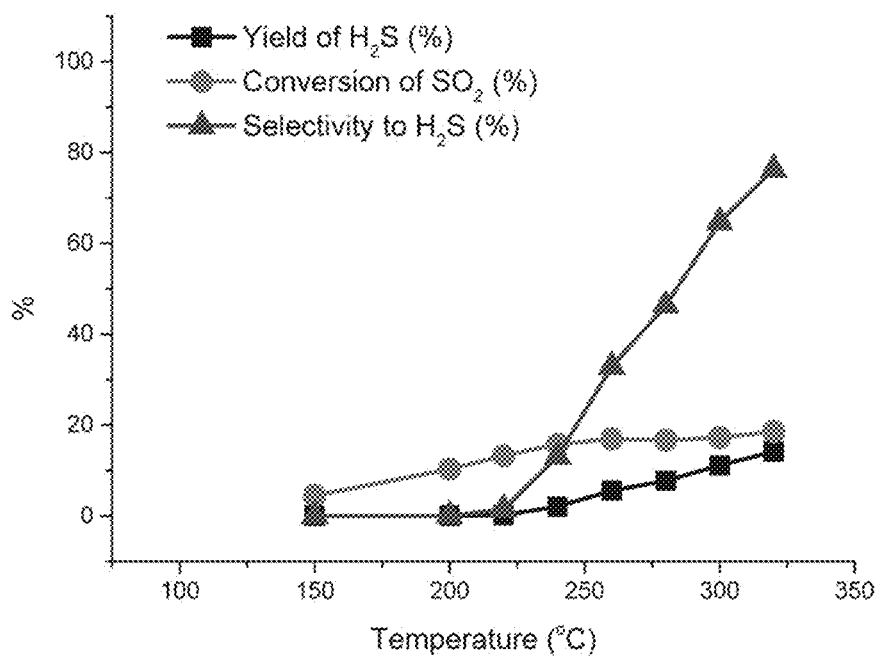

The particles were examined under TEM and subjected to XRD. The $SO_2$ conversion, $H_2S$ yield, and $H_2S$ selectivity of the nanoparticles was also tested at various temperatures. A TEM image of the particles is shown in FIG. 10A, the XRD pattern is shown in FIG. 10B, and the conversion, yield, and selectivity testing results are shown in graph form in FIG. 10C.

Sample 8

Under a $N_2$ atmosphere, 2 mmol of nickel precursor $Ni(acac)_2$ was dissolved in 5 g of TOPO and 5 mL of TOP. The reaction mixture was subjected to magnetic stirring for 10 min at 80° C., and then heated to a temperature of 350° C. for 2 hours. After cooling to room temperature, the black particles were precipitated by the addition of ethanol and subsequently centrifuged for 10 min at 4,500 rpm. The supernatant was discarded, thereby separating the nanoparticles from the solution. To remove any excess surfactants, the nanoparticles were then washed three times by dispersion in hexane followed by precipitation with ethanol and isolation by centrifugation. Finally, the resulting nanoparticles were dried at room temperature.

Figure 11A:
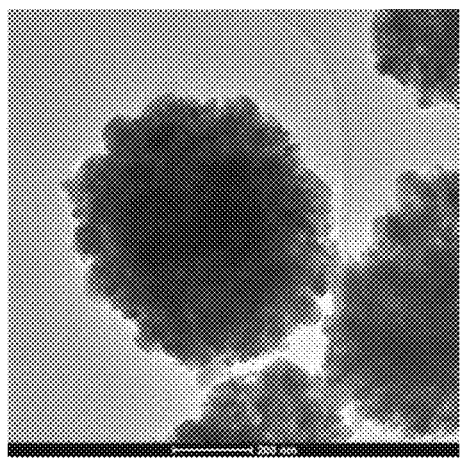
FIGS. 11A-11C illustrate (a) a TEM image of the nanoparticle material designated as Sample 8, (b) an XRD pattern of that nanoparticle material, and (c) a graph of $H_2S$ yield, conversion, and selectivity curves as a function of temperature for that nanoparticle material, according to one or more embodiments of the invention.
Figure 11B:
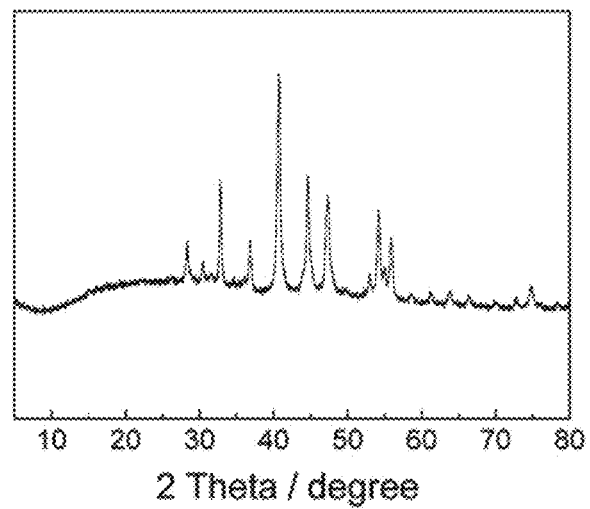
Figure 11C:
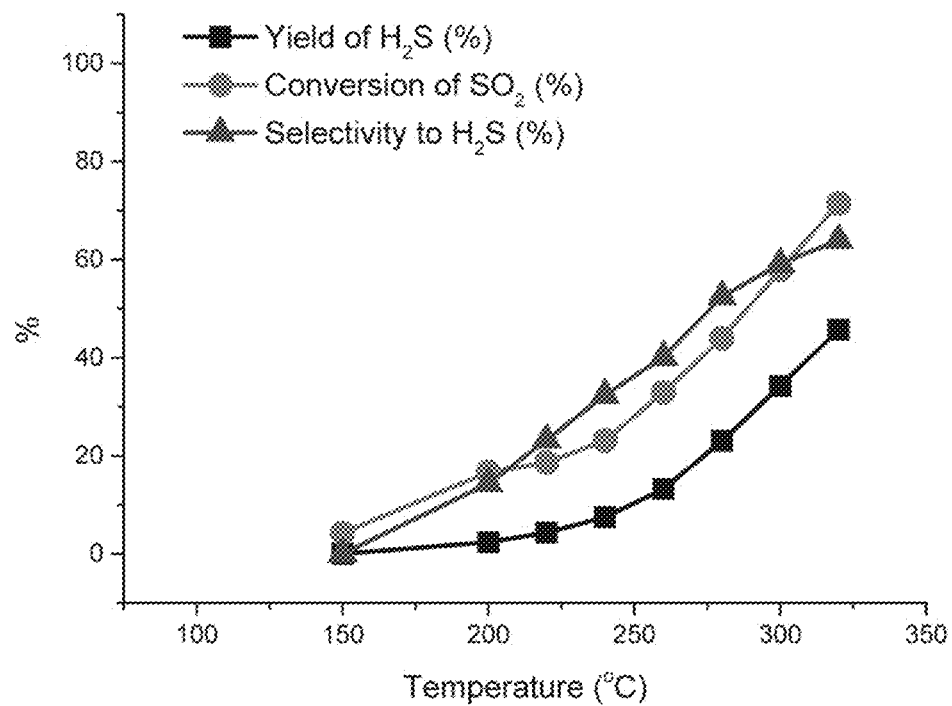

The particles were examined under TEM and subjected to XRD. The $SO_2$ conversion, $H_2S$ yield, and $H_2S$ selectivity of the nanoparticles was also tested at various temperatures. A TEM image of the particles is shown in FIG. 11A, the XRD pattern is shown in FIG. 11B, and the conversion, yield, and selectivity testing results are shown in graph form in FIG. 11C.

Sample 9

Under a $N_2$ atmosphere, 2 mmol of nickel precursor $Ni(acac)_2$ was dissolved in 5 g of TOPO. The reaction mixture was subjected to magnetic stirring for 10 min at 80° C., and then 5 mL of TOP was added. The mixture was then stirred at a temperature of 350° C. for another 2 hours. After cooling to room temperature, the black particles were precipitated by the addition of ethanol and subsequently centrifuged for 10 min at 4,500 rpm. The supernatant was discarded, thereby separating the nanoparticles from the solution. To remove any excess surfactants, the nanoparticles were then washed three times by dispersion in hexane followed by precipitation with ethanol and isolation by centrifugation. Finally, the resulting nanoparticles were dried at room temperature.

Figure 12A:
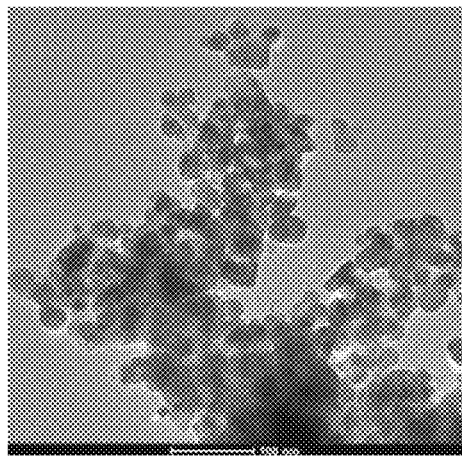
FIGS. 12A-12C illustrate (a) a TEM image of the nanoparticle material designated as Sample 9, (b) an XRD pattern of that nanoparticle material, and (c) a graph of $H_2S$ yield, conversion, and selectivity curves as a function of temperature for that nanoparticle material, according to one or more embodiments of the invention.
Figure 12B:
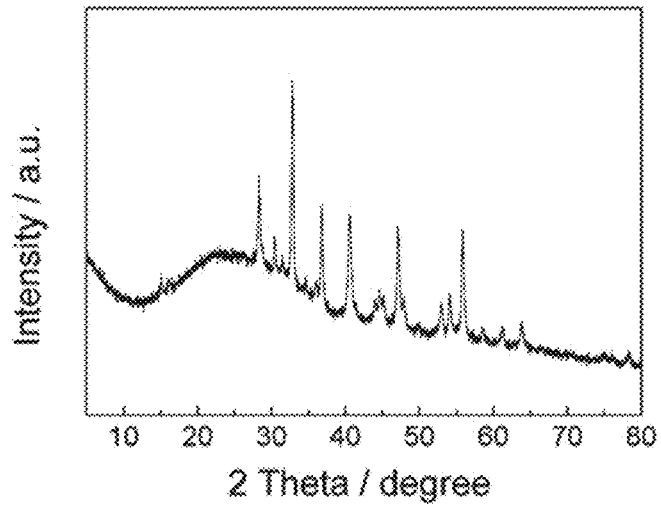
Figure 12C:
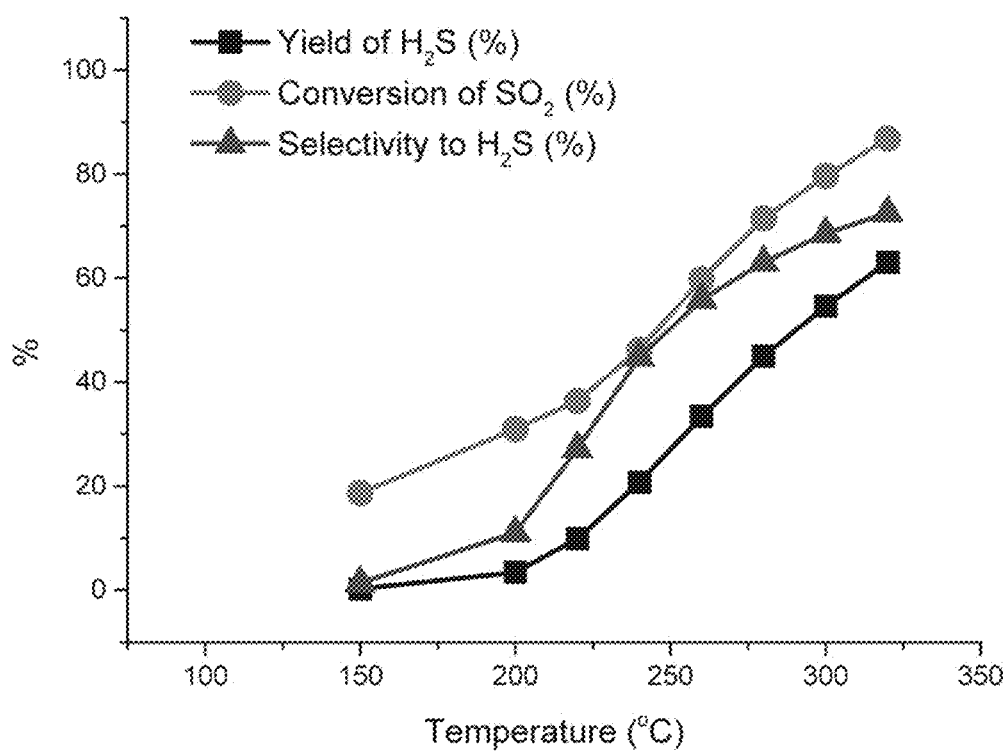

The particles were examined under TEM and subjected to XRD. The $SO_2$ conversion, $H_2S$ yield, and $H_2S$ selectivity of the nanoparticles was also tested at various temperatures. A TEM image of the particles is shown in FIG. 12A, the XRD pattern is shown in FIG. 12B, and the conversion, yield, and selectivity testing results are shown in graph form in FIG. 12C.

Sample 10

Under a $N_2$ atmosphere, 2 mmol of nickel precursor $Ni(acac)_2$ was dissolved in 10 mL of OA. The reaction mixture was subjected to magnetic stirring for 10 min at 80° C., and then 5 mL TOP was added and the mixture stirred for another 2 hours at a temperature of 350° C. After cooling to room temperature, the black particles were precipitated by the addition of ethanol and subsequently centrifuged for 10 min at 4,500 rpm. The supernatant was discarded, thereby separating the nanoparticles from the solution. To remove any excess surfactants, the nanoparticles were then washed three times by dispersion in hexane followed by precipitation with ethanol and isolation by centrifugation. Finally, the resulting nanoparticles were dried at room temperature.

Figure 13A:
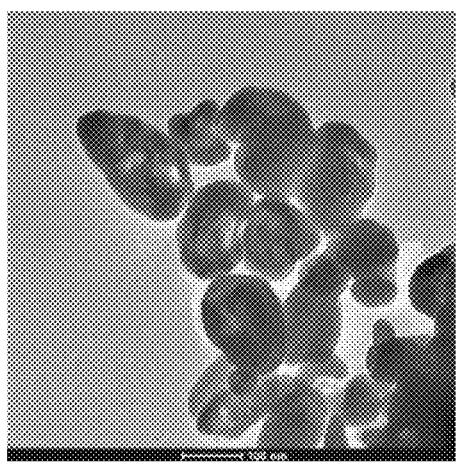
FIGS. 13A-13C illustrate (a) a TEM image of the nanoparticle material designated as Sample 10, (b) an XRD pattern of that nanoparticle material, and (c) a graph of $H_2S$ yield, conversion, and selectivity curves as a function of temperature for that nanoparticle material, according to one or more embodiments of the invention.
Figure 13B:
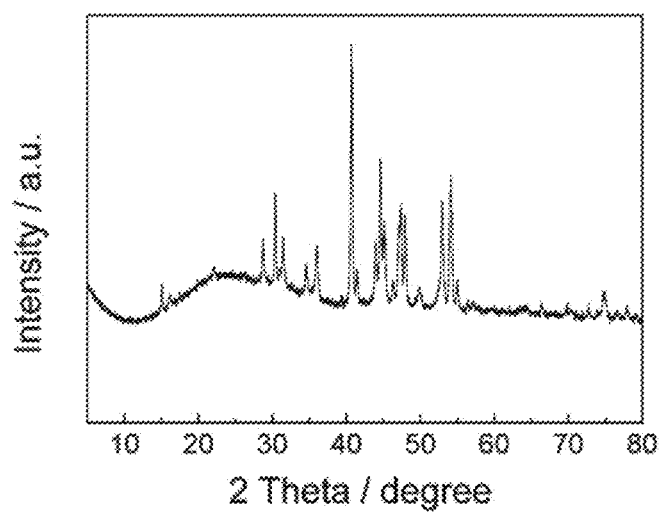
Figure 13C:
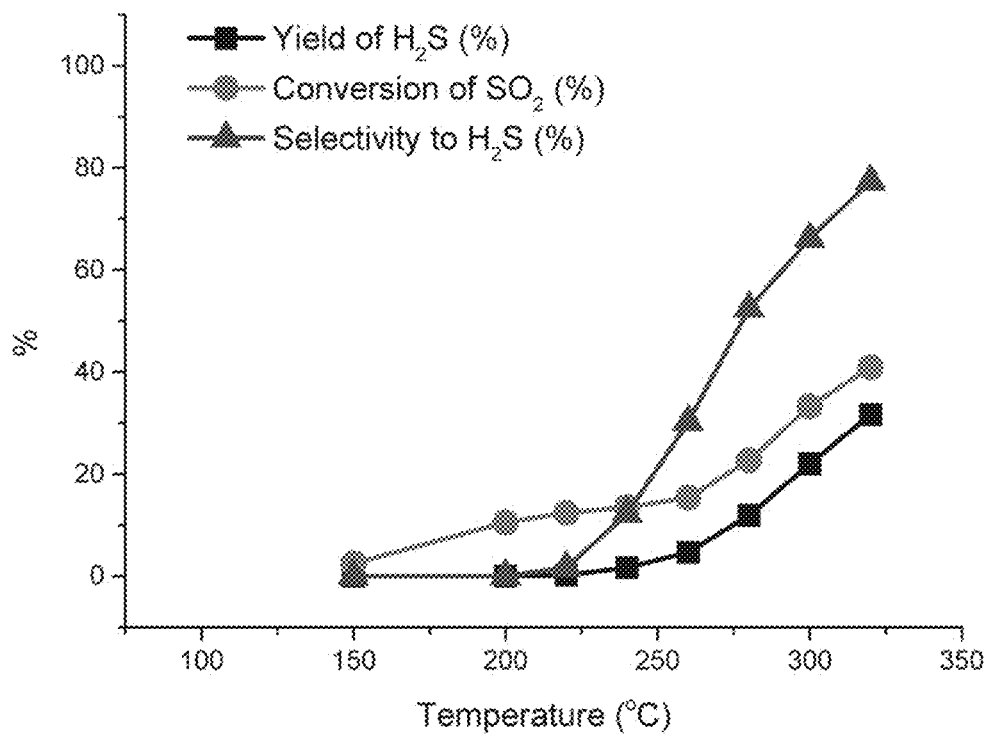

The particles were examined under TEM and subjected to XRD. The $SO_2$ conversion, $H_2S$ yield, and $H_2S$ selectivity of the nanoparticles was also tested at various temperatures. A TEM image of the particles is shown in FIG. 13A, the XRD pattern is shown in FIG. 13B, and the conversion, yield, and selectivity testing results are shown in graph form in FIG. 13C.

Sample 11

Under a $N_2$ atmosphere, 2 mmol of nickel precursor $Ni(acac)_2$ was dissolved in 10 mL of OA and 5 mL of TOP. The reaction mixture was subjected to magnetic stirring for 10 min at 80° C. followed by heating to 230° C. for 1 hour. Then another 5 mL TOP was added and the mixture stirred for another 2 hours at a temperature of 300° C. After cooling to room temperature, the black particles were precipitated by the addition of ethanol and subsequently centrifuged for 10 min at 4,500 rpm. The supernatant was discarded, thereby separating the nanoparticles from the solution. To remove any excess surfactants, the nanoparticles were then washed three times by dispersion in hexane followed by precipitation with ethanol and isolation by centrifugation. Finally, the resulting $Ni_xP_y$ nanoparticles were dried at room temperature. 100 mg of the $Ni_xP_y$ nanoparticles were dispersed in 5 mL of hexane. 50 mL of aqueous CTAB solution was added and the mixture sonicated for 30 minutes. The resulting emulsion was stirred at room temperature overnight, and then the nanoparticles were isolated from the solution via centrifugation. The resulting CTAB-coated $Ni_xP_y$ nanoparticles were washed and recovered again by centrifugation. Finally, the coated nanoparticles were dispersed in 50 mL of deionized water to form a stable hydrosol. 0.5 mL of TEOS was added dropwise into 50 mL of the CTAB-coated $Ni_xP_y$ nanoparticle hydrosol solution and stirred vigorously for 15 minutes. Then 70 μL of aqueous ammonia solution was added and the reaction allowed to take place at room temperature for 24 hours. The CTAB/$SiO_2$-coated $Ni_xP_y$ particles were recovered by centrifugation and washed with $H_2O$ followed by ethanol. The CTAB was removed by stirring the sample in a dilute HCl/ethanol solution (0.4 mL of 1 M HCl in 40 mL of ethanol) at room temperature for 1 hour. After 3 extractions, the final product was washed by ethanol, recovered by centrifugation, and dried at room temperature to obtain the $Ni_xP_y$@meso-$SiO_2$ nanoparticles.

Under a $N_2$ atmosphere, 0.1 g of the $Ni_xP_y$@meso-$SiO_x$ nanoparticles were dispersed in 10 mL of OA and 5 mL of TOP. The reaction mixture was subjected to magnetic stirring for 30 min at 100° C. and then stirred for another 2 hours at a temperature of 350° C. After cooling to room temperature, the powder was precipitated by the addition of ethanol and subsequently centrifuged for 10 min at 4,500 rpm. The supernatant was discarded, thereby separating the nanoparticles from the solution. To remove any excess surfactants, the nanoparticles were then washed three times by dispersion in hexane followed by precipitation with ethanol and isolation by centrifugation. Finally, the resulting nanoparticles were dried at room temperature.

Figure 14A:
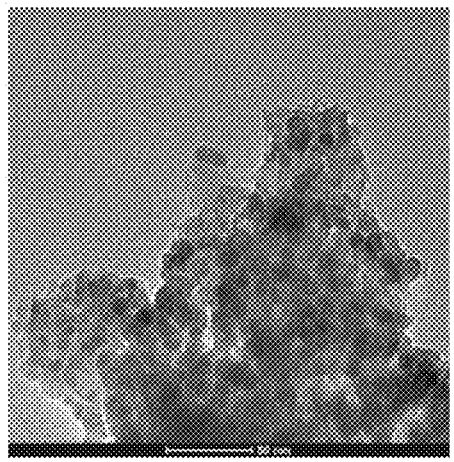
FIGS. 14A-14C illustrate (a) a TEM image of the nanoparticle material designated as Sample 11, (b) an XRD pattern of that nanoparticle material, and (c) a graph of $H_2S$ yield, conversion, and selectivity curves as a function of temperature for that nanoparticle material, according to one or more embodiments of the invention.
Figure 14B:
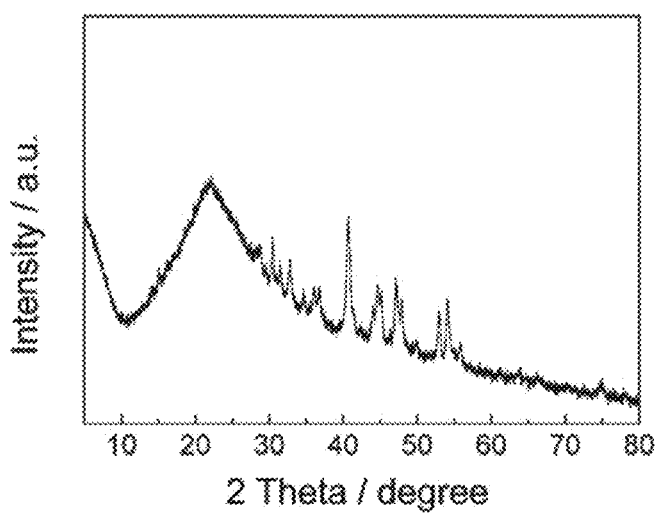
Figure 14C:
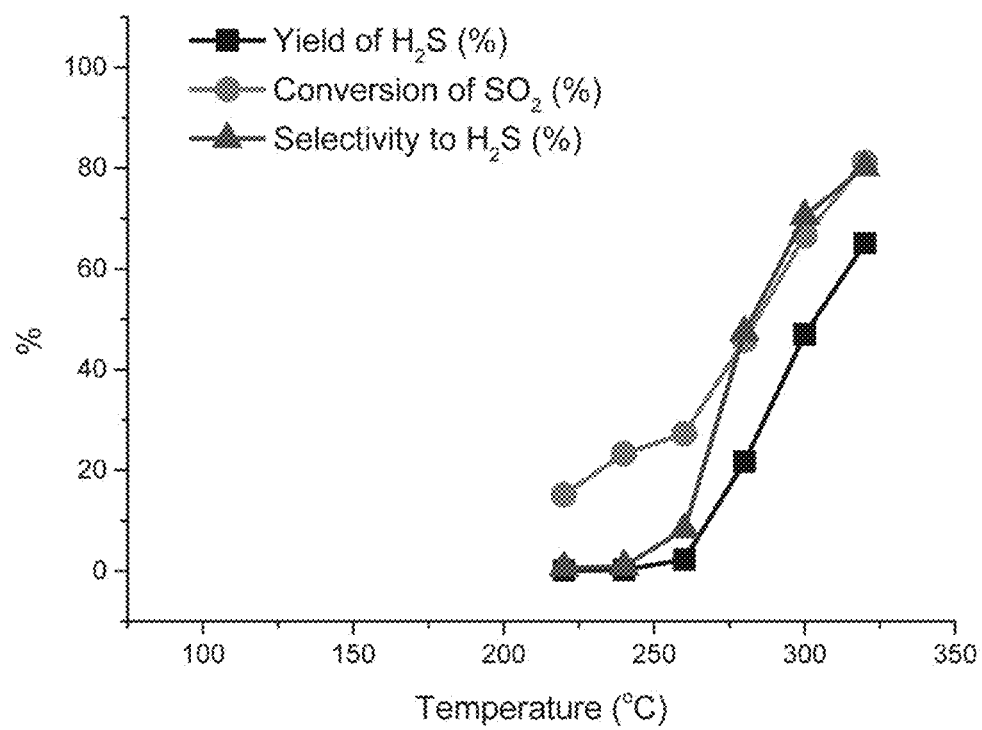

The particles were examined under TEM and subjected to XRD. The $SO_2$ conversion, $H_2S$ yield, and $H_2S$ selectivity of the nanoparticles was also tested at various temperatures. A TEM image of the particles is shown in FIG. 14A, the XRD pattern is shown in FIG. 14B, and the conversion, yield, and selectivity testing results are shown in graph form in FIG. 14C.

Sample 12

Under a $N_2$ atmosphere, 2 mmol of nickel precursor $Ni(acac)_2$ was dissolved in 10 mL of OA and 5 mL of TOP. The reaction mixture was subjected to magnetic stirring for 10 min at 80° C. followed by heating to 230° C. for 1 hour. Then another 5 mL TOP was added and the mixture stirred for another 2 hours at a temperature of 300° C. After cooling to room temperature, the black particles were precipitated by the addition of ethanol and subsequently centrifuged for 10 min at 4,500 rpm. The supernatant was discarded, thereby separating the nanoparticles from the solution. To remove any excess surfactants, the nanoparticles were then washed three times by dispersion in hexane followed by precipitation with ethanol and isolation by centrifugation. Finally, the resulting $Ni_xP_y$ nanoparticles were dried at room temperature.

100 mg of the $Ni_xP_y$ nanoparticles were dispersed in 5 mL of hexane and then mixed with 50 mL of aqueous CTAB solution. The mixture was sonicated for 30 minutes. The resulting emulsion was stirred at room temperature overnight and then the nanoparticles were isolated from the solution via centrifugation. The resulting CTAB-coated $Ni_xP_y$ nanoparticles were washed and recovered again by centrifugation. Finally, the coated nanoparticles were dispersed in 50 mL of deionized water to form a stable hydrosol.

0.5 mL of TEOS was added dropwise into 50 mL of the CTAB-coated $Ni_xP_y$ nanoparticle hydrosol solution and stirred vigorously for 15 minutes. 70 µL of aqueous ammonia solution was then added and the reaction allowed to take place at room temperature for 24 hours. The $CTAB/SiO_2$-coated $Ni_xP_y$ particles were recovered by centrifugation and then washed with $H_2O$ followed by ethanol. The CTAB was removed by stirring the sample in a dilute HCl/ethanol solution (0.4 mL of 1 M HCl in 40 mL of ethanol) at room temperature for 1 hour. After 3 extractions, the final product was washed by ethanol, recovered by centrifugation, and then dried at room temperature to obtain the $Ni_xP_y$@meso-$SiO_2$ nanoparticles.

Under a $N_2$ atmosphere, 0.1 g of the $Ni_xP_y$@meso-SiOx nanoparticles were dissolved in 5 mL of TOP. 5 g of TOPO was added and the reaction mixture subjected to magnetic stirring for 30 min at 100° C. followed by another 2 hours of stirring at a temperature of 380° C. After cooling to room temperature, the powder was precipitated by the addition of ethanol and subsequently centrifuged for 10 min at 4,500 rpm. The supernatant was discarded, thereby separating the nanoparticles from the solution. To remove any excess surfactants, the nanoparticles were then washed three times by dispersion in hexane followed by precipitation with ethanol and isolation by centrifugation. Finally, the resulting nanoparticles were dried at room temperature.

Figure 15A:
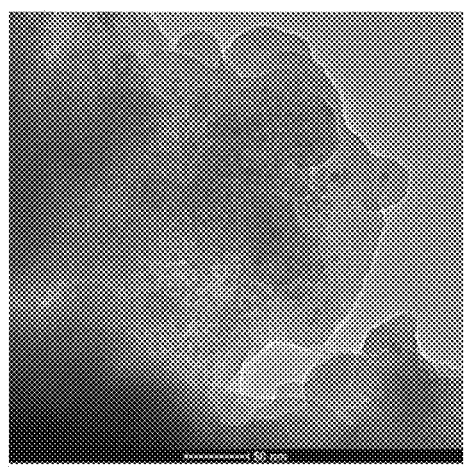
FIGS. 15A-15C illustrate (a) a TEM image of the nanoparticle material designated as Sample 12, (b) an XRD pattern of that nanoparticle material, and (c) a graph of $H_2S$ yield, conversion, and selectivity curves as a function of temperature for that nanoparticle material, according to one or more embodiments of the invention.
Figure 15B:
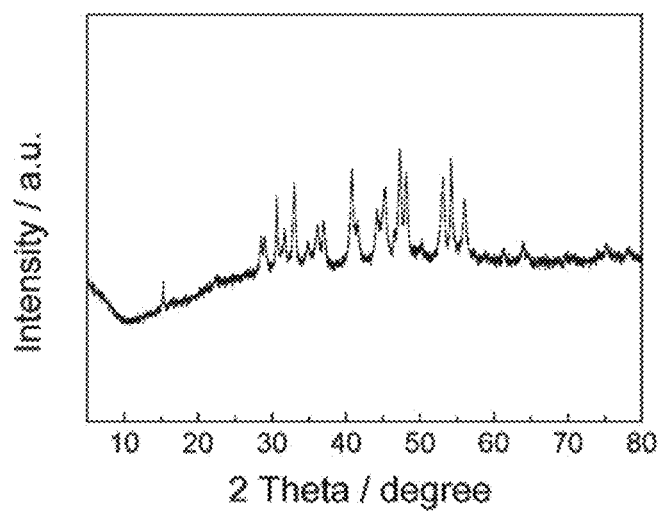
Figure 15C:
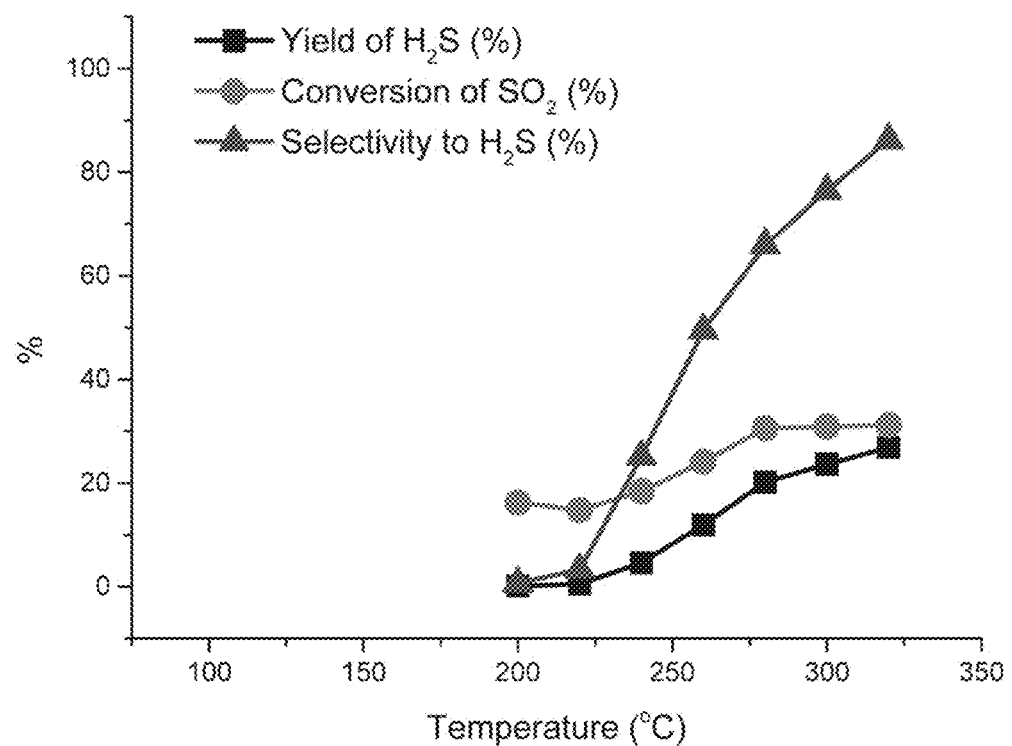

The particles were examined under TEM and subjected to XRD. The $SO_2$ conversion, $H_2S$ yield, and $H_2S$ selectivity of the nanoparticles was also tested at various temperatures. A TEM image of the particles is shown in FIG. 15A, the XRD pattern is shown in FIG. 15B, and the conversion, yield, and selectivity testing results are shown in graph form in FIG. 15C.

Sample 13

Under a $N_2$ atmosphere, 2 mmol of nickel precursor $Ni(acac)_2$ was dissolved in 10 mL of OA and 5 mL of TOP. The reaction mixture was subjected to magnetic stirring for 10 min at 80° C. followed by heating to 230° C. for 1 hour. Then another 5 mL TOP was added and the mixture stirred for another 2 hours at a temperature of 300° C. After cooling to room temperature, the black particles were precipitated by the addition of ethanol and subsequently centrifuged for 10 min at 4,500 rpm. The supernatant was discarded, thereby separating the nanoparticles from the solution. To remove any excess surfactants, the nanoparticles were then washed three times by dispersion in hexane followed by precipitation with ethanol and isolation by centrifugation. Finally, the resulting $Ni_xP_y$ nanoparticles were dried at room temperature.

100 mg of the $Ni_xP_y$ nanoparticles were dispersed in 5 mL of hexane. 50 mL of aqueous CTAB solution was added and the mixture sonicated for 30 minutes. The resulting emulsion was stirred at room temperature overnight and then the nanoparticles were isolated from the solution via centrifugation. The resulting CTAB-coated $Ni_xP_y$ nanoparticles were washed and recovered again by centrifugation. Finally, the coated nanoparticles were dispersed in 50 mL of deionized water to form a stable hydrosol.

0.5 mL of TEOS was added dropwise into 50 mL of the CTAB-coated $Ni_xP_y$ nanoparticle hydrosol solution and stirred vigorously for 15 minutes. 70 µL of aqueous ammonia solution was then added and the reaction allowed to take place at room temperature for 24 hours. The $CTAB/SiO_2$-coated $Ni_xP_y$ particles were recovered by centrifugation and then washed with $H_2O$ followed by ethanol. The CTAB was removed by stirring the sample in a dilute HCl/ethanol solution (0.4 mL of 1 M HCl in 40 mL of ethanol) at room temperature for 1 hour. After 3 extractions, the final product was washed by ethanol, recovered by centrifugation, and then dried at room temperature to obtain the $Ni_xP_y$@meso-$SiO_2$ nanoparticles.

Under a $N_2$ atmosphere, 0.1 g of the $Ni_xP_y$@meso-SiOx nanoparticles were dissolved in 5 mL of TOP. 10 g of TOPO was added, and the reaction mixture was subjected to magnetic stirring for 30 min at 100° C. and then stirred for another 4 hours at a temperature of 380° C. After cooling to room temperature, the powder was precipitated by the addition of ethanol and subsequently centrifuged for 10 min at 4,500 rpm. The supernatant was discarded, thereby separating the nanoparticles from the solution. To remove any excess surfactants, the nanoparticles were then washed three times by dispersion in hexane followed by precipitation with ethanol and isolation by centrifugation. Finally, the resulting nanoparticles were dried at room temperature.

Figure 16A:
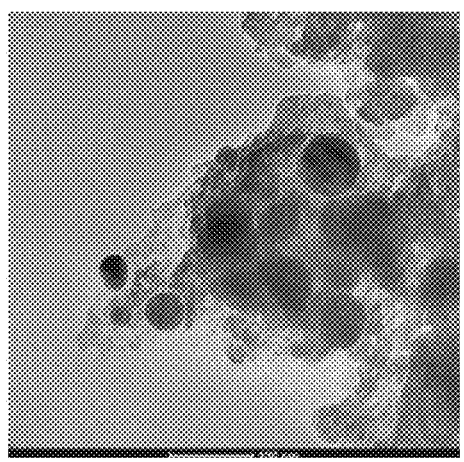
FIGS. 16A-16C illustrate (a) a TEM image of the nanoparticle material designated as Sample 13, (b) an XRD pattern of that nanoparticle material, and (c) a graph of $H_2S$ yield, conversion, and selectivity curves as a function of temperature for that nanoparticle material, according to one or more embodiments of the invention.
Figure 16B:
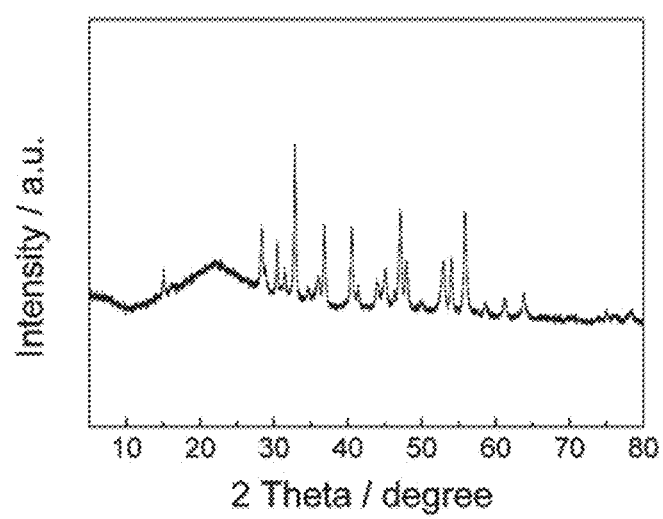
Figure 16C:
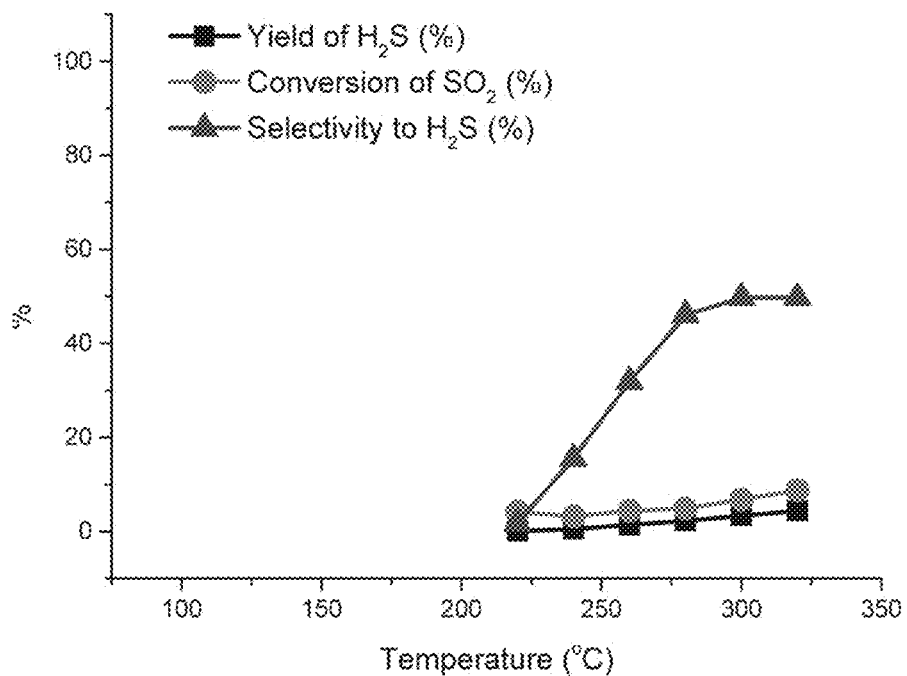

The particles were examined under TEM and subjected to XRD. The $SO_2$ conversion, $H_2S$ yield, and $H_2S$ selectivity of the nanoparticles was also tested at various temperatures. A TEM image of the particles is shown in FIG. 16A, the XRD pattern is shown in FIG. 16B, and the conversion, yield, and selectivity testing results are shown in graph form in FIG. 16C.

Sample 14

To prepare a $Na_2SiO_3$ solution, 32.0 g of sodium hydroxide was first dissolved in 800 mL of deionized water. Then 187 mL Ludox™ HS-40 colloidal silica (40 wt % in $H_2O$; available from Millipore Sigma) was added and the mixture closely stirred (i.e., stirred slowly to avoid creation of bubbles) at 40° C. overnight to produce a clear solution. This $Na_2SiO_3$ solution was stored in a sealed Teflon bottle at room temperature and can be stored as such for several weeks or until the mixture is no longer clear.

1.0 g CTAB and 1 mmol nickel precursor $Ni(acac)_2$ were dissolved in 35 mL of deionized water and closely stirred at a temperature of 60° C. for 1 hour until the surfactant was completely dissolved to form a clear viscous solution (the undissolved precipitate was isolated by centrifugation).

25 g of the $Na_2SiO_3$ solution was stirred at 60° C. for 1 hour and then the CTAB solution was added dropwise into the $Na_2SiO_3$ solution. The mixture was stirred vigorously at 60° C. for 1 hour and then stirred overnight at room temperature. A powder was then separated from the mixed solution by subjecting the solution to centrifugation for 10 min at 4500 rpm followed by removing the supernatant. To remove excess surfactants, the powder was washed three times by dispersion in H$_2$O, then washed two times by dispersion in ethanol, and then isolated by centrifugation. The solid was dried in an oven at 80° C. overnight to obtain about 1.5 g of a light green powder.

Under a N$_2$ atmosphere, 0.5 g of the light green powder was dissolved in 10 mL of OA and 5 mL of TOP. The reaction mixture was subjected to magnetic stirring for 10 min at 80° C. followed by stirring at 350° C. for 2 hours. After cooling to room temperature, a powder was precipitated by the addition of ethanol and subsequently centrifuged for 10 min at 4,500 rpm. The supernatant was discarded, thereby separating the nanoparticles from the solution. To remove any excess surfactants, the nanoparticles were then washed three times by dispersion in hexane followed by precipitation with ethanol and isolation by centrifugation. Finally, the resulting nanoparticles were dried in an 80° C. oven overnight.

Figure 17A:
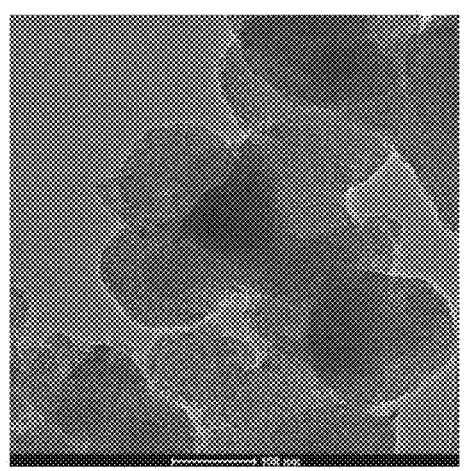
FIGS. 17A-17C illustrate (a) a TEM image of the nanoparticle material designated as Sample 14, (b) an XRD pattern of that nanoparticle material, and (c) a graph of $H_2S$ yield, conversion, and selectivity curves as a function of temperature for that nanoparticle material, according to one or more embodiments of the invention.
Figure 17B:
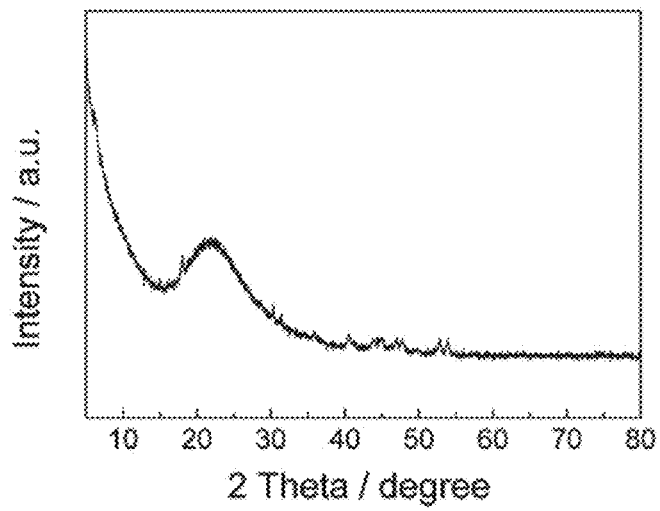
Figure 17C:
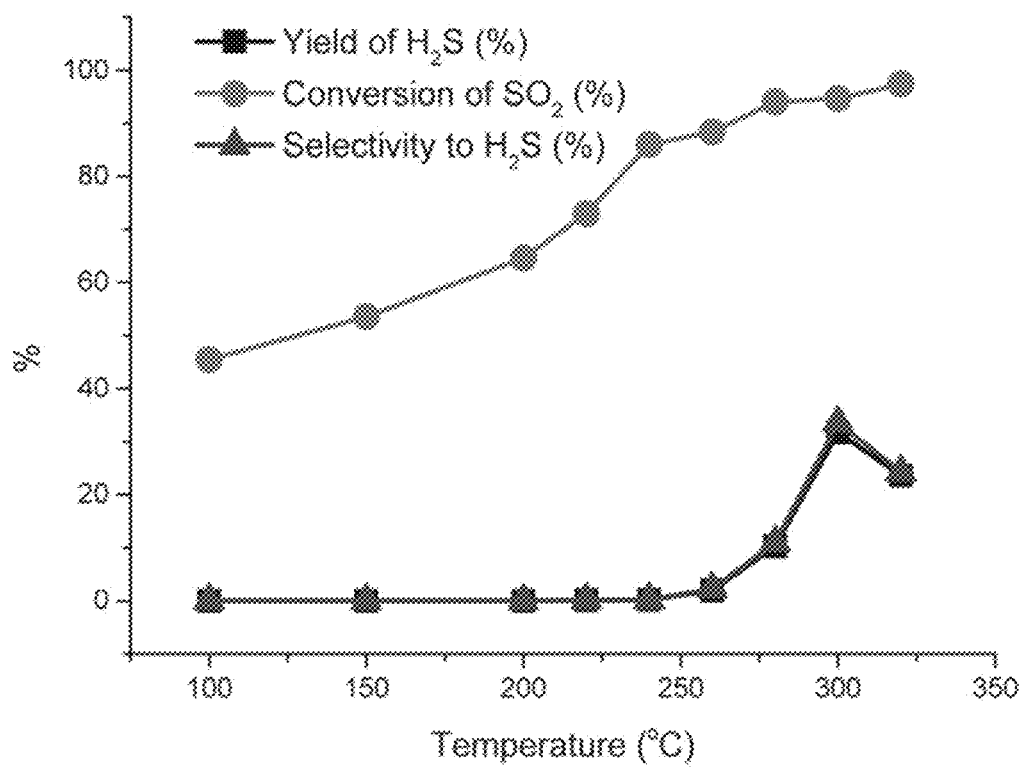

The particles were examined under TEM and subjected to XRD. The SO$_2$ conversion, H$_2$S yield, and H$_2$S selectivity of the nanoparticles was also tested at various temperatures. A TEM image of the particles is shown in FIG. 17A, the XRD pattern is shown in FIG. 17B, and the conversion, yield, and selectivity testing results are shown in graph form in FIG. 17C.

Sample 15

To prepare a Na$_2$SiO$_3$ solution, 32.0 g of sodium hydroxide was first dissolved in 800 mL of deionized water. Then 187 mL Ludox™ HS-40 colloidal silica (40 wt % in H$_2$O) was added and the mixture closely stirred at 40° C. overnight to produce a clear solution.

1.0 g CTAB and 1 mmol nickel precursor Ni(acac)$_2$ were dissolved in 35 mL of deionized water and closely stirred at a temperature of 60° C. for 1 hour until the surfactant was completely dissolved to form a clear viscous solution.

25 g of the Na$_2$SiO$_3$ solution was stirred at 60° C. for 1 hour and then the CTAB solution was added dropwise into the Na$_2$SiO$_3$ solution. The mixture was stirred vigorously at 60° C. for 1 hour and then stirred overnight at room temperature. A powder was then separated from the mixed solution by subjecting the solution to centrifugation for 10 min at 4500 rpm followed by removing the supernatant. To remove excess surfactants, the powder was washed three times by dispersion in H$_2$O, then washed two times by dispersion in ethanol, and then isolated by centrifugation. The solid was dried in an oven at 80° C. overnight to obtain about 1.5 g of a light green powder.

Under a N2 atmosphere, 0.5 g of the light green powder was dissolved in a mixture of 10 g of TOPO and 5 mL of TOP. The reaction mixture was subjected to magnetic stirring for 10 min at 80° C. followed by stirring at 400° C. for another 2 hours. After cooling to room temperature, a powder was precipitated by the addition of ethanol and subsequently centrifuged for 10 min at 4,500 rpm. The supernatant was discarded, thereby separating the nanoparticles from the solution. To remove any excess surfactants, the nanoparticles were then washed three times by dispersion in hexane followed by precipitation with ethanol and isolation by centrifugation. Finally, the resulting nanoparticles were dried in a 80° C. oven overnight.

Figure 18A:
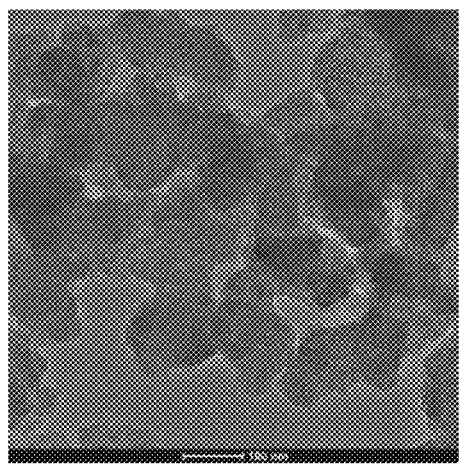
FIGS. 18A-18C illustrate (a) a TEM image of the nanoparticle material designated as Sample 15, (b) an XRD pattern of that nanoparticle material, and (c) a graph of $H_2S$ yield, conversion, and selectivity curves as a function of temperature for that nanoparticle material, according to one or more embodiments of the invention.
Figure 18B:
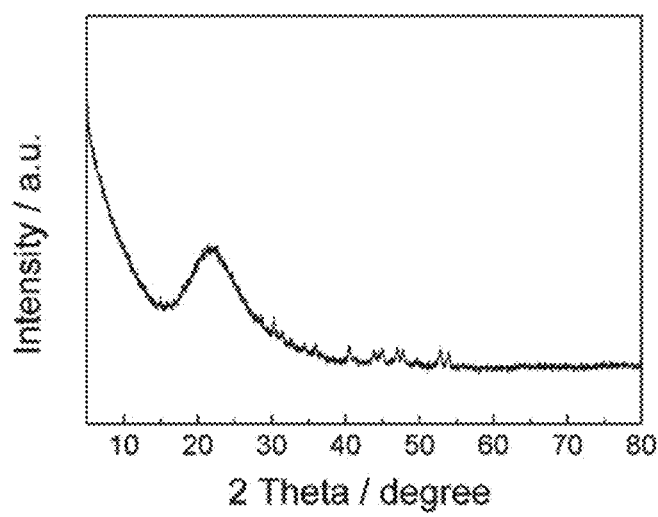
Figure 18C:
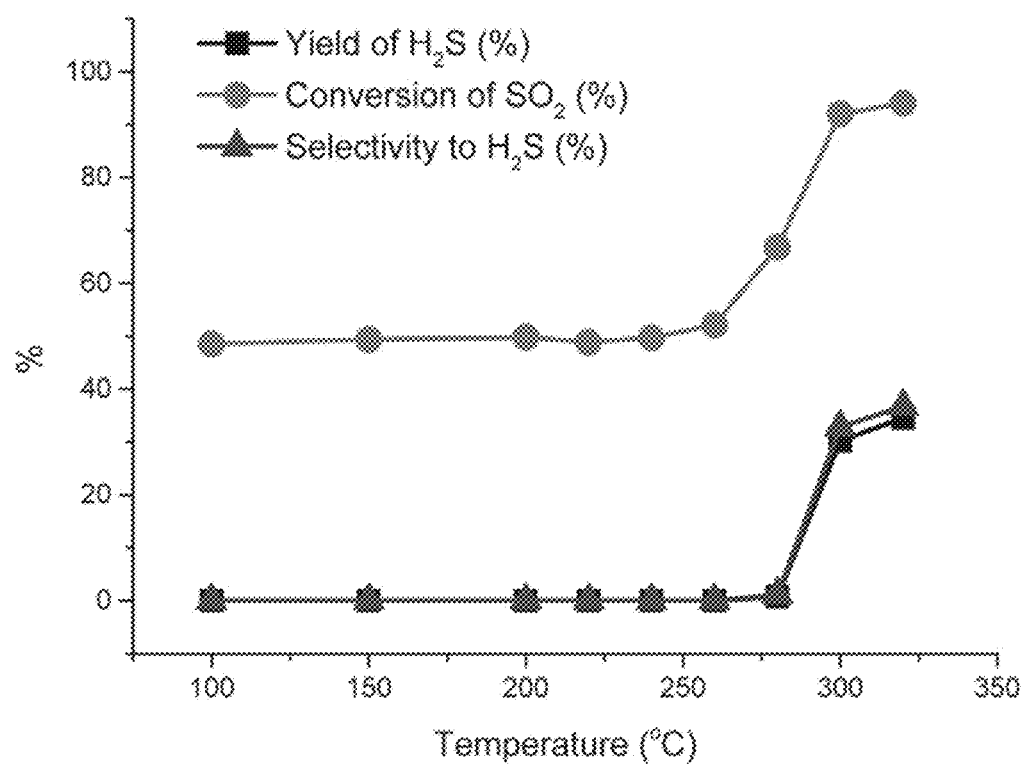

The particles were examined under TEM and subjected to XRD. The SO$_2$ conversion, H$_2$S yield, and H$_2$S selectivity of the nanoparticles was also tested at various temperatures. A TEM image of the particles is shown in FIG. 18A, the XRD pattern is shown in FIG. 18B, and the conversion, yield, and selectivity testing results are shown in graph form in FIG. 18C.

Sample 16

To prepare a Na$_2$SiO$_3$ solution, 32.0 g of sodium hydroxide was first dissolved in 800 mL of deionized water. Then 187 mL Ludox™ HS-40 colloidal silica (40 wt % in H$_2$O) was added and the mixture closely stirred at 40° C. overnight to produce a clear solution.

1.0 g CTAB and 0.3 g nickel precursor Ni(NO$_3$)$_2$ (≥97%, available from Millipore Sigma) were dissolved in 50 mL of deionized water and closely stirred at a temperature of 60° C. for 1 hour until the surfactant was completely dissolved to form a clear viscous solution.

25 g of the Na$_2$SiO$_3$ solution was stirred at 60° C. for 1 hour and then the CTAB solution was added dropwise into the Na$_2$SiO$_3$ solution. The mixture was stirred vigorously at 60° C. for 1 hour and then stirred overnight at room temperature. A powder was then separated from the mixed solution by subjecting the solution to centrifugation for 10 min at 4500 rpm followed by removing the supernatant. To remove excess surfactants, the powder was washed three times by dispersion in H$_2$O, then washed two times by dispersion in ethanol, and then isolated by centrifugation. The solid was dried in an oven at 80° C. overnight to obtain about 1.5 g of a light green powder.

Under a N$_2$ atmosphere, 0.5 g of the light green powder was dissolved in a mixture of 10 mL of OA and 5 mL of TOP. The reaction mixture was subjected to magnetic stirring for 10 min at 80° C. followed by stirring at 350° C. for another 2 hours. After cooling to room temperature, a powder was precipitated by the addition of ethanol and subsequently centrifuged for 10 min at 4,500 rpm. The supernatant was discarded, thereby separating the nanoparticles from the solution. To remove any excess surfactants, the nanoparticles were then washed three times by dispersion in hexane followed by precipitation with ethanol and isolation by centrifugation. Finally, the resulting nanoparticles were dried in an 80° C. oven overnight.

Figure 19A:
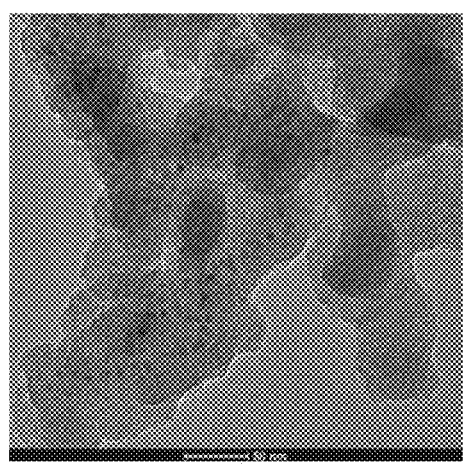
FIGS. 19A-19C illustrate (a) a TEM image of the nanoparticle material designated as Sample 16, (b) an XRD pattern of that nanoparticle material, and (c) a graph of $H_2S$ yield, conversion, and selectivity curves as a function of temperature for that nanoparticle material, according to one or more embodiments of the invention.
Figure 19B:
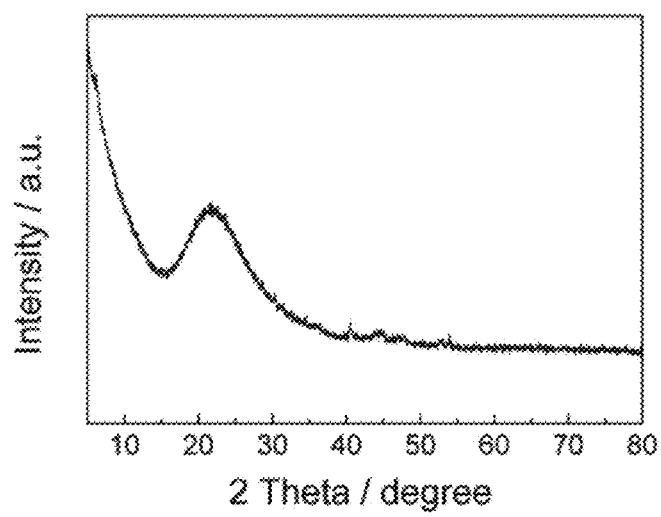
Figure 19C:
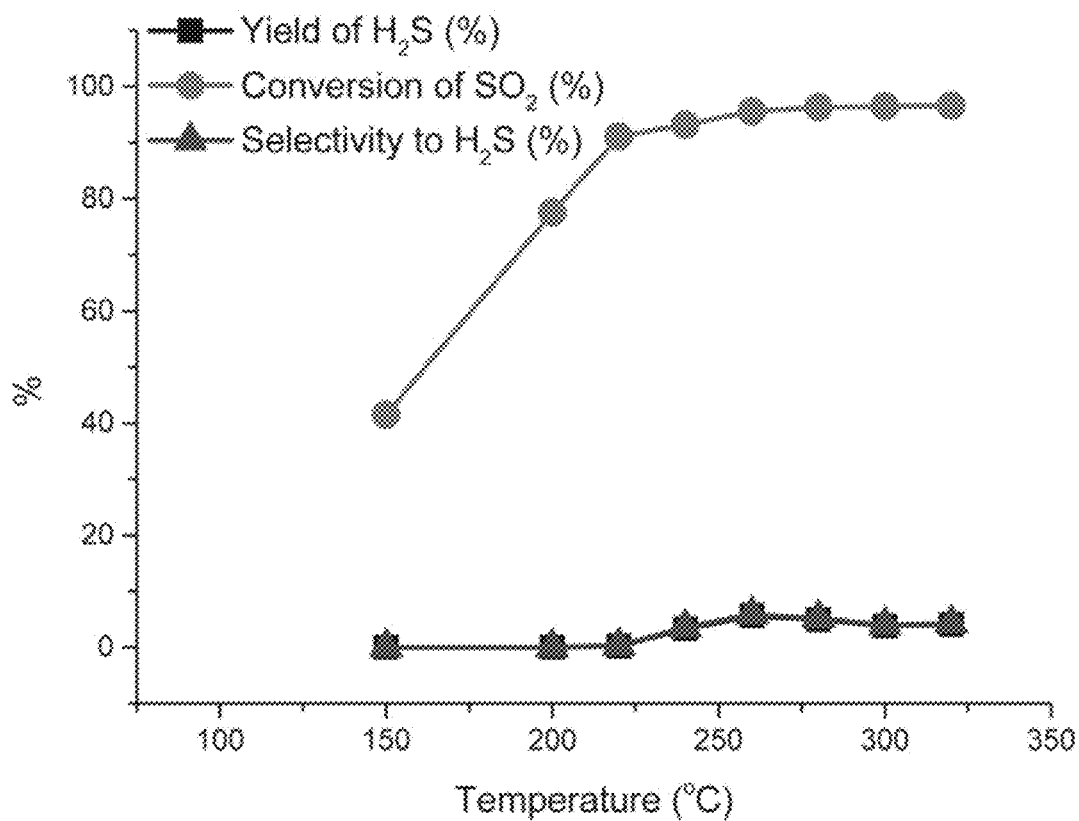

The particles were examined under TEM and subjected to XRD. The SO$_2$ conversion, H$_2$S yield, and H$_2$S selectivity of the nanoparticles was also tested at various temperatures. A TEM image of the particles is shown in FIG. 19A, the XRD pattern is shown in FIG. 19B, and the conversion, yield, and selectivity testing results are shown in graph form in FIG. 19C.

Sample 17

To prepare a Na$_2$SiO$_3$ solution, 32.0 g of sodium hydroxide was first dissolved in 800 mL of deionized water. Then 187 mL Ludox™ HS-40 colloidal silica (40 wt % in H$_2$O) was added and the mixture closely stirred at 40° C. overnight to produce a clear solution.

1.0 g CTAB and 1.5 g nickel precursor Ni(NO$_3$)$_2$ were dissolved in 35 mL of deionized water and closely stirred at a temperature of 60° C. for 1 hour until the surfactant was completely dissolved to form a clear viscous solution.

25 g of the Na$_2$SiO$_3$ solution was stirred at 60° C. for 1 hour and then the CTAB solution was added dropwise into the Na$_2$SiO$_3$ solution. The mixture was stirred vigorously at 60° C. for 1 hour and then stirred overnight at room temperature. A powder was then separated from the mixed solution by subjecting the solution to centrifugation for 10 min at 4500 rpm followed by removing the supernatant. To remove excess surfactants, the powder was washed three times by dispersion in H$_2$O, then washed two times by dispersion in ethanol, and then isolated by centrifugation. The solid was dried in an oven at 80° C. overnight to obtain about 1.5 g of a light green powder.

Under a N2 atmosphere, 0.5 g of the light green powder was dissolved in a mixture of 10 mL of OA and 5 mL of TOP.

The reaction mixture was subjected to magnetic stirring for 10 min at 80° C. followed by stirring at 350° C. for another 2 hours. After cooling to room temperature, a powder was precipitated by the addition of ethanol and subsequently centrifuged for 10 min at 4,500 rpm. The supernatant was discarded, thereby separating the nanoparticles from the solution. To remove any excess surfactants, the nanoparticles were then washed three times by dispersion in hexane followed by precipitation with ethanol and isolation by centrifugation. Finally, the resulting nanoparticles were dried in an 80° C. oven overnight.

Figure 20A:
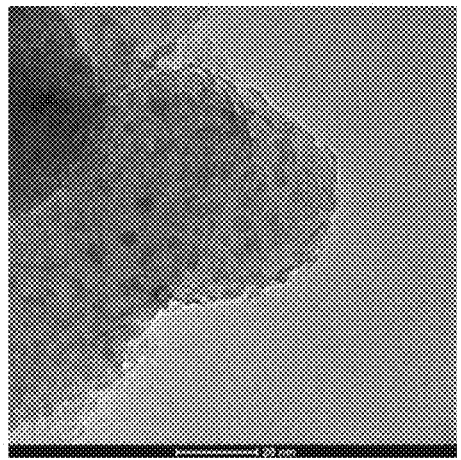
FIGS. 20A-20C illustrate (a) a TEM image of the nanoparticle material designated as Sample 17, (b) an XRD pattern of that nanoparticle material, and (c) a graph of $H_2S$ yield, conversion, and selectivity curves as a function of temperature for that nanoparticle material, according to one or more embodiments of the invention.
Figure 20B:
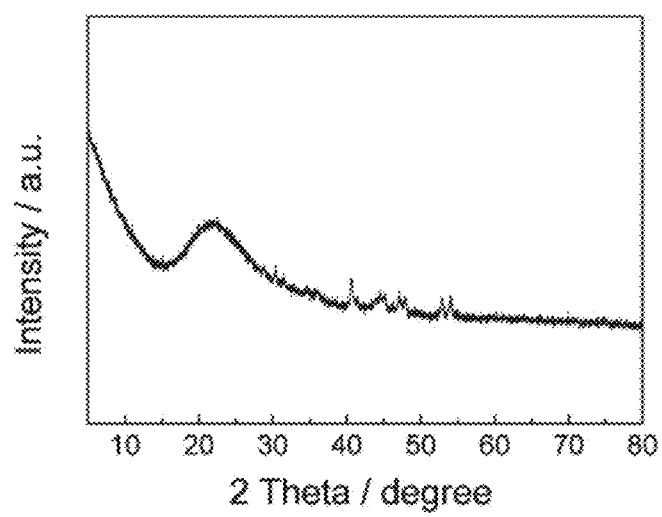
Figure 20C:
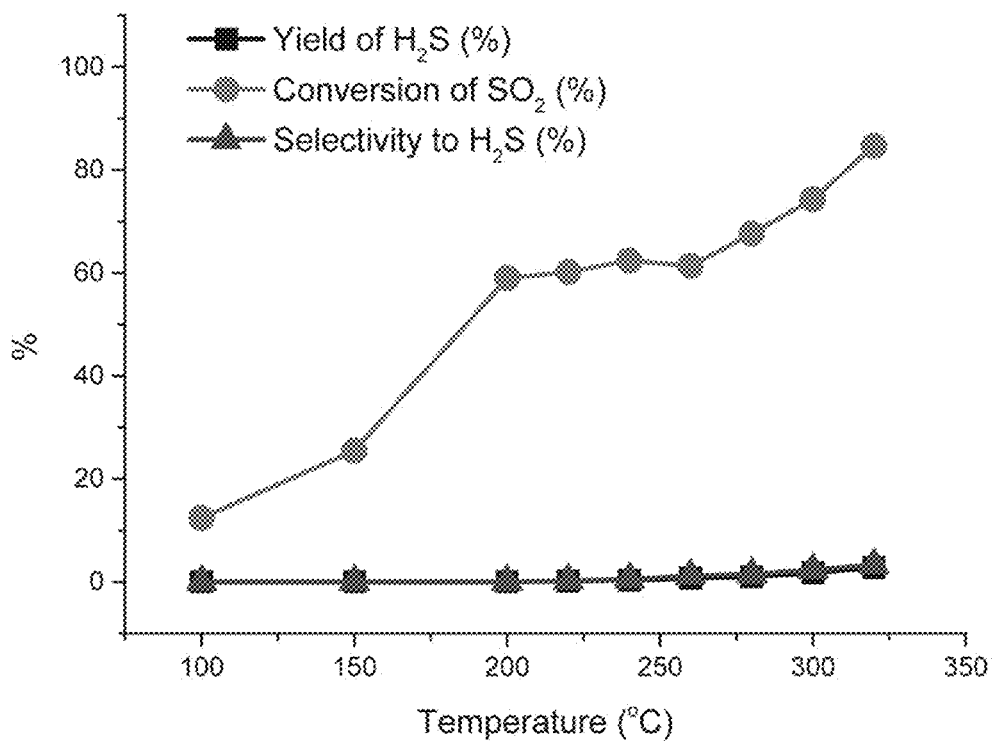

The particles were examined under TEM and subjected to XRD. The $SO_2$ conversion, $H_2S$ yield, and $H_2S$ selectivity of the nanoparticles was also tested at various temperatures. A TEM image of the particles is shown in FIG. 20A, the XRD pattern is shown in FIG. 20B, and the conversion, yield, and selectivity testing results are shown in graph form in FIG. 20C.

Sample 18

Under a $N_2$ atmosphere, 2 mmol of molybdenum precursor $Mo(CO)_6$ (98%, available from Millipore Sigma) was dissolved in a mixture of 10 mL of OA and 5 mL of TOP. The reaction mixture was subjected to magnetic stirring for 10 min at 80° C. followed by stirring at 350° C. for another 2 hours. After cooling to room temperature, black particles were precipitated by the addition of ethanol and subsequently centrifuged for 10 min at 4,500 rpm. The supernatant was discarded, thereby separating the black nanoparticles from the solution. To remove any excess surfactants, the nanoparticles were then washed three times by dispersion in hexane followed by precipitation with ethanol and isolation by centrifugation. Finally, the resulting nanoparticles were dried at room temperature.

Figure 21A:
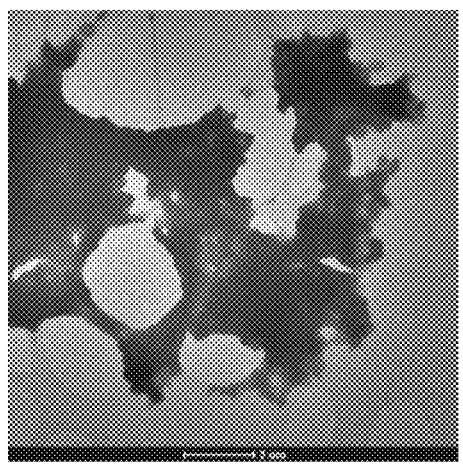
FIGS. 21A-21C illustrate (a) a TEM image of the nanoparticle material designated as Sample 18, (b) an XRD pattern of that nanoparticle material, and (c) a graph of $H_2S$ yield, conversion, and selectivity curves as a function of temperature for that nanoparticle material, according to one or more embodiments of the invention.
Figure 21B:
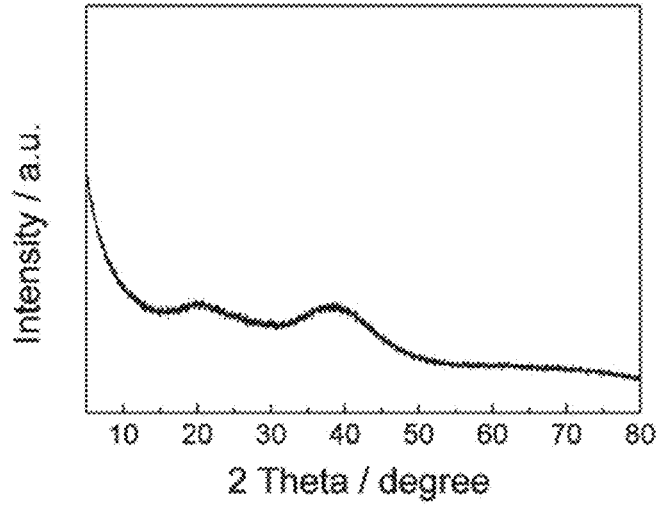
Figure 21C:
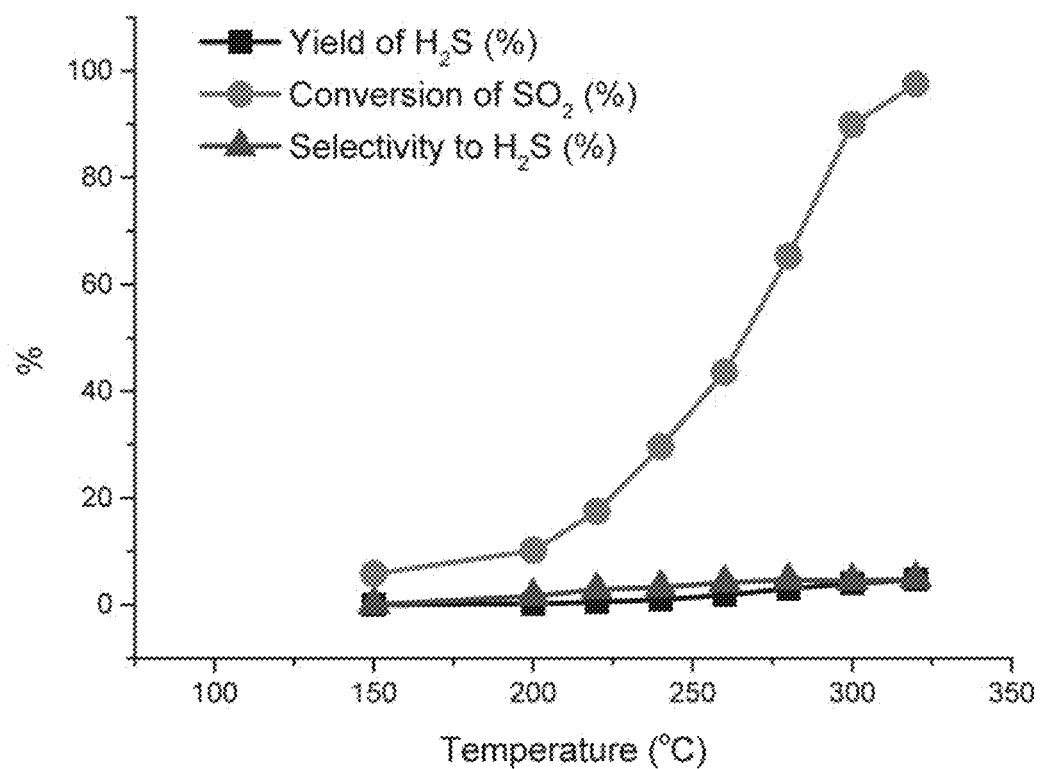

The particles were examined under TEM and subjected to XRD. The $SO_2$ conversion, $H_2S$ yield, and $H_2S$ selectivity of the nanoparticles was also tested at various temperatures. A TEM image of the particles is shown in FIG. 21A, the XRD pattern is shown in FIG. 21B, and the conversion, yield, and selectivity testing results are shown in graph form in FIG. 21C.

Sample 19

Under a $N_2$ atmosphere, 2 mmol of cobalt precursor $Co(acac)_2$ (97%, available from Millipore Sigma) was dissolved in a mixture of 10 mL of OA and 5 mL of TOP. The reaction mixture was subjected to magnetic stirring for 10 min at 80° C. followed by heating to 180° C. for 1 hour. An additional 5 mL of TOP was added to the mixture and the mixture was then stirred at 350° C. for another 2 hours. After cooling to room temperature, black particles were precipitated by the addition of ethanol and subsequently centrifuged for 10 min at 4,500 rpm. The supernatant was discarded, thereby separating the black nanoparticles from the solution. To remove any excess surfactants, the nanoparticles were then washed three times by dispersion in hexane followed by precipitation with ethanol and isolation by centrifugation. Finally, the resulting nanoparticles were dried at room temperature.

Figure 22A:
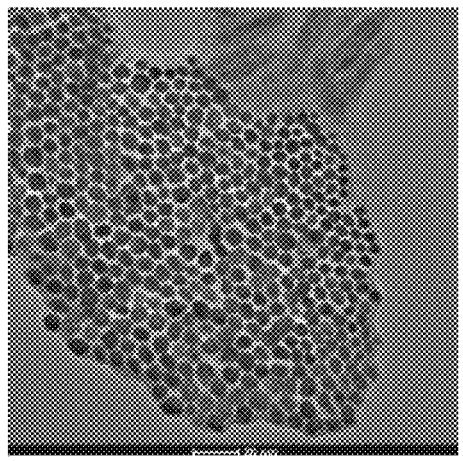
FIGS. 22A-22C illustrate (a) a TEM image of the nanoparticle material designated as Sample 19, (b) an XRD pattern of that nanoparticle material, and (c) a graph of $H_2S$ yield, conversion, and selectivity curves as a function of temperature for that nanoparticle material, according to one or more embodiments of the invention.
Figure 22B:
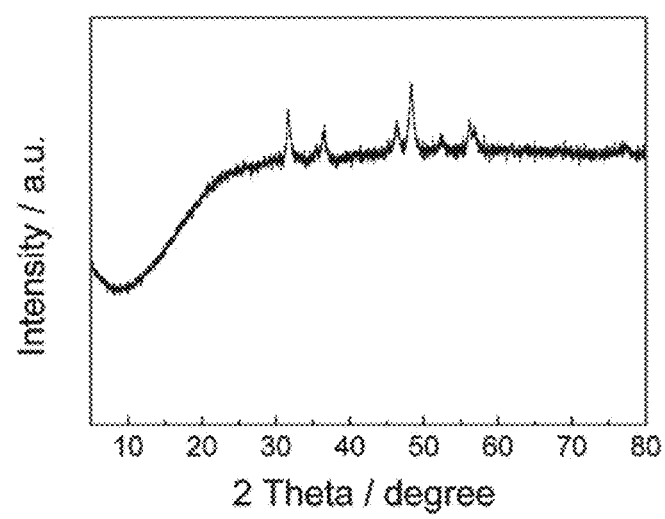
Figure 22C:
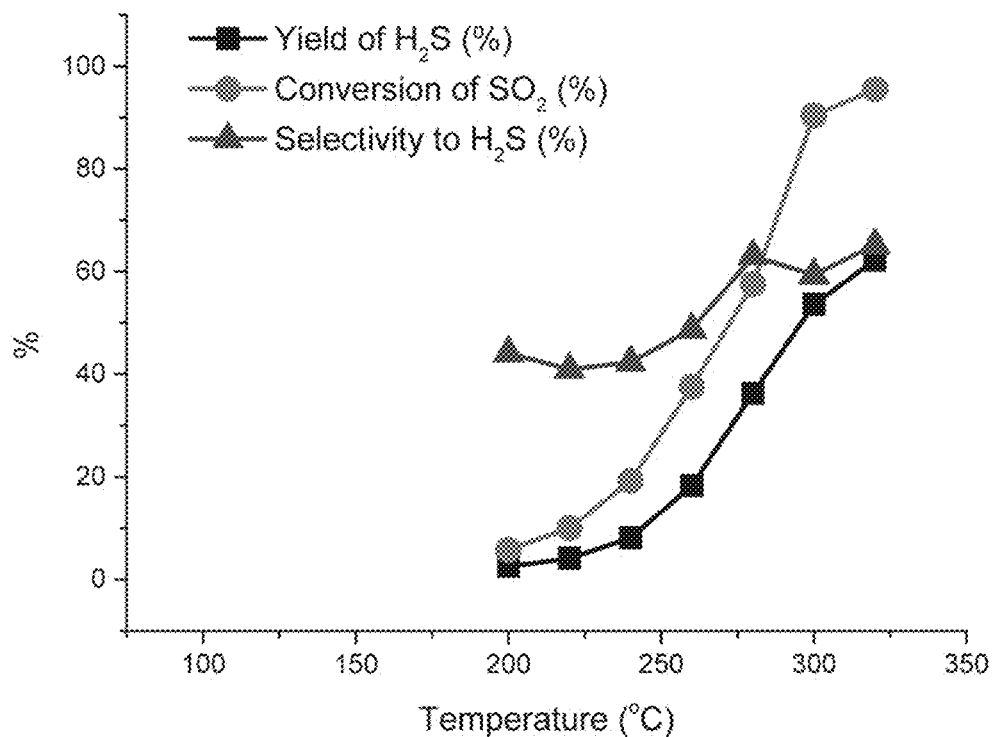

The particles were examined under TEM and subjected to XRD. The $SO_2$ conversion, $H_2S$ yield, and $H_2S$ selectivity of the nanoparticles was also tested at various temperatures. A TEM image of the particles is shown in FIG. 22A, the XRD pattern is shown in FIG. 22B, and the conversion, yield, and selectivity testing results are shown in graph form in FIG. 22C.

Sample 20

Under a $N_2$ atmosphere, 1 mmol of nickel precursor $Ni(acac)_2$ and 1 mmol cobalt precursor $Co(acac)_2$ were dissolved in a mixture of 10 mL of OA and 5 mL of TOP. The reaction mixture was subjected to magnetic stirring for 10 min at 80° C. and then stirred at a temperature of 350° C. for another 2 hours. After cooling to room temperature, black particles were precipitated by the addition of ethanol and subsequently centrifuged for 10 min at 4,500 rpm. The supernatant was discarded, thereby separating the black nanoparticles from the solution. To remove any excess surfactants, the nanoparticles were then washed three times by dispersion in hexane followed by precipitation with ethanol and isolation by centrifugation. Finally, the resulting nanoparticles were dried at room temperature.

Figure 23A:
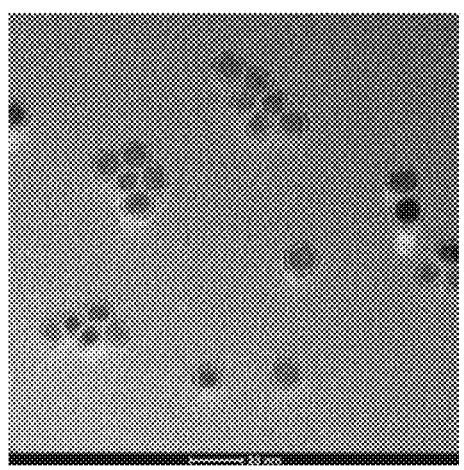
FIGS. 23A-23C illustrate (a) a TEM image of the nanoparticle material designated as Sample 20, (b) an XRD pattern of that nanoparticle material, and (c) a graph of $H_2S$ yield, conversion, and selectivity curves as a function of temperature for that nanoparticle material, according to one or more embodiments of the invention.
Figure 23B:
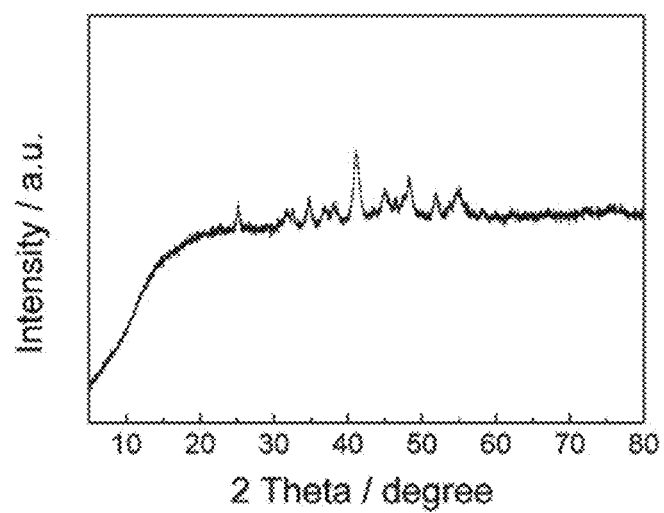
Figure 23C:
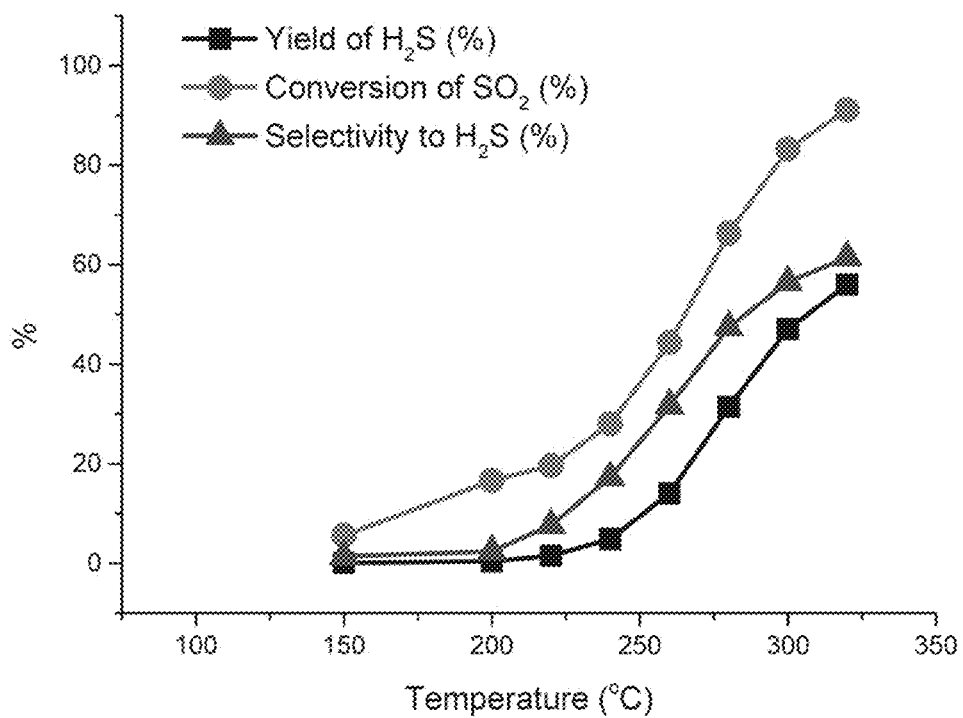

The particles were examined under TEM and subjected to XRD. The $SO_2$ conversion, $H_2S$ yield, and $H_2S$ selectivity of the nanoparticles was also tested at various temperatures. A TEM image of the particles is shown in FIG. 23A, the XRD pattern is shown in FIG. 23B, and the conversion, yield, and selectivity testing results are shown in graph form in FIG. 23C.

Sample 21

Under a $N_2$ atmosphere, 1 mmol of nickel precursor $Ni(acac)_2$ and 1 mmol of molybdenum precursor $(NH_4)_6Mo_7O_{24} \cdot 4H_2O$ (99.98%, available from Millipore Sigma) were dissolved in a mixture of 10 mL of OA and 5 mL of TOP. The reaction mixture was subjected to magnetic stirring for 10 min at 80° C. and then stirred at a temperature of 350° C. for another 2 hours. After cooling to room temperature, black particles were precipitated by the addition of ethanol and subsequently centrifuged for 10 min at 4,500 rpm. The supernatant was discarded, thereby separating the black nanoparticles from the solution. To remove any excess surfactants, the nanoparticles were then washed three times by dispersion in hexane followed by precipitation with ethanol and isolation by centrifugation. Finally, the resulting nanoparticles were dried at room temperature.

Figure 24A:
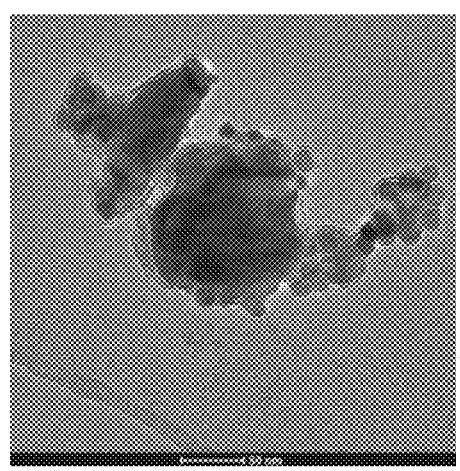
FIGS. 24A-24C illustrate (a) a TEM image of the nanoparticle material designated as Sample 21, (b) an XRD pattern of that nanoparticle material, and (c) a graph of $H_2S$ yield, conversion, and selectivity curves as a function of temperature for that nanoparticle material, according to one or more embodiments of the invention.
Figure 24B:
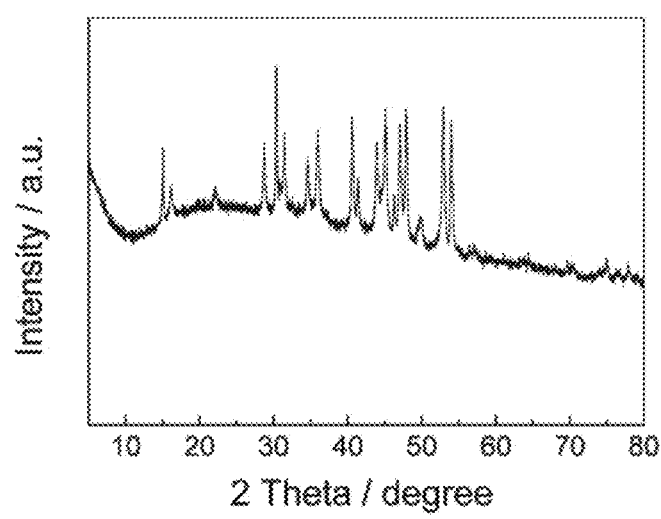
Figure 24C:
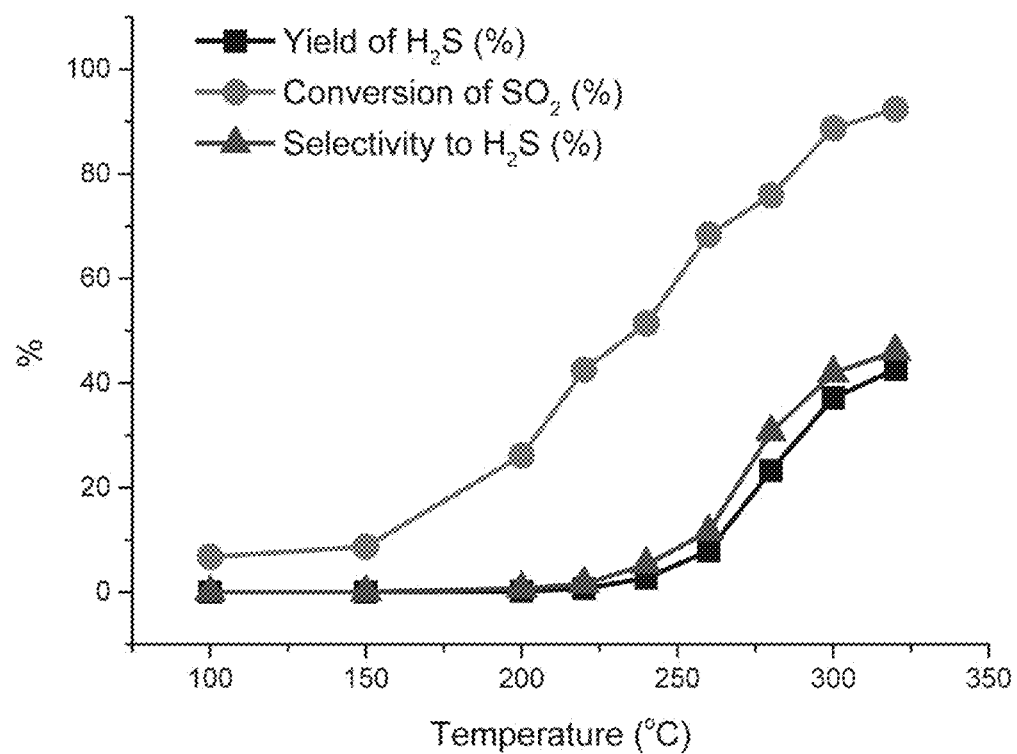

The particles were examined under TEM and subjected to XRD. The $SO_2$ conversion, $H_2S$ yield, and $H_2S$ selectivity of the nanoparticles was also tested at various temperatures. A TEM image of the particles is shown in FIG. 24A, the XRD pattern is shown in FIG. 24B, and the conversion, yield, and selectivity testing results are shown in graph form in FIG. 24C.

Sample 22

Under a $N_2$ atmosphere, 1 mmol of nickel precursor $Ni(acac)_2$ and 1 mmol of iron precursor $Fe(acac)_3$ (≥97%, available from Millipore Sigma) were dissolved in a mixture of 10 mL of OA and 5 mL of TOP. The reaction mixture was subjected to magnetic stirring for 10 min at 80° C. and then stirred at a temperature of 350° C. for another 2 hours. After cooling to room temperature, black particles were precipitated by the addition of ethanol and subsequently centrifuged for 10 min at 4,500 rpm. The supernatant was discarded, thereby separating the black nanoparticles from the solution. To remove any excess surfactants, the nanoparticles were then washed three times by dispersion in hexane followed by precipitation with ethanol and isolation by centrifugation. Finally, the resulting nanoparticles were dried at room temperature.

Figure 25A:
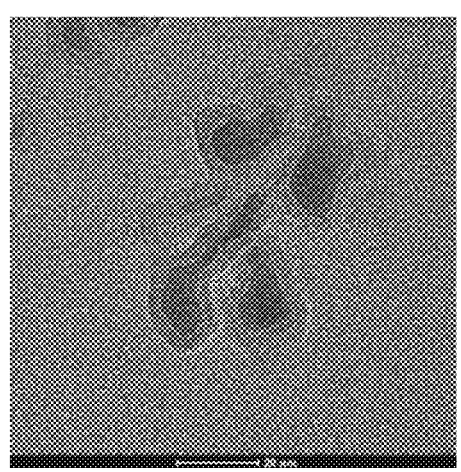
FIGS. 25A-25C illustrate (a) a TEM image of the nanoparticle material designated as Sample 22, (b) an XRD pattern of that nanoparticle material, and (c) a graph of $H_2S$ yield, conversion, and selectivity curves as a function of temperature for that nanoparticle material, according to one or more embodiments of the invention.
Figure 25B:
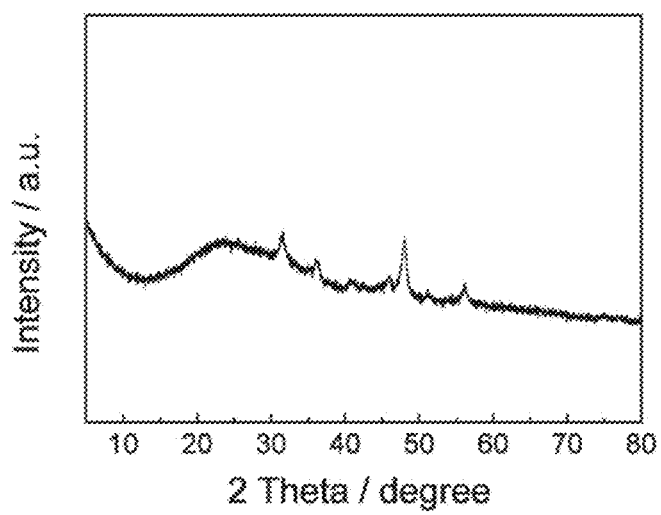
Figure 25C:
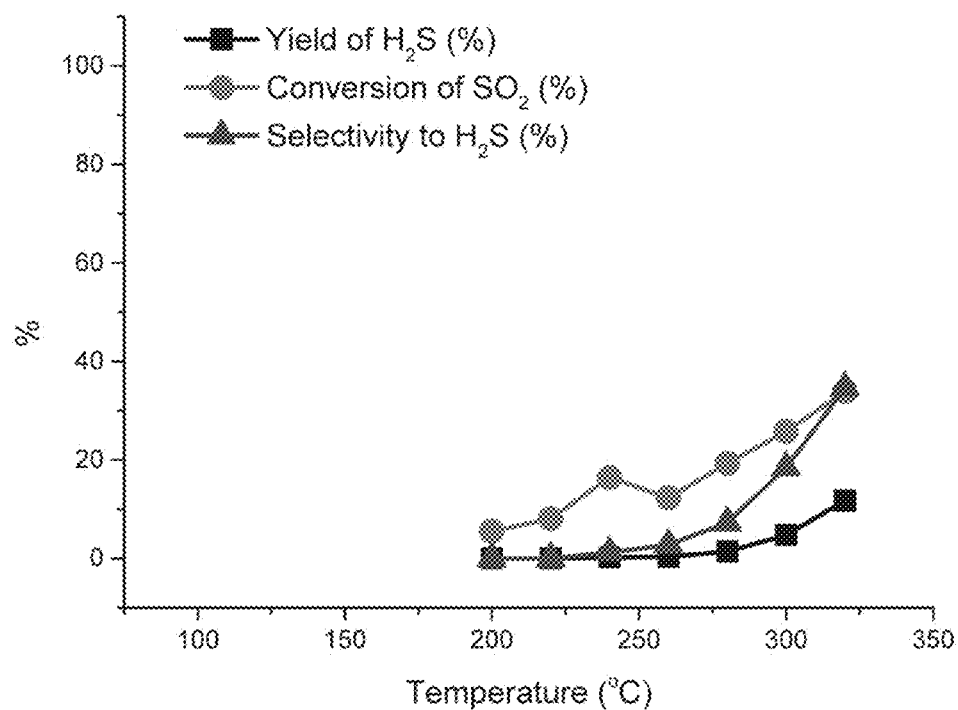

The particles were examined under TEM and subjected to XRD. The $SO_2$ conversion, $H_2S$ yield, and $H_2S$ selectivity of the nanoparticles was also tested at various temperatures. A TEM image of the particles is shown in FIG. 25A, the XRD pattern is shown in FIG. 25B, and the conversion, yield, and selectivity testing results are shown in graph form in FIG. 25C.

Sample 23

Under a $N_2$ atmosphere, 1 mmol of nickel precursor $Ni(acac)_2$ and 1 mmol of tungsten precursor $WCl_4$ (95%, available from Millipore Sigma) were dissolved in a mixture of 10 mL of OA and 5 mL of TOP. The reaction mixture was subjected to magnetic stirring for 10 min at 80° C. and then stirred at a temperature of 350° C. for another 2 hours. After cooling to room temperature, black particles were precipitated by the addition of ethanol and subsequently centrifuged for 10 min at 4,500 rpm. The supernatant was discarded, thereby separating the black nanoparticles from the solution. To remove any excess surfactants, the nanoparticles were then washed three times by dispersion in hexane followed by precipitation with ethanol and isolation by centrifugation. Finally, the resulting nanoparticles were dried at room temperature.

Figure 26A:
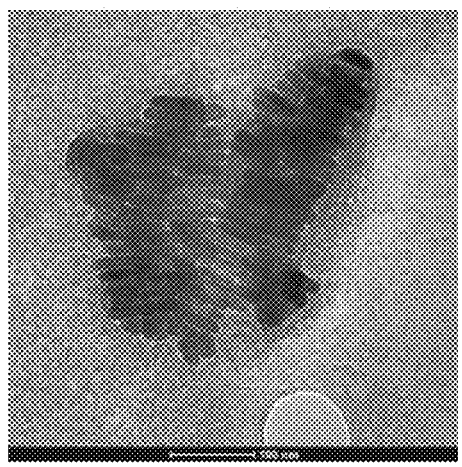
FIGS. 26A-26C illustrate (a) a TEM image of the nanoparticle material designated as Sample 23, (b) an XRD pattern of that nanoparticle material, and (c) a graph of $H_2S$ yield, conversion, and selectivity curves as a function of temperature for that nanoparticle material, according to one or more embodiments of the invention.
Figure 26B:
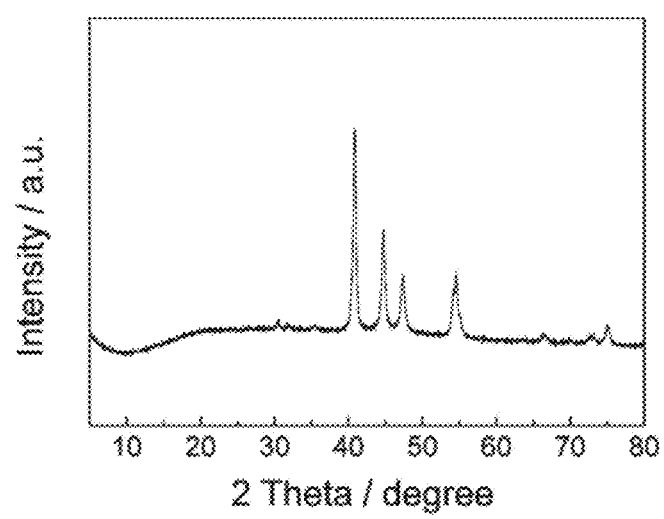
Figure 26C:
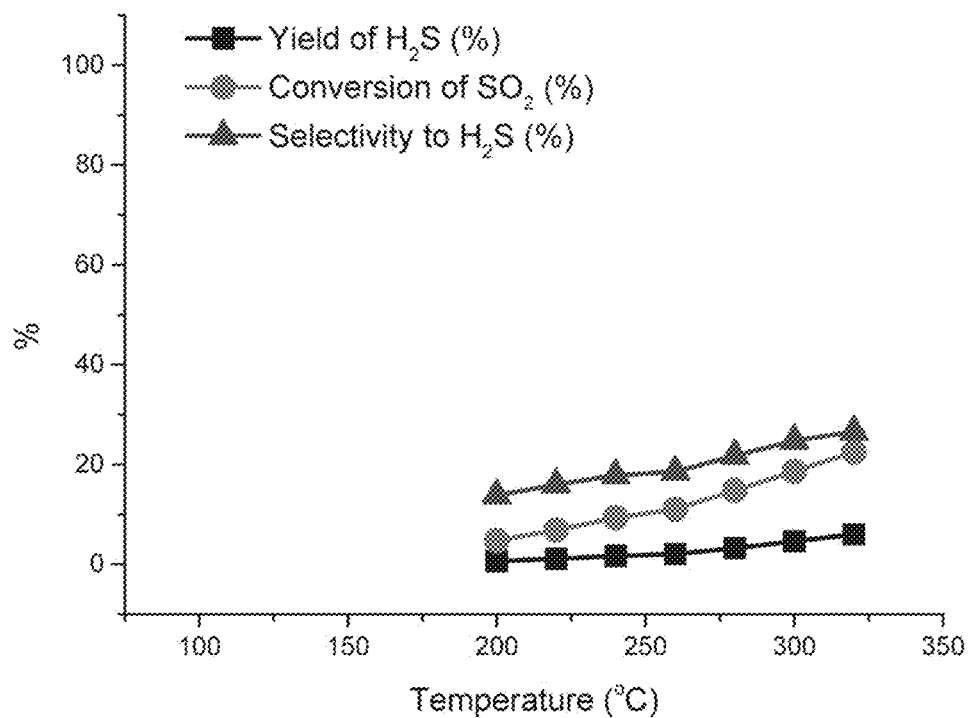

The particles were examined under TEM and subjected to XRD. The $SO_2$ conversion, $H_2S$ yield, and $H_2S$ selectivity of the nanoparticles was also tested at various temperatures. A TEM image of the particles is shown in FIG. 26A, the XRD pattern is shown in FIG. 26B, and the conversion, yield, and selectivity testing results are shown in graph form in FIG. 26C.

Sample 24

Under a $N_2$ atmosphere, 1 mmol of nickel precursor $Ni(acac)_2$ and 1 mmol of cobalt precursor $Co(acac)_2$, and 1 mmol of molybdenum precursor $((NH_4)_6Mo_7O_{24} \cdot 4H_2O)$ were dissolved in a mixture of 15 mL of OA and 7.5 mL of TOP. The reaction mixture was subjected to magnetic stirring for 10 min at 80° C. and then stirred at a temperature of 350° C. for another 2 hours. After cooling to room temperature, black particles were precipitated by the addition of ethanol and subsequently centrifuged for 10 min at 4,500 rpm. The supernatant was discarded, thereby separating the black nanoparticles from the solution. To remove any excess surfactants, the nanoparticles were then washed three times by dispersion in hexane followed by precipitation with ethanol and isolation by centrifugation. Finally, the resulting nanoparticles were dried at room temperature.

Figure 27A:
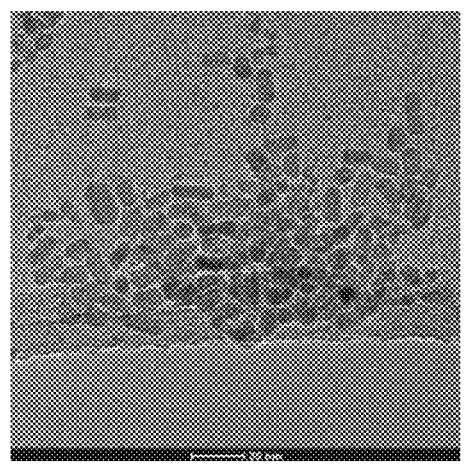
FIGS. 27A-27C illustrate (a) a TEM image of the nanoparticle material designated as Sample 24, (b) an XRD pattern of that nanoparticle material, and (c) a graph of $H_2S$ yield, conversion, and selectivity curves as a function of temperature for that nanoparticle material, according to one or more embodiments of the invention.
Figure 27B:
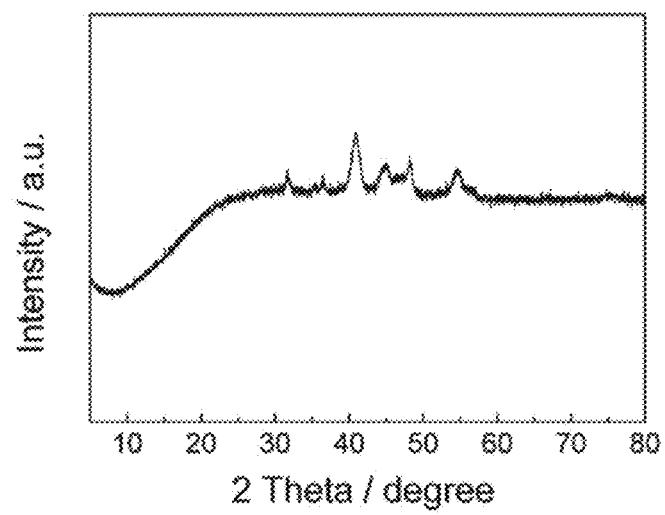
Figure 27C:
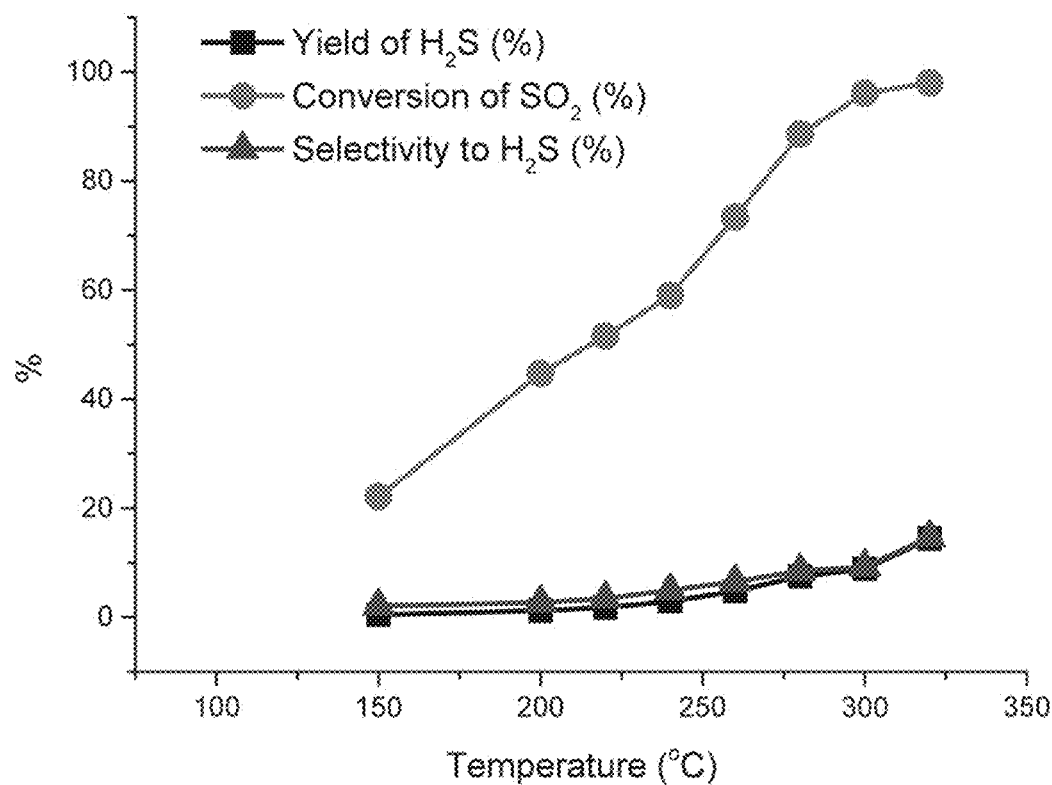

The particles were examined under TEM and subjected to XRD. The $SO_2$ conversion, $H_2S$ yield, and $H_2S$ selectivity of the nanoparticles was also tested at various temperatures. A TEM image of the particles is shown in FIG. 27A, the XRD pattern is shown in FIG. 27B, and the conversion, yield, and selectivity testing results are shown in graph form in FIG. 27C.

Sample 25

Under a $N_2$ atmosphere, 2 mmol of nickel precursor $Ni(acac)_2$ was dissolved in a mixture of 10 mL of OA and 5 mL of TOP. The reaction mixture was subjected to magnetic stirring for 10 min at 80° C. and then heated to a temperature of 230° C. for one hour. Another 5 mL of TOP was added to the mixture and the mixture stirred at 300° C. for another 2 hours. After cooling to room temperature, black particles were precipitated by the addition of ethanol and subsequently centrifuged for 10 min at 4,500 rpm. The supernatant was discarded, thereby separating the black nanoparticles from the solution. To remove any excess surfactants, the nanoparticles were then washed three times by dispersion in hexane followed by precipitation with ethanol and isolation by centrifugation. Finally, the resulting nanoparticles were dried at room temperature.

Figure 28A:
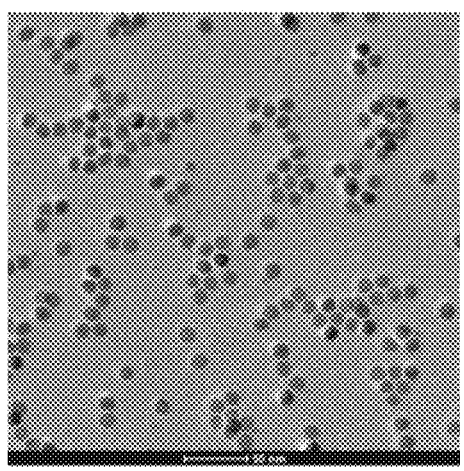
FIGS. 28A-28C illustrate (a) a TEM image of the nanoparticle material designated as Sample 25, (b) an XRD pattern of that nanoparticle material, and (c) a graph of $H_2S$ yield, conversion, and selectivity curves as a function of temperature for that nanoparticle material, according to one or more embodiments of the invention.
Figure 28B:
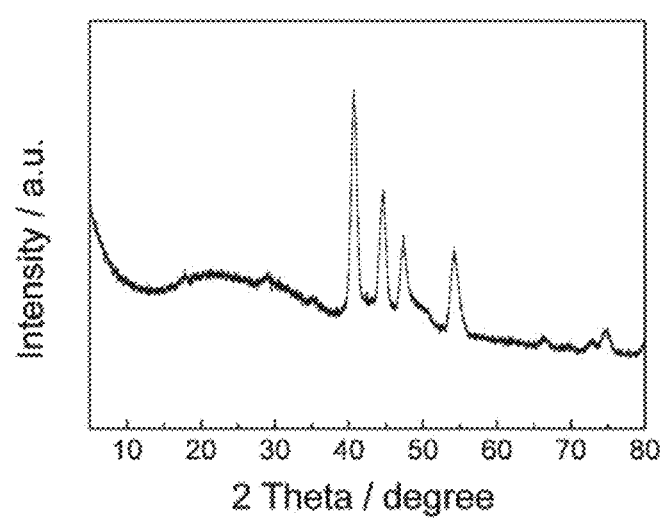
Figure 28C:
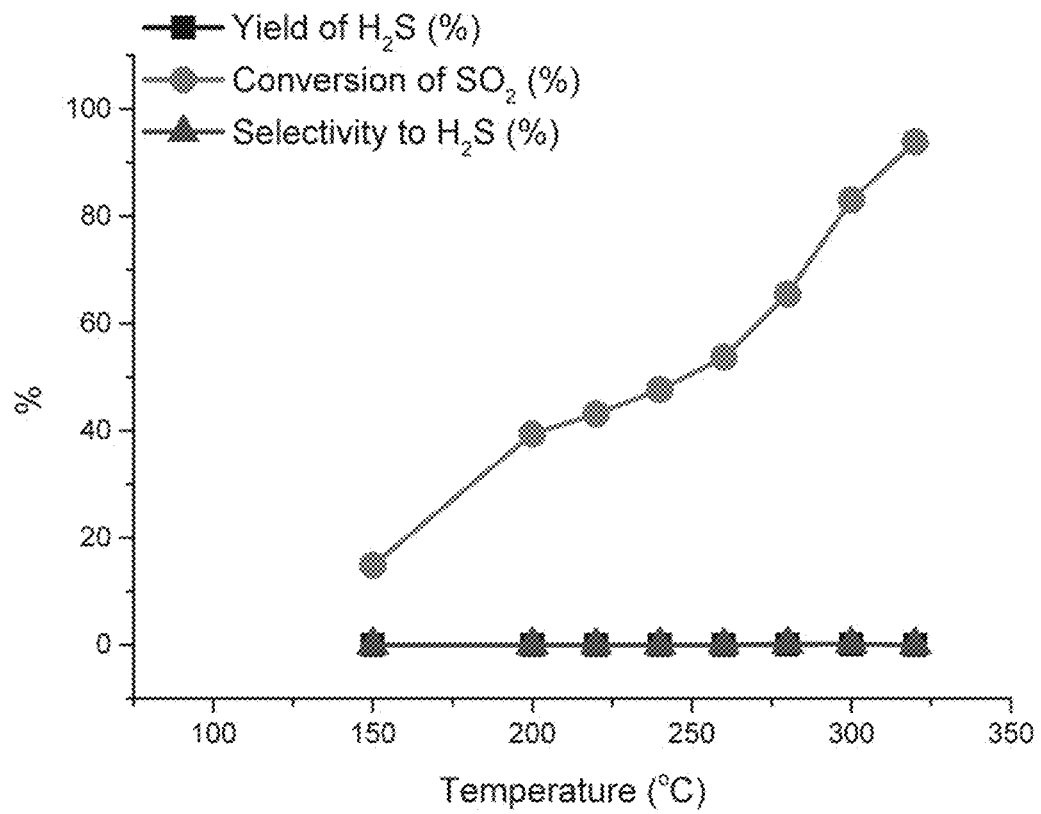

The particles were examined under TEM and subjected to XRD. The $SO_2$ conversion, $H_2S$ yield, and $H_2S$ selectivity of the nanoparticles was also tested at various temperatures. A TEM image of the particles is shown in FIG. 28A, the XRD pattern is shown in FIG. 28B, and the conversion, yield, and selectivity testing results are shown in graph form in FIG. 28C.

Sample 26

Under a $N_2$ atmosphere, 2 mmol of nickel precursor $Ni(acac)_2$ was dissolved in a mixture of 10 mL of OA and 5 mL of TOP. The reaction mixture was subjected to magnetic stirring for 10 min at 80° C. and then heated to a temperature of 230° C. for one hour. Another 5 mL of TOP was added to the mixture and the mixture stirred at 300° C. for another 8 hours. After cooling to room temperature, black particles were precipitated by the addition of ethanol and subsequently centrifuged for 10 min at 4,500 rpm. The supernatant was discarded, thereby separating the black nanoparticles from the solution. To remove any excess surfactants, the nanoparticles were then washed three times by dispersion in hexane followed by precipitation with ethanol and isolation by centrifugation. Finally, the resulting nanoparticles were dried at room temperature.

Figure 29A:
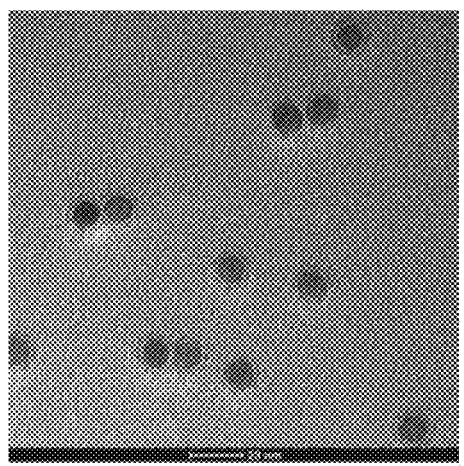
FIGS. 29A-29C illustrate (a) a TEM image of the nanoparticle material designated as Sample 26, (b) an XRD pattern of that nanoparticle material, and (c) a graph of $H_2S$ yield, conversion, and selectivity curves as a function of temperature for that nanoparticle material, according to one or more embodiments of the invention.
Figure 29B:
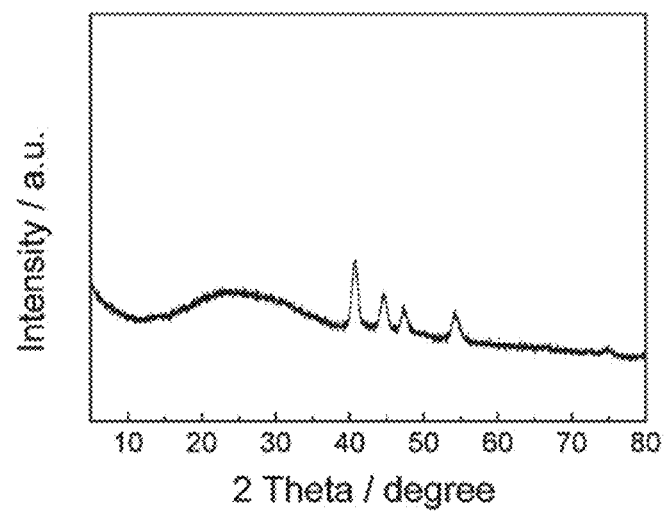
Figure 29C:
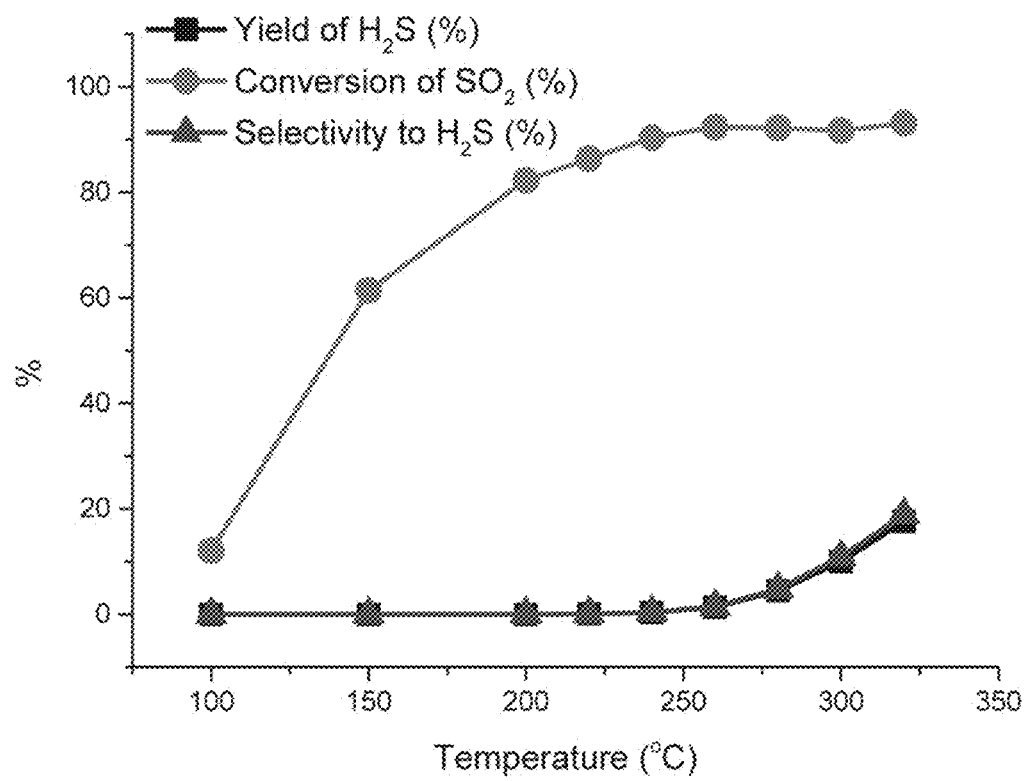

The particles were examined under TEM and subjected to XRD. The $SO_2$ conversion, $H_2S$ yield, and $H_2S$ selectivity of the nanoparticles was also tested at various temperatures. A TEM image of the particles is shown in FIG. 29A, the XRD pattern is shown in FIG. 29B, and the conversion, yield, and selectivity testing results are shown in graph form in FIG. 29C.

Sample 27

Under a $N_2$ atmosphere, 2 mmol of nickel precursor $Ni(acac)_2$ was dissolved in a mixture of 10 mL of OA and 5 mL of TOP. The reaction mixture was subjected to magnetic stirring for 10 min at 80° C. and then stirred for another 1 hour at 350° C. After cooling to room temperature, black particles were precipitated by the addition of ethanol and subsequently centrifuged for 10 min at 4,500 rpm. The supernatant was discarded, thereby separating the black nanoparticles from the solution. To remove any excess surfactants, the nanoparticles were then washed three times by dispersion in hexane followed by precipitation with ethanol and isolation by centrifugation. Finally, the resulting nanoparticles were dried at room temperature.

Figure 30A:
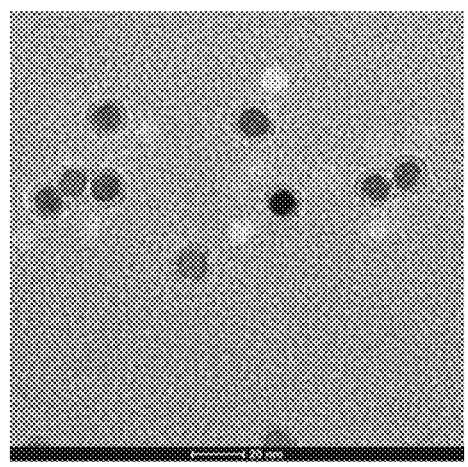
Figure 30B:
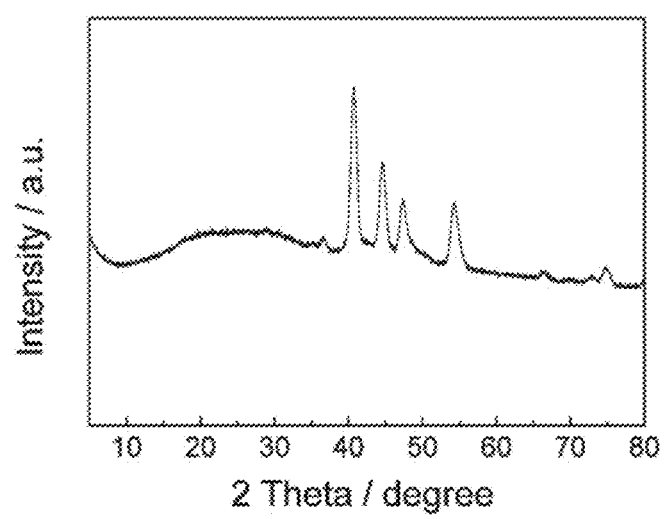

The particles were examined under TEM and subjected to XRD. The $SO_2$ conversion, $H_2S$ yield, and $H_2S$ selectivity of the nanoparticles was also tested at various temperatures. A TEM image of the particles is shown in FIG. 30A, the XRD pattern is shown in FIG. 30B, and the conversion, yield, and selectivity testing results are shown in graph form in FIG. 30C.

Sample 28

Under a $N_2$ atmosphere, 1 mmol of nickel precursor $Ni(acac)_2$ and 1 mmol of molybdenum precursor $Mo(CO)_6$ were dissolved in a mixture of 10 mL of OA and 5 mL of TOP. The reaction mixture was subjected to magnetic stirring for 10 min at 80° C. and then stirred for another 2 hours at 350° C. After cooling to room temperature, black particles were precipitated by the addition of ethanol and subsequently centrifuged for 10 min at 4,500 rpm. The supernatant was discarded, thereby separating the black nanoparticles from the solution. To remove any excess surfactants, the nanoparticles were then washed three times by dispersion in hexane followed by precipitation with ethanol and isolation by centrifugation. Finally, the resulting nanoparticles were dried at room temperature.

Figure 31C:
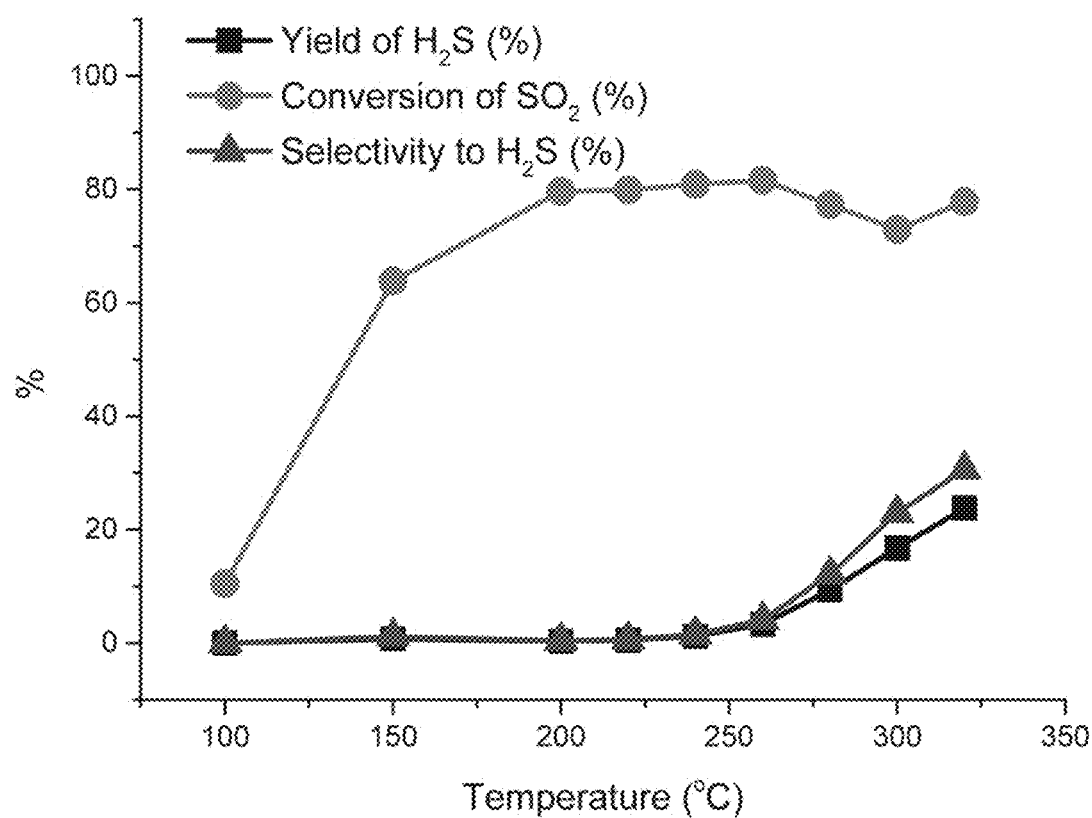

The particles were examined under TEM and subjected to XRD. The $SO_2$ conversion, $H_2S$ yield, and $H_2S$ selectivity of the nanoparticles was also tested at various temperatures. A TEM image of the particles is shown in FIG. 31A, the XRD pattern is shown in FIG. 31B, and the conversion, yield, and selectivity testing results are shown in graph form in FIG. 31C.

Sample 29

To prepare a $Na_2SiO_3$ solution, 32.0 g of sodium hydroxide was first dissolved in 800 mL of deionized water. Then 187 mL Ludox™ HS-40 colloidal silica (40 wt % in $H_2O$) was added and the mixture closely stirred at 40° C. overnight to produce a clear solution.

1.0 g CTAB and 1 mmol nickel precursor $Ni(acac)_2$ were dissolved in 35 mL of deionized water and closely stirred at a temperature of 60° C. for 1 hour until the surfactant was completely dissolved to form a clear viscous solution (the undissolved precipitate was isolated by centrifugation).

25 g of the $Na_2SiO_3$ solution was stirred at 60° C. for 1 hour and then the CTAB solution was added dropwise into the $Na_2SiO_3$ solution. The mixture was stirred vigorously at 60° C. for 1 hour and then stirred overnight at room temperature. A powder was then separated from the mixed solution by subjecting the solution to centrifugation for 10 min at 4500 rpm followed by removing the supernatant. To remove excess surfactants, the powder was washed three times by dispersion in $H_2O$, then washed two times by dispersion in ethanol, and then isolated by centrifugation. The solid was dried in an oven at 80° C. overnight to obtain about 1.5 g of a light green powder.

Under a $N_2$ atmosphere, 0.5 g of the light green powder was dissolved in a mixture of 10 mL of OA and 5 mL of TOP. The reaction mixture was subjected to magnetic stirring for 10 min at 80° C. followed by stirring at 300° C. for another 2 hours. After cooling to room temperature, a powder was precipitated by the addition of ethanol and subsequently centrifuged for 10 min at 4,500 rpm. The supernatant was discarded, thereby separating the nanoparticles from the solution. To remove any excess surfactants, the nanoparticles were then washed three times by dispersion in hexane followed by precipitation with ethanol and isolation by centrifugation. Finally, the resulting nanoparticles were dried in an 80° C. oven overnight.

Figure 32A:
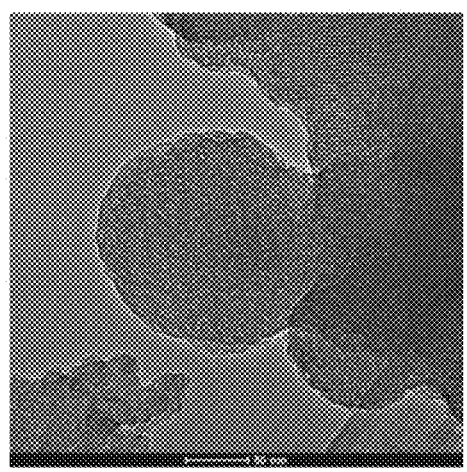
FIGS. 32A-32C illustrate (a) a TEM image of the nanoparticle material designated as Sample 29, (b) an XRD pattern of that nanoparticle material, and (c) a graph of $H_2S$ yield, conversion, and selectivity curves as a function of temperature for that nanoparticle material, according to one or more embodiments of the invention.
Figure 32B:
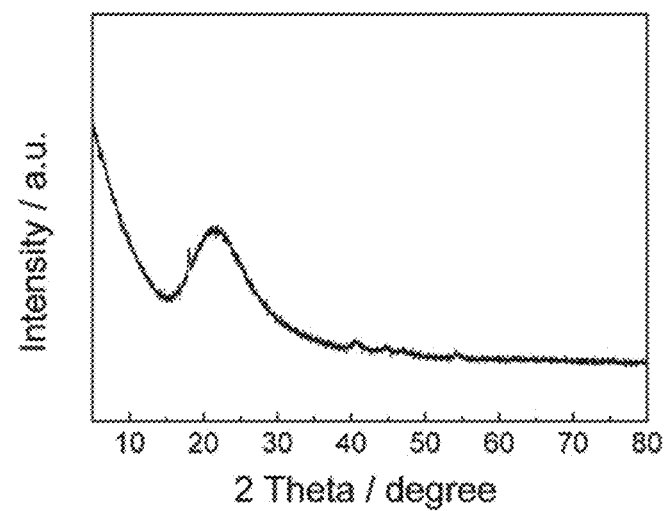
Figure 32C:
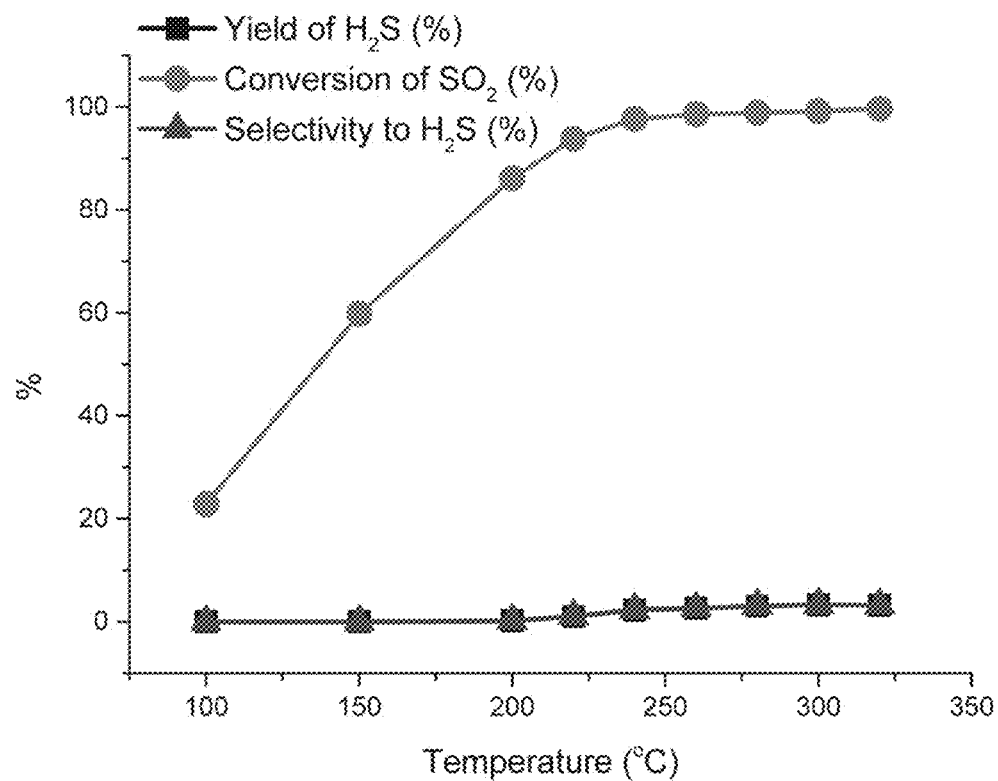

The particles were examined under TEM and subjected to XRD. The $SO_2$ conversion, $H_2S$ yield, and $H_2S$ selectivity of the nanoparticles was also tested at various temperatures. A TEM image of the particles is shown in FIG. 32A, the XRD pattern is shown in FIG. 32B, and the conversion, yield, and selectivity testing results are shown in graph form in FIG. 32C.

Sample 30

Under a $N_2$ atmosphere, 1 mmol of nickel precursor $Ni(acac)_2$ and 1 mmol of cobalt precursor $Co(acac)_2$ were dissolved in a mixture of 10 mL of OA and 2.5 mL of TOP. The reaction mixture was subjected to magnetic stirring for 10 min at 80° C. and then heated to a temperature of 230° C. for 1 hour. The mixture was then stirred at 300° C. for another 2 hours. After cooling to room temperature, black particles were precipitated by the addition of ethanol and subsequently centrifuged for 10 min at 4,500 rpm. The supernatant was discarded, thereby separating the black nanoparticles from the solution. To remove any excess surfactants, the nanoparticles were then washed three times by dispersion in hexane followed by precipitation with ethanol and isolation by centrifugation. Finally, the resulting nanoparticles were dried at room temperature.

Figure 33A:
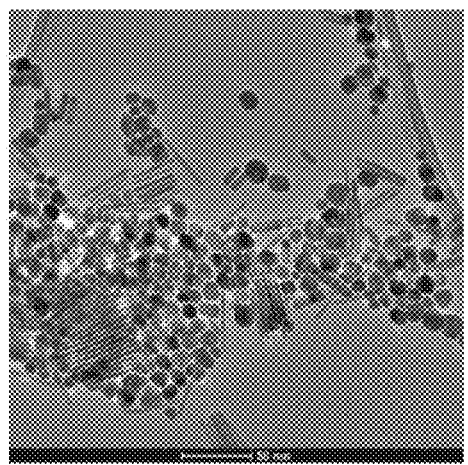
FIGS. 33A-33C illustrate (a) a TEM image of the nanoparticle material designated as Sample 30, (b) an XRD pattern of that nanoparticle material, and (c) a graph of $H_2S$ yield, conversion, and selectivity curves as a function of temperature for that nanoparticle material, according to one or more embodiments of the invention.
Figure 33B:
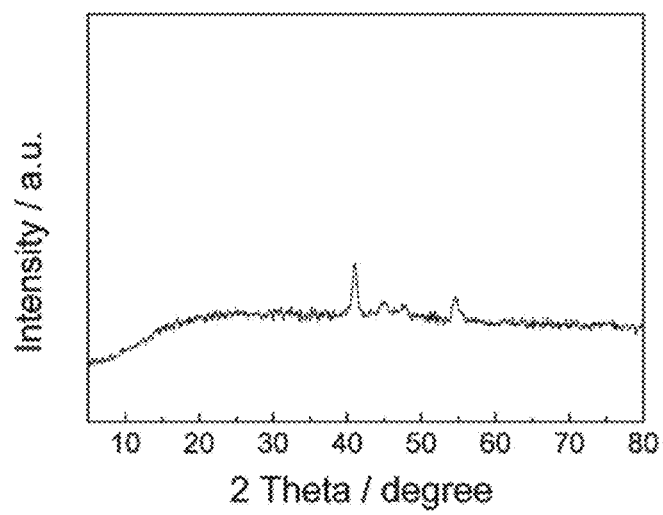
Figure 33C:
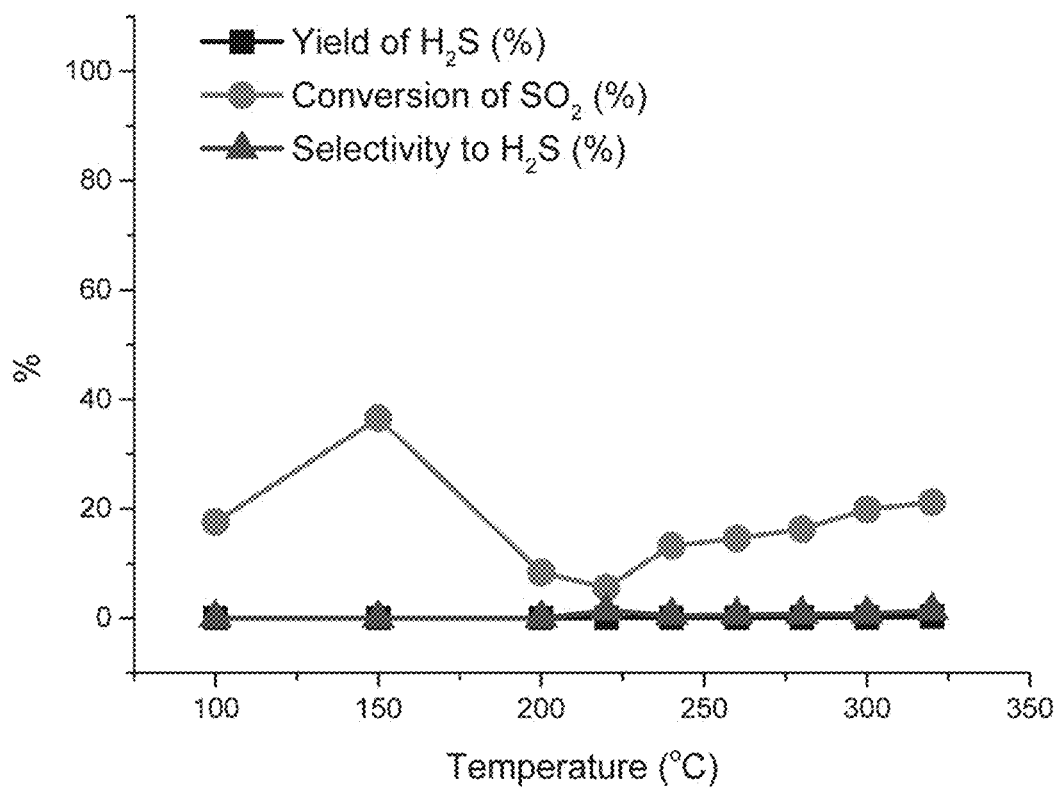

The particles were examined under TEM and subjected to XRD. The $SO_2$ conversion, $H_2S$ yield, and $H_2S$ selectivity of the nanoparticles was also tested at various temperatures. A TEM image of the particles is shown in FIG. 33A, the XRD pattern is shown in FIG. 33B, and the conversion, yield, and selectivity testing results are shown in graph form in FIG. 33C.

TABLE 6

The phase, size, morphology, and conversion of $SO_2$ and yield of $H_2S$ at 320° C. of various Samples described above in Example 3.

| Sample | Phase (XRD) | Size (TEM) | Morphology (TEM) | Conv. of $SO_2$ (@320° C.) | Yield of $H_2S$ (@320° C.) |
|---|---|---|---|---|---|
| 1 | $Ni_5P_4$ | 500-1000 nm | clusters | 80 | 78 |
| 2 | $Ni_2P + Ni_5P_4$ | 50 nm | hollow particles | 93 | 93 |
| 3 | $Ni_5P_4$ | 200 nm | particles | 48 | 36 |
| 4 | $Ni_5P_4$ | 100 nm | particles | 95 | 70 |
| 5 | $Ni_5P_4$ | 200 nm | particles | 56 | 31 |
| 6 | $Ni_5P_4$ | 50-500 nm | clusters | 5 | 3 |
| 7 | $Ni_5P_4$ | 100 nm | clusters | 18 | 14 |
| 8 | $Ni_2P + Ni_5P_4 + NiP_2$ | 700 nm | clusters | 71 | 46 |
| 9 | $Ni_5P_4 + NiP_2$ | 20-50 nm | particles | 87 | 63 |
| 10 | $Ni_2P + Ni_5P_4$ | 100 nm | hollow particles | 41 | 32 |
| 11 | $Ni_2P + Ni_5P_4 + NiP_2$ | 10 nm | particles@$SiO_2$ | 81 | 65 |
| 12 | $Ni_2P + Ni_5P_4 + NiP_2$ | 10 nm | particles@$SiO_2$ | 31 | 27 |
| 13 | $Ni_5P_4 + NiP_2$ | 10-100 nm | particles@$SiO_2$ | 9 | 4 |
| 14 | $Ni_2P + Ni_5P_4$ | <2 nm | invisible@$SiO_2$ | 97 | 24 |
| 15 | $Ni_2P + Ni_5P_4$ | <2 nm | invisible@$SiO_2$ | 94 | 35 |
| 16 | $Ni_2P + Ni_5P_4$ | <5 nm | particles@$SiO_2$ | 97 | 4 |
| 17 | $Ni_2P + Ni_5P_4$ | <5 nm | particles@$SiO_2$ | 85 | 3 |
| 18 | N/A | N/A | amorphous | 98 | 5 |
| 19 | CoP | 10 nm | particle + rod | 95 | 62 |
| 20 | $Ni_2P + CoP$ | 10 nm | particles | 91 | 56 |
| 21 | $Ni_5P_4$ | 10-1000 nm | clusters | 92 | 43 |
| 22 | $Ni_5P_2 + FeP_4$ | 10-20 nm | tadpole clove | 34 | 12 |
| 23 | $Ni_2P$ | 10-50 nm | rod | 22 | 6 |
| 24 | $Ni_2P + CoP + Co_2P$ | 10 nm | particles + rod | 98 | 14 |
| 25 | $Ni_2P$ | 10 nm | particles | 70 | 0 |
| 26 | $Ni_2P$ | 10 nm | particles | 93 | 18 |
| 27 | $Ni_2P$ | 10 nm | particles | 87 | 0 |

TABLE 6-continued

The phase, size, morphology, and conversion of $SO_2$ and yield of
$H_2S$ at 320° C. of various Samples described above in Example 3.

| Sample | Phase (XRD) | Size (TEM) | Morphology (TEM) | Conv. of $SO_2$ (@320° C.) | Yield of $H_2S$ (@320° C.) |
|---|---|---|---|---|---|
| 28 | $Ni_2P$ | 10 nm | particles | 78 | 24 |
| 29 | $Ni_2P$ | <2 nm | clusters | 100 | 3 |
| 30 | $Ni_2P + Co_2P$ | 10-30 nm | particles + rod | 21 | 0 |

TABLE 7

The phase and atomic ratio of Ni, P, and Si from EDX analysis
of various Samples described above in Example 3.

| | | Atomic Ratio | |
|---|---|---|---|
| Sample | Phase (XRD) | Ni/P | Ni/(Ni + Si) |
| 1 | $Ni_5P_4$ | 1.5 | 100% |
| 2 | $Ni_2P + Ni_5P_4$ | 1.8 | 100% |
| 3 | $Ni_5P_4$ | 1.7 | 100% |
| 4 | $Ni_5P_4$ | 1.4 | 100% |
| 5 | $Ni_5P_4$ | 1.5 | 100% |
| 6 | $Ni_5P_4$ | 1.6 | 100% |
| 7 | $Ni_5P_4$ | 1.7 | 100% |
| 8 | $Ni_2P + Ni_5P_4 + NiP_2$ | 1.3 | 100% |
| 9 | $Ni_5P_4 + NiP_2$ | 0.9 | 100% |
| 10 | $Ni_2P + Ni_5P_4$ | 1.3 | 100% |
| 11 | $Ni_2P + Ni_5P_4 + NiP_2$ | 1.3 | 28% |
| 12 | $Ni_2P + Ni_5P_4 + NiP_2$ | 1.3 | 84% |
| 13 | $Ni_5P_4 + NiP_2$ | 0.5 | 34% |
| 14 | $Ni_2P + Ni_5P_4$ | 0.6 | 5% |
| 15 | $Ni_2P + Ni_5P_4$ | 0.5 | 3% |
| 16 | $Ni_2P + Ni_5P_4$ | 0.9 | 6% |
| 17 | $Ni_2P + Ni_5P_4$ | 0.8 | 10% |
| 25 | $Ni_2P$ | 2.2 | 100% |
| 26 | $Ni_2P$ | 2.2 | 100% |
| 27 | $Ni_2P$ | 2 | 100% |
| 29 | $Ni_2P$ | 0.5 | 7% |

TABLE 8

The phase and atomic ratio of different elements from EDX analysis of
various Samples described above in Example 3.

| | | Atomic Ratio (%) | | | | | |
|---|---|---|---|---|---|---|---|
| Sample | Phase (XRD) | P | Ni | Co | Fe | Mo | W |
| 18 | N/A | 55 | | | | 45 | |
| 19 | CoP | 57 | | 43 | | | |
| 20 | $Ni_2P + CoP$ | 40 | 32 | 28 | | | |
| 21 | $Ni_5P_4$ | 41 | 45 | | | 14 | |
| 22 | $Ni_5P_2 + FeP_4$ | 49 | 26 | | 25 | | |
| 23 | $Ni_2P$ | 52 | 44 | | | | 4 |
| 24 | $Ni_2P + CoP + Co_2P$ | 50 | 23 | 19 | | 8 | |
| 28 | $Ni_2P$ | 51 | 43 | | | | 6 |
| 30 | $Ni_2P + Co_2P$ | 29 | 38 | 33 | | | |

Example 4

$Ni_2P$ Nanoparticles Embedded in Mesoporous $SiO_2$

This example demonstrates the synthesis and catalytic performance of a new class of nano-engineered catalysts encapsulated in a protective mesoporous silica whereby the P insertion step occurs within the mesoporous silica matrix. The Ni precursor is incorporated into the $SiO_2$ matrix simultaneously during the formation of the mesoporous $SiO_2$ framework and then the phosphorization step is conducted on the resulting composite material. The presence of the silica hinders the aggregation or uneven distribution of Ni precursor on the $SiO_2$ surface. Moreover, the mesoporous channels in $SiO_2$ provide a limited space, which facilitates the formation of ultrafine $Ni_2P$ nano crystals while preventing crystal growth during the phase transformation from Ni to $Ni_2P$. The mesoporous $SiO_2$ confined ultrafine $Ni_2P$ nano clusters, demonstrate herein a superior catalytic performance, especially by the sub-2 nm particle, when compared to the 11 nm $Ni_2P$ nano particles and the commercial $Ni_2P$ catalyst, thereby achieving higher conversions and selectivity at lower temperatures.

Catalytic Synthesis

Figure 47:
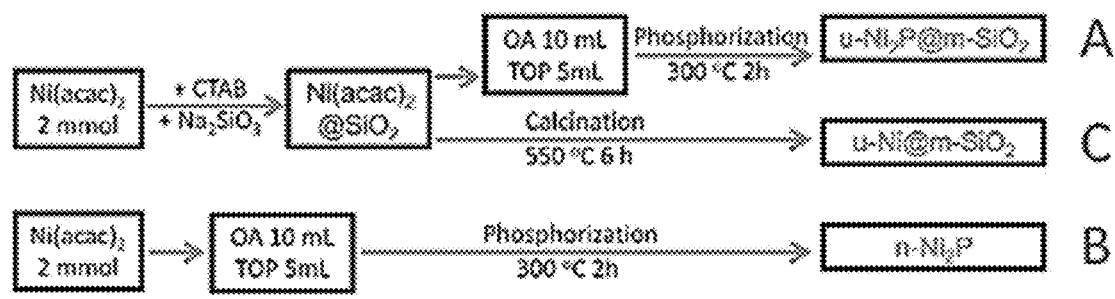
FIG. 47 illustrates flow charts showing some aspects of methodologies of the present invention.

FIG. 47 illustrates the catalysts synthesis methodology which is based on the $SiO_2$ confinement process and the phosphorization process. A summary of the methods used in all samples is shown in Table 9 below.

Catalytic Synthesis—Ni Precursor Confined in Mesoporous $SiO_2$ 32 g sodium hydroxide was dissolved in 800 mL deionized water, then 187 mL Ludox (40 wt. %) was added into the above NaOH solution and stirred at 40° C. overnight (until clear) to prepare the $Na_2SiO_3$ solution. Following, 1.0 g CTAB and 1 mmol nickel precursor ($Ni(acac)_2$) were dissolved in 35 mL deionized water and slowly stirred at 60° C. for 1 hour until the surfactant was dissolved completely to form a clear viscous solution (the precipitate was isolated by centrifugation). At the same time, 25 g of the above $Na_2SiO_3$ solution was stirred at 60° C. for 1 hour. Then the CTAB solution was added into the $Na_2SiO_3$ solution. After 1 hour of vigorous stirring at 60° C., this mixture was stirred at room temperature overnight. The powder was precipitated by centrifugation for 10 min at 4500 rpm. To remove the excess of surfactants, the obtained powder was washed three times by dispersion in $H_2O$, then two times by dispersion in ethanol and finally separated by centrifugation. The solid was dried at 80° C. overnight to obtain a light green powder, corresponding to Ni precursor confined in mesoporous $SiO_2$.

Catalytic Synthesis—Phosphorization

In a $N_2$ atmosphere, 2 mmol nickel precursor ($Ni(acac)_2$) or 0.5 g Ni confined in $SiO_2$ was first dissolved/dispersed in 10 mL OA and 5 mL TOP in a 100 mL volume three-necked round-bottom flask (installed with a condenser for the reflux and a thermocouple for the temperature control). The reaction mixture was stirred for 10 min at 80° C., followed by stirring at 300° C. for another 2 hours. All the above operations were carried out in a fume hood to minimize the hazards arising from the chemical nature of the reactants used (e.g. the serious poisoning and damage to the skin and eyes caused by the TOP and its vapour, and the skin irritation that can be caused by OA). After cooling to room temperature, a powder was precipitated by addition of ethanol and subsequently centrifuged for 10 min at 4500 rpm. To remove the excess surfactants, the obtained solid was washed three times by dispersion in hexane, then precipitated with ethanol and isolated by centrifugation. Finally, the resulting black powder was dried overnight.

u-Ni$_2$P@m-SiO$_2$ (Mesoporous SiO$_2$ Confined Ultrafine Ni$_2$P Nano Clusters, Methodology "A" of FIG. 47)

1 mmol nickel precursor (Ni(acac)$_2$) was confined in mesoporous SiO$_2$ to get about 1.5 g light green powder. Then 0.5 g of the obtained light green powder was treated using the phosphorization process shown in methodology "A" of FIG. 47. Finally, the resulting black powder was dried in an oven at 80° C. overnight.

n-Ni$_2$P (11 Nm Ni$_2$P Nano Particles, Methodology "B" of Figure 47)

In a N$_2$ atmosphere, 2 mmol nickel precursor (Ni(acac)$_2$) was treated following the phosphorization process shown in methodology "B" of FIG. 47. Finally, resulting nanoparticles were dried at room temperature on a glass plate.

u-Ni@m-SiO$_2$ (Mesoporous SiO$_2$ Confined Ultrafine Ni Precursor, Methodology "C" of Figure 47)

1 mmol nickel precursor (Ni(acac)$_2$) was confined in mesoporous SiO$_2$ to get about 1.5 g light green powder. Then 0.5 g obtained green powder was calcined in air at 550° C. for 6 hours (with a 2° C./min heating rate).

c-Ni$_2$P (Commercial Ni$_2$P Powder)

The commercial Ni$_2$P from Sigma-Aldrich was directly used without any further treatment.

Characterization

The XRD patterns of the fresh catalysts and the spent catalyst (in the presence of quartz) were collected with a Panalytical X'Pert PRO powder diffractometer using Cu-Ka radiation ($\lambda$=1.5406 Å) operated at 40 mA and 40 kV. The mean particle size and morphology of the fresh catalysts and the spent catalysts (with quartz) were determined using high-resolution transmission electron microscopy HR-TEM (FEI Tecnai, 200 kV), the area for image capture were selected to avoid the quartz particles. Additionally, selected HR-TEM studies were carried out over some of the herein catalysts using Titan 80-300 ST electron microscope, operated at 300 kV. The microscope was equipped with a spherical aberration (Cs) corrector for the image (CEOS CETCOR), and an energy filter (model GIF Quantum 963, Gatan, Inc.). However, nanoscale elemental mapping was carried out using scanning TEM, STEM-EELS mode. The entire TEM data acquisition and post processing was done by utilizing Gatan Microscopy Suite (GMS, version 3.2). Elemental analysis was also conducted in FEI Quanta 250 FEG scanning microscope. The electron source of this instrument is a Schottky field emission gun, possessing a spatial resolution of approximately 1 nm at 30 kV (SE) and 3.0 nm at 1 kV (SE). Elemental analysis was conducted using an equipped Apollo silicon drift detector (SDD) integrated with the EDAX Genesis software, the fresh catalysts were tested directly, and the spent catalysts were prepared with the powders where the quartz particles were removed as much as possible. Nitrogen adsorption-desorption isotherms of the fresh catalysts were carried out at 77 K using a 3Flex Micromeritics (Atlanta, USA) instrument. Samples (~90 mg, fresh) were pretreated at 130° C. in vacuum overnight for degassing before any measurements. UV-vis diffuse reflection spectra were measured by a VARIAN CARY 5000 uv-vis-nir spectrophotometer. The photoelectron spectra of the samples were recorded using a ESCALAB Thermo Scientific Theta Probe Angle-Resolved X-ray Photoelectron Spectrometer (East Grinstead, UK). The spectrometer is equipped with a monochromatic Al Ka X-ray source (hv=1486.6 eV). A pass energy of 300 eV was used to obtain the survey spectra, whereas the high-resolution core level spectra were acquired at a pass energy of 50 eV. The binding energy scale was calibrated (charge reference) by centering the C 1 s peak at 285.0 eV for all the spectra. The static $^{31}$P solid-state nuclear magnetic resonance (ssNMR) spectrum was collected at a magnetic Field of 9.4 T on a home-built broadband coherent NMR spectrometer using a home-built probe. For acquisition, a standard Hahn echo pulse sequence, with variation of frequency along the NMR line was employed, with a 90° excitation pulse of 3.5 s, corresponding to rf field of 71.4 kHz. NMR shifts were referenced to H$_3$PO$_4$ 85 wt % at 0 ppm.

Catalytic Assessment: Reaction Metrics

SO$_2$ hydrogenation experiments were conducted at atmospheric pressure in a fixed bed U-shaped quartz reactor. A 40 mg catalyst mixed with 180 mg of quartz particles (125 to 250 µm) were placed in a quartz reaction tube having 4 mm internal diameter. The catalyst bed was initially pretreated for 1 hour at 100° C. by introducing a stream of Ar at 40 mL/min. Then, a feed gas consisting of 103 ppm SO$_2$ at 20 mL/min and a feed gas of 2% H$_2$ in N$_2$ at 20 mL/min was fed into the reactor (total feed gas at 40 ml/min, GHSV=~50000/h, WHSV=60000 mL/g/h), the reaction was run across the temperature range of 100-320° C. The effluent gas stream (reactants and reaction products) was analyzed using a Perkin Elmer Clarus 580 Gas Chromatograph and Model Arnel 4016 PPC Sulphur Chemiluminescence Detector (SCD).

For SO$_2$ catalytic measurements, while the experiments were done only once for each sample, the measurements of the experimental parameters were repeated as follows:

a. Flow measurements were repeated five times in each experiment.
b. Mass of sample measurements were repeated 3 times prior to each experiment.
c. At each experimental temperature, five measurements were made to compute the conversion.
d. Reference SO$_2$ areas used to determine SO$_2$/H$_2$S concentrations were measured 10 times per experiment.

Following, the standard errors computed from the repeated measurements were used to compute the expected error (standard deviation) in the SO$_2$ average rate and rate constant by the method of the propagation of uncertainty.

The conversion of SO$_2$ was calculated based on the peak area using the following Equation 10:

$$\text{Conversion of SO}_2 \ (\%) = \left(1 - \frac{(SO_2)_{out}}{(SO_2)_{in}}\right) \times 100 \quad \text{(Equation 10)}$$

where $(SO_2)_{in}$ is SO$_2$ molar flow rate in the feed gas (mol/s), $(SO_2)_{out}$ is SO$_2$ molar flow rate in the bed effluent (mol/s).

The selectivity to sulfur was calculated based on the peak area of H$_2$S and SO$_2$ using the following Equation 11:

$$\text{Selectivity of sulfur} \ (\%) = \left(1 - \frac{(H_2S)_{out}}{(SO_2)_{in} - (SO_2)_{out}}\right) \times 100 \quad \text{(Equation 11)}$$

where: $(SO_2)_{in}$ is SO$_2$ molar flow rate in the feed gas (mol/s), $(SO_2)_{out}$ is SO$_2$ molar flow rate in the bed effluent (mol/s), $(H_2S)_{out}$ is H$_2$S molar flow rate in the bed effluent (mol/s).

Catalytic Assessment: Kinetic Studies

The average reaction rate r (mol/s·g$_{active}$) was calculated based on the conversion of SO$_2$ using Equation 12:

$$r = \frac{n(SO_2)_c}{m_{active}} = \frac{(SO_2)_{in} \times (SO_2)_{conv}}{m_{active}} \quad \text{(Equation 12)}$$

where $m_{active}$ (g) is the mass of the catalyst active phase (e.g. $Ni_2P$).

The average rate constant k ($m^3$/s·g) was calculated based on the average rate of reaction, using the following Equation 13 derived for a PFR (plug flow reactor model) assuming r=k*concentration of $SO_2$ (the reaction rate is assumed to be first order in $SO_2$):

$$k = \frac{-1 \times (SO_2)_{in} \times \ln(1-(SO_2)_{conv})}{c(SO_2)_{in} \times m_{active}} \quad \text{(Equation 13)}$$

where c $(SO_2)_{in}$ is the concentration of $SO_2$ in the feed gas.

The activation energy of reaction was based on the average rate constant using the following Equation 14 derived from the Arrhenius expression:

$$\ln k = \ln A - \frac{E_a}{RT} \quad \text{(Equation 14)}$$

where: k ($m^3$/s·g) is the average rate constant, A is the pre-exponential factors, $E_a$ is the activation energy, R is the ideal gas constant which value is 8.314 J/(K·mol), T (K) is the reaction temperature. $E_a$ is derived from the slope of the ln k vs. 1/T linear plot (Arrhenius plot).

The turn over frequency (TOF, $s^1$) was calculated based on the average reaction rate using the following Equation 15:

$$TOF = r \times M_{active}(8) \quad \text{(Equation 15)}$$

where r is the average reaction rate, $M_{active}$ is the molar mass of $Ni_2P$ (148.361 g/mol) or Ni (58.693 g/mol).

Results—Structural Characterization

Figure 48:
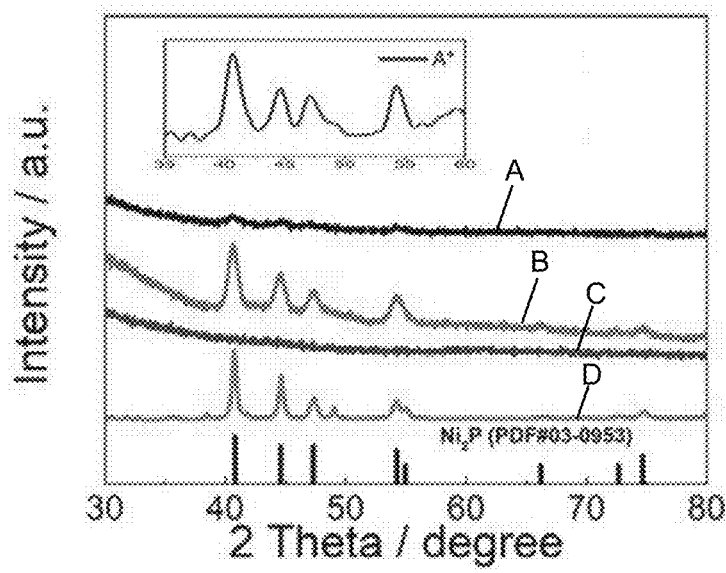
FIG. 48 illustrates XRD patterns for some catalysts of the present invention.

FIG. 48 shows the XRD patterns of the samples synthesized by the aforementioned methods. The peaks at 2θ of 40.6° (111), 44.5° (201), 47.1° (210), 54.2° (002/300) and 54.8° (211) correspond to the typical $Ni_2P$ characteristic peaks (PDF #03-0953). For n-$Ni_2P$ and c-$Ni_2P$ samples, the characteristic peaks of $Ni_2P$ phase can be observed. For u-Ni@m-$SiO_2$ sample, no obvious peaks of Ni/NiO phases can be observed from XRD, as the Ni was highly dispersed in the $SiO_2$ matrix. The absence of any Ni/NiO peak can be due to the low Ni loading amount or the presence of amorphous phase. By contrast, in the case of u-$Ni_2P$@m-$SiO_2$, the XRD pattern, after 10 times signal enhancement, display the $Ni_2P$ characteristic peaks. This suggests that the Ni precursor has undergone complete phase transformation to $Ni_2P$, and due to the confinement effect of the mesoporous $SiO_2$ matrix skeleton, the $Ni_2P$ crystallites preserved their small size.

Figure 49A:
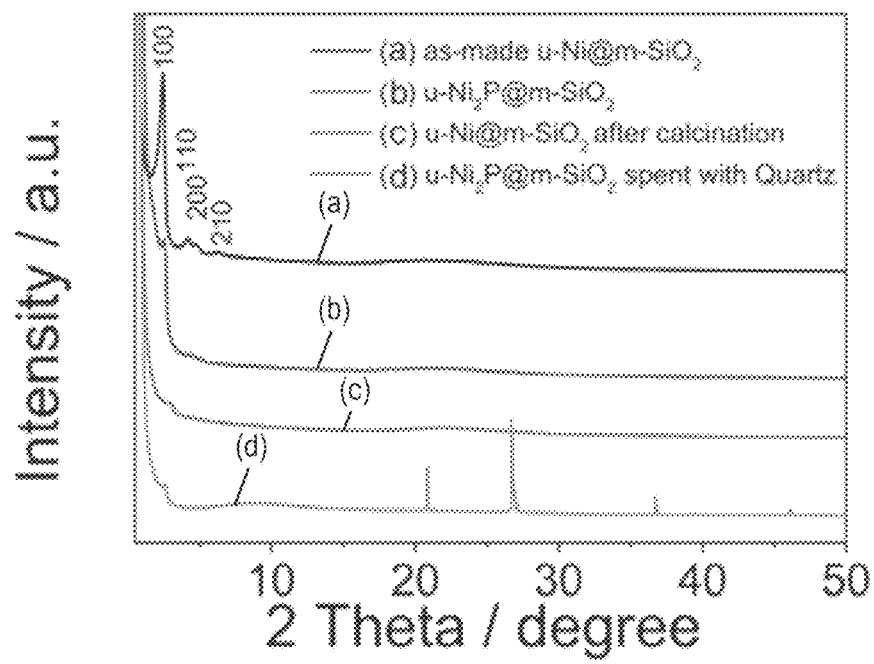
FIGS. 49A-49B illustrate XRD patterns for some catalysts of the present invention.
Figure 49B:
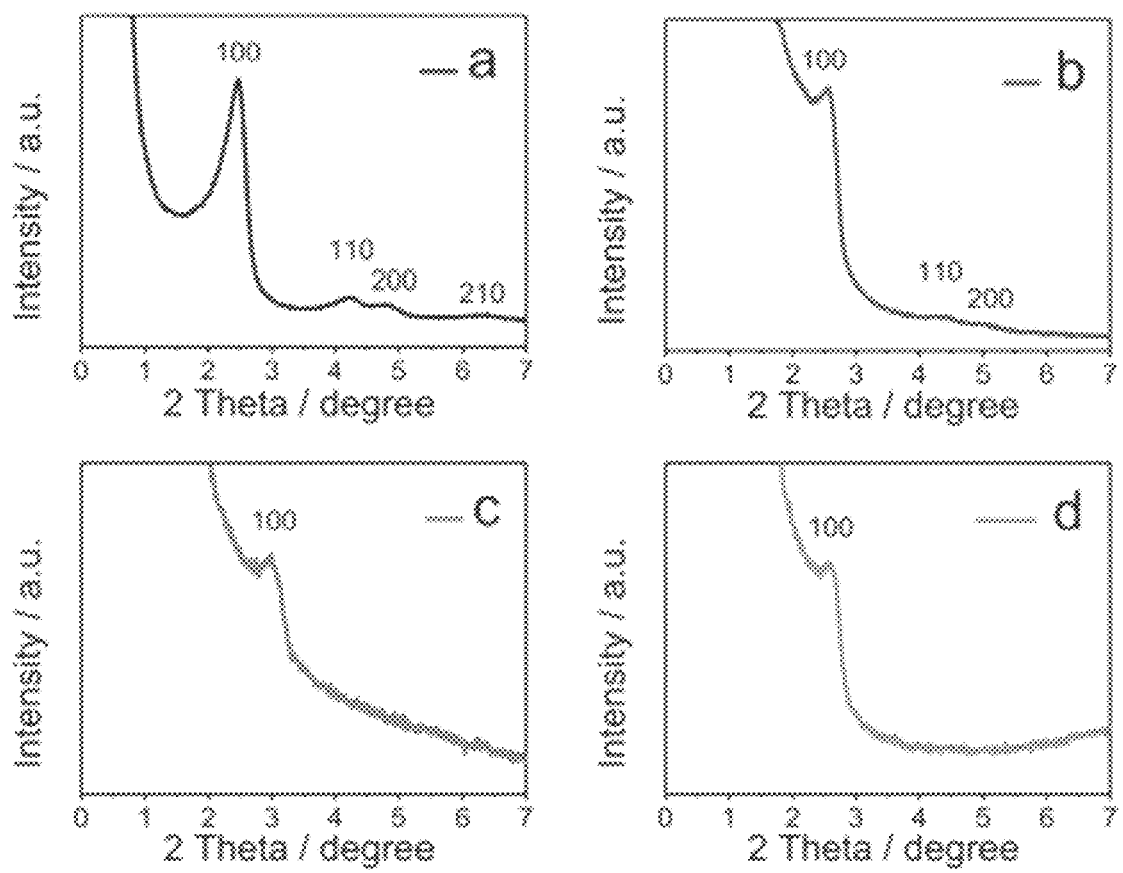

Low-angle XRD was performed to study the mesoporous silica structure, and the patterns are shown in FIGS. 49A and 49B. FIG. 49A illustrates patterns for u-Ni@m-$SiO_2$ before and after calcination and u-$Ni_2P$@m-$SiO_2$ before and after performance testing. FIG. 49B is a magnified low-angle XRD pattern for the same samples as in FIG. 49A. The low-angle XRD patterns of the as-made u-Ni@m-$SiO_2$ (Ni precursor confined in mesoporous $SiO_2$) displays four characteristic peaks at 2.48°, 4.24°, 4.76° and 6.35°, corresponding to the (100), (110), (200), and (210) plane diffractions respectively and typical of the hexagonal structure (p6 mm symmetry) of MCM-41. After the phosphorization step, the intensity of peaks decreased (u-$Ni_2P$@m-$SiO_2$, peaks at 2.520 and 4.25°), which indicate that the $Ni_2P$ species were incorporated into the matrix of the mesoporous silica. The diffraction peaks were very weak for the u-Ni@m-$SiO_2$ after calcination (peaks at 2.50° and 4.24°) and the u-$Ni_2P$@m-$SiO_2$ after reaction (peaks at 2.530 and 4.25°, the strong peaks between 20°-50° come from the quartz). This is likely due to collapse of the hexagonal structure because the water vapor formed from the reaction influenced the formation and stability of the mesoporous silica structure negatively. As the MCM-41 porous structure was obtained in room temperature without any hydrothermal process in oven, the stability is not very high. A traditional hydrothermal synthesis in autoclaves using an oven can be introduced to improve the stability of the porous structure of this Ni precursor containing mesoporous $SiO_2$ matrix. The weak $Ni_2P$ peaks are not visible.

Figure 50A:
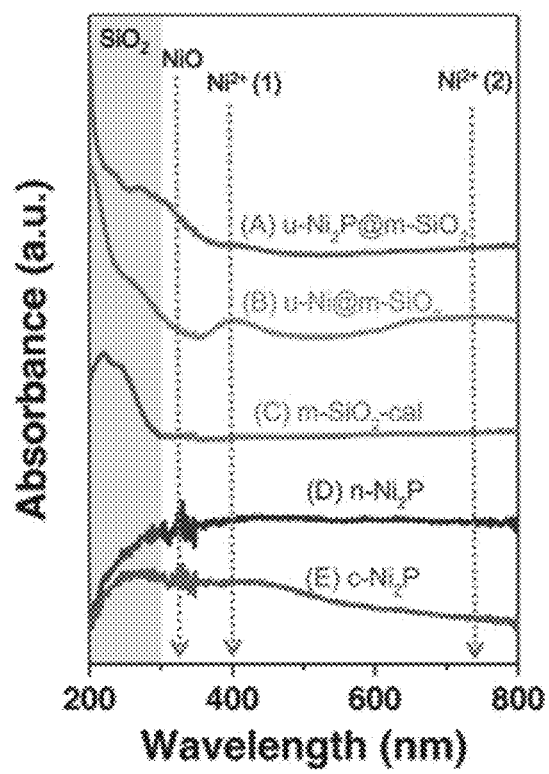
FIGS. 50A-50B illustrate UV-vis adsorption spectra for some catalysts of the present invention.
Figure 50B:
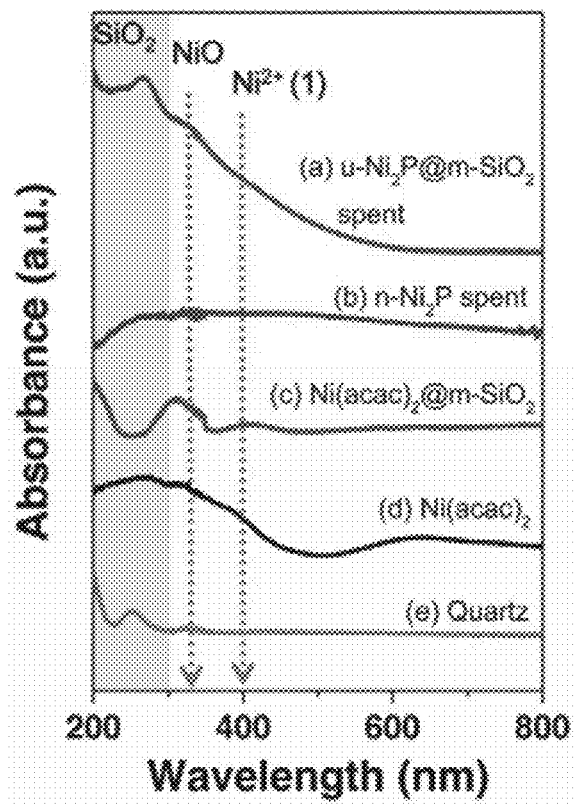

FIGS. 50A and 50B show the UV-vis adsorption spectra of the various samples. FIG. 50A shows the spectra of (A) u-$Ni_2P$@m-$SiO_2$ (invisible ultrafine $Ni_2P$ nano clusters confined in mesoporous $SiO_2$), (B) u-Ni@m-$SiO_2$ (Ni precursor confined in mesoporous $SiO_2$), (C) m-$SiO_2$-cal (calcined mesoporous $SiO_2$), (D) n-$Ni_2P$ (11 nm $Ni_2P$ nano particles), (E) c-$Ni_2P$ (commercial $Ni_2P$ powder). FIG. 50B shows the spectra of (a) u-$Ni_2P$@m-$SiO_2$ spent (invisible ultrafine $Ni_2P$ nano clusters confined in mesoporous $SiO_2$ with quartz after performance testing), (b) n-$Ni_2P$ spent (11 nm $Ni_2P$ nano particles with quartz after performance testing), (c) $Ni(acac)_2$@m-$SiO_2$ (Ni precursor confined in mesoporous $SiO_2$ before phosphorization), (d) $Ni(acac)_2$ (Ni precursor), and (e) quartz.

UV-Vis is used to probe the ligand-to-metal charge transfer (LMCT), which is highly sensitive to the coordination environment and the extent of aggregation. The coordination environment of the Ni and $Ni_2P$ incorporated into the mesoporous $SiO_2$ is of interest. The absorption bands between 200-300 nm are related to the mesoporous silica matrix. The absorption bands around 400 nm ($Ni^{2+}(1)$: $^3A_{2g} \rightarrow {^3T_{1g}}(P)$) and 740 nm ($Ni^{2+}(2)$: $^3A_{2g} \rightarrow {^3T_{1g}}(F)$) are related to the octahedral coordinated $Ni^{2+}$ in Ni and $Ni_2P$, whereas the bands of the $O^{2-}(2p) \rightarrow Ni^{2+}$ (3d) charge transfer in the NiO phase are in the 250~350 nm range. The NiO species could be attributed to the surface oxidation of u-$Ni_2P$@m-$SiO_2$ and u-Ni@m-$SiO_2$ after long storage in atmosphere. For the Ni phosphate, the presence of which has also been confirmed using XPS and ssNMR (as discussed further below) the 400-600 nm band as well as the band >700 nm can be assigned. These bands correspond to $Ni^{2+}$ species bound in an octahedral environment ($O_h$) in the phosphate structure. No meaningful bands for the $Ni_2P$ nano particles and commercial $Ni_2P$ in the displayed area (200-800 nm) were observed due to its narrow band gap. Also, comparing the UV-vis spectrum of the u-Ni@m-$SiO_2$ (FIG. 50A) with the one of $Ni(acac)_2$@m-$SiO_2$ (FIG. 50B) it can be seen that the former lacks the absorption band due to the strong Ni-acac ligand complexation (295 nm). This indicates that the thermal treatment applied (550° C., 6h) was efficient. The band at 295 nm is due to the interaction of $Ni^{2+}$ with the acac ligand rather than $Ni^{2+}$ with the $SiO_2$ matrix as the same peak is also prominent in the spectrum of the $Ni(acac)_2$ sample in the absence of silica (FIG. 50B).

Figure 51:
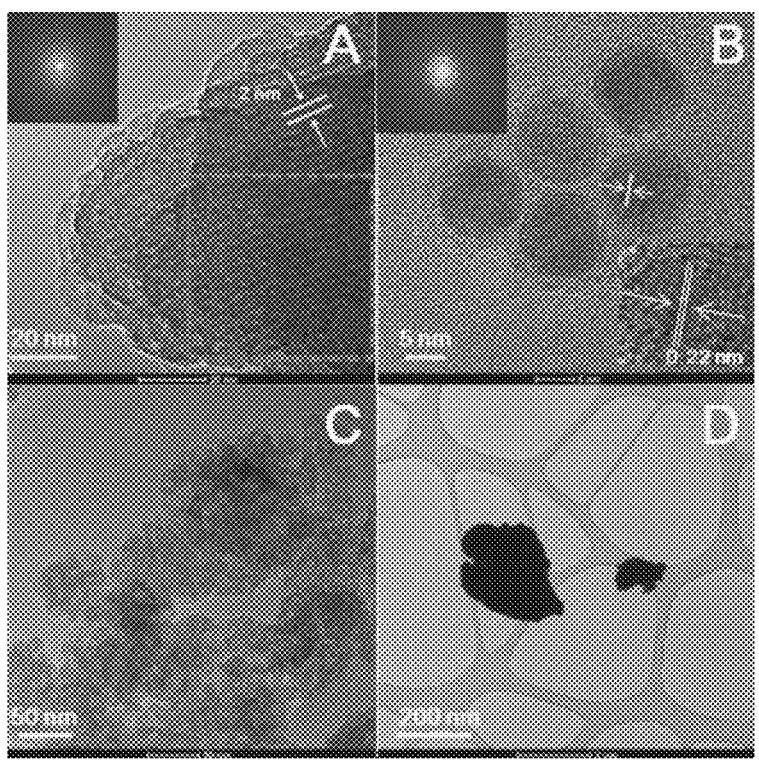
FIG. 51 illustrates TEM images for some catalysts of the present invention.

FIG. 51 shows the TEM images of the synthesized samples. Panel A in FIG. 51 is the image for u-$Ni_2P$@m-$SiO_2$ (invisible ultrafine $Ni_2P$ nano clusters confined in mesoporous $SiO_2$), panel B is the image for n-$Ni_2P$ (11 nm $Ni_2P$ nano particles), panel C is the image for u-Ni@m-$SiO_2$ (Ni precursor confined in mesoporous $SiO_2$), and panel D is the image for c-$Ni_2P$ (commercial $Ni_2P$ powder). The TEM image of n-$Ni_2P$ displays spherical particles possessing a diameter of about 11 nm and a lattice spacing of about 0.22 nm (consistent with the (111) plane of $Ni_2P$). The TEM images of u-Ni$_2$P@m-SiO$_2$ and u-Ni@m-SiO$_2$ samples show the typical structure of MCM-41 mesoporous SiO$_2$ skeleton. The ordered fingerprint 2D hexagonal honeycomb pores were clearly observed. The diameter of the pores is about 2-3 nm, whereas the wall thickness is about 1 nm. No separated particles can be observed from the TEM images of u-Ni$_2$P@m-SiO$_2$ and u-Ni@m-SiO$_2$ samples. This demonstrates the successful confinement of the Ni$_2$P nano clusters in the mesoporous SiO$_2$ matrix. The expected size of Ni$_2$P is <2 nm. For u-Ni@m-SiO$_2$ sample, the Ni precursor is well dispersed in the SiO$_2$ matrix as well. No sintering of Ni or NiO in u-Ni@m-SiO$_2$ occurred even after calcination. c-Ni$_2$P is comprised of irregular-shaped large particles of Ni$_2$P with diameter>1 μm.

Figure 52:
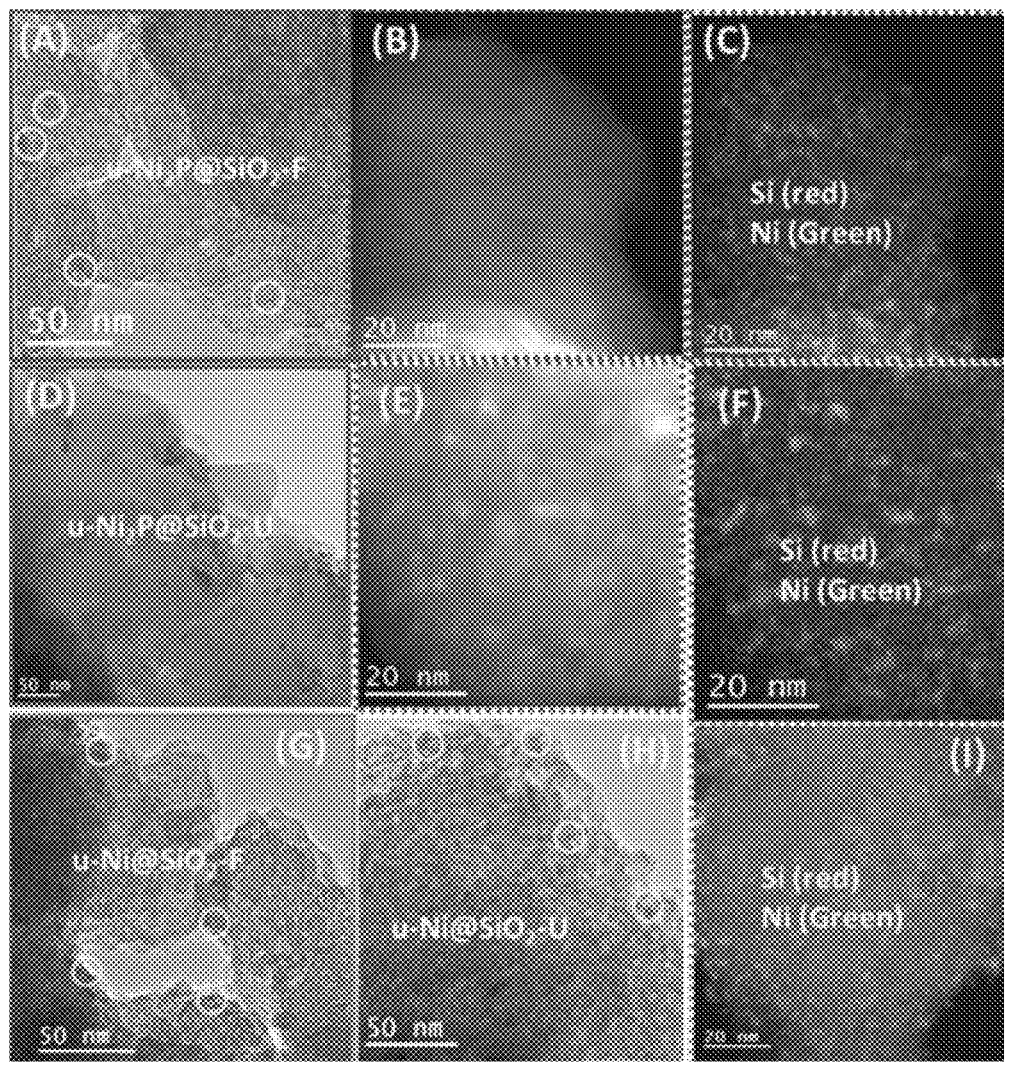
FIG. 52 illustrates STEM-HAADF/EDS mapping images for some catalysts of the present invention.

The highly dispersed ultrafine Ni$_2$P clusters were further studied using the STEM-HAADF/EDS mapping, which are shown in FIG. 52. Panels A-C of FIG. 52 illustrate the mapping for fresh (untested) u-Ni$_2$P@SiO$_2$, panels D-F illustrate the mapping for used (post-testing) u-Ni$_2$P@SiO$_2$, panels G and I illustrate the mapping for fresh u-Ni@SiO$_2$, and panel H illustrates the mapping for used u-Ni@SiO$_2$. The Ni$_2$P contrast on SiO$_2$ particles is low and the loading of Ni$_2$P is also very low (~5%). So, no reliable P maps could be acquired because its P-L edge (132 eV) was completely masked by the Si-L edge (99 eV). Ni-L23 edge (855 eV) was not overlapping with any other and it has white-lines in it as well. So, its maps were somewhat more reliable than the corresponding P maps. Briefly, the sintering of the Ni crystallites is observed following the reaction over the u-Ni$_2$P@SiO$_2$ (panel F), whereas this catalyst appears to be more sintering resistant compared to the u-Ni@SiO$_2$ one (panel C vs. panel I).

Figure 53:
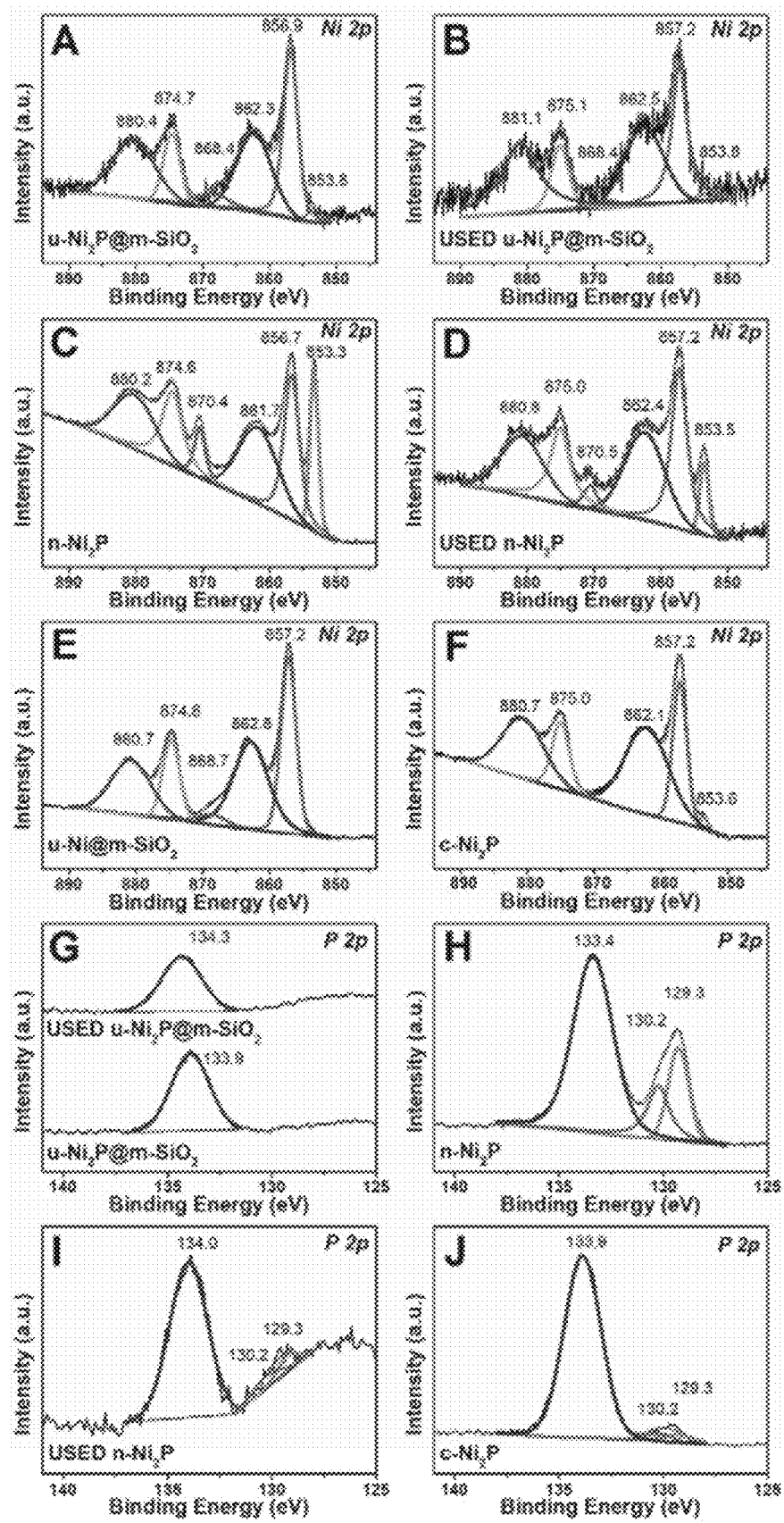
FIG. 53 illustrate XPS spectra data for some catalysts of the present invention.

The X-ray photoelectron spectra (XPS) of the above catalysts were measured to identify the chemical states present at the surface. The high-resolution XPS spectra are shown in FIG. 53, with the spectra of Ni 2p shown in graphs A, B, C, D, E, and F and the spectra of P 2p shown in graphs G, H, I, and J for u-Ni$_2$P@m-SiO$_2$ (invisible ultrafine Ni$_2$P nano clusters confined in mesoporous SiO$_2$, both fresh and used), n-Ni$_2$P (11 nm Ni$_2$P nano particles, dispersed on the quartz, fresh and used), u-Ni@m-SiO$_2$ (Ni precursor confined in mesoporous SiO$_2$, fresh), and c-Ni$_2$P (commercial Ni$_2$P powder, fresh). The lowest binding energy Ni 2p$_{3/2}$ peak recorded for unused n-Ni$_2$P and c-Ni$_2$P particles occurs at a binding energy of 853.3-853.6 eV. The low binding energy P 2p peak occurs at a binding energy of 129.3 eV for n-Ni$_2$P and c-Ni$_2$P. These Ni 2p$_{3/2}$ and P 2p peak binding energies correspond to Ni$_2$P. The higher binding energy P 2p peak occurs at a binding energy of 133.4-133.9 eV. This peak corresponds to the oxidized surface of Ni$_2$P and can be attributed to Ni$_3$(PO)$_4$. The strongest Ni 2p$_{3/2}$ peak for all Ni$_2$P and Ni catalyst samples occurs at binding energies between 856.7 and 857.2 eV. Ni(OH)$_2$ has a binding energy of 856.7 eV. The small binding energy difference between Ni(OH)$_2$ and Ni$_3$(PO)$_4$ makes it difficult to distinguish between these two chemical states. Considering that Ni$_3$(PO)$_4$ has been identified from the P 2p peaks and the binding energies observed also correspond to Ni(OH)$_2$, it is believed that Ni(OH)$_2$ was the dominant species on the Ni catalyst surface and Ni(OH)$_2$ and Ni$_3$(PO)$_4$ were present on the Ni$_2$P oxidized surface. However, Ni supported on SiO$_2$ may result in a strong metal-support interaction leading to the formation of nickel silicate, so nickel silicate may have also been present on the u-Ni@m-SiO$_2$ catalyst surface.

With regard to the intensities of the Ni 2p$_{3/2}$ and P 2p peaks for the different Ni$_2$P catalysts, the photoelectron intensity decreases in the order n-Ni$_2$P>c-Ni$_2$P>u-Ni$_2$P. The n-Ni$_2$P particles were freshly prepared, so exhibited a thinner oxidized layer than the commercially procured c-Ni$_2$P powder. The absence of a Ni$_2$P bulk P 2p peak for the u-Ni$_2$P@SiO$_2$ catalyst suggests the formation of a thicker and more strongly oxidized layer on the Ni$_2$P nanoparticles in the SiO$_2$ matrix. This could be a result of their very small diameter, providing a larger surface area and more highly stressed (hence weaker, more porous oxidized layer) leading to a greater degree of Ni$_2$P oxidation. However, the SiO$_2$ matrix encapsulating the Ni$_2$P nanoparticles may also have attenuated the photoelectron signal, which could explain the presence of only peaks corresponding to the surface oxide and not the bulk Ni$_2$P.

Figure 54:
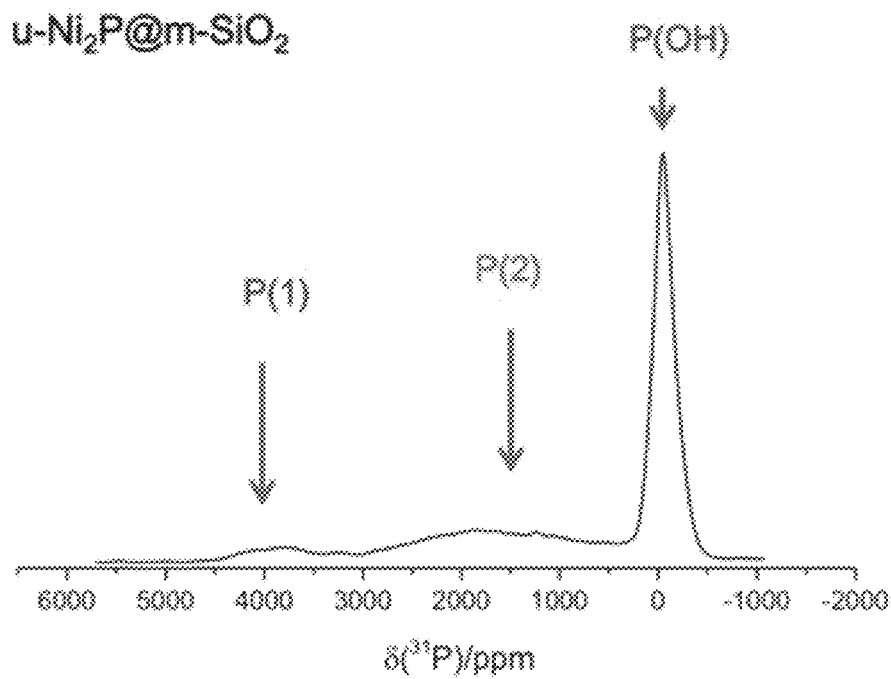
FIG. 54 illustrates $^{31}P$ MAS ssNMR spectrum data for some catalysts of the present invention.

FIG. 54 shows the $^{31}$P solid-state NMR spectrum of the sample u-Ni$_2$P@m-SiO$_2$. Since the crystal structure of Ni$_2$P comprises two alternating layers with the stoichiometry of Ni$_3$P$_2$ and Ni$_3$P along the [0001] direction, there are two non-equivalent P-sites, referred to as P(1) and P(2), with NMR signals shifts of ~4000 ppm and ~1500 ppm, respectively. In case of bulk Ni$_2$P, the P(1):P(2) signal integrals are in the ratio 2:1, in accordance with the stoichiometry. However, for Ni$_2$P nanoparticles, the $^{31}$P NMR signal broadens significantly due to crystal structure distortions at the surface of the nanoparticles, exhibiting the shift distributions shown in FIG. 54. The additional intense and narrow peak at 0 ppm is assigned to the P(OH) groups, which are likely due to Si(HPO$_4$) formed by the excess P reacted with SiO$_2$ during the phosphorization step, in agreement with the findings of XPS and SEM-EDX.

The textural properties of the samples containing mesoporous silica were studied employing N$_2$ adsorption/desorption experiments. The collected isotherms along with the NLDFT pore size distributions are presented in FIG. 55 and the BET surface area and pore volume are listed in the following Table 9:

TABLE 9

Summary of synthesis parameters, size and morphology characteristics, and porosity data

| Sample Name | Treatment Process | | | Size & Morphology | $V_p$ (cm$^3$·g$^{-1}$) | $S_{BET}$ (m$^2$·g$^{-1}$) | $d_{NLDFT}$ (nm) |
| --- | --- | --- | --- | --- | --- | --- | --- |
| | SiO$_2$ *[a] | P | Cal. | | | | |
| u-Ni$_2$P@m-SiO$_2$ | Yes | Yes | No | <2 nm Ni$_2$P @ SiO$_2$ | 0.13 | 53 | 3.3/5.1 |
| n-Ni$_2$P | No | Yes | No | ~11 nm Ni$_2$P particles | N/A | N/A | N/A |
| u-Ni@m-SiO$_2$ | Yes | No | Yes | <2 nm Ni @ SiO$_2$ | 0.23 | 214 | 3.8/5.9 |
| c-Ni$_2$P | N/A | N/A | N/A | >1 μm Ni$_2$P blocks | N/A | N/A | N/A |

*[a]: Average data from 5 measurements; error = 2%

Figure 55:
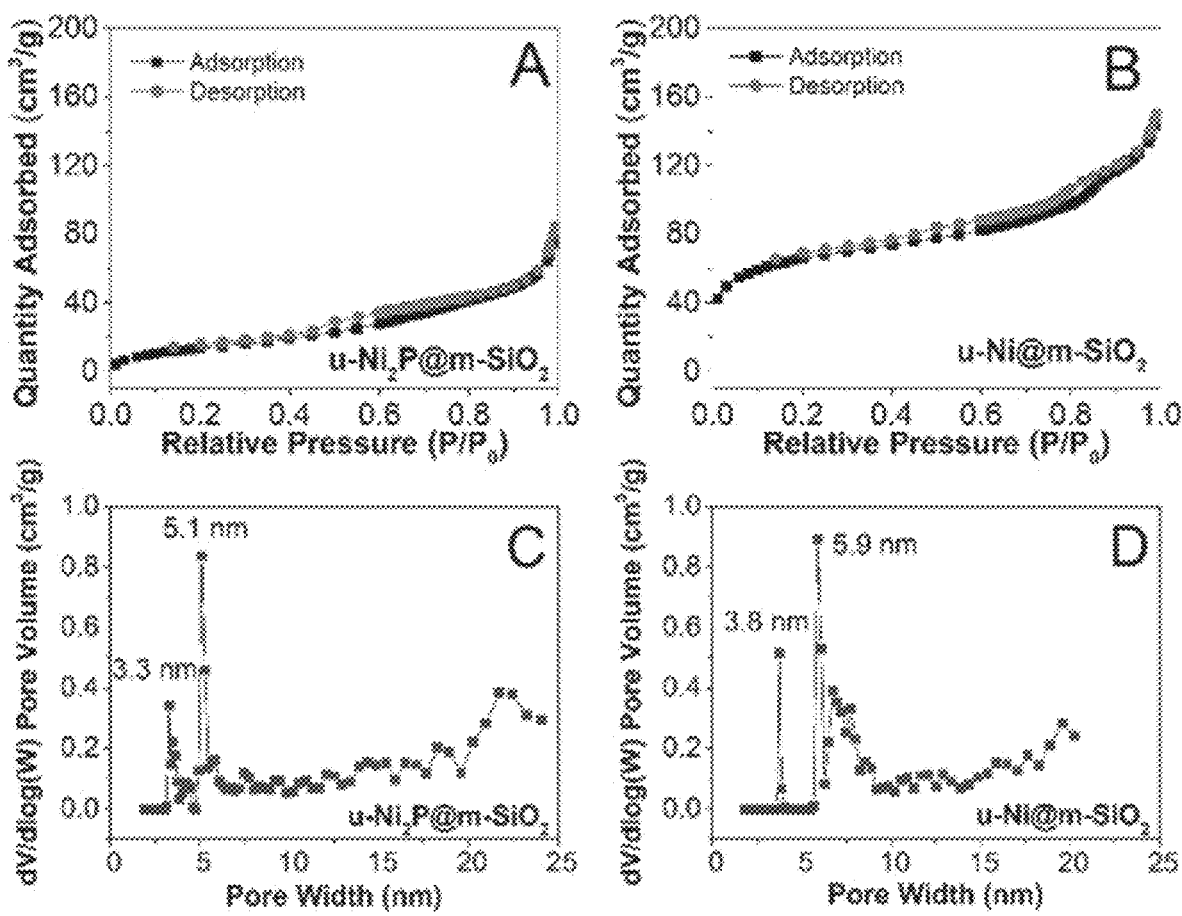
FIG. 55 illustrate $N_2$ adsorption-desorption isotherms and NLDFT pore size distribution data for some samples of the catalysts of the present invention.

Sample u-Ni$_2$P@m-SiO$_2$ (FIG. 55, panel A) and u-Ni@m-SiO$_2$ (FIG. 55, panel B) exhibit the typical Type IV isotherm according to the IUPAC classification. There are three distinct adsorbed volume uptakes: the uptakes at low, medium and high relative pressure, which correspond to the filling of microporous, mesoporous, and inter-grain volumes, respectively. The BET surface area of the u-Ni$_2$P@m-SiO$_2$ is 53 m$^2$·g$^{-1}$. The relatively low BET surface area measured is significantly lower than that of atypical MCM-41 structure (e.g., usually >500 m$^2$/g depending on the synthesis followed and the presence of dopants). This is likely due to the deterioration of the MCM-41 porous structure, as proved through the low-angle XRD studies, mostly due to absence of a thermal treatment step and the phosphorization process. The NLDFT pore width distributions of the above two samples are shown in FIG. 55, panels C and D, and Table 9 as well. The peak around 3-4 nm represents part of the hexagonal honeycomb meso-pores of MCM-41. The peak around 5-6 nm is likely due to defects in the meso-pores. The broad peak around 5-10 nm can be assigned to the collapsed defects caused by the calcination. Compare to the u-Ni@m-SiO$_2$ which has a surface area of 214 m$^2$·$^{-1}$ after calcination, the u-Ni$_2$P@m-SiO$_2$ has a much lower surface area, most likely due to the presence of template residues during the decomposition of CTAB in the phosphorization step or low hydrothermal stability of the MCM-41 structure initially built.

The possible Ni-containing phases have been evaluated using XRD, XPS, UV-vis and ssNMR. XRD studies for the n-Ni$_2$P and the c-Ni$_2$P samples confirmed the presence of the Ni$_2$P phase. Also, EDX elemental composition confirmed the Ni/P ratio of 1.8, close to the nominal one (2) for those two catalysts. The XPS Ni/P signals from the underlying Ni$_2$P bulk are of very low intensity. Hence, it is not possible to reliably calculate the Ni:P stoichiometry.

For the u-Ni@SiO$_2$ and u-Ni$_2$P@SiO$_2$ samples, the XRD patterns showed a lack of XRD peaks or minor peaks (after magnification), respectively. Particularly for the u-Ni$_2$P@SiO$_2$ catalyst, the XRD results indicate that the grain size is clearly very similar to that expected for growth of Ni$_2$P nano-particulates in the SiO$_2$ matrix pores, suggesting that the particulates are purely crystalline and there is no significant amorphous phase present. After the phosphorization step, the P atoms are inserted into the lattice of Ni (either crystalline or amorphous species), thus forming the Ni$_2$P phase, as confirmed using the XRD, XPS and NMR studies. The presence of other possible Ni—P containing phases (different stoichiometries) can be discounted, as they are typically synthesized at different phosphorization temperatures in the presence of OA; for example, the Ni$_{12}$P$_5$, Ni$_5$P$_4$ and NiP$_2$ phases need a phosphorization temperature of 250° C., 350° C., and 400° C., respectively, which was not the case in the synthesis procedures used in this study. In the synthesis followed herein in OA with excess TOP, the Ni—P phase was controlled by the temperature. Based on the SEM-EDX results, the ratio of P/Ni is about 2 for the u-Ni$_2$P@SiO$_2$, which is an excess compared to the nominal P/Ni ratio of 0.5 for the Ni$_2$P. The excess is likely due to the presence of compounds other than Ni$_2$P, such as P(OH) species and PO$_4^{3-}$(phosphates), as indicated by the NMR and XPS studies. The amorphous Ni is unlikely to survive in OA at 300° C. in the presence of excess amounts of TOP (P-source). Though, in the sample u-Ni@m-SiO$_2$, without phosphorization, the Ni was distributed in the SiO$_2$ matrix and is likely present as Ni-containing phase (e.g. NiO, Ni(OH)$_2$) based on the UV-vis and XPS analysis.

Mechanistic Insights on the Phosphorization Process

The conversion of the Ni precursor to Ni$_2$P (phosphorization) includes decomposing the Ni(acac)$_2$ precursor to Ni by raising the temperature above ~230° C. The insertion of P resulting from the decomposition of the TOP precursor (carrier of C—P bonds) into the Ni crystal occurs at about the same temperature. The phosphorization rate increases gradually with temperature, and after 2 hours of heating to ~300° C. the phase transformation of Ni to Ni$_2$P occurs. The long carbon chain of OA acts as a surfactant that prevents the aggregation of Ni$_2$P crystals. To control the size and morphology of nano particles, the type and carbon chain length of the surfactant are important. Due to the high temperature requirement to achieve the Ni$_2$P phase, a stable "surfactant" which can withstand temperatures above 300° C. is desirable for controlling the size and morphology the Ni$_2$P crystals. Mesoporous SiO$_2$ which is stable at high temperature (up to –600° C.) is a suitable candidate serving as a "hard template".

In some embodiments of this invention, mesoporous silica is used to prevent aggregation and limit growth of the crystals during the phosphorization step by introducing the Ni precursor into the mesoporous silica. With the assistance of CTAB as a surfactant, the Ni(acac)$_2$ is well dispersed in the silica matrix. When introducing Ni(acac)$_2$ into the CTAB solution, the removal of any precipitate of the precursor is desirable since the solubility of Ni(acac)$_2$ is very low. The clear solution of the liquid precursor, separated by centrifugation, ensures good dispersion of Ni(acac)$_2$ and prevents formation of aggregated nickel. To form the ultra-fine Ni$_2$P clusters, low loading of Ni precursor is advantageous as excess Ni will tend to form aggregates of larger particles on the available surface of SiO$_2$ support. Depending on the solubility of Ni(acac)$_2$ in water, the upper limit of well dispersed Ni incorporated into the SiO$_2$ matrix without giving rise to Ni aggregation is a Ni/Si ratio of about 5%. Only the soluble Ni(acac)$_2$ is enclosed in MCM-41, so the Ni precursor is highly dispersed. It may be possible to change the size range of the produced nanoparticles by modifying the Ni precursor to TOP ratio, however, altering that ratio is unlikely to produce ultrafine Ni$_2$P nanoparticles because the particles will slowly grow to around 10 nm during the 2 hours of phosphorization at 300° C. In the synthesis performed for these experiments, either for the 11 nm n-Ni$_2$P or the ultrafine u-Ni$_2$P@mSiO$_2$, both the TOP and OA were in excess so the influence of the amount of precursor was not an accountable parameter here.

The resulting composite is mixed with OA and TOP in order to initiate the phosphorization. The surfactant CTAB in the silica skeleton slowly decomposes when the as the temperature exceeds 250° C., thereby exposing the Ni precursor to P insertion, and the phosphorization occurs simultaneously. Due to the confinement effect of the stable mesoporous silica matrix, the Ni$_2$P crystals can only grow within the honeycomb channels which are less than 2 nm width. Hence, the phase transfer from Ni to Ni$_2$P can be completed after 2 hours heating at 300° C. while also ensuring that the Ni$_2$P nano cluster size remains in a range that is less than about 2 nm. From the EDX analysis, the atomic ratio of Ni precursor in SiO$_2$ is about 5%, and Ni$_2$P loading in SiO$_2$ is about 3.5%, as shown in the following Table 10:

TABLE 10

Compositional analysis of catalysts before and after performance testing

| | Atomic Ratio*[a] | | | | | |
|---|---|---|---|---|---|---|
| | Before Performance Test | | | After Performance Test | | |
| Sample Name | Ni/P | Ni/(Ni + Si) | S/Ni | Ni/P | Ni/(Ni + Si) | S/Ni |
| u-$Ni_2$P@m-$SiO_2$ | 0.5 | 7% | 0% | 0.5 | 10% | 0% |
| n-$Ni_2$P | 2.2 | 100% | 0% | 1.8 | 100% | 1.7% |
| u-Ni@m-$SiO_2$ | N/A | 5% | 0% | N/A | 6% | 5.3% |
| c-$Ni_2$P | 2.0 | 100% | 0% | 1.8 | 100% | 0.1% |

*[a]Average data from 5 measurements, error = 2%.

Compared to the c-$Ni_2$P and n-$Ni_2$P, the u-$Ni_2$P@m-$SiO_2$ shows a much higher P ratio. Based on the XPS and NMR analysis, it is clear that the excess P reacted with $SiO_2$ during the phosphorization step, leading to the formation of phosphate species on the surface of $SiO_2$.

Catalytic Performance

FIGS. 56A-56D illustrate four graphs showing, respectively, the $SO_2$ conversion, sulfur selectivity, reaction rate of $SO_2$, and TOF for the various catalysts across the temperature range 150° C. to 320° C. In each of these four graphs, the "A" data line is for the u-$Ni_2$P@m-$SiO_2$ (ultrafine $Ni_2$P nano clusters confined in mesoporous $SiO_2$) sample, the "B" data line is for the n-$Ni_2$P (11 nm $Ni_2$P nano particles) sample, the "C" data line is for the u-Ni@m-$SiO_2$ (Ni precursor confined in mesoporous $SiO_2$) sample, and the "D" data line is for the c-$Ni_2$P (commercial $Ni_2$P powder) sample.

Figure 56B:
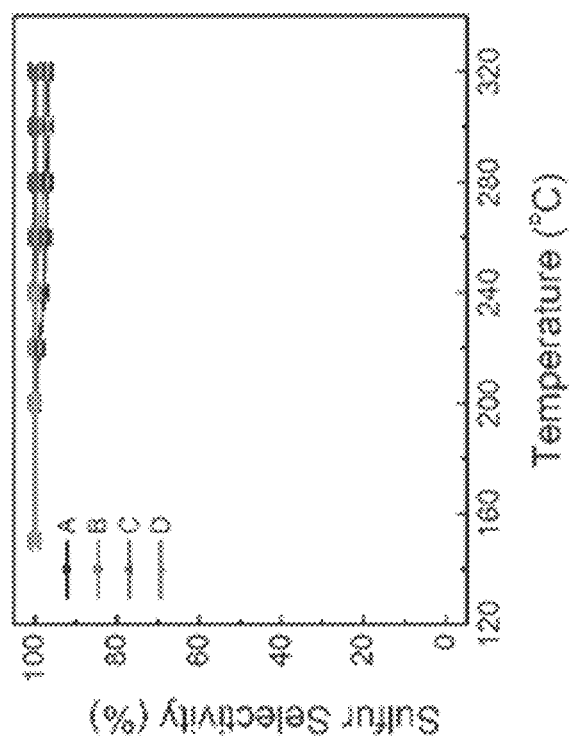
Figure 56A:
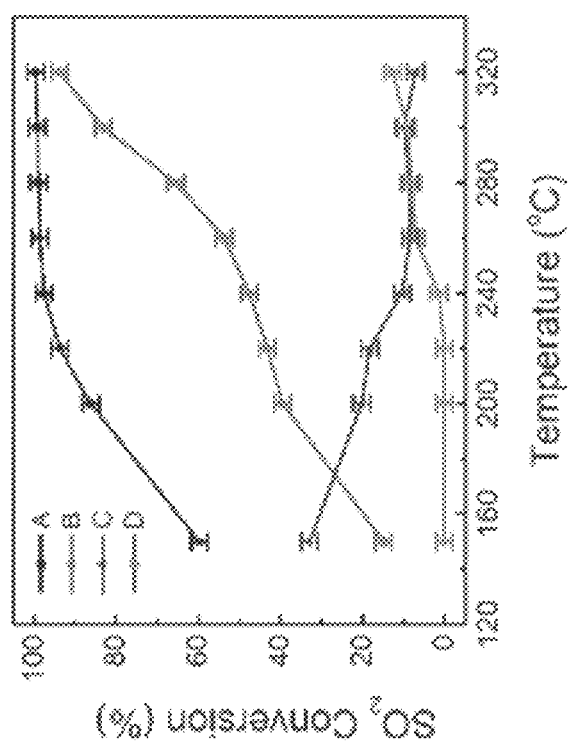

FIG. 56A shows that the activity of the four catalysts followed the order u-$Ni_2$P@m-$SiO_2$>n-$Ni_2$P>u-Ni@m-$SiO_2$>c-$Ni_2$P (A>B>C>D). The commercial $Ni_2$P sample (c-$Ni_2$P, data line D) shows the lowest activity (<20%) over the investigated temperature range. Compared to the commercial bulk $Ni_2$P, the 11 nm $Ni_2$P nano particles (n-$Ni_2$P, data line B) display higher activity achieving an $SO_2$ conversion of 43% at 220° C. and 94% at 320° C. Sample u-Ni@m-$SiO_2$ (Ni precursor confined in mesoporous $SiO_2$, data line C) was introduced to show the difference before and after phosphorization of the catalyst. It achieved low conversion of $SO_2$ (<30%) below 250° C. The conversion decreases with temperature increase and this may arise from the weakening of $H_2$ adsorption over the catalyst which reduces the concentration of surface adsorbed hydrogen. In contrast, sample u-$Ni_2$P@m-$SiO_2$ comprised of the smallest $Ni_2$P nano clusters achieved the highest activity. The $SO_2$ conversion achieved was 94% at 220° C. and reached ~99% conversion at 240° C. This result highlights the importance of active phase size on the catalytic performance. The mesoporous silica entrapment of $Ni_2$P allows for higher dispersion of the active sites along with higher surface areas and higher pore volumes, which facilitate the diffusion of $SO_2$ towards the $Ni_2$P active sites. Furthermore, the presence of higher concentration of defects (e.g. kink sites) over smaller nanoparticles can be a contributing factor.

FIG. 56B presents the selectivity to sulfur over the tested catalysts. All the $Ni_2$P samples exhibit a sulfur selectivity>97% over the temperature range investigated which suggests that the $Ni_2$P phase is an effective phase for $SO_2$ reduction to sulfur. u-$Ni_2$P@m-$SiO_2$ and n-$Ni_2$P achieved the highest $SO_2$ conversion and S selectivity over the temperature range 220-300° C. u-$Ni_2$P@m-$SiO_2$ showed the best performance in a comparatively low temperature at 220° C.

Tables 11 and 12 below illustrate the superior performance of the u-$Ni_2$P@m-$SiO_2$ and n-$Ni_2$P catalysts in reducing $SO_2$ to sulfur with $H_2$ as compared to various known catalysts.

TABLE 11 summary of experimental parameters of inventive catalysts and known catalysts

| Catalyst | Synthesis Method | Space Velocity | $SO_2/H_2$ (mol/mol) | $SO_2$ (ppm) | $SO_2$ Flow Rate (mL/min) | Mass of Catalyst (g) | Active Component (wt %) |
|---|---|---|---|---|---|---|---|
| Co—Mo/$Al_2O_3$ | Commercially & presulfided | WHSV = 3000 mL/g/h | 1/3 | $10^6$ | 2.5 | 2 | 11 |
| Fe/γ-$Al_2O_3$ | Impregnation & presulfided | GHSV = 3600/h | 1/2 | $10^6$ | 3 | 2 | 10 |
| Co/γ-$Al_2O_3$ | Impregnation & presulfided | GHSV = 3600/h | 1/2 | $10^6$ | 3 | 2 | 10 |
| Ni/r-$Al_2O_3$ | Impregnation & presulfided | GHSV = 3600/h | 1/2 | $10^6$ | 3 | 2 | 10 |
| Ru@$TiO_2$ | Impregnation & presulfided | WHSV = 9000 mL/g/h | 1/2 | $10^6$ | 20 | 0.4 | 1.5 |
| NiO/r-$Al_2O_3$ | Impregnation & presulfided | WHSV = 5040 mL/g/h | 1/2 | 12000 | 14 | 0.5 | 16 |
| $SnO_2$—$ZrO_2$ | Precipitate | GHSV = 10000/h | 1/2 | 20000 | 55 | 0.5 | 100 |
| u-$Ni_2$P@m-$SiO_2$ | One-pot & Phosphorization | GHSV = ~5000/h WHSV = 60000 mL/g/h | 1/200 | 103 | 20 | 0.04 | 6 |
| n-NiP | Phosphorization | GHSV = ~50000/h WHSV = 60000 mL/g/h | 1/200 | 103 | 20 | 0.04 | 100 |

TABLE 11-continued summary of experimental parameters of inventive catalysts and known catalysts

| Catalyst | Synthesis Method | Space Velocity | $SO_2/H_2$ (mol/mol) | $SO_2$ (ppm) | $SO_2$ Flow Rate (mL/min) | Mass of Catalyst (g) | Active Component (wt %) |
|---|---|---|---|---|---|---|---|
| u-Ni@m-SiO$_2$ | One-pot | GHSV = ~50000/h WHSV = 60000 mL/g/h | 1/200 | 103 | 20 | 0.04 | 3 |
| c-Ni$_2$P | Commercial | GHSV = ~5000/h WHSV = 60000 mL/g/h | 1/200 | 103 | 20 | 0.04 | 100 |

TABLE 12 summary of catalytic performance of inventive catalysts and known catalysts

| Catalyst | T (° C.) | $SO_2$ Conv. (%) | Sulfur Select. (%) | TOF ($10^{-6}$/s) |
|---|---|---|---|---|
| Co—Mo/Al$_2$O$_3$ | 300 | 84.2 | 95.4 | 573 |
| Fe/γ-Al$_2$O$_3$ | 300 | 44.9 | 95.2 | 256 |
| Co/γ-Al$_2$O$_3$ | 300 | 66.7 | 93.7 | 402 |
| Ni/r-Al$_2$O$_3$ | 300 | 63.9 | 91.9 | 353 |
| Ru@TiO$_2$ | 300 | 90.2 | 100 | 206988*[b] |
| NiO/r-Al$_2$O$_3$ | 320 | 98 | 69 | 82 |
| SnO$_2$—ZrO$_2$ | 550 | 98 | 55 | 208 |
| u-Ni$_2$P@m-SiO$_2$ | 220 | 93.8 | 98.9 | 81 |
|  | 320 | 99.6 | 96.8 | 87 |
| n-Ni$_2$P | 220 | 43.1 | 100 | 2 |
|  | 320 | 93.8 | 100 | 5 |
| u-Ni@m-SiO$_2$ | 220 | 18.2 | 100 | 8 |
|  | 320 | 7.1 | 100 | 3 |
| c-Ni$_2$P | 220 | 0.0 | 100 | 0 |
|  | 320 | 12.6 | 97.5 | 1 |

Figure 57A:
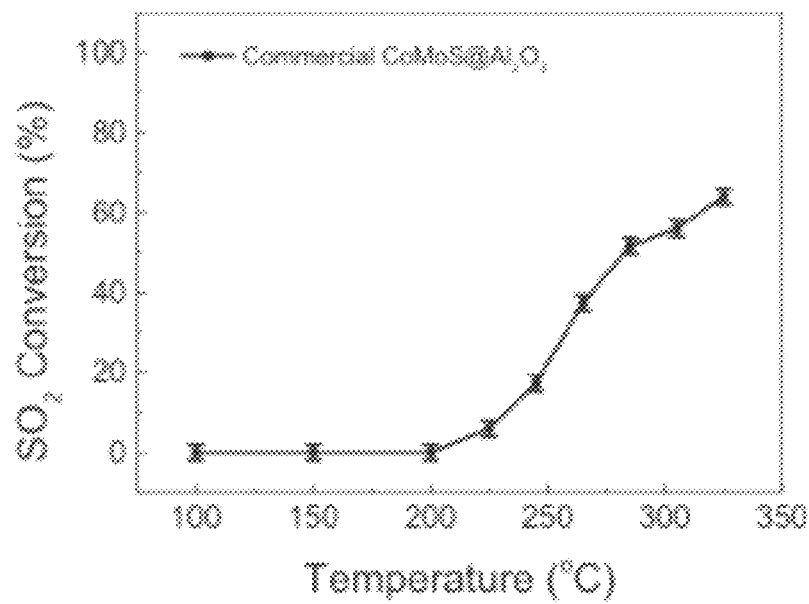
FIGS. 57A and 57B illustrate $SO_2$ conversion and sulfur selectivity curves for a commercial catalyst.
Figure 57B:
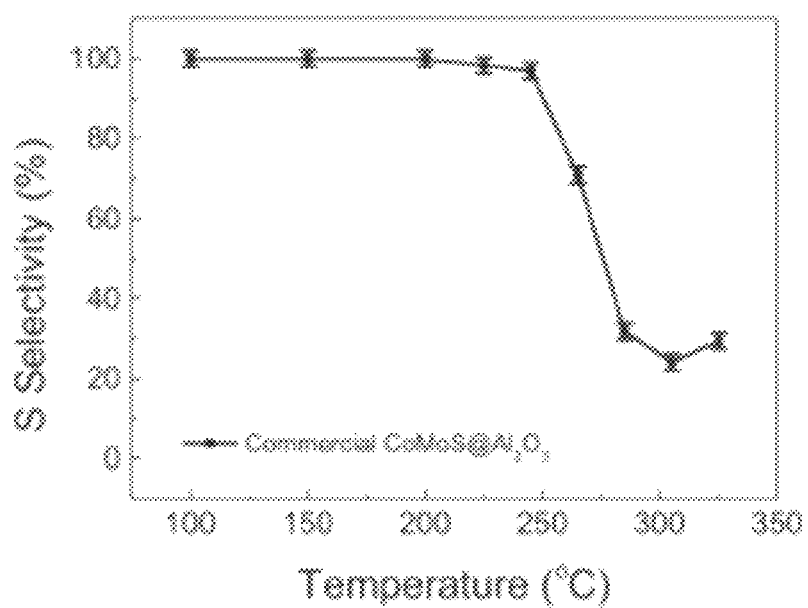

*[b]This high value is caused by the feed gas of SO$_2$ which had a high flow rate of 99.9% purity SO$_2$ gas without dilution The GHSV employed in this work is by far higher than known catalysts (5-20 times higher), which provides for smaller reactors and lower operating and capital costs. In addition, the performance of the CoMoS/Al$_2$O$_3$ commercial catalyst is given in FIGS. 57A and 57B which show the SO$_2$ conversion and sulfur selectivity curves for the commercial catalyst. It is clear that the commercial catalyst has an inferior performance compared to the inventive catalysts, especially at temperatures≤200° C. where the u-Ni$_2$P@m-SiO$_2$ catalyst provided 80% SO$_2$ conversion at 200° C. The profound activity differences between the CoMoS/Al$_2$O$_3$ and u-Ni$_2$P@m-SiO$_2$ catalysts are also reflected in the TOF values (Table 12).

Spent Catalyst Characterization

To assess catalyst structural and morphological changes due to the reaction conditions, spent catalysts of the samples u-Ni$_2$P@m-SiO$_2$ and u-Ni@m-SiO$_2$ were characterized using TEM imaging, TEM/EDX elemental analysis and XRD.

Figure 58:
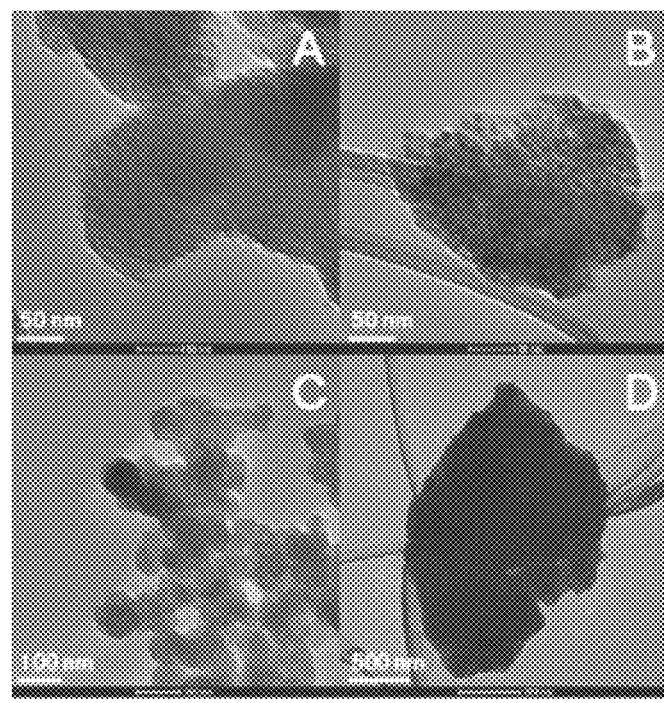
FIG. 58 illustrates TEM images for some catalysts of the present invention.

FIG. 58 illustrates the TEM images, with panel A showing the image of u-Ni2P@m-SiO2 (invisible ultrafine Ni2P nano clusters confined in mesoporous SiO2), panel B showing the image of n-Ni2P (11 nm Ni$_2$P nano particles, dispersed on the quartz), panel C showing the image of u-Ni@m-SiO$_2$ (Ni precursor confined in mesoporous SiO$_2$), and panel D showing the image of c-Ni$_2$P (commercial Ni$_2$P powder), all after catalysis performance testing. From the TEM images shown in panels A and C, it is apparent that the mesoporous SiO$_2$ structures of u-Ni$_2$P@m-SiO$_2$ and u-Ni@m-SiO$_2$ remained intact. Moreover, the active phase particles (Ni$_2$P or Ni/NiO crystals) retained their size and shape (see also panels D-F and H of FIG. 52 which illustrate post-testing mapping of catalysts). In the n-Ni$_2$P sample, the nano crystals retained their size and morphology (panel B of FIG. 58). Furthermore, size and morphology changes were absent for the c-Ni$_2$P (panel D of FIG. 58). The EDX results (shown in Table 10) of the samples after reaction show that the Ni/P ratio and the Ni/(Ni+Si) ratio remained intact. Trace amounts of sulfur formed during the reaction were measured on the surface of the catalyst based on the EDX analysis (Table 10). As the surface temperature of the catalyst is above 300° C. under reaction conditions, the S is likely to sublimate and then solidify at the end of the reaction tube where it is cold rather than deposit and accumulate on the surface of the catalysts. The possible source of the S on the surface of catalyst may come from the Ni—S species formed from the Ni in u-Ni@m-SiO$_2$ and the trace amount of Ni in n-Ni$_2$P (which was not combined with P during the phosphorization step). As the P:Ni ratio is about 2, there was excess loading of P on the SiO$_2$ compared to Ni, which excludes the formation of Ni—S species.

Figure 59A:
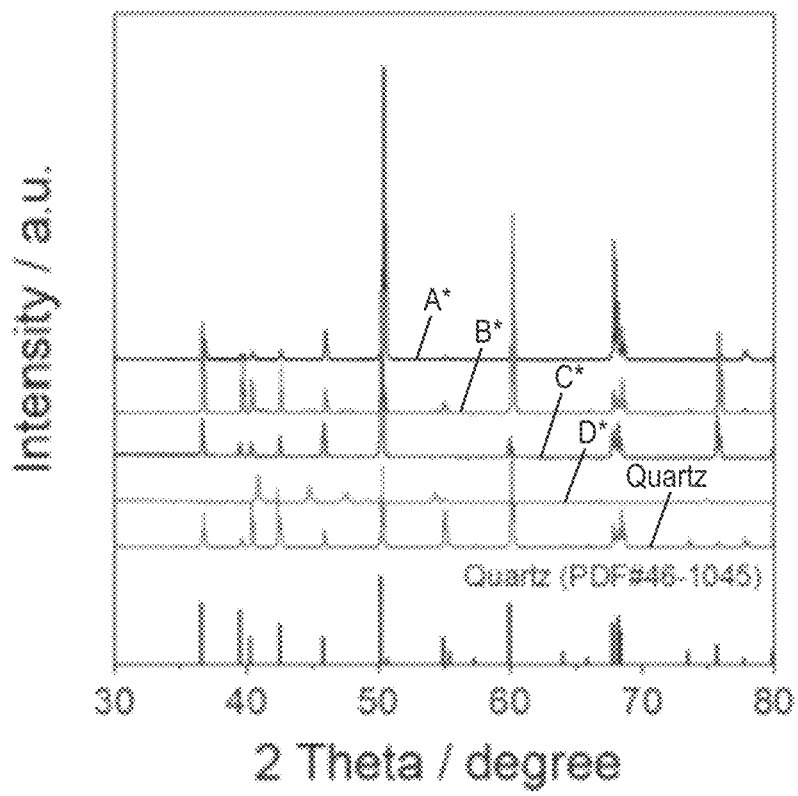
FIGS. 59A and 59B illustrate XRD patters for some catalysts of the present invention.
Figure 59B:
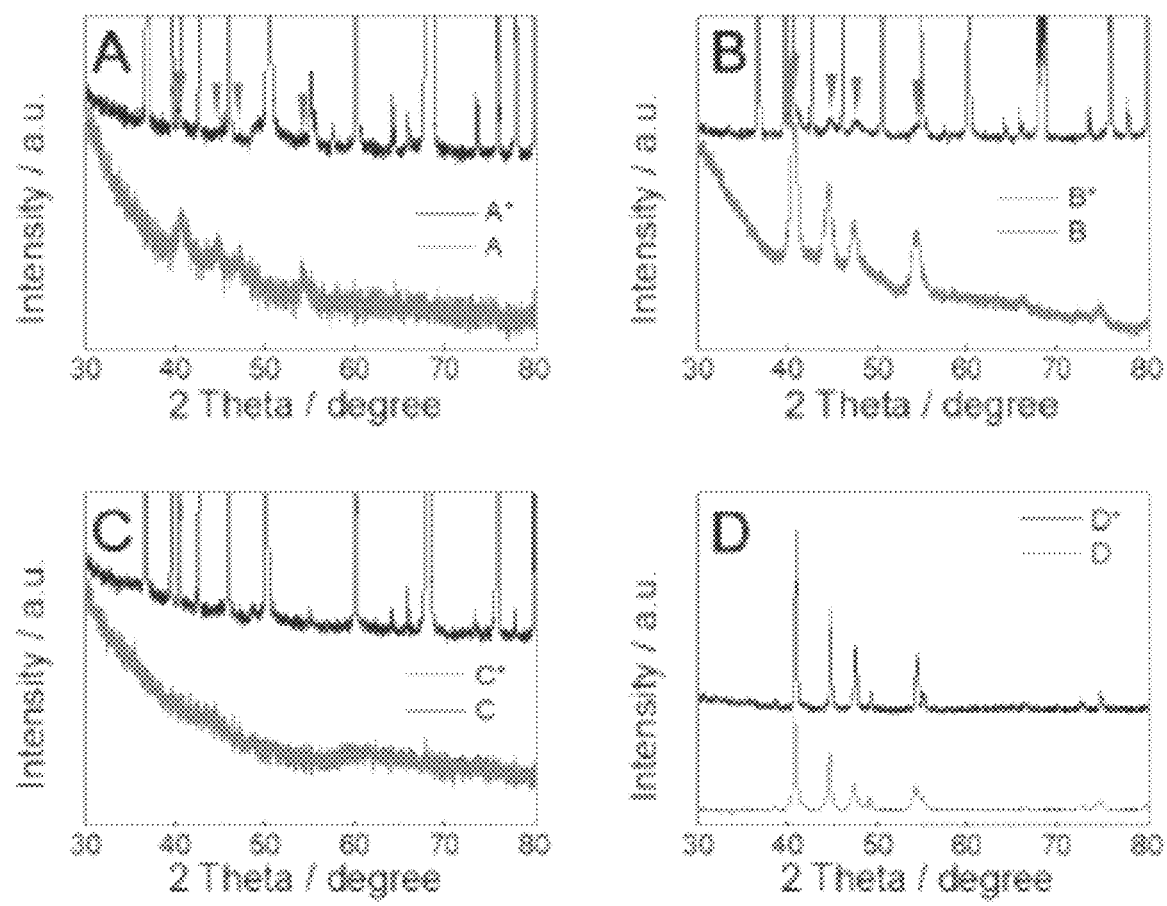

The XRD patterns of the above samples are presented in FIGS. 59A and 59B, with the data for the u-Ni$_2$P@m-SiO$_2$ sample (invisible ultrafine Ni$_2$P nano clusters confined in mesoporous SiO$_2$ mixed with quartz) denoted with "A*" and "A", the data for the n-Ni$_2$P sample (11 nm Ni$_2$P nano particles, mixed with quartz) denoted with "B*" and "B", the data for the u-Ni@m-SiO$_2$ sample (Ni precursor confined in mesoporous SiO$_2$ mixed with quartz) denoted with "C*" and "C", and the data for the c-Ni$_2$P sample (commercial Ni$_2$P powder mixed with quartz) denoted with "D*" and "D". The A/B/C/D data lines are for the fresh unused catalysts, while the A*/B*/C*/D* data lines indicate the "used" or post-performance testing catalysts.

The XRD patterns for the fresh samples and the spent samples were similar, except for the strong peak of quartz which was mixed with the catalysts during the performance test. The peaks at 2θ of 20.9° (100), 26.6° (101), 36.5° (110), 40.3° (111), 42.4° (200), 45.8° (201), 50.1° (112), 54.9° (202), 60.0° (211), and 67.70 (212) corresponds to the typical quartz characteristic peaks (PDF #46-1045). This suggests the absence of any structural changes experienced by the catalysts during use. A comparison of the STEM-HAADF/EDS elemental mapping in FIG. 52 for fresh u-Ni$_2$P@SiO$_2$ (panels A-C) and used Ni$_2$P@SiO$_2$ (panels D-F) shows that the Ni dispersion in the used sample is not as uniform as found in the original fresh sample, with small aggregated Ni particles (<5 nm) found on the border of the SiO$_2$ support. A comparison of the XPS results in FIG. 53 for the fresh samples (panels A, C, and H) and the used samples (panels B, D, and I) shows that the peaks located at around 853 eV and 129-130 eV decreased after the catalytic performance test, which indicates that the active Ni$_2$P phase decreased. Part of the Ni and P may have reacted with the support or diffused to the support during the catalytic reaction, thereby leaving less Ni and P residing on the surface.

Assessment of Reaction Kinetics

Figure 60:
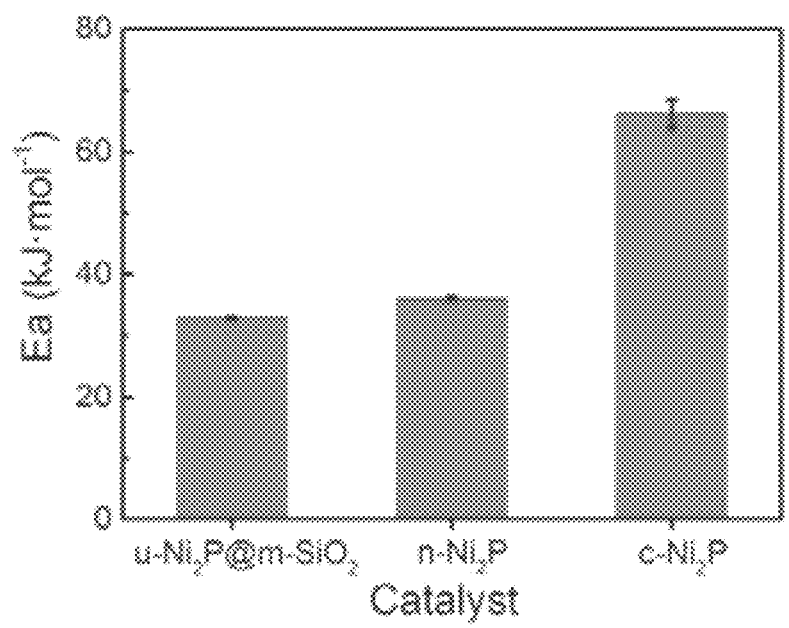
FIG. 60 illustrates activation energies for some catalysts of the present invention.

The average reaction rate in units µmols of SO$_2$ per second per gram of active catalysts (Ni$_2$P or Ni) was computed based on the Ni$_2$P loading in SiO$_2$. Hence the results reflect the activity per site. FIG. 56C presents the average reaction rate per gram of active site, while FIG. 56D shows the TOF of each catalyst. u-Ni$_2$P@m-SiO$_2$ is the most active catalyst, achieving a rate of about 0.6 µmol/s·g$_{active}$ and a TOF>80 (10$^{-6}$/s) over the temperature range of 220° C. to 320° C. n-Ni$_2$P achieved a reaction rate ranged between 0.01-0.03 µmol/s·g$_{active}$ and a TOF<5 (10$^{-6}$/s) while c-Ni$_2$P only has a SO$_2$ rate ranged between 0-0.004 µmol/s·g$_{active}$ and a TOF<1 (10$^{-6}$/s) over the studied temperature range. The vast difference in reaction rates is attributed to the size variation of Ni$_2$P crystals across the samples. The activation energy for the catalyst was computed from Arrhenius plots (ln k vs. 1/T), and the results are shown in FIG. 60. The activation energy is the lowest over the catalyst u-Ni$_2$P@m-SiO$_2$ (~33 kJ/mol), suggesting that the energy barrier can be surpassed at lower temperature. For the catalyst n-Ni$_2$P, the activation energy is slightly higher (~36 kJ/mol), whereas in the bulk catalyst c-Ni$_2$P the activation energy is much higher (~66 kJ/mol). This is consistent with the Ni$_2$P crystal diameter of each sample: u-Ni$_2$P@m-SiO$_2$ (<2 nm)<n-Ni$_2$P (11 nm)<c-Ni$_2$P (>1 µm). The apparent activation energy corresponding to sulfur formation decreases with nanoparticle size while the reaction rate increases. As the size of the particle decreases, surface roughness increases translating to higher concentrations of steps and kinks (i.e. sites of undersaturated coordination) which are sites where adsorption of reactants occur more strongly.

Conclusions

Highly active mesoporous SiO$_2$ confined ultrafine Ni$_2$P nano cluster was synthesized by the phase conversion method in OA and TOP at 300° C. for the enhancement of the catalytic reduction of SO$_2$ to sulfur in the presence of H$_2$. The Ni precursor was dispersed in the mesoporous SiO$_2$ matrix before phosphorization. The honeycomb channels in the SiO$_2$ matrix provide a stable confined crystal grow space, thus facilitating the formation of ultrafine Ni$_2$P nano clusters of sizes less than 2 nm. The XRD patterns show the typical Ni$_2$P broad peaks and the TEM images reveal the ordered fingerprint 2D hexagonal honeycomb pores of MCM-41. The NMR study indicates that this ultrafine Ni$_2$P catalysts exhibits a higher ratio of energetically favored Ni$_3$P$_2$ terminations. XPS and UV-DRS studies demonstrated that phosphate species are also formed on the surface. Compared to the commercial bulk Ni$_2$P and the 11 nm Ni$_2$P nano particles, the mesoporous SiO$_2$ confined ultrafine Ni$_2$P nano clusters display a high activity for the SO$_2$ reduction to sulfur in H$_2$ (94% SO$_2$ conversion at 220° C. and ~99% at 240° C., >97% selectivity to sulfur, GHSV=~50000/h, WHSV=60000 mL/g/h), and the ultrafine Ni$_2$P nano clusters significantly reduces the activation energy of the SO$_2$ hydrogenation. This mesoporous SiO$_2$ confined nano crystal phase transfer method provides a new strategy for the high dispersion ultrafine nano crystal catalyst synthesis as well as the active site phase and size control, achieving catalysts of great potential for the other transition metal phosphide and the industry application.

What is claimed is:

1. A method of making a hydrogenation catalyst, the method comprising:
   dispersing Ni in a mesoporous SiO2 to form a Ni@meso-SiO2 composite;
   contacting the Ni@meso-SiO2 composite with a P source to provide a Ni$_x$P$_y$@meso-SiO2 composite, wherein contact between the Ni@meso-SiO2 composite and the P source occurs as a temperature between 225° C. and 375° C., and wherein the Ni$_x$P$_y$@meso-SiO$_2$ composite includes Ni$_x$P$_y$ nanoparticles that are less than 5 nm in size and are embedded within the mesoporous SiO$_2$.

2. The method of claim 1, wherein dispersing Ni in mesoporous SiO2 includes forming a mixture of Ni precursor, a solvent, a surfactant, and a SiO2 source.

3. The method of claim 2, wherein the mixture includes a Ni: Si atomic ratio of 5% or less.

4. The method of claim 2, wherein the Ni precursor is Ni(acac)$_2$, the solvent is water, the surfactant is CTAB, and the SiO2 source is Na$_2$SiO$_3$; and wherein dispersing Ni in mesoporous SiO$_2$ includes forming particles of Ni@meso-SiO$_2$ composite suspended in a liquid phase and separating the particles of Ni@SiO$_2$ composite from the liquid phase; and further including removing excess Ni precursor from the mixture; and further stirring the mixture at a temperature of between about 15° C. and 60° C. for a time of between 1 hour and 24 hours.

5. The method of claim 1, wherein contacting the Ni@meso-SiO$_2$ composite with a P source includes dissolving the P source in OA.

6. The method of claim 1, wherein the P source is TOP.

7. The method of claim 1, wherein the Ni@meso-SiO$_2$ composite is contacted with the P source for at least 2 hours.

8. The method of claim 1, wherein the Ni$_x$P$_y$@meso-SiO$_2$ composite is substantially free of amorphous phase Ni.

9. The method of claim 1, wherein contact between the Ni@meso-SiO$_2$ composite and the P source occurs as a temperature between 225° C. and 275° C., and wherein the Ni$_x$P$_y$@meso-SiO$_2$ composite is a Ni$_{12}$P$_5$@meso-SiO$_2$ composite and includes Ni$_{12}$P$_5$ nanoparticles that are less than 5 nm in size and are embedded within the mesoporous SiO$_2$.

10. The method of claim 1, wherein contact between the Ni@meso-SiO$_2$ composite and the P source occurs as a temperature between 275° C. and 325° C., and wherein the Ni$_x$P$_y$@meso-SiO$_2$ composite is a Ni$_2$P@meso-SiO$_2$ composite and includes Ni$_2$P nanoparticles that are less than 5 nm in size and are embedded within the mesoporous SiO$_2$.

11. The method of claim 1, wherein contact between the Ni@meso-SiO$_2$ composite and the P source occurs as a temperature between 325° C. and 375° C., and wherein the Ni$_x$P$_y$@meso-SiO$_2$ composite is a Ni$_5$P$_4$@meso-SiO$_2$ composite and includes Ni$_5$P$_4$ nanoparticles that are less than 5 nm in size and are embedded within the mesoporous SiO$_2$.

12. The method of claim 1, wherein the Ni$_2$P nanoparticles are less than 2 nm in size.

13. A method of making a hydrogenation catalyst, the method comprising:
   dissolving Ni in a solvent at a temperature between 15° C. and 100° C. to form a first mixture, wherein the solvent has a boiling point that is above 400° C.;
   heating the mixture to a temperature of between 325° C. and 375° C. to provide a heated mixture;

adding a P source to the heated mixture while maintaining the temperature between 325° C. and 375° C. to allow the P source to phosphorize the Ni and to produce $Ni_5P_4$ nanoparticles.

14. The method of claim 13, wherein the solvent is TOPO.

15. The method of claim 14, wherein the Ni precursor is $Ni(acac)_2$.

16. The method of claim 15, where the P source is TOP or TOPO.

17. The method of claim 13, wherein the $Ni_5P_4$ nanocrystals are between 25 nm and 125 nm in size.

18. A hydrogenation catalyst, comprising:
$Ni_2P$ nanoparticles that are less than 2 nm in size; and
mesoporous $SiO_2$, wherein the $Ni_2P$ nanoparticles are embedded within the mesoporous $SiO_2$.

* * * * *